US007130885B2

(12) United States Patent
Chandra et al.

(10) Patent No.: US 7,130,885 B2
(45) Date of Patent: Oct. 31, 2006

(54) METHODS AND APPARATUS PROVIDING ELECTRONIC MESSAGES THAT ARE LINKED AND AGGREGATED

(75) Inventors: Mala Chandra, Pleasanton, CA (US); Steven R. Evans, Los Altos Hills, CA (US); John Kruempelstaedter, Cupertino, CA (US); Kirpal Khalsa, Sunnyvale, CA (US); Joshua McFarland, San Francisco, CA (US)

(73) Assignee: Zaplet, Inc., Redwood Shores, CA (US)

( * ) Notice: Subject to any disclaimer, the term of this patent is extended or adjusted under 35 U.S.C. 154(b) by 559 days.

(21) Appl. No.: 09/948,051

(22) Filed: Sep. 5, 2001

(65) Prior Publication Data

US 2002/0138582 A1    Sep. 26, 2002

Related U.S. Application Data

(60) Provisional application No. 60/230,037, filed on Sep. 5, 2000.

(51) Int. Cl.
 G06F 15/16 (2006.01)
(52) U.S. Cl. .................... 709/206; 709/223; 709/224
(58) Field of Classification Search ............... 709/206, 709/207, 205, 223, 224
 See application file for complete search history.

(56) References Cited

U.S. PATENT DOCUMENTS 4,503,499 A    3/1985 Mason et al. ............... 364/200

(Continued)

FOREIGN PATENT DOCUMENTS

EP    0 581 722 A1    2/1994

(Continued)

OTHER PUBLICATIONS

James E. Pitkow, et al., "Towards an intelligent publishing environment," Computer Networks and ISDN Systems, 1995, pp. 729-737.

(Continued)

Primary Examiner—Zarni Maung
Assistant Examiner—Nghi V. Tran
(74) Attorney, Agent, or Firm—Hickman Palermo Truong & Becker LLP

(57) ABSTRACT

A method for associating related electronic messages in computer storage. A first transportable application is created and stored. User input requesting creation of a link from the first transportable application to another transportable application is received. User input that selects a second transportable application from among a plurality of previously created transportable applications is received. A link from the first transportable application to the second transportable application is created and stored. As a result, transportable application may be inter-related in complex message webs. The message webs may also be inter-related in message web rings. Links may be generated manually or automatically, based on context, workflow processes, or other known relationships among applications. Recipient lists and data may propagate among fields of linked transportable applications, directly or according to abstract business rules. Further, multiple-part electronic messages are disclosed. A graphical user interface of an electronic messaging system displays a message in the form of one or more header portions and one or more body portions. Each of the body portions has a selection region. While one body portion is visible at a given time, all the selection regions are continuously visible in the user interface to facilitate selection of any of the body portions at a particular time. Selecting a selection region of a non-displayed body portion causes a server to generate a refreshed user interface that includes the entirety of the selected body portion, and that hides the previously viewed body portion. As a result, a large amount of associated information may be combined in a single message in a way that is clearly organized and easily accessible.

17 Claims, 70 Drawing Sheets

U.S. PATENT DOCUMENTS

| | | | |
|---|---|---|---|
| 4,567,600 A | 1/1986 | Massey et al. ............... 375/2.1 |
| 4,645,873 A | 2/1987 | Chomet ...................... 379/93 |
| 5,043,876 A | 8/1991 | Terry ........................ 364/200 |
| 5,089,954 A | 2/1992 | Rago ........................ 395/600 |
| 5,093,901 A | 3/1992 | Cree et al. ................. 395/100 |
| 5,093,918 A | 3/1992 | Heyen et al. ............... 395/725 |
| 5,129,057 A | 7/1992 | Strope et al. ............... 395/161 |
| 5,161,214 A | 11/1992 | Addink et al. ............. 395/145 |
| 5,245,532 A | 9/1993 | Mourier ..................... 364/400 |
| 5,299,305 A | 3/1994 | Oomae et al. .............. 395/149 |
| 5,325,310 A | 6/1994 | Johnson et al. ............ 364/514 |
| 5,337,407 A | 8/1994 | Bates et al. |
| 5,363,507 A | 11/1994 | Nakayama et al. ......... 395/800 |
| 5,377,354 A | 12/1994 | Scannell et al. ............ 395/650 |
| 5,392,400 A | 2/1995 | Berkowitz et al. .......... 395/200 |
| 5,408,470 A | 4/1995 | Rothrock et al. ............ 370/62 |
| 5,410,646 A | 4/1995 | Tondevold et al. ......... 395/149 |
| 5,418,908 A | 5/1995 | Keller et al. ................ 395/200 |
| 5,428,784 A | 6/1995 | Cahill, Jr. ................... 395/650 |
| 5,535,332 A | 7/1996 | Ishida .................... 395/200.01 |
| 5,537,142 A | 7/1996 | Fenouil ....................... 348/12 |
| 5,555,426 A | 9/1996 | Johnson et al. ........ 395/200.15 |
| 5,557,723 A | 9/1996 | Holt et al. .................. 395/149 |
| 5,579,472 A | 11/1996 | Keyworth, II et al. ...... 395/326 |
| 5,583,993 A | 12/1996 | Foster et al. |
| 5,592,626 A | 1/1997 | Papadimitriou et al. ..................... 395/200.09 |
| 5,602,841 A | 2/1997 | Lebizay et al. ............. 370/413 |
| 5,608,872 A | 3/1997 | Schwartz et al. ...... 395/200.04 |
| 5,615,269 A | 3/1997 | Micali ......................... 380/49 |
| 5,617,539 A | 4/1997 | Ludwig et al. ........ 395/200.02 |
| 5,632,018 A | 5/1997 | Otorii .................... 395/200.04 |
| 5,647,002 A | 7/1997 | Brunson ...................... 380/49 |
| 5,664,207 A | 9/1997 | Crumpler et al. ........... 395/766 |
| 5,687,317 A | 11/1997 | Hughes et al. ......... 395/200.03 |
| 5,689,642 A | 11/1997 | Harkins et al. ........ 395/200.04 |
| 5,692,125 A | 11/1997 | Schloss et al. ............. 395/209 |
| 5,706,452 A | 1/1998 | Ivanov |
| 5,727,165 A | 3/1998 | Ordish et al. |
| 5,732,400 A | 3/1998 | Mandler et al. ............... 705/26 |
| 5,744,670 A | 4/1998 | Motoyuki et al. .......... 585/320 |
| 5,757,669 A | 5/1998 | Christie et al. ....... 364/514.006 |
| 5,761,662 A * | 6/1998 | Dasan ........................ 707/10 |
| 5,781,732 A | 7/1998 | Adams .................. 395/200.35 |
| 5,790,677 A | 8/1998 | Fox et al. ..................... 380/24 |
| 5,794,207 A | 8/1998 | Walker et al. ................ 705/23 |
| 5,796,396 A | 8/1998 | Rich ........................... 345/332 |
| 5,799,191 A | 8/1998 | Moriyasu et al. ........... 395/682 |
| 5,799,320 A | 8/1998 | Klug .......................... 707/10 |
| 5,819,032 A | 10/1998 | de Vries et al. .......... 395/200.8 |
| 5,819,092 A | 10/1998 | Ferguson et al. ............ 395/701 |
| 5,819,274 A | 10/1998 | Jackson, Jr. ................. 707/10 |
| 5,821,925 A | 10/1998 | Carey et al. ................ 345/331 |
| 5,825,883 A | 10/1998 | Archibald et al. ............. 380/25 |
| 5,826,242 A | 10/1998 | Montulli ...................... 705/27 |
| 5,835,713 A | 11/1998 | FitzPatrick et al. ..... 395/200.34 |
| 5,842,178 A | 11/1998 | Giovannoli ................... 705/26 |
| 5,848,396 A | 12/1998 | Gerace ........................ 705/10 |
| 5,850,430 A | 12/1998 | Hamalainen ............. 379/93.02 |
| 5,850,517 A | 12/1998 | Verkler et al. ......... 395/200.32 |
| 5,855,020 A | 12/1998 | Kirsch ........................ 707/10 |
| 5,862,223 A | 1/1999 | Walker et al. |
| 5,862,330 A | 1/1999 | Anupam et al. ....... 395/200.34 |
| 5,872,924 A | 2/1999 | Nakayama et al. .... 395/200.35 |
| 5,884,035 A | 3/1999 | Butman et al. ........ 395/200.48 |
| 5,884,325 A | 3/1999 | Bauer et al. ................ 707/201 |
| 5,892,761 A | 4/1999 | Stracke, Jr. ................. 370/395 |
| 5,897,622 A | 4/1999 | Blinn et al. .................. 705/26 |
| 5,905,863 A | 5/1999 | Knowles et al. |
| 5,909,689 A | 6/1999 | Van Ryzin ................. 707/203 |
| 5,911,045 A | 6/1999 | Leyba et al. ........... 395/200.34 |
| 5,913,040 A | 6/1999 | Rakavy et al. ......... 395/200.62 |
| 5,913,920 A | 6/1999 | Adams et al. ............... 709/204 |
| 5,918,054 A | 6/1999 | Jury et al. ................... 395/712 |
| 5,923,848 A | 7/1999 | Goodhand et al. ..... 395/200.49 |
| 5,926,798 A | 7/1999 | Carter |
| 5,930,471 A | 7/1999 | Milewski et al. ....... 395/200.04 |
| 5,933,811 A | 8/1999 | Angles et al. ................ 705/14 |
| 5,937,160 A | 8/1999 | Davis et al. |
| 5,937,161 A | 8/1999 | Mulligan et al. ....... 395/200.36 |
| 5,944,785 A | 8/1999 | Pommier et al. ........... 709/205 |
| 5,945,989 A | 8/1999 | Freishtat et al. ............ 345/329 |
| 5,948,057 A | 9/1999 | Berger et al. ............... 709/205 |
| 5,948,070 A | 9/1999 | Fujita ......................... 709/243 |
| 5,951,652 A | 9/1999 | Ingrassia, Jr. et al. ...... 709/248 |
| 5,956,693 A | 9/1999 | Geerlings ..................... 705/14 |
| 5,959,621 A * | 9/1999 | Nawaz et al. ............... 715/733 |
| 5,960,404 A | 9/1999 | Chaar et al. ................... 705/8 |
| 5,963,947 A | 10/1999 | Ford et al. .................... 707/10 |
| 5,966,512 A | 10/1999 | Bates et al. ............ 395/200.35 |
| 5,970,470 A | 10/1999 | Walker et al. |
| 5,970,479 A | 10/1999 | Shepherd ..................... 705/37 |
| 5,974,430 A | 10/1999 | Mutschler, III et al. .... 707/505 |
| 5,978,836 A | 11/1999 | Ouchi |
| 5,987,376 A | 11/1999 | Olson et al. ................ 701/201 |
| 5,995,096 A | 11/1999 | Kitahara et al. ............ 345/330 |
| 5,995,097 A | 11/1999 | Tokumine et al. .......... 345/331 |
| 6,006,200 A | 12/1999 | Boies et al. .................. 705/26 |
| 6,009,410 A | 12/1999 | LeMole et al. ............... 705/14 |
| 6,012,083 A | 1/2000 | Savitzky et al. ............ 709/202 |
| 6,012,090 A | 1/2000 | Chung et al. ............... 709/219 |
| 6,014,502 A | 1/2000 | Moraes .................. 395/200.49 |
| 6,014,644 A | 1/2000 | Erickson ...................... 705/37 |
| 6,014,688 A | 1/2000 | Venkatraman et al. |
| 6,023,686 A | 2/2000 | Brown ......................... 705/37 |
| 6,025,841 A | 2/2000 | Finkelstein et al. ......... 345/342 |
| 6,041,308 A | 3/2000 | Walker et al. ................ 705/14 |
| 6,044,205 A | 3/2000 | Reed et al. ............. 395/200.31 |
| 6,044,403 A | 3/2000 | Gerszberg et al. .......... 709/225 |
| 6,047,311 A | 4/2000 | Ueno et al. ................. 709/202 |
| 6,049,787 A | 4/2000 | Takahashi et al. ............ 705/44 |
| 6,055,519 A | 4/2000 | Kennedy et al. ............. 705/80 |
| 6,055,522 A * | 4/2000 | Krishna et al. ............. 715/517 |
| 6,084,883 A | 7/2000 | Norrell et al. .............. 370/420 |
| 6,092,074 A | 7/2000 | Rodkin et al. .............. 707/102 |
| 6,105,055 A | 8/2000 | Pizano et al. ............... 709/204 |
| 6,115,384 A | 9/2000 | Parzych ...................... 370/401 |
| 6,134,534 A | 10/2000 | Walker et al. |
| 6,134,582 A | 10/2000 | Kennedy .................... 709/206 |
| 6,141,010 A | 10/2000 | Hoyle ........................ 345/356 |
| 6,144,991 A | 11/2000 | England ...................... 709/205 |
| 6,151,588 A | 11/2000 | Tozzoli |
| 6,151,621 A | 11/2000 | Colyer et al. ............... 709/204 |
| 6,155,840 A | 12/2000 | Sallette ....................... 434/323 |
| 6,161,137 A | 12/2000 | Ogdon et al. ............... 709/224 |
| 6,161,149 A | 12/2000 | Achacoso et al. ............. 710/4 |
| 6,173,316 B1 | 1/2001 | De Boor et al. ............ 709/218 |
| 6,182,052 B1 | 1/2001 | Fulton et al. ................. 705/26 |
| 6,185,602 B1 | 2/2001 | Bayrakeri ................... 709/204 |
| 6,205,478 B1 | 3/2001 | Sugano et al. .............. 709/223 |
| 6,208,956 B1 | 3/2001 | Motoyama |
| 6,212,553 B1 | 4/2001 | Lee et al. ................... 709/206 |
| 6,219,054 B1 | 4/2001 | Komoda et al. ............ 345/353 |
| 6,226,670 B1 | 5/2001 | Ueno et al. ................. 709/207 |
| 6,230,156 B1 | 5/2001 | Hussey ....................... 707/10 |
| 6,230,185 B1 * | 5/2001 | Salas et al. ................. 709/205 |
| 6,247,045 B1 | 6/2001 | Shaw et al. ................. 709/207 |
| 6,260,124 B1 | 7/2001 | Crockett et al. ............. 711/162 |
| 6,282,565 B1 * | 8/2001 | Shaw et al. ................. 709/206 |
| 6,317,777 B1 | 11/2001 | Skarbo et al. .............. 709/204 |
| 6,336,134 B1 | 1/2002 | Varma ........................ 709/205 |
| 6,338,086 B1 | 1/2002 | Curtis et al. ................ 709/218 |
| 6,505,233 B1 * | 1/2003 | Hanson et al. .............. 709/204 |
| 6,697,942 B1 * | 2/2004 | L'Heureux et al. ......... 713/152 |

| | | | |
|---|---|---|---|
| 6,718,368 B1* | 4/2004 | Ayyadurai | 709/206 |
| 6,732,152 B1* | 5/2004 | Lockhart et al. | 709/206 |
| 6,748,421 B1* | 6/2004 | Ozkan et al. | 709/206 |
| 2002/0026349 A1* | 2/2002 | Reilly et al. | 705/14 |
| 2002/0059526 A1* | 5/2002 | Dillon et al. | 713/201 |
| 2003/0028607 A1 | 2/2003 | Miller et al. | |
| 2003/0140112 A1* | 7/2003 | Ramachandran et al. | 709/217 |

FOREIGN PATENT DOCUMENTS

| | | |
|---|---|---|
| EP | 0 739 115 A2 | 10/1996 |
| EP | 0 959 592 A2 | 11/1999 |
| EP | 1 085 444 A2 | 3/2001 |
| WO | WO 99/03053 A1 | 1/1999 |
| WO | WO 99/20014 A2 | 4/1999 |

OTHER PUBLICATIONS

S. Dharap et al., "Multi-user distributed specification environments for Z," Technical report, Pennsylvania State University (1992), pp. 1-29.

S. Dharap et al., "The Z-Specificator: A multi-user distributed specification environment," Technical report, Pennsylvania State University (1992), pp. 1-26.

S. Dharap, "Coordinating Concurrent Development in Distributed Environments," Ph.D. thesis, Pennsylvania State University Department of Computer Science (May, 1995), pp. 1-98.

J. Palme, et al., "MIME Encapsulation of Aggregate Documents, Such As HTML (MHTML)," Mar. 1999, XP 002209393, pp. 1-28.

IBM Corp, IBM Technical Disclosure Bulletin, "Method for Managing Files Referenced in In-Basket Items," vol. 36, No. 07, Jul. 1993, p. 469.

Goldberg et al., "Active Mail-A Framework for Implementing Groupware," CSWC Proceedings Nov. 1992: 75-83.

Brothers et al., "Supporting Informal Communication via Ephemeral Interest Groups," CSWC Proceedings Nov. 1992: 84-90.

Borstein, Nathanial S., "Computational Mail as Network Infrastructure for Computer-Supported Cooperative Work," CSWC Proceedings Nov. 1992: 67-74.

"Lotus Notes 5 Release Step by Step, A Beginner's Guide to Lotus Notes," 1995-1999, pp. 1-228.

"Quick Courses in Microsoft Outlook 2000," Microsoft Press, Online Press Inc., 1999, pp. 1-148.

Jacobs, Stephan et al., "Filling HTML forms simultaneously: CoWeb—architecture and functionality," Computer Networks and ISDN Systems 28, 1996, pp. 1385-1395, XP-004018236.

Palme, J. et al., "MIME E-mail Encapsulation of Aggregate Documents, such as HTML (MHTML)," IETF Standard, Internet Engineering Task Force, IETF Mar. 1997, pp. 1-19.

European Patent Office, "Supplementary European Search Report," EP 00957754.5-2413, dated Jul. 14, 2005, 3 pages.

Current Claims, EP 00957754.5-2413, 6 pages.

Jacobs, Stephan, et al., "Filling HTML forms simultaneously: CoWeb-architecture and functionality," Computer Networks and ISDN Systems 28, 1996, pp. 1385-1395, XP-004018236.

Palme J. et al., "MIME E-mail Encapsulation of Aggregate Documents, such as HTML (MHTML)," IETF Standard, Internet Engineering Task Force, IETE Mar. 1997, pp. 1-19.

European Patent Office, "Supplementary European Search Reports," EP 00957754.5-2413, dated Jul. 14. 2005, 3 pages.

Current Claims, EP 00957754.5-2413, 6 pages.

* cited by examiner

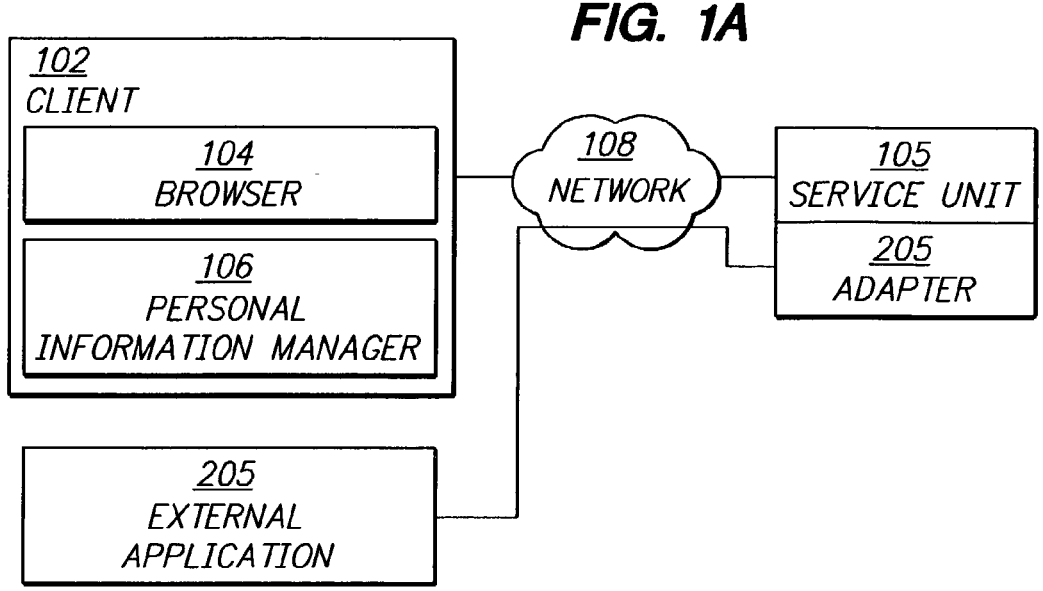
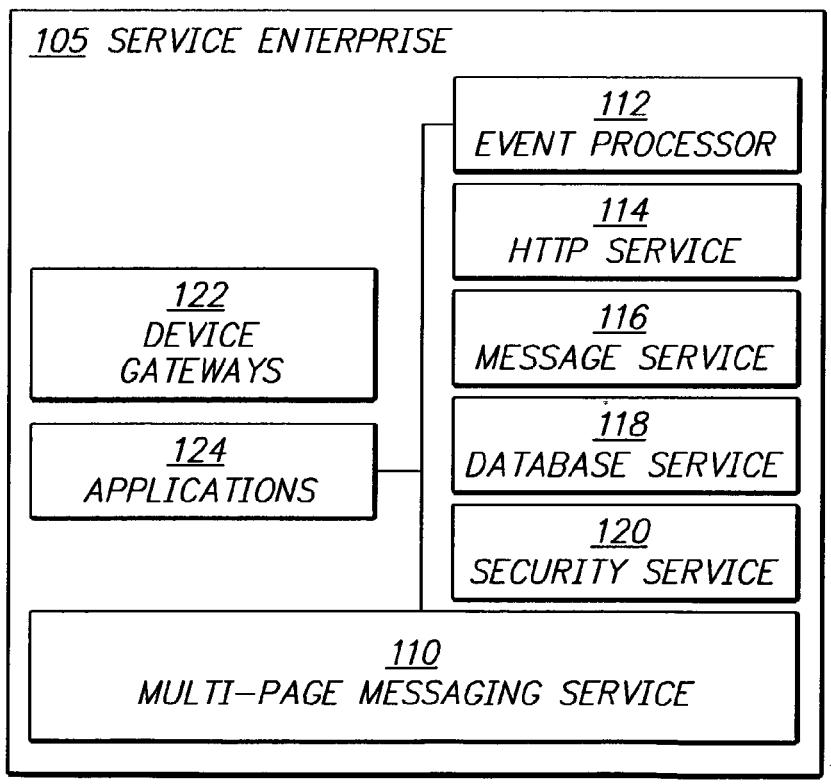

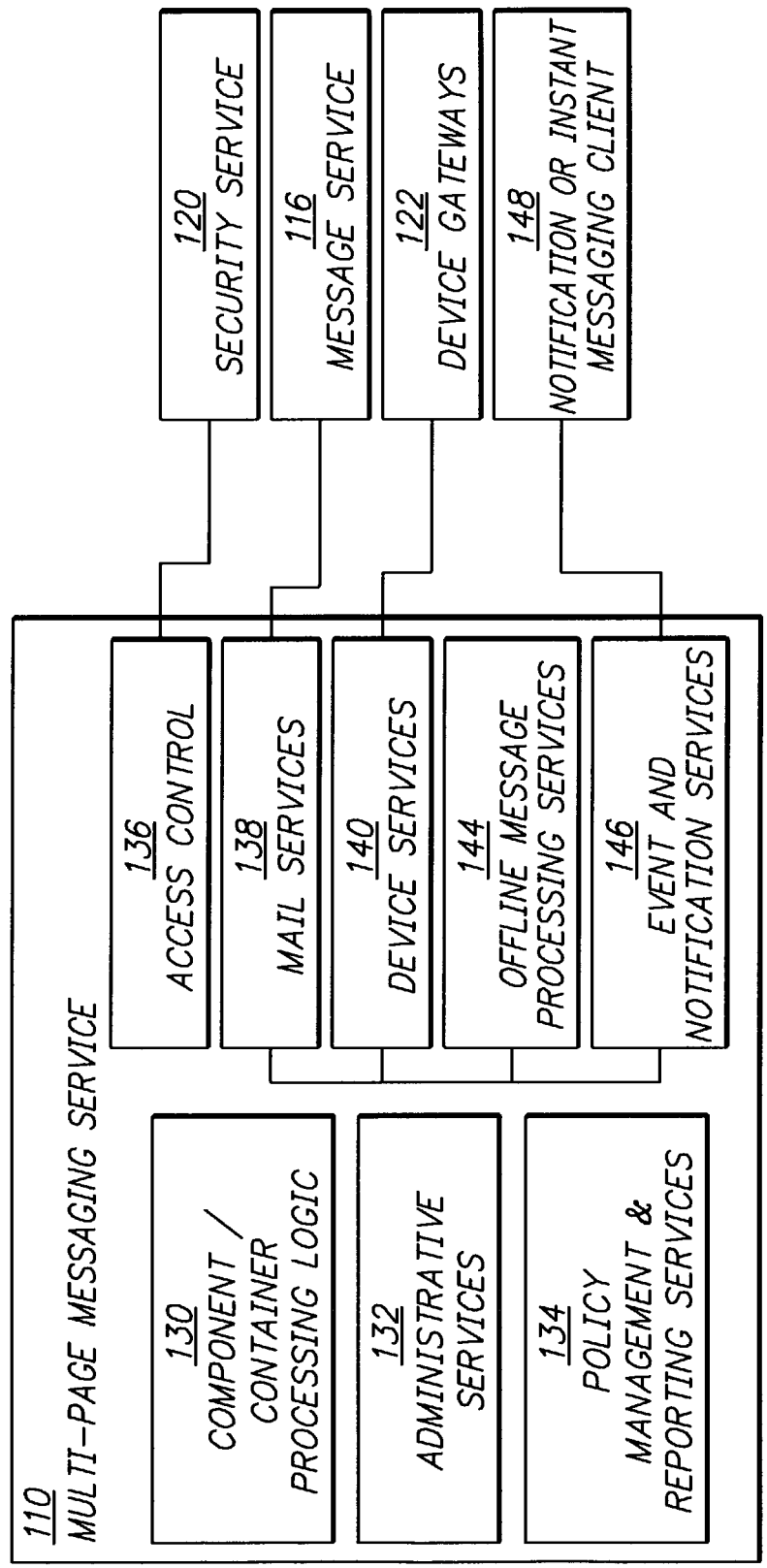

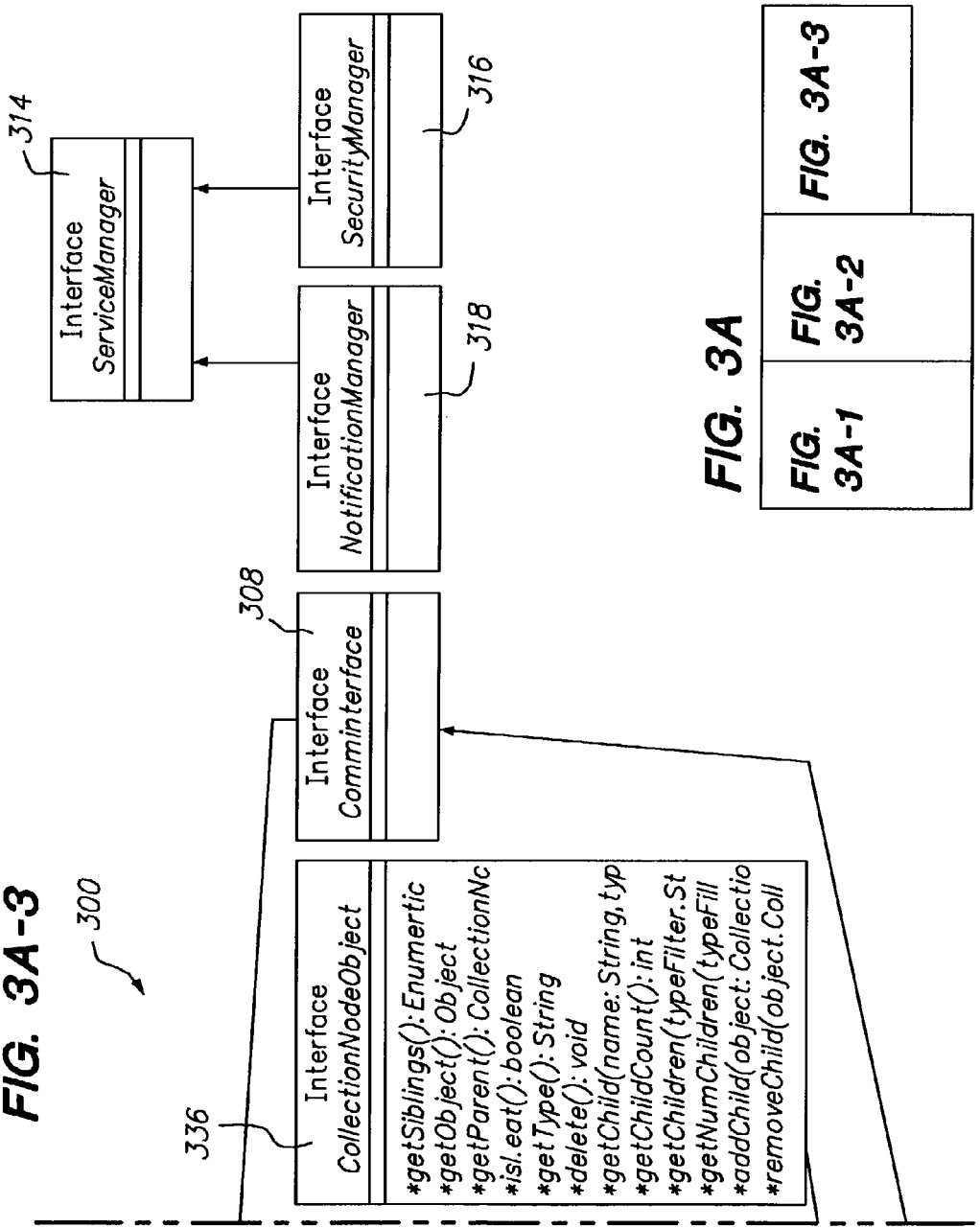

| zaplet | Next Message | | | | Help |
|---|---|---|---|---|---|
| | | | | Wednesday April 11, 2001 | 914 |

My Groups

Application Shortcuts
- ☑ Discussion  ☑ Poll  ☑ Schedule
- ☑ File Sharing  ☑ File Approval  ☑ Table Updated Messages (With Notifications On)   My Group Activity (Last Seven Days)

| SUBJECT | LAST MODIFIED | | GROUPS | MESSAGES |
|---|---|---|---|---|
| No messages in which notifications are on have been updated. | 916 | | Sip | 4  918 |
| | | | Total Messages | 4 |

New Groups You Can Join (View All Groups)

⋮ DO NOT DELETE (private)    d
⋮ Sip (public)    Testing purpose    Request Membership
                                     Member  920

Sidebar:
- Group Directory (922)
- ▷ My Groups (934, 934A)
  - Sip (924)
- Personal Messages
- Search (926)
- Builder (928)
- Preferences (930)
- ○– Heather Leitch_C
- Logout (932)

FAQ Copyright 2000–2002 Zaplet, Inc. All rights reserved. Patent pending. v-0-0-50-1

*FIG. 9B*

950
Zaplet Application Builder – Microsoft Internet Explorer zaplet

Zaplet Application Builder
This tool allows you to create a Zaplet Application by combining Zaplet Pages. Fill in the information below and pick Add Page to add pages to the application. To modify an existing Zaplet Application, click Open at the bottom of the window. Click a page's name to view or modify its settings, or click Edit to modify the page itself.

Name:    New Application    —954
(Name can be changed when using "Save As")

952

Description: [ 956 ]

(This appears in the Application Selection dialog box and helps users select the appropriate Application)

Introduction Settings                                958
These settings determine what information will appear in the introduction area at the top of the message. More Info...

Custom fields:(Optional) 960          Name of status field:(Optional) 964
Field label:       Required      [Status]
[   ]   □  962
[   ]   □      Possible settings for status field:
[   ]   □      (Optional) (Type one setting per line)
[   ]   □      [ 966 ]

Default Pages   968
These Pages will be part of any Zaplet Message sent using this Application Template. Pages marked as required cannot be deleted from a Message. More Info...

[Add Page]—968A

Optional Pages   969
These are Pages that the author (and possibly recipients) can choose from when adding a Page to the Zaplet Message. These will be listed on the Add Page screen. More Info...

[Add Page]—969A
☑ Allow authors to add Pages from outside this list

[ New ]  [ Open ]  [ Save As ]  [ Exit ]

Approval List — ⇧ Move Up  ⇩ Move Down  ✗ Delete

Instructions for recipients:

|  | Approval |
|---|---|
| Sample User | Yes |
| Another User | No |
| Yet Another User | Yes |

☐ Include linked comment section
(Shows participant comments)

FIG. 11B

Discussion — ⇧ Move Up  ⇩ Move Down  ✗ Delete

| Name | Date/Time  1–2 of 2 |
|---|---|
| Sample User | Mar 27, 2000  4:25 PM |
| This is a sample comment. | |
| Another User | Mar 28, 2000  10:48 PM |
| This is another sample comment. | |

FIG. 11C

File Sharing — ⇧ Move Up  ⇩ Move Down  ✗ Delete

Description of shared files: (optional)

☐ Enable File Versioning

[Attach files...]

```
                    ┌─────────────────┐
              ┌─┐   │ Invitation      │         ⇧ Move Up   ⇩ Move Down   ✗ Delete
              └─┘   └─────────────────┘
      1302─── ─[Select Invitation Style...] (required)
              Event Title: (required)
      1304─── ┌──────────────────────────────┐
              └──────────────────────────────┘          1300
              Brief Description: (required)
      1306─── ┌──────────────────────────────┐
              └──────────────────────────────┘
              Event Details: (required)
              ┌──────────────────────────────┐▲
      1308─── │                              │
              └──────────────────────────────┘▼
              Date: (required)
      1310─── ┌──────────────────────────────┐
              └──────────────────────────────┘
              (e.g., Monday, 10/12/99)
              Duration: (required)
      1312─── ┌──────────────────────────────┐
              └──────────────────────────────┘
              (e.g., 7am—5pm)
              Location: (required)
      1314─── ┌──────────────────────────────┐
              └──────────────────────────────┘
              Address: (required)
      1316─── ┌──────────────────────────────┐
              │                              │
              └──────────────────────────────┘
              RSVP By: (required)
      1318─── ┌──────────────────────────────┐
              └──────────────────────────────┘
              (e.g., Monday, 10/12/99)
```

FIG. 13A

```
              Advanced Options                                    ▫□✗
      1330─── zaplet
              Recipients can vote for:?
      1332─── ┌─────────────┐
              │Only 1 choice│▽
              └─────────────┘
      1334─── ─☐ Include "Other" answer choice and let participants write-in.
                ?
              Vote options:?
      1336───   ☐ Allow participants to change their vote
      1338───   ☐ Allow participants to vote anonymously
              Poll results available to participants:?
                ● Always  ○ After voting  ○ After poll closes  ○ Never
                Note: Author can always see results
                              ┌──────┐  ┌──────┐
                              │ Save │  │Cancel│
                              └──────┘  └──────┘
```

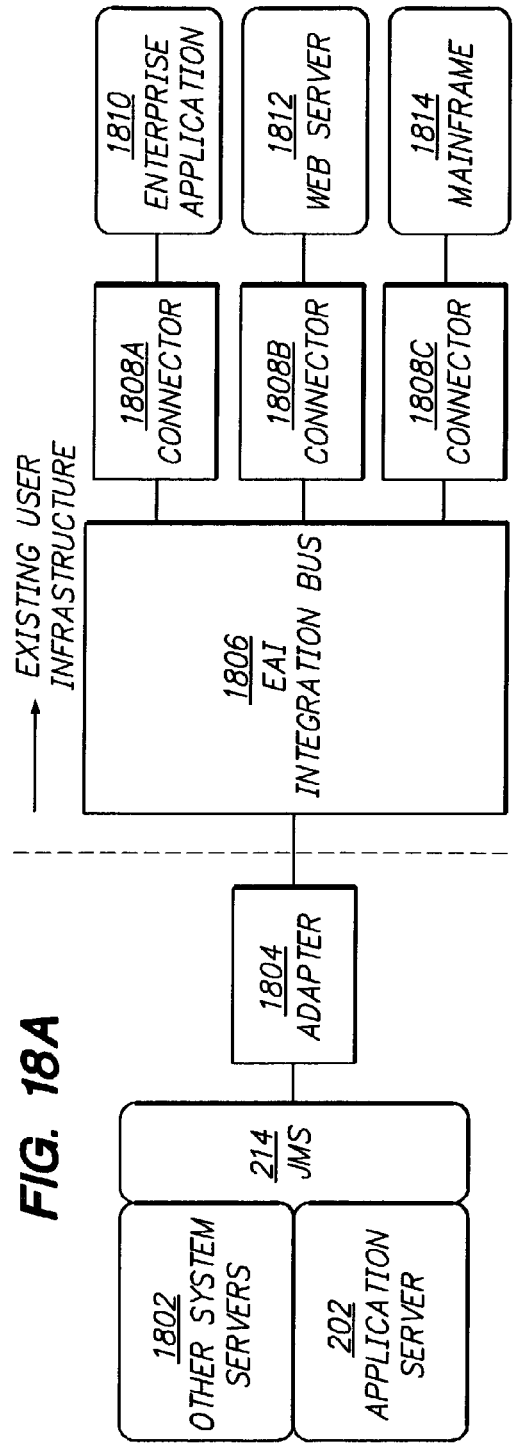
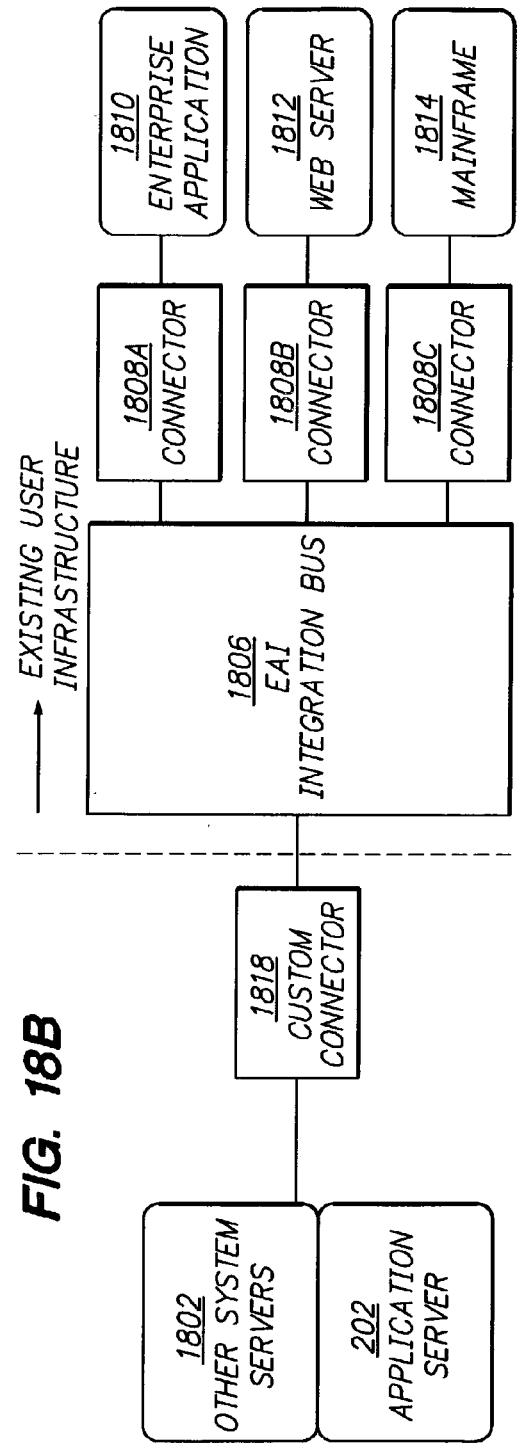
FIG. 18A
FIG. 18B

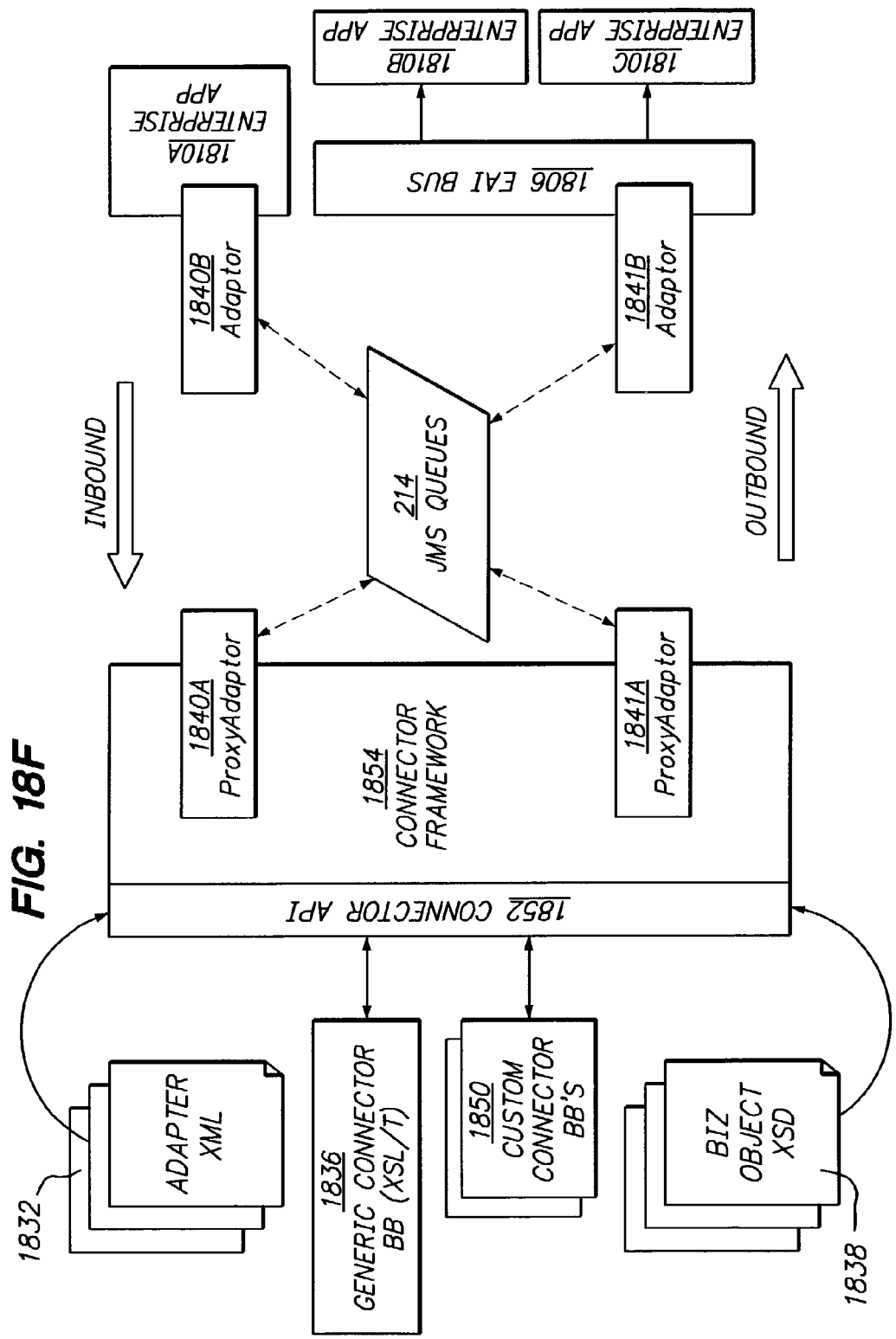

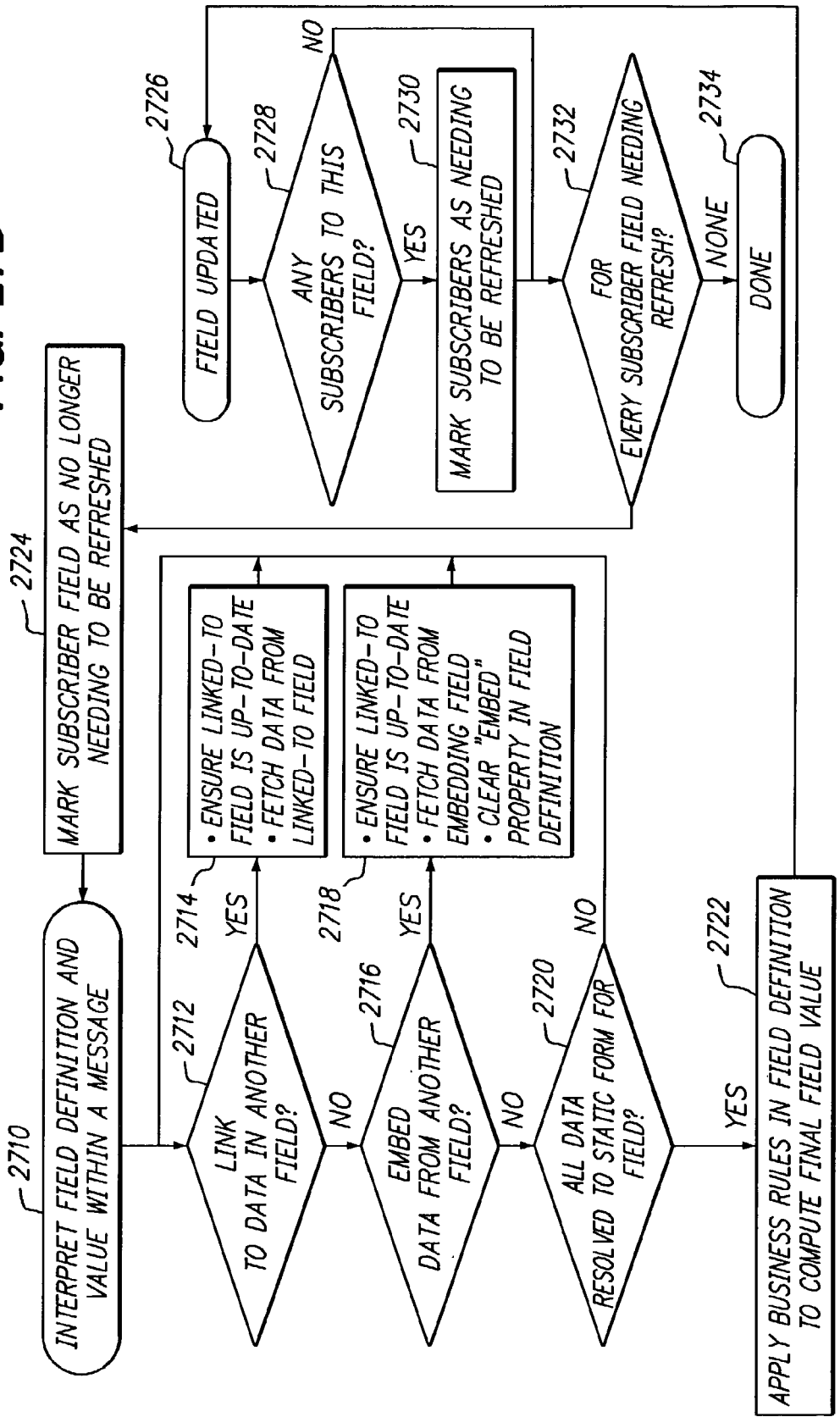

METHODS AND APPARATUS PROVIDING ELECTRONIC MESSAGES THAT ARE LINKED AND AGGREGATED

CROSS-REFERENCE TO RELATED APPLICATIONS

Domestic priority is claimed under 35 U.S.C. 119(e) from prior Provisional application Ser. No. 60/230,037, filed Sep. 5, 2000, the entire contents of which are hereby incorporated by reference as if fully set forth herein.

FIELD OF INVENTION

The present invention generally relates to data processing in the fields of electronic messaging and collaborative communications. The invention relates more specifically to a collaborative communications system providing transportable applications, multiple-page electronic messages and electronic messages that are linked and aggregated.

BACKGROUND OF THE INVENTION

Despite more than fifty years of development, computer systems and computer programs remain difficult to use. In particular, individuals who are not well-versed in technology or computer programming encounter numerous problems in carrying out simple data processing tasks, such as collaborating on the form or content of a document, polling others to arrive at a decision, scheduling a meeting or activity, and other tasks. Several main approaches have been used in the past to facilitate these activities.

In a first approach, a pre-configured computer program or application is provided to all individuals who will participate in the data processing tasks. The individuals interact with the application to carry out the tasks. This approach requires little technical knowledge, but the approach is often too rigid and limits the individuals to using the particular forms, features and functions selected by the developers of the application. A related approach involves use of electronic mail ("e-mail") for distribution of information or for collaborative communications. E-mail is inefficient and often requires sending multiple messages before a task can be completed. Further, since the content of the messages is static, the content tends to become old and stale. The number and content of the messages are not easily organized.

In another prior approach, users construct their own custom computer program to perform exactly the desired task. This approach requires extensive technical knowledge that is beyond the capability of a typical user.

In a third approach, certain collaborative computing applications and environments have been provided. Applications such as Microsoft NetMeeting enable users to participate in online meetings, but have a significant limitation in that they are synchronous; a meeting participant must be online and present to participate. Applications such as Lotus Notes have enabled users to share documents, but creation and deployment of applications to carry out more sophisticated business tasks, such as automating personnel recruiting processes, is complicated and requires programming knowledge. Further, the collaborative processes that are supported by these applications "off the shelf" are limited and do not encompass many multi-step business processes.

A common disadvantage of all these approaches is that it is very hard for individual, non-technical users to create computer-based applications or systems that automate specific desired tasks and provide the applications or systems to others. Further, the approaches generally enable users to see only a static view of content that is under discussion or modification. Another disadvantage is that the approaches are typically synchronous; a user must be present during the collaboration and has no way to view actions or communications that have occurred before the user arrived or after the user leaves.

Another common disadvantage is that integrating the past approaches with existing or "legacy" databases and applications is extremely complicated, and requires programming knowledge. There is no easy way to enable such legacy systems to automatically interact with collaborative applications, without human intervention, to exchange data and carry out business processes. There is no simple means to enable the collaborative applications to receive signals from the external applications, take action based on the signals, or initiate new processes based on the signals.

Based on the foregoing, there is a clear need for an improved way to facilitate collaborative communication among individuals. In particular, there is a need for an approach that can enable new kinds of collaborative productivity applications, created by anyone and delivered using familiar communication mechanisms.

There is a related need for an approach that can facilitate distribution of secure, collaborative applications among separate but networked enterprises, so that users or applications of different enterprises can collaborate.

Computers have been used in messaging services since the 1960s, when suppliers of telex and telegraph services began deploying automated switching functions and providing complete computer-based messaging systems. An example of such a system is a teletypewriter system. Many of these systems used computers as data switches that relayed messages without providing message composition capabilities or the ability to search through previously sent messages.

Development of interactive time-sharing computer systems resulted in creation of linking tools that enabled two users to interlock their terminals in order to see what the other was typing. Mailbox tools were developed to allow users to send short messages to other users on-line on the same system. For example, the interactive time-sharing system at MIT's Project MAC had both linking and mailbox facilities that supported text messages.

Construction of the Advanced Research Projects Agency Network (ARPANET) in 1969–1975 initiated extensive research in store-and-forward communication techniques. An outgrowth of this research was the development of electronic messaging facilities, including electronic mail. Such facilities supported transport of simple text messages.

In the early 1980s, international standards bodies began work on electronic messaging with the goal of ensuring interoperability among different systems. In 1984, CCITT adopted a standard for store-and-forward messaging services called X.400 Message Handling Services (MHS). The International Standards Organization (ISO) created a competing standard called Message Oriented Text Interchange Standard (MOTIS). Differences among the versions were largely overcome by 1988.

The period 1973 to 1989 saw development of several computer systems that featured graphical user interfaces rather than character displays, such as the Xerox Alto, the Apple Lisa and Macintosh, and personal computers using Microsoft Windows. During this period, users developed interest in the ability to send messages having elements other than text. Examples of such multimedia e-mail systems include Slate, from BBN Software Products, and the first release of Lotus Notes, from Lotus Development Corporation.

To support transmission of formatted images, sound, files, folders, and video attachments, in 1992 the Internet Engineering Task Force (IETF) created a multi-media messaging standard known as Multipurpose Internet Mail Extensions (MIME). Using MIME, users of different kinds of computers can exchange e-mail messages that include formatted images, sound, files, folders, and video attachments. Further, a single MIME e-mail can contain alternative representations of the same data. For example, there can be an attachment in text form followed by one containing bitmap page images of the same information.

Implementations of MIME generally displayed messages in a graphical user interface window that presented different attachments as icons embedded within a text message. Other implementations, such as NeXTMail, from NeXT Computer, Inc., could display text, graphical elements, and attachment icons within the same message. A drawback of this implementation, however, was that to view different parts of a long message, a user was required to scroll down through a single contiguous message display in order to reach the desired part of the message.

Further, such systems provide no way to organize related elements of a message, other than manual cutting of one part of the message and pasting it into another upper or lower part of the same contiguous message. This procedure could quickly become unwieldy when such messages were exchanged among members of a group. As each member of the group added comments, graphics, or other attachments to the message, the message would become longer and longer, requiring extensive scrolling and searching to locate a desired part, or to correlate one comment of one user with a related comment of another user.

Other systems display multimedia attachments in a separate pane of a graphical user interface window that is displaying the message. For example, in Microsoft Outlook, when multimedia attachments are present, they are displayed at the bottom of the message window, divided from the message body by a separator bar. A disadvantage of this approach is that it is hard to correlate the attachment with a particular part of the message body.

In a more recent development, e-mail programs such as Microsoft Outlook have been linked to browser programs such as Microsoft Internet Explorer. Through such linkage, the e-mail program can receive an e-mail message formatted in Hypertext Markup Language (HTML) and display a rendered version of the HTML within an e-mail message display window. Using this approach, e-mail messages may contain text, graphics, and embedded hyperlinks to other content, multimedia resources, or applications. However, this approach has not cured the deficiency of prior approaches with respect to content organization and scrolling. It is still necessary to scroll through a long HTML e-mail to find desired content, and there is no simple way to correlate related content. Further, authoring HTML e-mail requires familiarity with complex HTML authoring software such as Microsoft FrontPage.

Based on the foregoing, there is a clear need in this field for a way to improve organization of content of e-mail messages.

There is a specific need for a way to organize related content portions of e-mail messages within the messages in a way that makes related content easy to find and display.

There is also a need for a way to create, deliver, receive, and display e-mail messages in which related content is correlated and accessed without scrolling or similar cumbersome operations.

E-mail, the World Wide Web, and instant messaging each have contributed to a revolution in the way people communicate. Each of these platforms offers a variety of benefits. For example, e-mail is available at the user's convenience; messages remain in an inbox until the user deletes them. Because e-mail arrives in the inbox, the user does not have to "go" anywhere to retrieve it. E-mail is useful for sending a note to a friend or addressing a large group. Because e-mail is individually addressable, a user can adapt the recipient list to the subject. Experts have estimated that users spend more time in e-mail than any other Internet application.

The World Wide Web ("Web") contains an abundance of information that is dynamically changing and ever growing. It is graphical and interactive, and offers the ability to conduct transactions. With relatively simple user interface operations, such as button clicks, the user can receive valuable information, purchase an item, or review work materials that have been placed on an internal website. Instant messaging offers the advantage of timeliness; the recipient knows that a newly received message is current, because the recipient is in a one-on-one communication session with the sender. This form of messaging has grown rapidly because people want information that is current.

However, e-mail, the web, and instant messaging have inherent limitations that restrict what users can do with them and how they communicate information to users. For example, e-mail today consists of static text that is neither dynamic nor interactive. E-mail messages are considered to be "dead on arrival" because they are current when sent, but are not current when read. For example, a user may not read an e-mail until hours after it was originally sent and there can be subsequent e-mails that supersede the original message, but the original outdated message remains in the inbox. There is no logical order to messages that are received in the inbox other than the time of arrival. Occasionally, the user can even receive an answer to a question before the question arrives, because of delays in server responses. The user is required to either scan all messages or sort them into some order to verify that the user has all needed information before taking action.

Unthreaded responses are another problem with e-mail. If a user sends a message to six people, and they all respond, the user receives six new messages in the inbox referring to one subject. The user is left to organize it all. Perhaps the most significant limitation of e-mail is the volume of messages that can flood a mailbox. When a user receives hundreds of e-mail messages a day, the sheer volume of e-mail is daunting.

Using the Web requires the user to proactively visit a location for information updates, and the user may need to visit multiple locations and pages before the user finds desired information. The Web is not personal or targeted, so it is not as effective as e-mail for communications. There are meeting sites on the Web, but users must seek out the destination, which requires them to remember URLs and passwords. There are also sites that offer group discussion and collaboration, but their groups are generally rigid and are based around a common interest.

Instant messaging allows for dynamic communication, but only if both participants are actively signed on and are available to receive messages. If one user is not able to respond, the link is dead and the user has lost the ability to instantly communicate. In addition, it's difficult to document "conversations" that occur through instant messaging; users lose the ability to have an audit trail or history.

Based on the foregoing, there is a need for a communication system that provides ways to share messages and information, ideally by providing the best features of e-mail, the Web, and instant messaging, while overcoming the limitations that each of these carries.

There is a particular need for methods and mechanisms for linking multiple messages together so that multiple message threads and sub-topics may be related and associated with a particular topic.

Users and applications may desire to link one message to another related message. However, past approaches to communication systems do not allow information, such as applications and electronic messages, to be related, threaded, managed and stored in an efficient, flexible, and simple way. Such approaches also do not provide a way to obtain a view of complex webs of messages.

There is also a need for methods and mechanisms that can aggregate related topical information within the context of a single message or web of messages.

SUMMARY OF THE INVENTION

The foregoing needs, and other needs that will become apparent from the following description, are achieved in the present invention, which comprises, in one aspect, a method and system for communicating and collaborating using transportable applications. Embodiments provide a breakthrough communication approach that improves collaboration among groups of individuals, within corporations, among customers, partners, and suppliers, and among distributed computer systems. In one approach, computer processes enable such users to create or host a new kind of collaborative productivity application called a transportable application. Transportable applications as disclosed herein may be used, for example, to bring together people, systems and information needed to contribute, make decisions, and take action on collaborative business processes or projects. In one embodiment, when a transportable application is opened, it reveals a live, shared, structured workspace that is specific to a project or process. Unlike past approaches, the workspace is continually updated to reflect the latest input of any recipient or user.

The transportable applications can be created by anyone, including individuals, non-technical users within an enterprise, or automatically by other computer programs, applications, or programmatic mechanisms. Each transportable application may comprise one or more pages each having one or more building blocks that encapsulate processing functions and data. Each building block may comprise one or more static content regions, one or more dynamic content regions, and other information. Content for the dynamic content regions may be stored in a database of a server.

The transportable applications can be distributed to others using existing transport mechanisms. For example, in one specific approach, transportable applications can be deployed in a manner analogous to sending an electronic mail message. Recipients may be individual users, groups, or other programs or applications.

The transportable applications can be accessed programmatically, or by an e-mail in-box, or using a web browser. When a transportable application is accessed by a recipient, data for its dynamic content regions is automatically retrieved. Input created by a recipient is accepted by the server and updates the dynamic content region of the transportable application. If a recipient modifies data in the transportable application, the modifications or updates are stored asynchronously and dynamically with respect to the sending and receiving of the modifications or updates by the recipients. Thus, the dynamic content is always current, and whenever any recipient opens and views the transportable application, the content of the transportable application is retrieved and displayed in then-current form.

Unlike past approaches, which rely on distribution of static information, transportable applications as defined herein enable full interaction and navigation of dynamic content without the user leaving the transportable application. A shared workspace is created in which multiple persons or systems can interact within the same transportable application, and all responses are aggregated in one place. The content of the transportable application is current when read; the transportable application is constantly updated so users can always see the most current information and responses of other group members. Transportable applications may be supported by related services, such as a secure mode that enables only authorized members to view and interact with the content, notifications that inform a user when an update to a transportable application has occurred, etc. Transportable applications may generate events that are acted upon by other transportable applications, and may act upon events that are received from external systems.

In a business enterprise environment, transportable applications and the systems and methods disclosed herein enable the enterprise to save time, reduce costs, and accomplish more. Companies can use transportable applications for simple shared projects to the complex and collaborative business processes required for global, multi-company projects, depending upon the need. Collaborative business processes may be rapidly automated and streamlined. Collaboration may be extended outside the corporate firewall by sending the transportable applications to others. The relevance and speed of collaborative application development may be improved. Costs of distributed team interaction may be reduced.

In one approach, the system features an integration framework comprising connectors that provide connectivity to and integrating with existing or "legacy" databases and applications. An author can create transportable applications that can retrieve data values from and set data values in such external applications and systems without programming knowledge, or even automatically from another program. As a result, legacy systems can automatically interact with collaborative applications, without human intervention, to exchange data and carry out business processes. A simple and efficient means is provided to enable the collaborative applications to receive signals from the external applications, take action based on the signals, or initiate new processes based on the signals.

According to another aspect, a method for associating related electronic messages in computer storage is disclosed. A first transportable application is created and stored. User input requesting creation of a link from the first transportable application to another transportable application is received. User input that selects a second transportable application from among a plurality of previously created transportable applications is received. A link from the first transportable application to the second transportable application is created and stored.

As a result, transportable application may be inter-related in complex message webs. The message webs may also be inter-related in message web rings. Links may be generated manually or automatically, based on context, workflow processes, or other known relationships among applications.

Recipient lists and data may propagate among fields of linked transportable applications, directly or according to abstract business rules.

According to another aspect, a method for processing a request to display an electronic message is disclosed. First message data is generated. The first message data defines at least a first message portion and one or more navigation regions for one or more other message portions of a multiple-part electronic message having a plurality of message portions. The first message data is provided to a client. A request is received from the client for a second portion of the electronic message selected from among the other message portions. Second message data is generated which, when processed at a user interface of the client, causes the client to display the second portion of the electronic message. The second message data is provided to the client.

Multiple-part electronic messages are disclosed. A graphical user interface of an electronic messaging system displays a message in the form of one or more header portions and one or more body portions. Each of the body portions has a selection region. While one body portion is visible at a given time, all the selection regions are continuously visible in the user interface to facilitate selection of any of the body portions at a particular time. Selecting a selection region of a non-displayed body portion causes a server to generate a refreshed user interface that includes the entirety of the selected body portion, and that hides the previously viewed body portion. As a result, a large amount of associated information may be combined in a single message in a way that is clearly organized and easily accessible.

Transportable applications are disclosed. The transportable applications may be linked into webs of associated messages. For example, multiple related discussions or applications may be associated and organized. The webs of messages may be linked into rings of related message webs. As a result, workflow processes and complex associated information may be accessed and analyzed in an ordered way.

In other aspects, the invention encompasses computer readable media, and systems configured to carry out the foregoing steps. Other features and advantages of the invention will be apparent from the following detailed description, the drawings, and from the claims.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a block diagram providing a structural overview of a system context in which an embodiment may be used.

FIG. 1B is a block diagram that illustrates software elements of one embodiment of a service unit.

FIG. 1C is a block diagram of the system of FIG. 1B illustrating additional elements.

FIG. 9B is a diagram of a My Groups screen that is generated and displayed when a user selects the My Groups link of the portal home page.

FIG. 9D is a diagram of an Application Builder screen display that is displayed in response to selecting the Application Builder.

FIG. 11A is a diagram of the graphical appearance of an Approval List building block as it appears in a transportable application page under development using the Page Builder.

FIG. 11B is a diagram of an example embodiment of a Discussion building block that may be used to captures a discussion between message participants.

FIG. 11C is a diagram of an example embodiment of a File Sharing building block, according to an example embodiment, which may be used to share an electronic file among a group of recipients for collaborative review or updating.

FIG. 13A is a diagram of an Invitation building block that may be provided, in one example embodiment.

FIG. 13C is a diagram of an Advanced Options window that may be displayed, in one example embodiment.

FIG. 13D is a diagram of a Schedule building block that may be provided, in one example embodiment.

FIG. 18A is a block diagram of a first enterprise application integration approach that uses an asynchronous approach.

FIG. 18B is a block diagram of the system of FIG. 18A wherein a custom connector is used.

FIG. 18F is a block diagram of another embodiment of an enterprise application integration approach.

FIG. 27B is a flow diagram of a process of updating data among linked messages in a message web.

DETAILED DESCRIPTION OF THE PREFERRED EMBODIMENT

Figure 1D:
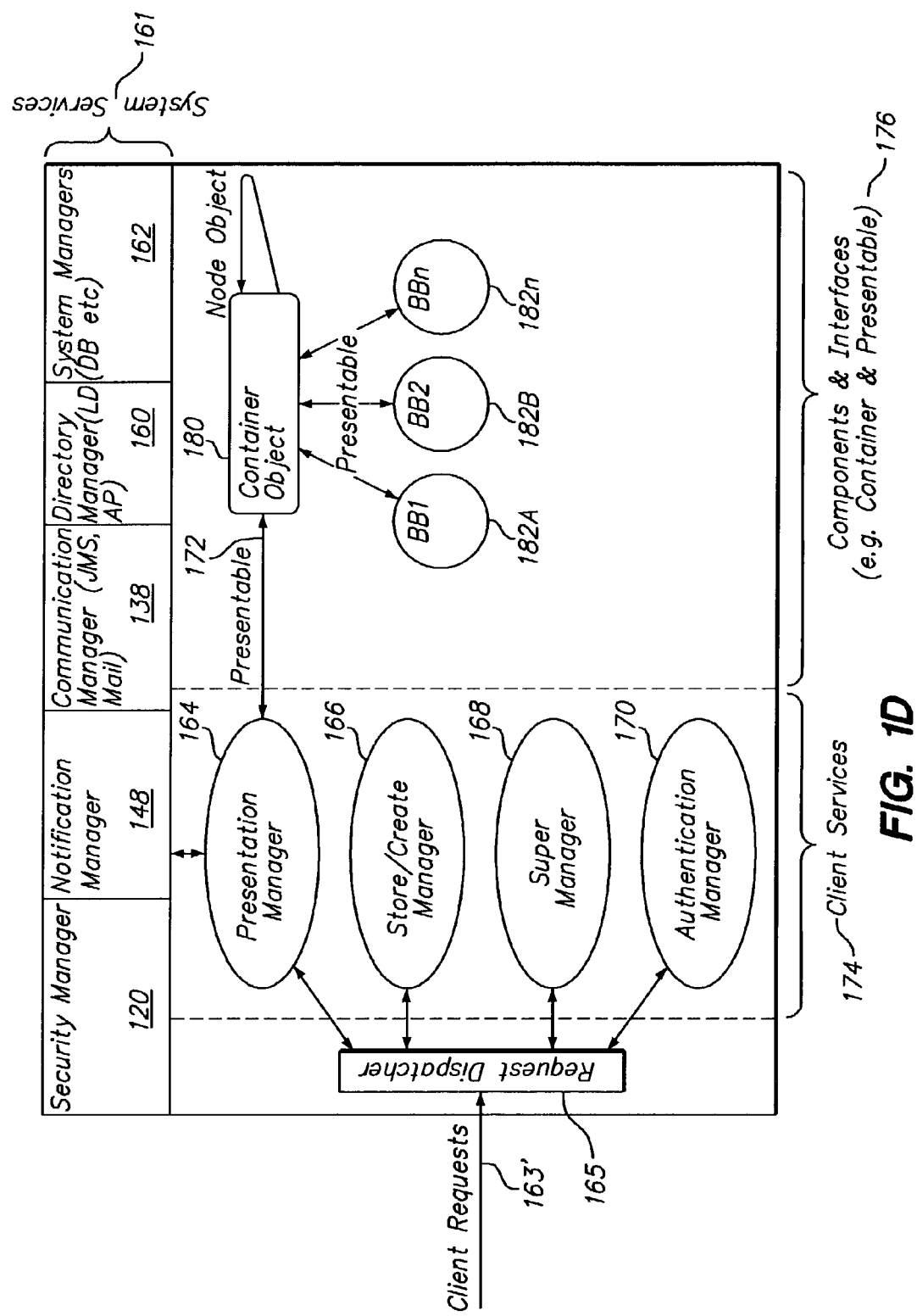
FIG. 1D is a block diagram illustrating an example of interaction of a container and its building blocks with system services.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Unless otherwise defined, all technical and scientific terms used herein have substantially the same meaning as commonly understood by one of ordinary skill in the art to which the invention pertains. ZAPLET is a trademark of Zaplet, Inc., Redwood Shores, Calif. Microsoft, Microsoft Outlook, Microsoft Active Directory, Microsoft Exchange Server, Microsoft SQL Server, Microsoft Internet Explorer, and Microsoft Internet Information Server are trademarks of Microsoft Corporation, Redmond, Wash. All other trademarks mentioned are the property of their respective owners.

Embodiments are described herein in sections according to the following outline:
1.0 TRANSPORTABLE APPLICATION COMMUNICATIONS SYSTEM
  1.1 System Structural Overview
    1.1.1 Clients
    1.1.2 Networks
    1.1.3 Servers—Application Server, Proxy Server, Mail Server, Wireless Gateway, Directory Server, Middleware, File Server, Photo Server, Database Server, etc.
    1.1.4 Support Applications—Java, Database, etc.
  1.2 Transportable Applications—Structural and Functional Overview
    1.2.1 Graphical Appearance of a Transportable Application—Generally
    1.2.2 Receiving and Sending Transportable Applications
    1.2.3 Containers
      1.2.3.1 Root Container
      1.2.3.2 Contained Containers
      1.2.3.3 Implementation with Enterprise Java Beans
    1.2.4 Templates
    1.2.5 Pages and Building Blocks
    1.2.6 Object Model
    1.2.7 Membership
    1.2.8 Building Blocks—Programmatic Aspects
    1.2.9 Directory Integration—Global Object Identifiers
  1.3 Presentation of Transportable Applications
    1.3.1 E-mail Client Presentation
    1.3.2 Personal Portal Presentation
    1.3.3 Multiple-Page Transportable Applications
    1.3.4 Programmatic Processes for Presentation
  1.4 Authoring Transportable Applications
    1.4.1.1 Application Editor
    1.4.1.2 Page Editor
    1.4.1.3 Building Blocks—Examples
    1.4.1.4 Site Style Editor
  1.5 Communications From Transportable Applications to Users ("Notifications")
    1.5.1 Notifications Based on User Responses or Timed Events
    1.5.2 Notifications Based on Rules and Attributes
  1.6 Object Communications—Programmatic Methods
  1.7 Object Communications—Event—Driven Methods (Event Handling System)
    1.7.1 Database Schema
    1.7.2 Application Programming Interface & Object Methods
  1.8 Object Communications—External Systems
    1.8.1 Enterprise Application Integration Using Connectors
  1.9 Security Processes
    1.9.1 Cluster-Specific Encryption and Request Routing
    1.9.2 Sharing Transportable Application Data Among Multiple Sites
  1.10 System Administration Processes
  1.11 Using Transportable Applications in Business Processes and Workflow
2.0 MULTIPLE-PART ELECTRONIC MESSAGES
3.0 LINKING AND AGGREGATING MESSAGES
4.0 HARDWARE OVERVIEW
5.0 EXTENSIONS AND ALTERNATIVES 1.0 Transportable Application Communications System According to an embodiment, a communications system, and data processing methods that it carries out, facilitate collaborative communication and work among a group of individuals. Embodiments feature structures and processes for creating, authoring, transporting, updating, and viewing certain transportable applications. In general, a transportable application is an interactive, dynamic, addressable computer software application that can be transported among systems. A transportable application comprises one or more pages. Each page comprises one or more building blocks, and can be designed for either specific or general uses. Each building block contains the user interface, data elements, and processing capability that enable specific functions within a page.

A transportable application can be transported among different computer systems, clients and servers using transport mechanisms such as e-mail and other data transport protocols. When a transportable application arrives at a destination computer system, a user of that system can open the transportable application, view content that is dynamically asynchronously updated from a server source, and interact with functional elements of the transportable application in order to carry out work or other useful tasks.

Transportable applications are a new way to communicate by turning an existing transport mechanism, such as e-mail, into a live, shared place. Transportable applications enable users to share documents, Web pages, data, business applications, schedules and other information with a group of people or with other systems. They can be used to make decisions with friends, family, or co-workers, schedule meetings and events, gather group data such as contact information, collect opinions, send invitations and RSVPs, and other tasks. In one embodiment, transportable applications enable all recipients in a group to communicate using just one message. Because a single transportable application takes the place of a thread of emails, transportable applications reduce inbox clutter and eliminate confusing strings of messages.

Transportable applications as described herein are better than e-mail because they provide information that is fresh and up-to-date. In one embodiment, transportable applications arrive in the user's inbox like normal e-mail, but they are current when the user opens them; new information can be included between the time the original author sent the transportable application and the time you open it. The transportable applications are current when read, not current when sent, eliminating the problem of receiving messages that are obsolete upon arrival.

The transportable applications add organization to the normally undifferentiated pile of individual e-mail messages. For example, transportable applications provide a structured container in which related data is collected, thus freeing users of organizing multiple pieces of e-mail. Additionally, transportable applications show aggregate views of multiple pieces of e-mail, thus summarizing information for better decision making. Also, transportable applications save time by reducing the volume of e-mail. By consolidating many responses into a transportable application, there are fewer pieces of e-mail to read.

Transportable applications are better than using the Web as a communications medium, for numerous reasons. For example, transportable applications push individualized messages into a user's Inbox. Transportable applications do not require a user to remember to visit a web site to see if they have a message.

Moreover, transportable applications are better than instant messaging as a day-to-day communications platform because transportable applications overcome the difficulty in getting multiple people to collaborate in real time. Transportable applications are targeted for group communication and persistent knowledge acquisition. In contrast, instant messaging is not designed for group communications and persistent knowledge acquisition.

1.1 System Structural Overview

FIG. 1A is a block diagram providing a structural overview of a system context in which an embodiment may be used. In general, a client 102 is communicatively coupled through a network 108 to a service unit 105. The client 102 creates requests for transportable applications and dispatches the requests into network 108. The requests are received by service unit 105 and processed, resulting in creation of a response, which is sent back over network 108 to client 102.

Client 102 may be, for example, a workstation, personal computer, personal digital assistant, cellular telephone or other wireless processing device, or any other end station data processor. Client 102 also may be a programmatic process that forms a part of a larger computer system or application program. Network 108 is any data communication network that can carry data communications between client 102 and service unit 105. Network 108 may be a direct electronic connection of client 102 of service unit 105; a local area network; a wide area network; one or more internetworks; a combination of a an access network, a service provider network, and one or more internetworks; or any combination of the foregoing. Client 102 also may comprise the combination of any of the foregoing with a client software application that enables a user to view, create, edit, and manage transportable applications.

Service unit 105 is a facility that hosts hardware and software elements that provide the functions described herein, and may be a private business enterprise, a service provider that provides the functions described herein to others, e.g., on a licensed basis, subscription basis, etc., or any other entity that hosts appropriate service equipment and facilities.

Client 102 executes a browser 104 and a personal information manager 106. Browser 104 is a conventional Internet or World Wide Web browser, such as Microsoft Internet Explorer. Personal information manager 106 is one or more software elements that provide e-mail processing, among other functions. Optionally, personal information manager 106 also may provide other personal information management functions such as address book management, calendar management, notepads, task lists, etc. An example of a commercial product suitable for use as personal information manager 106 is Microsoft Outlook. In an alternative approach, client 102 may be an external computer system that receives transportable application programmatically, without using browser 104 or personal information manager 106.

FIG. 1B is a block diagram that illustrates software elements of one embodiment of service unit 105. In general, in one embodiment, service unit 105 hosts a multi-page messaging service 110 that is communicatively coupled to an event processor 112, HTTP service 114, message service 116, database service 118, security service 120, device gateways 122, and applications 124. Such elements interoperate to provide multiple-page messages and carry out the processes that are described further herein.

FIG. 1C is a block diagram of the system of FIG. 1A illustrating additional elements.

In the example embodiment of FIG. 1B, multi-page messaging service 110 comprises component/container processing logic 130, administrative services 132, policy management & reporting services 134, access control service 136, mail services 138, device services 140, offline message processing services 144, and event and notification services 146.

The component/container processing logic 130 creates and manages a plurality of message components and message containers using processes that are described herein. The administrative services 132 provide administrative functions, such as adding or deleting users, importing files of users, identifying an external directory server and associating it with the system, etc. The policy management & reporting services 134 facilitate creating and managing policies for acting on transportable applications, access controls, etc.

Access control service 136 is communicatively coupled to security service 120, which may include an authentication, authorization and access (AAA) server, such as a RADIUS server. Access control service 136 communicates with other elements of multi-page messaging service 110 to receive requests to determine whether a particular user is authenticated in the system. The access control service also can receive and process requests to determine whether an authenticated user is authorized to access a particular message or a particular page of a particular message.

Security service 120 provides authentication and protection of user names and passwords. In one embodiment, security service 120 also provides Secure Sockets Layer (SSL) communication facilities so that communications from clients 102 to service unit 105, and from service unit 105 to an external directory server or other secure element, can be encrypted and carried out in a secure manner. Security service 120 also may provide means for integration with third-party security systems. Using such integration, security service 120 may be extended to provide authentication, access control, privacy, non-repudiation, and data integrity services. Such third-party systems may be the Sun Java Cryptography Engine, systems from Entrust, Cylink, Cybersafe, Verisign, etc. Security service 120 may support encrypted communications using asymmetric encryption algorithms such as RSA, DSS, D-H, etc.; symmetric encryption algorithms such as DES, triple-DES, DESX, IDEA, ES2, ES4, Blowfish, etc., message digest or hash algorithms such as SHA-1, SHA, MD5, MD2, RIPEMD, etc. Such encryption algorithms can be called programmatically from containers, building blocks, or system services that need to encrypt or decrypt data for communication, storage, or retrieval.

Mail services 138 is responsible for receiving data from other elements of the multi-page messaging service 110 and creating e-mail messages based on the received data. Mail services 138 also interfaces with message service 116 to dispatch and forward messages to users and clients. An example of a commercial product that may be used for message service 116 is Microsoft Exchange Server 2000.

In one specific embodiment, each of the foregoing services is implemented in the form of one or more Java class libraries. Thus, the services are provided by generic software modules that can be called by other software components of the system. The modules can incorporate third-party components, such as calculation engines, a workflow engine, etc.

Figure 2A:
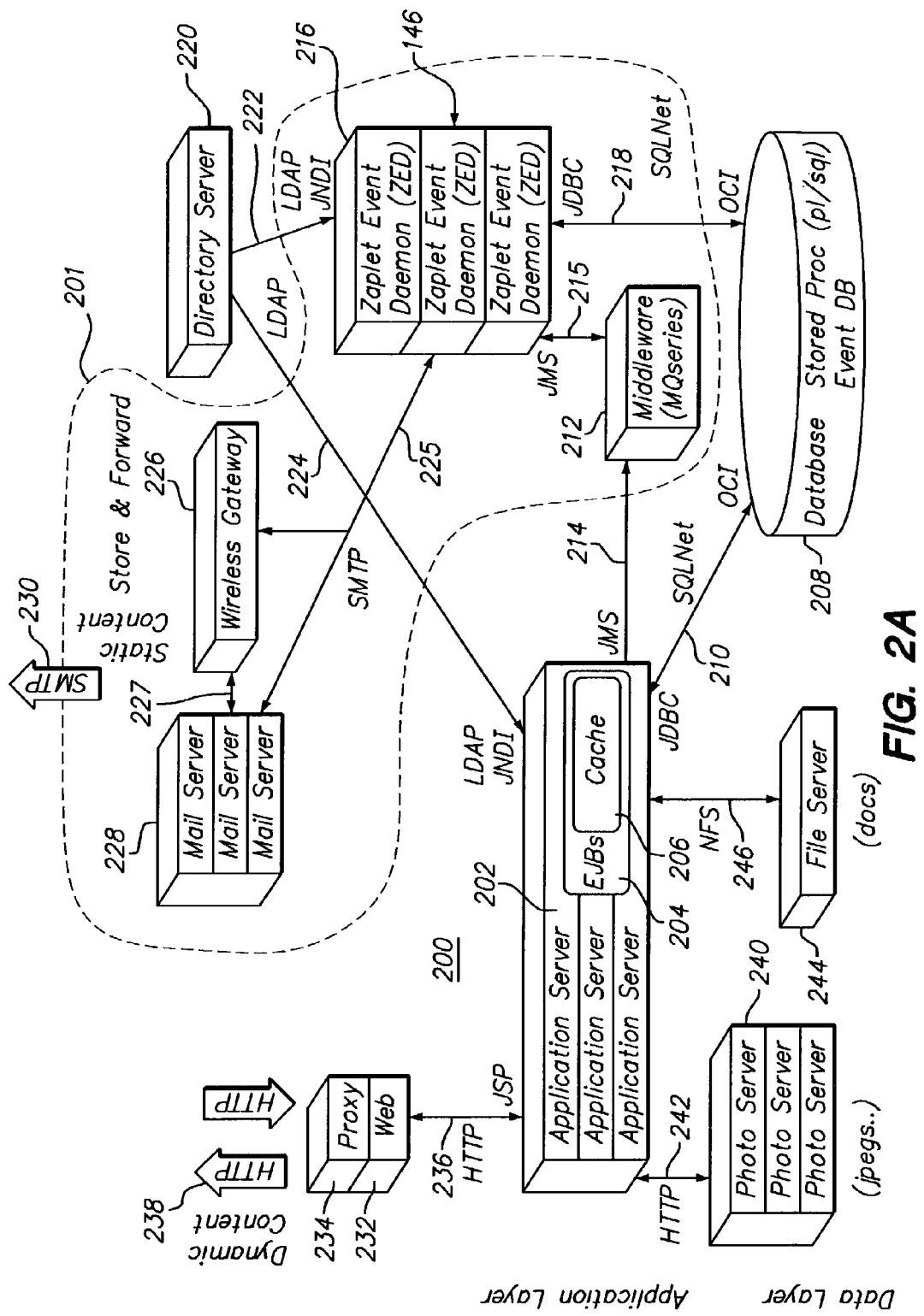
FIG. 2A is a block diagram of system architecture that may be used to host the foregoing services and provide such services to clients.

FIG. 2A is a block diagram of system architecture that may be used to host the foregoing services and provide such services to clients.

One or more application servers 202 host containers in the form of Enterprise Java Beans 204 and store programmatic objects representing containers, building blocks, pages, and transportable applications in a cache 206. Application servers 202 execute code of the containers and building blocks and call servers and services in a services domain 201 to result in servicing client requests. In one embodiment, application servers 202 are implemented as a plurality of clusters of application servers, to provide load balancing and increased throughput. Inbound client requests are routed to a particular cluster using a routing mechanism that is described further herein.

Application servers 202 are communicatively coupled by link 210 to database server 208, which comprises one or more databases. The databases in database server 208 provide persistent storage of stored procedures, a repository of data and logic for containers, building blocks, and other system objects, and an event database that supports event-based messaging. Database 208 may be, for example, an Oracle database server, Microsoft SQL Server, etc. Link 210 may be implemented, in one specific embodiment, as JDBC calls from applications server 202 that traverse an SQL network using the SQLNet protocol and arrive at database server 208 in Oracle Command Interface (OCI) format. Alternatively, ODBC may be used, as in the case of SQL Server.

The database server 208 provides one source for content for building blocks and containers that application servers 202 may dynamically retrieve and present to clients 102 as part of processing transportable application and executing their building blocks. Other data sources may be used. In one embodiment, application servers 202 are communicatively coupled by an NFS link 246 to one or more file servers 244. This arrangement enables application servers 202 to obtain text files, word processing documents and other contents of a file system to include in the dynamic content of a building block or for other purposes.

One or more adapters 209 cooperate with a connection framework in application server 202 to communicate with one or more external systems or applications 205. Such external systems or applications include legacy applications, enterprise systems, etc., as described further herein.

In another embodiment, application servers 202 are communicatively coupled to one or more image servers 240 by an HTTP link 242. This arrangement enables application servers 202 to rapidly retrieve one or more graphical images, digital photos, and other image information to include in transportable applications when they are presented to clients.

Application servers 202 may obtain dynamic content from one or more external sources and may communicate with clients using connections to public networks. In one embodiment, application servers 202 are communicatively coupled by a first HTTP link 236 to an HTTP server 232 (Web server 232), proxy server 234, and second HTTP link 238. This arrangement enables application servers 202 to receive a large number of separate HTTP connections and requests from clients 102 over second HTTP link 238, which are received at proxy server 234 and passed to the application servers over the first HTTP link 236. When the application servers have prepared content for presentation to clients in response to client requests, Java Server Pages elements of the application servers send the content to HTTP server 232 over the first HTTP link 236. The HTTP server 232 then issues an appropriately encapsulated HTTP response to the clients over HTTP link 238, through proxy server 234.

Application servers 202 are also communicatively coupled by link 214 to middleware 212, which provides basic messaging infrastructure functions. In one specific embodiment, link 214 uses the Java Messaging System (JMS) protocol, which may also be used to transport data on link 215 from middleware 212 to one or more event daemons 216 of event service 146. The event service 146 is communicatively coupled by link 218 to database server 208. In one specific embodiment, link 218 is implemented by JDBC calls from event service 146 that traverse the SQLNet and arrive at database server 208 in OCI format.

Directory information such as user names and group membership may be obtained from one or more directory servers 220 that are communicatively coupled to application servers 202 by link 224 and to event service 146 by link 222. In one embodiment, directory servers 220 conform to Lightweight Directory Access Protocol (LDAP) and communications on links 222, 224 are carried out using LDAP. Directory servers 220 need not be co-located with application server 202, and may be located in any location that is accessible using LDAP communications over a network or similar facility.

Application servers 202 communicate with e-mail clients using mail servers 228, and with wireless devices, such as wireless personal digital assistants and cellular phones, using a wireless gateway 226. In one embodiment, one or more mail servers 228 are communicatively coupled by an SMTP link 225 to event services 146, which is responsible to generate events that request mail transport. Event services 146 also are coupled by SMTP link 225 to wireless gateway 226, and the wireless gateway may be communicatively coupled to the mail servers by link 227. Mail servers 228 and wireless gateway 226 communicate with e-mail clients, other client devices using external networks that are reached using SMTP link 230.

Figure 2B:
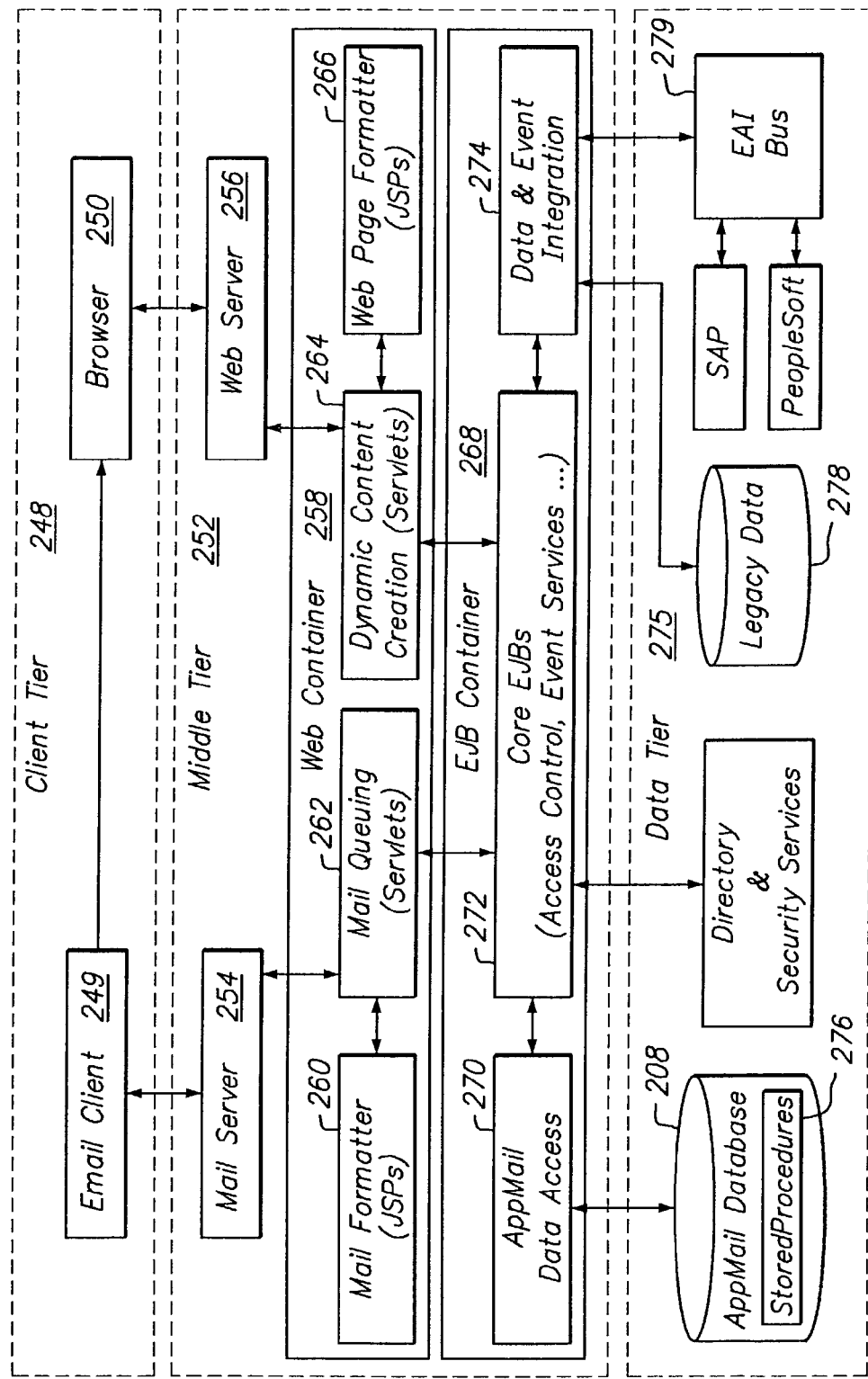
FIG. 2B is a block diagram of an example software architecture of elements of the system of FIG. 2A.

FIG. 2B is a block diagram of an example software architecture of elements of the system of FIG. 2A.

The software elements of the system may be viewed as logically organized in a client tier 248, middle tier 252, and data tier 275. Client tier 248 comprises an e-mail client 249 that executes on a client computer, e.g., client 102, and a browser 250 that executes at the same client. The e-mail client 249 and browser 250 may interoperate with a shared DLL that provides HTML parsing functions, so that the e-mail client can display HTML e-mail messages.

In one embodiment, system services generally are provided by a plurality of servlet constructs that implement the services. For example, middle tier 252 comprises a mail server 254 that communicates with e-mail client 249 over a network link. The mail server is communicatively coupled to one or more mail queuing servlets 262 that are organized in a Web container 258 of program elements. The Web container 258 further comprises a mail formatter 260, which may be implemented in the form of one or more Java Server Pages. Creation and modification of dynamic content of a transportable application is generally performed by dynamic content creation servlets 264. A Web page formatter 266, implemented in the form of one or more JSPs, is responsible for formatting Web pages or other HTML content that may form a part of a transportable application.

In one specific embodiment, middle tier 252 further comprises an EJB container 268 that comprises a plurality of program elements in the form of Enterprise Java Beans (EJBs). EJBs are Java® language classes that can interoperate with a plurality of servers within an enterprise network. Data access EJBs 270 are responsible for interfacing higher-layer elements with database 208 and one or more stored procedures 276 in the database. Core EJBs 272 are responsible for carrying out access control processes, managing event services, etc. Data and event integration EJBs 274 provide an interface to external systems such as a legacy database 278, an enterprise application integration program or bus 279, etc.

In an embodiment, these elements are implemented using Java-based technologies in conformance with the Java 2 Enterprise Edition (J2EE) specification for server-based applications. However, embodiments are not limited to this context.

Figure 2C:
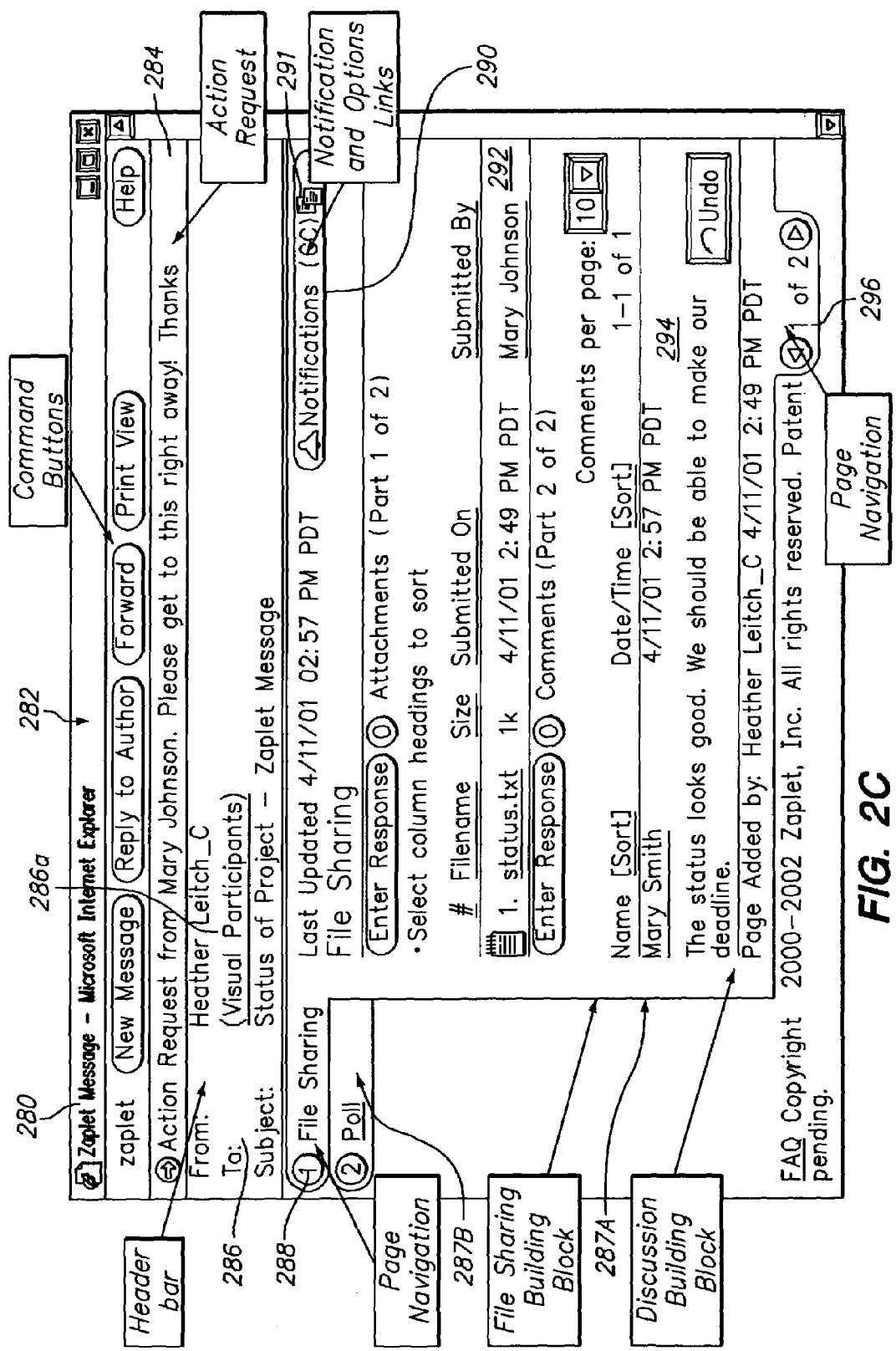
FIG. 2C is a diagram of an example graphical appearance of a transportable application, according to one embodiment.
Figure 2D:
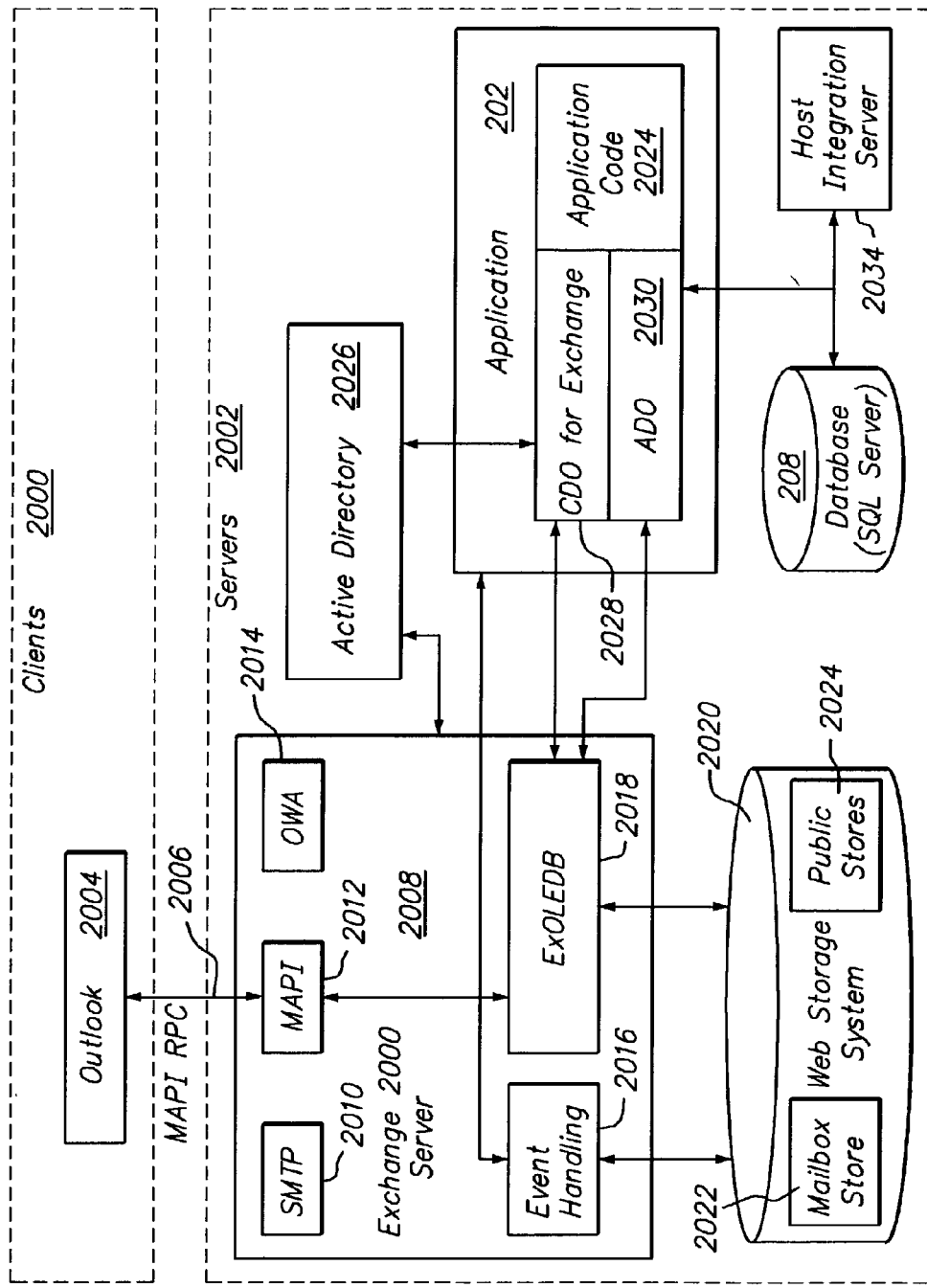
FIG. 2D is a block diagram of an alternate embodiment of a system architecture that features use of certain Microsoft® servers and systems.

FIG. 2D is a block diagram of an alternate embodiment of a system architecture that features use of certain Microsoft® servers and systems. In general, FIG. 2D depicts a client layer 2000 that communicate with servers 2002. Client layer 2000 comprises, in this example, a Microsoft Outlook client 2004. Servers 2002 comprise a Microsoft Exchange server 2008, an Active Directory server 2026, Web storage system 2020, application server 202, database server 208, and host integration server 2034.

In this configuration, Outlook client 2004 communicates over a mail application programming interface (MAPI) or remote procedure call (RPC) link 2006 with a MAPI processor 2012 of the Microsoft Exchange server 2008. The Microsoft Exchange server 2008 further comprises an SMTP agent 2010, OWA agent 2014, event handling system 2016, and Exchange OLE Database agent 2018. The SMTP agent 2010 can communicate with SMTP-compatible mail servers to enable the system to transport e-mail messages across a network. Event handling system 2016 receives events generated by application server 202 or its applications and processes them by, for example, storing information in mailbox store 2022 and public stores 2024 of Web storage system 2020. Database operations by or on behalf of application server 202 are facilitated by Exchange OLE Database agent 2018, which is communicatively coupled to Web storage system 2020.

Web storage system 2020 provides Exchange server 2008 with a unified storage name space for all messages, calendar information, documents, discussions, or other data. Its objects are accessible using HTTP, XML, COM, WebDAV, and file system calls. In one embodiment, transportable applications are stored in Web storage system 2020. Such transportable applications, their document attachments, and their building blocks are addressable in Web storage system 2020 using URLs. Web storage system 2020 may also store information about a plurality of Exchange offline folders, facilitating synchronization of offline updates to transportable applications.

Active Directory server 2026 is communicatively coupled to Exchange server 2008 and stores directory information, such as definitions of users and groups, locations of network elements such as servers, hosts, workstations, and printers, etc. The Active Directory server 2026 is also accessible by application code 202A, which is hosted by application server 202, through a common data object (CDO) agent 2028 that is hosted by the application server. Active Directory is an example of an LDAP directory as described herein.

Application server 202 further comprises an Active Data Objects (ADO) process 2030 that is communicatively coupled to Exchange OLE Database agent 2018 and to database 208 and host integration server 2034. These communication paths enable functions of application code 202 to set and retrieve values of data objects that are stored in database 208, in external legacy systems that are accessed using host integration server 2034. Further, the application code 202 can set and retrieve values of data objects that are stored in Web storage system 2020 by appropriate messages to Exchange OLE Database agent 2018.

Application code 202A of application server 202 comprises sequences of computer program instructions that are configured to carry out the functions that are described herein.

In the configuration of FIG. 2D, transportable applications that are hosted by application server 202 may be viewed and managed using Outlook client 2004. The Outlook client 2004 is an example of an HTML e-mail client that can display transportable application content in rich HTML form within an e-mail message window. The transportable applications may be transported over a network using Exchange server 2008. Active Directory server 2026 may serve as a source for user and group information. Building blocks may be implemented in the form of Web forms, which provide user interface front-ends to data and logic in the Web storage system 2020.

Exchange server 2008 includes instant messaging support with presence detection API's. Thus, application server 202 may determine, by an appropriate API call, if participants in transportable applications are actually online, and utilize instant messaging for communications, and record such sessions at user request. Transportable applications can include NetMeeting features for initiating and storing data conferences, such as virtual white board, application sharing, video conferences, audio conferences, etc., through Exchange server 2008.

Exchange has threaded discussion capabilities that are programmatically available. In one embodiment, application server 202 uses the threaded discussion APIs to provide a threaded discussion capability, with presence detection, as a core building block.

Calendaring and contact information access through Exchange server 2008 allows for scheduling features, such as automatic meeting creation, available time lookup and resolution, meeting cancellations, etc., and more integrated addressing and address validation on the server side. Use of Exchange server 2008 also enables application server 202 to communicate transportable applications to PDA, mobile phone, and other non-PC devices, over wired and wireless.

A workflow engine of Exchange server 2008 has an accompanying graphical workflow designer that allows execution of logic and invocation of components in and outside of Exchange, via COM, that provide message routing, approval, and state transitions. Thus, transportable applications of application server 202 may participate and drive these workflows.

Figure 2E:
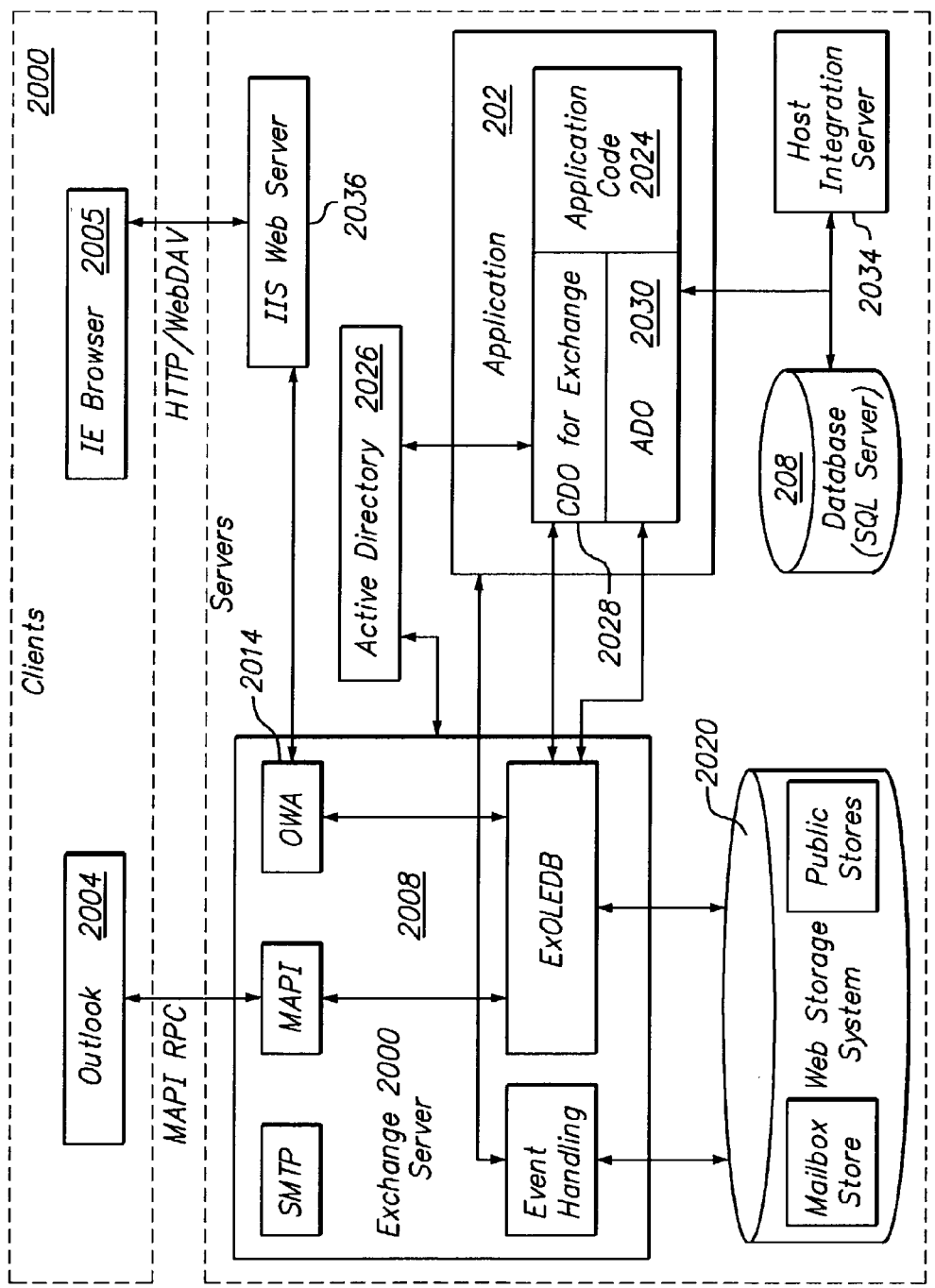
FIG. 2E is a block diagram of an alternate embodiment of a system architecture that features use of certain Microsoft® servers and systems.

FIG. 2E is a block diagram of an alternate embodiment of a system architecture that features use of certain Microsoft® servers and systems. As in FIG. 2D, the architecture of FIG. 2E features an Outlook client 2004, Exchange server 2008, Active Directory server 2026, Web storage system 2020, application server 202, and host integration server 2034. The architecture of FIG. 2E further features an Internet Information Server (IIS) 2036 that is communicatively coupled to Exchange server 2008 via OWA agent 2014. In client layer 2000, an Internet Explorer browser 2005 is communicatively coupled, for example, over a network, to IIS 2036.

Browser 2005 and Outlook client 2004 may carry out HTML display functions using a shared DLL.

In this configuration, application server 202 may serve transportable applications to a user through browser 2005, Outlook client 2004, or both. For example, a user may use browser 2005 to open an HTTP connection to IIS 2036, which communicates HTTP requests and posts among application server 202 and the browser. Using this mechanism, a user may obtain the portal presentation described herein and may view, create, and manage transportable applications. Alternatively, as in FIG. 2D, the user may obtain a portal view, or view an individual transportable application, in an e-mail window that is generated by Outlook client 2004.

Figure 2F:
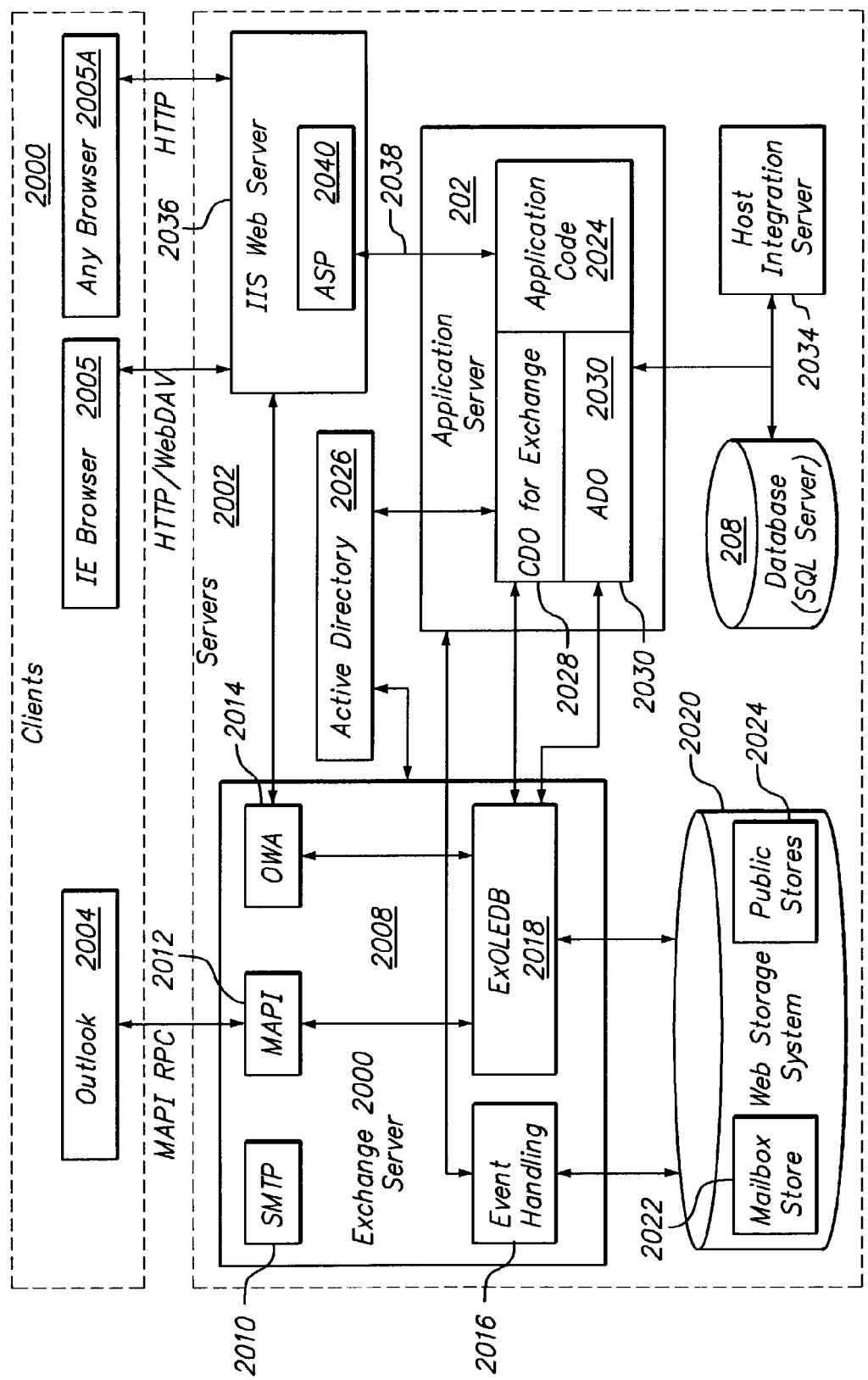
FIG. 2F is a block diagram of an alternate embodiment of a system architecture that features use of certain Microsoft® servers and systems.

FIG. 2F is a block diagram of an alternate embodiment of a system architecture that features use of certain Microsoft® servers and systems. As in FIG. 2E, the architecture of FIG. 2F features an Outlook client 2004, Exchange server 2008, Active Directory server 2026, Web storage system 2020, application server 202, host integration server 2034, and an Internet Information Server (IIS) 2036 that is communicatively coupled to Exchange server 2008 via OWA agent 2014. In client layer 2000, an Internet Explorer browser 2005 is communicatively coupled, for example, over a network, to IIS 2036. Any other browser 2005A, such as Netscape Navigator, may participate in client layer 2000. Browser 2005 and Outlook client 2004 may carry out HTML display functions using a shared DLL.

The architecture of FIG. 2F further features a plurality of Active Server Page (ASP) constructs that are hosted by IIS 2036. The ASPs are callable from application code 202A, as indicated by link 2038, by passing URLs over a network to IIS 236. The URLs identify a particular ASP and provide one or more function parameters or data values.

In this configuration, certain transportable application functions that are defined herein are carried out by appropriately configured ASPs 2040 rather than by application code 202A. For example, any of the functions that are described herein as implemented using JSP constructs may be implemented, alternatively, using ASPs 2040 in a system configured as in FIG. 2F.

In still another alternative configuration, elements of the Microsoft ".NET" infrastructure are used. In this embodiment, the database server 208 is Microsoft SQL Server, but all other components are found within Windows 2000, Windows XP, and related server products of Microsoft. For example, ISAPI filters are used as a substitute for J2EE servlets as disclosed herein; Active Server Pages substitute for JSP's; Microsoft Message Queues (MSMQ) substitute for JMS; COM+ components substitute for EJB's; and ODBC is the database communication protocol rather than JDBC. Data access objects (DAOs) as disclosed herein may be implemented using a custom OLE database provider that is compatible with the Microsoft Active Data Object (ADO+) framework. COM+ access to external legacy applications may be provided as an alternative to JCA or connectors as disclosed herein.

As set forth in the foregoing, embodiments of transportable applications, an application server, and associated functions described herein are applicable equally to contexts that use Microsoft servers, products, and related elements, as well as Java servers, open-source elements, servers or products of Sun Microsystems and its partners, etc.

1.2 Transportable Application—Structural Overview

A system having the foregoing configuration may be used to create, send, respond to, interact with, and manage a plurality of transportable applications.

Figure 1E:
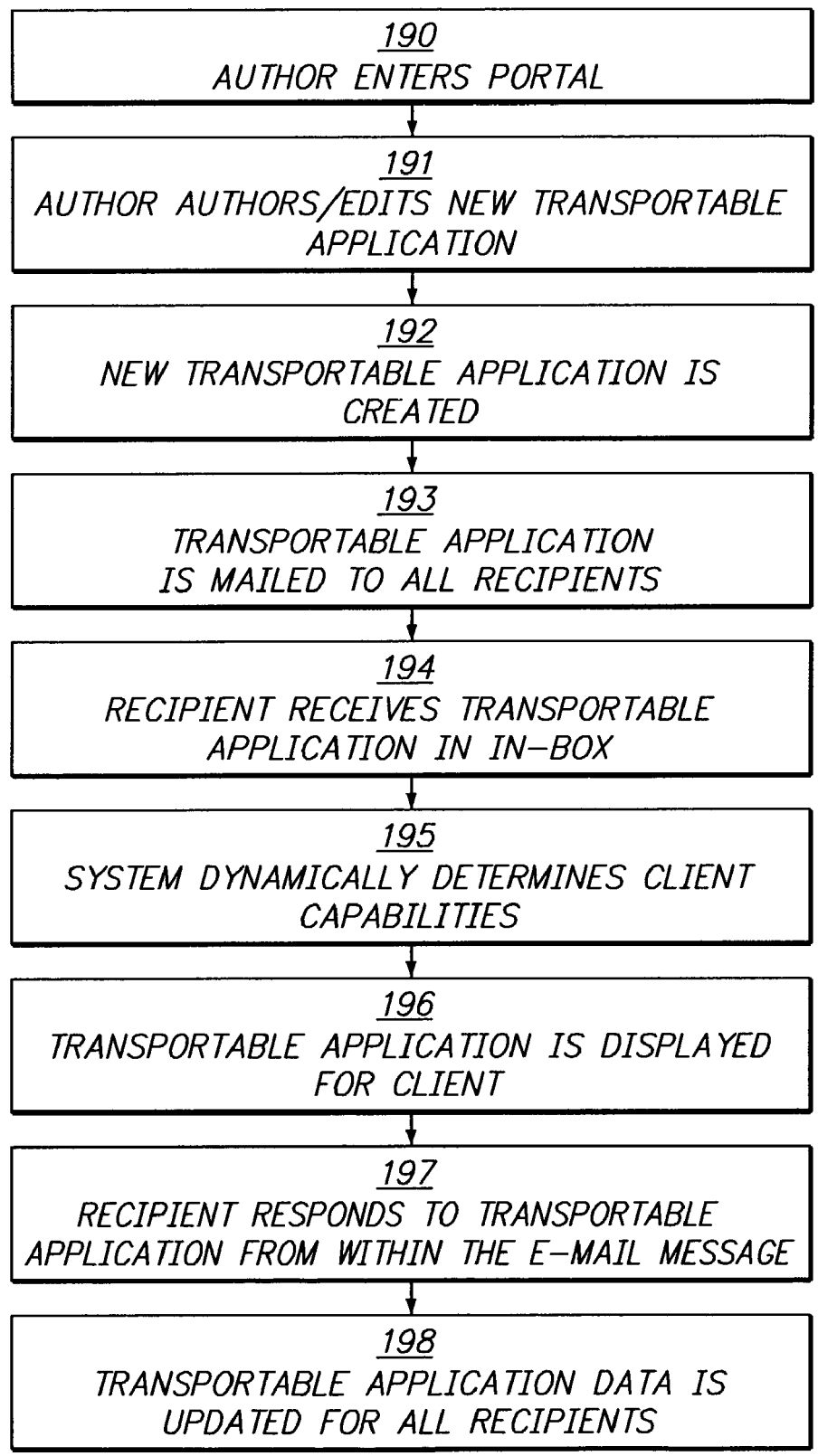
FIG. 1E is a block diagram illustrating a high-level view of a process of creating and interacting with a transportable application.

FIG. 1E is a block diagram illustrating a high-level view of a process of creating and interacting with a transportable application. In block 190, an author of a transportable application accesses an application authoring system. The application authoring system may comprise a transportable application editor that is provided by application server 200 and accessed through an enterprise network or over a public internetwork.

In block 191, the author creates, authors and edits a new transportable application using the editor, resulting in creating and storing the transportable application, as shown in block 192. Such authoring also includes identifying one or more recipients of the transportable application. In block 193, the transportable application is transported to all the recipients using a suitable transport mechanism. Transport mechanisms may include e-mail, wireless gateways, or other means.

When the transport mechanism is e-mail, in block 194, each recipient receives an e-mail message identifying the transportable application and appearing to contain the transportable application. Assume that a particular recipient opens the e-mail message that identifies the transportable application. In response, in block 195, the system dynamically determines what client e-mail program is in use, and determines what display capabilities it has with respect to fonts, colors, graphics, other types of information, etc. In block 196, the transportable application is displayed to the user using its e-mail client, based on the available display capabilities of the client. Further, any dynamic content associated with the transportable application is automatically retrieved, in its then-current form, from a database and displayed as part of the transportable application.

In block 197, the recipient responds to the transportable application in a manner analogous to replying to an e-mail message. Text comments or other changes to dynamic content of the transportable application may be entered in the application as it is displayed within a window of the e-mail program. Any such changes are updated at the database in dynamic content associated with the transportable application, as shown by block 198. As a result, any other recipient who subsequently views the same transportable application will receive a current view of the dynamic content. In this sense, the dynamic content and the transportable application are always current when read.

Figure 1F:
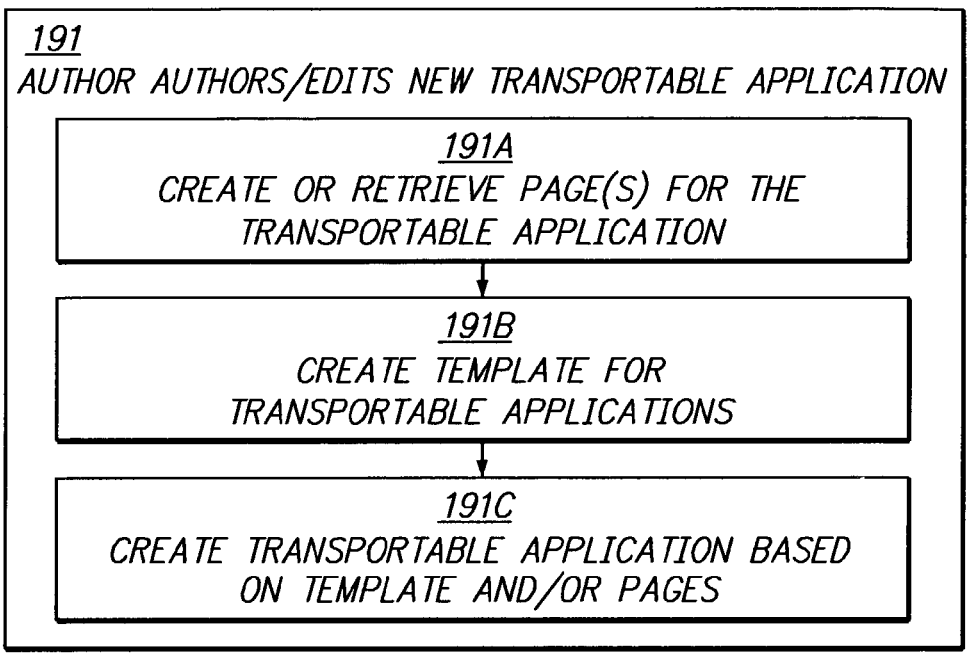
FIG. 1F is a block diagram illustrating details of a process of authoring a transportable application.

FIG. 1F is a block diagram illustrating details of a process of authoring a transportable application as in block 191 of FIG. 1E.

In block 191A, one or more pages for the transportable application are created or retrieved from storage. In block 191B, a template for the transportable application is created. In block 191C, a transportable application is created based on the template and/or the pages.

Each of blocks 191A, 191B, 191C may be carried out by a different individual. For example, one person can create a template and another person can create a transportable application based on the template. Recipients of the transportable application may, depending on the settings of the transportable application, change the structure of the transportable application. Alternatively, the same person can be responsible for all stages of the authoring process by creating templates, authoring new transportable applications, and participating in collaboration with others within the framework of a transportable application. Individual pages and templates may be shared with others.

1.2.1 Graphical Appearance of a Transportable Application—Generally

FIG. 2C is a diagram of an example graphical appearance of a transportable application, according to one embodiment. In this embodiment, a transportable application is displayed in a transportable application window 280 that comprises, in general, a command options bar 282, an action request or note 284, a header bar 286, and one or more pages 287A, 287B. Each of the pages 287A, 287B may comprise one or more building blocks 292, 294. Each building block contains the user interface, data elements, and processing capability that enable specific functions within a page. Navigation among pages is accomplished by selecting a navigation area 288 associated with a particular page, or by selecting a navigation direction icon 296.

In one specific embodiment, command options bar 282 includes a New Message button, Reply to Author button, Forward button, and Print View button. The New Message button is used to author a new transportable application message. A Reply to Author button is used to send a message directly to the author of the transportable application displayed in window 280. The Forward button is used to forward the transportable application to additional recipients. The Print View button is used to obtain a properly formatted printed version of the transportable application.

Header bar 286 provides addressing information identifying the author of the transportable application, its recipients, and its subject or title. In one embodiment, the specific names of recipients are hidden, and header bar 286 includes a View All Recipients link 286a. Selecting the View All Recipients link 286a causes the system to display a list of all recipients.

One or more notifications may be associated with a transportable application. If a notification is present for a transportable application, a notification link 290 is displayed, and provides a hyperlink with which the user may obtain a view of the notifications. When a user receives a transportable application, a notification system enables the user to "opt-in" to individual transportable applications in which the user has an interest. In one approach, if dynamic content associated with the transportable application changes, a new copy of the transportable application is sent to the user. Alternatively, notifications may comprise rebolding an identifier of the transportable application in the user's e-mail client. In this manner, the user can track changes without having to remember to continually go back and check on the state of the transportable application. For example, a user may read a transportable application, opt-in to the notification system for that transportable application, delete the transportable application from the user's e-mail Inbox, and wait for a notification when anything changes in the transportable application.

Each user is sent only a single copy of the transportable application, even if there are multiple responses to it. The system knows when the transportable application has been read by the user and can minimize the number of notifications sent. If the user has not opted-in to the notification system, the user can always open the transportable application or refresh the display of client 102, e.g., by selecting a Refresh button of the browser, to see the latest information.

A transportable application also can change state during its lifetime. For example, an author can close a transportable application; this notifies the recipients that comments or replies are no longer being accepted on the subject of the transportable application. The author of the transportable application can then communicate a decision or the results of the transportable application to all the recipients. Thus, the user no longer needs to spend time writing a response to an e-mail when its subject matter is essentially closed.

An Options link 291 provides a mechanism to display a list of actions that the user can take with the transportable application.

The action request or note 284 displays a brief urgent note or request from the author of the transportable application. Such notes provide a way to carry out a side conversation among recipients of the transportable application and the author or other recipients. Such notes may be stored persistently and generally are directed to one recipient. In one embodiment, a transportable application that is sent in the form of an HTML e-mail to a recipient may comprise a script, which is executed when the message is opened by the recipient, that establishes an HTTP connection to application server 202, requests any changes to dynamic content of the transportable application, determines whether the recipient has received any notes, and displays the notes if any have been received. The notes may be displayed within the transportable application, as in FIG. 2C, or in a pop-up window that is displayed separately.

1.2.2 Receiving and Sending Transportable Applications

In general, interacting with a transportable application involves receiving a message that references or contains a transportable application, entering a response, and using one or more transportable application commands. A user may receive a transportable application as a message carried using any suitable transport mechanism. In this description, for purposes of illustrating a simple example, the transport mechanism is assumed to be e-mail. However, any other suitable transport mechanism may be used, such as wireless gateways, voice and other multimedia protocols, etc. Further, various e-mail protocols may be used, such as SMTP, MAPI, etc.

When a user receives a transportable application, the user receives a specially designated e-mail message in the in-box of the e-mail client of the user. To begin interacting with the transportable application, the user opens the message. In response, the contents of the transportable application are automatically dynamically updated from a server, such as application server 202 of FIG. 2A. The transportable application is also updated when a user submits a response.

Specific processes for interaction with a transportable application depend on what pages and building blocks are contained in the transportable application. Specific building blocks are described further herein. In general, interaction involves selecting a desired page using a navigation area 287B and locating a response button. Each building block has a response button such as "Enter Response," "Add Image," "Add Table Row," etc. The response button is selected. In response, the system generates and sends an Enter Response window to the client 102, which displays it as a new graphical user interface window. An appropriate response is entered.

When the response is complete, the user selects a Submit button to send the response information to the server. Alternatively, the user may select Cancel to exit without entering a response. In response to a Submit selection, information for the transportable application in a database associated with the server is updated to show the response. The foregoing steps may be repeated any number of times for any number of pages in the transportable application. When the user is finished entering responses, the user closes the message.

Figure 7A:
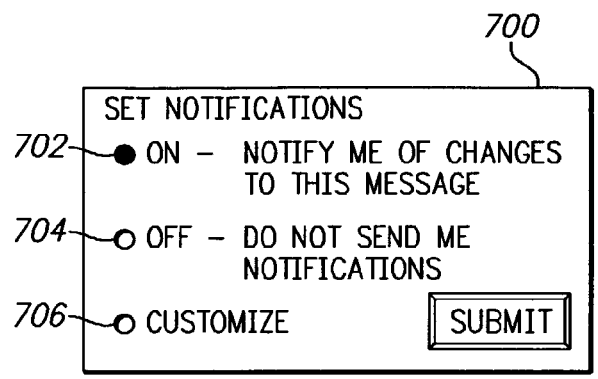
FIG. 7A is a diagram of a Set Notifications user interface window that is displayed when a notifications link is selected.

As noted above, notifications may be turned on and off by selecting notifications link 290. FIG. 7A is a diagram of a Set Notifications user interface window that is displayed when notifications link 290 is selected. Window 700 comprises an On radio button 702, Off radio button 704, and Customize radio button 706.

Figure 7B:
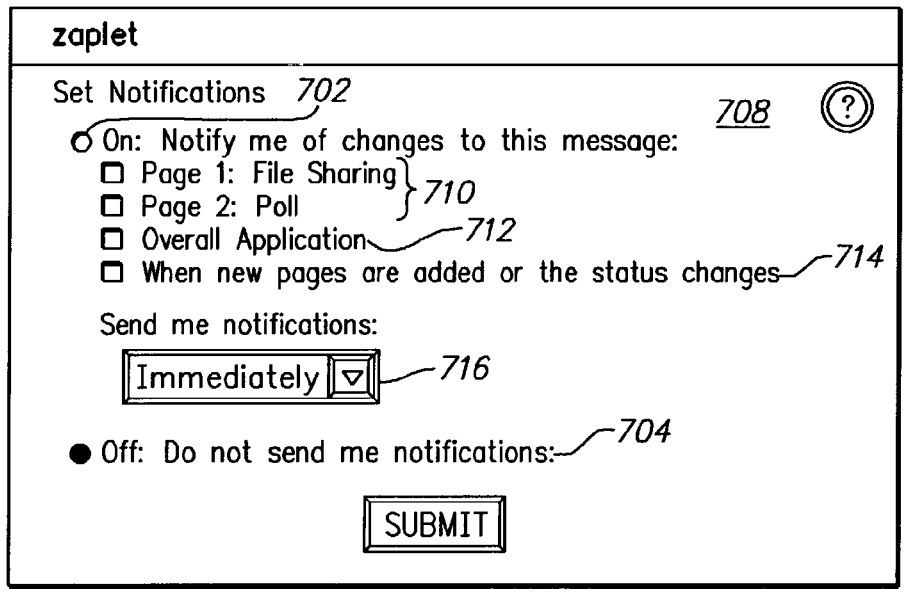
FIG. 7B is a diagram of a Customize Notifications window that may be displayed.

If the Customize radio button 706 is selected, in response, the server generates and sends to the client a Customize Notifications window. FIG. 7B is a diagram of a Customize Notifications window that may be displayed. The Customize Notifications window 708 displays one or more page check boxes 710 corresponding to pages of the transportable application. Selecting one of the check boxes 710 causes the system to generate a notification message only when a change occurs in the associated page. Window 708 also comprises an Overall Application check box 712 that triggers a notification when any change occurs in any part of the transportable application. Window 708 further comprises a Page Change checkbox 714 that triggers a notification when one or more pages are added to the transportable application or when its status changes. Window 708 also comprises a Set Frequency pull-down menu 716 that enables change notification messages to be sent at particular time intervals.

1.2.3 Containers

Each transportable application comprises one or more containers. Each container is implemented in the form of a programmatic object in an object-oriented programming environment. Each container may be a root container or an embedded container. Each transportable application has one root container, and one or more embedded containers.

The root container is responsible for interacting with transport services such as mail services 338, access and addressing services, and sending only new or changed information to and from its contained building blocks. Each root container stores a list of pointers or other references to contained child objects or building blocks. Thus, a tree walk of the pointers may be carried out to identify all building blocks or other child nodes of a particular container. A child, such as a building block or contained container, may have multiple parent containers; this mechanism enables, for example, a particular page to appear in more than one transportable application or in more than one template.

Each embedded container references and logically contains one or more other embedded containers or building blocks. Containers can call functions of the system services shown in FIG. 1A, FIG. 1B, and FIG. 1C, and thereby provide access to such services to the containers or building blocks that they contain. Further, containers coordinate presentation of content of contained building blocks. Containers can subscribe to events relating to variable values that are published by contained building blocks and embedded containers. Containers also may publish self-defined events for the purpose of providing data or other information to other containers or building blocks, and containers may define global variable values that can be retrieved and modified by contained building blocks and embedded containers.

In one specific embodiment, each container is implemented in the form of an Enterprise Java Bean.

1.2.4 Templates

Transportable applications are created based on transportable application templates. To create a new transportable application, a user must first access a transportable application template. Templates may provide corporate processes, general-purpose applications, or other functions.

In one specific embodiment, corporate process templates include templates for recruiting management, collections, financial reporting, and similar corporate-level tasks. Examples of corporate process templates include:

Collections. Facilitates the collection of past due customer accounts. Multiple departments can participate in the process and upload relevant documents, read and add comments to a threaded discussion, and track the overall process using a shared timeline or task list.

Escalation Exception Manager. Helps resolve a customer problem by displaying a current view of the case, managing interactions, and facilitating decision-making. Supplements call center applications by extending collaboration to other departments.

Financial Reporting. Collections the quarter's performance highlights and manages the development of the earnings release and earnings call script.

Forecasting. Compiles forecast input from multiple sources. Participants can modify a document and then provide their approval or disapproval.

Lead Management. Distributes, compiles, and tracks lead data. Participants can enter data in the shared table, assess the opportunity, and close the lead.

Order Exception Management. Tracks and manages the resolution of a problem that occurs in fulfilling the order. Enables collaboration across the enterprise, partners and suppliers to define the exception and decide on a solution.

Product Configuration. Manages the product configuration process from initial product requirements to configuration and approval. Participants can modify documents and approve or disapprove the final versions.

Proposal Management. Displays a proposal for review and feedback and compiles sign-off by reviewers or stakeholders.

Recruiting Management. Organizes and streamlines the process of interviewing a candidate, from receiving the resume to making an offer.

In another specific embodiment, general purpose templates include:

Discussion. Initiate a group discussion. Try brainstorming ideas or resolving issues among a select group of recipients.

File approval. Request approval on files that require consensus. Participants either disapprove or approve and share comments.

File sharing. Distribute files for participants to review, discuss and collaborate on. A version control option allows participants to check files in and out.

Image. Display and discuss a single image from a computer or the World Wide Web.

Image Gallery. Display and discuss a plurality of images that participants or the user contribute to a shared stored area.

Image Poll. Gather feedback and reach consensus about images.

Inline document. Review and discuss an HTML document; the contents may be displayed within the transportable application page, so that participants do not have to open another window.

Interactive Web Page. Interact with and discuss a Web page. Participants can interact with the page's hyperlinks and fields and can navigate as they would on a Web browser.

Invitation. Invite colleagues to meetings and other events; display event details and collect RSVPs and comments from invitees.

Poll. Gather opinions and feedback; see voters' comments and a chart of the results.

Ratings. Gather feedback on up to 100 questions or statements. Participants can rate each on a scale and provide comments.

Schedule. Schedule a meeting or event by specifying dates and times and availability.

Table. Create a table to capture input from a team. Import a file to start the table, or create a table from scratch. Tables can be exported to a file for reuse.

The foregoing are merely examples, and templates providing other functions may be created or provided. Each template is created using an application editor or Application Builder, as further described herein. Updating a template using such an editor or builder does not causes changes to transportable applications that have been instantiated from the template, however.

1.2.5 Pages and Building Blocks

Generally, building blocks of a transportable application define the specific appearance, content, and functions of the transportable application. Each building block comprises data elements, logical elements, and presentation elements, each of which may be implemented in the form of one or more classes, methods and interfaces in an object-oriented programming environment. Each building block is contained within a container, and communicates with other building blocks through the container. The data associated with data elements of the building blocks is stored in a persistent data store, e.g., a database server. Building blocks are implemented, in one embodiment, as one or more Java Server Pages.

FIG. 1D is a block diagram illustrating an example of interaction of a container and its building blocks with system services. For purposes of illustrating a simple example, FIG. 1D illustrates one instance of a container 180 having three instances of building blocks 182A, 182B, 182N. However, embodiments are not limited to this example context, and a practical system may have many thousands or millions of instances of building blocks and containers.

Client requests 163 arrive at a request dispatcher 165, which de-encapsulates each client requests and routes it to a particular service selected from among client services 174. Client services 174 may comprise a presentation manager 164, store/create manager 166, submit manager 168, and authentication manager 170. Client services 174 may call one or more system services 161 as needed to carry out specific functions. In the example of FIG. 1D, system services 161 comprise security manager 120, notification manager 148, mail services 138, directory manager 160, and system manager 162. In other examples and embodiments, system services 161 may comprise any of the services shown in FIG. 1B and FIG. 1C.

Programmatic components and interfaces 176 interact with the client services 174. Each container 180 and building block 182A, 182B, 182N implements such components and interfaces. For example, container 180 and building block 182A, 182B, 182N each implement a Presentable interface that comprises programmatic methods that determine how the container and building blocks are presented in a user interface. Container 180 implements a NodeObject interface that comprises methods that determine the object hierarchy of the container, i.e., which specific building blocks it contains. A further description of such object interactions is provided herein in the section entitled Object Model.

In one specific embodiment, the data associated with data elements of the building blocks is stored in a persistent data store, e.g., a database server, that is dedicated to storage of system data and not generally exposed to external clients. The building blocks access services of the system programmatically through an associated container.

In this configuration, containers may be used to programmatically create transportable applications as described herein without use of an editor, builder, or other graphical user interface or user intervention. A program component may create or instantiate a container, add building blocks to it, and register the building blocks in the system. For example, in response to an event, an action can create a new transportable application and send it.

A description of examples of building blocks that may be provided in an embodiment is provided herein in the sections entitled "Application Editor," "Page Editor," and "Building Blocks—Examples."

1.2.6 Object Model

According to one embodiment, transportable applications and system services are implemented using programmatic objects that are created using an object-oriented development environment and executed in an object-oriented runtime environment. The programmatic objects are organized according to an abstract object model that comprises base interfaces, support classes, and component objects. A preferred embodiment is implemented using the Java environment, but this environment is not required, and program implementations in other object-oriented environments, or in procedural programming languages, threaded interpreted languages, etc., are possible.

In general, the base interfaces serve as APIs that can be called by other objects and services in the system. The intermediate support classes are classes with partial or full implementation of specific functionality, providing typical combinations of basic interfaces. The component objects are fully implemented classes for carrying out specific tasks.

Base interfaces, in one embodiment, relate to rendering and presentation of objects, data persistence, containment, event handling, service callbacks, core service management, and client service management.

Figure 3B:
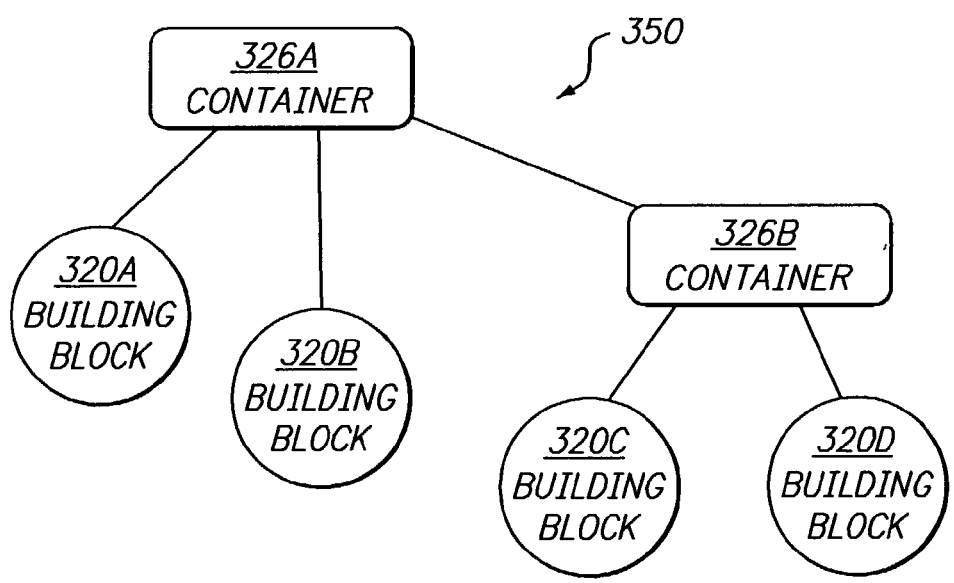
FIG. 3B is a diagram of a containment hierarchy for objects that define a transportable application.
Figures 1, 3A:
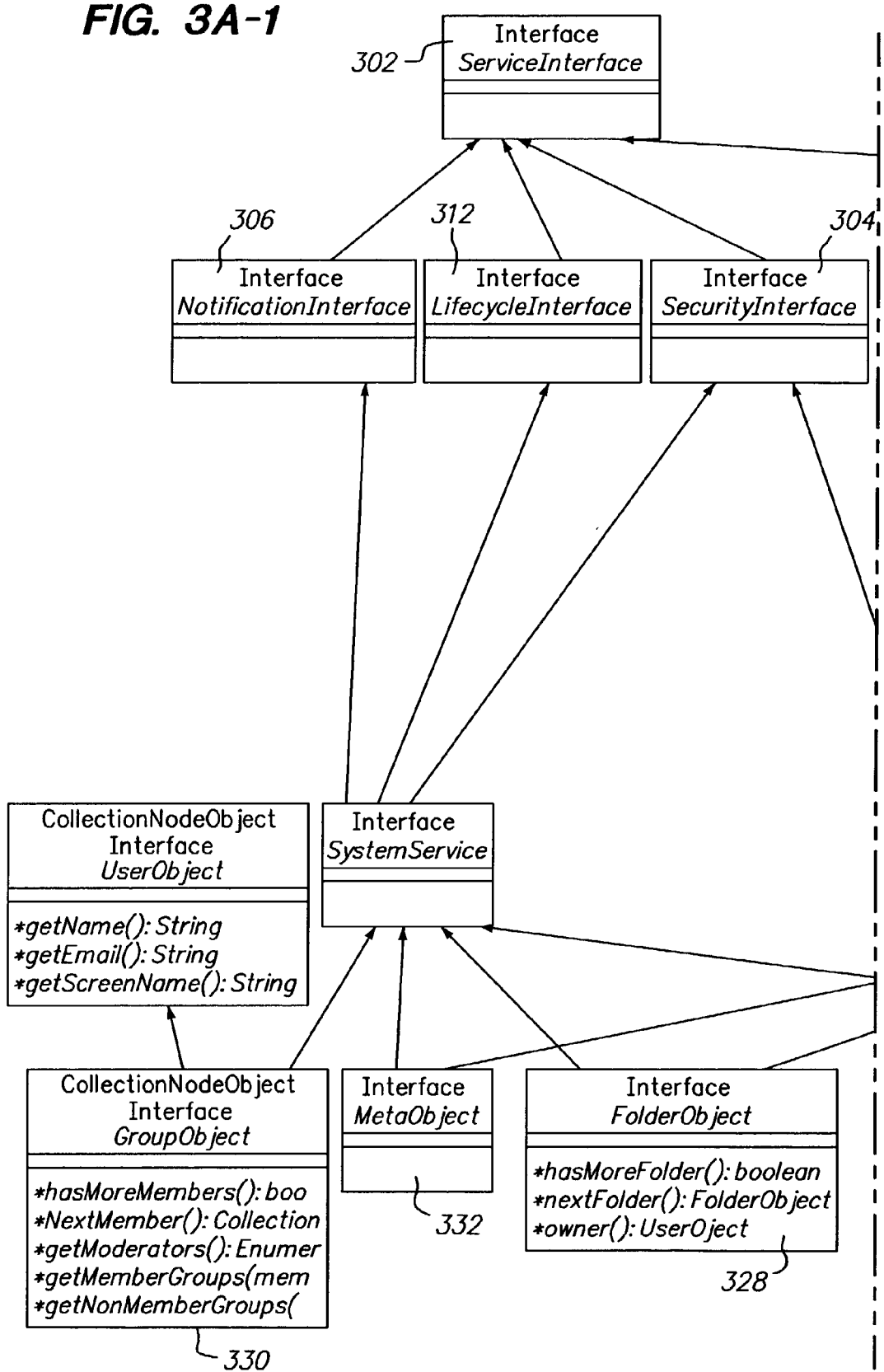
FIG. 3A is a diagram of dependency relationships among interfaces that may be used, in one embodiment.

FIG. 3A is a diagram of dependency relationships among interfaces that may be used, in one embodiment.

A Rendering/Presentation package provides interfaces for rendering objects. A Presentable interface 332 is used to render an object to a particular target client or device. A service or object that wishes to present the contents of an object creates and populates attribute values for information about a client request in a ClientContext data structure. This information may comprise a device identifier, rendering format, etc. An implementation of the Presentable interface uses the ClientContext data to create appropriate data for rendering.

A Data package deals with data persistence from different data sources. In one embodiment, a "DAO" interface 334 contains methods that allow creation of a data access object (DAO) from a data source, its maintenance and data storage.

A Hierarchy/Containment/Collection package deals with object hierarchy and containment processes, e.g., collecting child building blocks and containers, etc. In one specific embodiment, a CollectionNodeObject interface 336 provides hierarchy functionality for a derived object. This interface supports navigation across object trees and DAGs. The interface can be used to provide functionality that includes both object trees and object collections. An InheritanceCriteria interface 338 defines how default inheritance policies (e.g., security, notification) apply to a specific object hierarchy. Examples of these are access control inheritance for objects in a given hierarchy. The interface also covers whether the child object inherit state information from parent objects or not. For example, if a child container or building block object inherits state from a parent container object, and the parent container is closed, then all child containers will close. In contrast, state would not be inherited if deleting a group does not necessarily mean removing all members of the group, though it might be an option.

An event handling package deals with handling of events generated from different components in the system. In one specific embodiment, an EventHandler interface 340 provides a base event handler interface. Further description of event handling processes, in an example embodiment, is provided herein in the section entitled "Object Communications—Event-Driven Methods (Event Handling System)."

A service callback interface package contains definitions for callback interfaces that are used by service managers. The callback interfaces provide APIs that application objects provide to services. Control managers, services and other components can use such interfaces to communicate with application components.

In one specific embodiment, an interface "ServiceInterface" 302 provides a base interface for all service interfaces. An interface "SecurityInterface" 304 provides a security service interface that can be used to query an object for access control permissions and other security related functionality. An interface "NotificationInterface" 306 provides interfaces that can be used to generate necessary notifications for a derived object. An interface "CommInterface" 308 is used for communication with users and other systems. An interface "MailableInterface" 310 is used to define how to make an object transportable using e-mail, and an object can query such interface to receive content and target mail addresses. An interface "LifecycleInterface" 312 covers the lifecycle management of a component, in the form of operations such as close a component, create a component, respond to a component, and add or delete members of groups and folders.

A package of core service managers contains a set of core service engines. In one embodiment, certain critical core service engines, e.g., a security service engine, are not extendable. They provide basic services that other components can use. Each of the service managers is implemented in standalone fashion and is not dependent on any functionality from other system components.

In one specific embodiment, a ServiceManager interface 314 provides a base interface for all other service managers. A SecurityManager interface 316 is a security provider for services such as authentication, access control and SSL, etc. A NotificationManager interface 318 is a notification provider. A CommunicationManager interface handles SNMP communications among system entities. A DirectoryManager interface provides LDAP directory functionality.

A package of client service managers provides interfaces that are related to platform services, and which rely on the components to provide certain functionality. The client service managers are analogous to brokers that act as liaisons between objects and services to achieve a particular end result, such as rendering an object in a user interface.

In one specific embodiment, a PresentationManager provides a broker that deals with object presentation in the system. Such objects may comprise: building blocks; container types such as container objects, folders, or groups; or meta objects such as authoring objects. A StoreCreateManager provides an interface for creating and storing objects. A SubmitManager provides an interface for submitting changes. An AuthenticationManager provides functionality to authenticate users and applications that wants to Zaplet platform services, in communication with the SecurityManager.

A plurality of support classes are provided for the foregoing interfaces; the support classes generally comprise abstract classes with partial interface implementations. The support classes encapsulate a list of common interfaces across different platform components. Thus, the support classes enable objects to reuse common functionally across multiple components.

Component objects of the system are fully implemented objects. Components are composed from a single support class and one or more base interfaces classes. In some cases, a component needs functionality from multiple support classes. In this case, needed interfaces are implemented at the component level by delegating functionality to embedded support objects.

Figures 2, 3A:
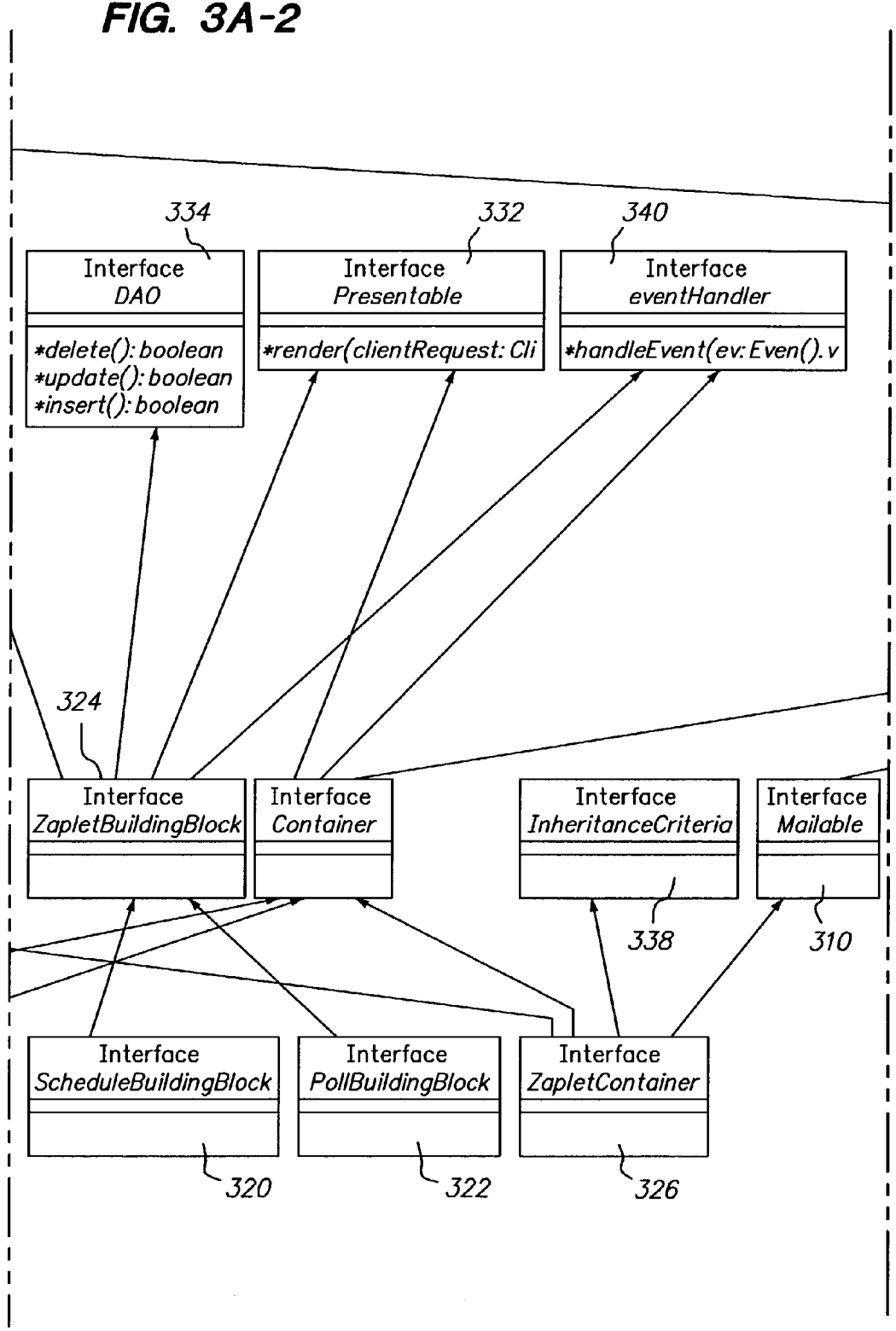

In one embodiment, a BuildingBlock component object represents an atomic displayable component that can be extended. Examples of building blocks include a poll building block, schedule building block, dynamic Web page building block, document upload building block, etc. FIG. 3 illustrates a schedule building block interface 320 and a poll building block interface 322, as examples. Each is constructed based on a building block interface 324.

An ApplicationContainer component object 326 represents a transportable application in the system, and may reference and logically include one or more building block objects. A FolderObject component object 328 represents a document folder in a manner analogous to file system folders in an operating system. The FolderObject component object provides a mechanism to organize different resources, such as folders, files, task templates, etc. A GroupObject component object 330 provides a mechanism to organize a set of resources and users as a group. A MetaObject component object 332 represents meta information for objects that can be authored in the system, and comprises a container that includes a representation for authoring control flow.

FIG. 3B is a diagram of a containment hierarchy for objects that define a transportable application. In general, an Application Container object 326 (FIG. 3A) represents a transportable application and contains one or more building blocks and optionally other containers. For example, a containment hierarchy 350 (FIG. 3B) may comprise a first ApplicationContainer 326A that comprises first and second building blocks 320A, 320B and a second ApplicationContainer 326B. The second ApplicationContainer 326B further contains additional building blocks 320C, 320D.

Each ApplicationContainer provides services to its contained Building Blocks. When a Container contains other Containers, the hierarchy is represented as a tree structure, as in FIG. 3B. A Container acts as a coordinator for its contained building blocks and interacts with them in order to store user inputs and responses and also for getting the presentation data of the building blocks. Similarly, a Container interacts with its contained Containers in order to propagate certain actions such as closing a transportable application. When a transportable application is closed, all its contained transportable applications are also closed.

Once a Container has been created, new building blocks and containers can be added to it. A Container provides necessary APIs for adding the building blocks and containers and also for interacting with them. Table 1 presents an example class definition of a container.

TABLE 1

CONTAINER CLASS

```
public class ZapletContainer{
    void ZapletContainer(ZapletRequest request);
    void            addBuildingBlock(ZapletRequest request);
    void            addChildZaplet(ZapletRequest request);
    Vector          getChildren();
    ZapletData      getZapletData();
    Zaplet              getParent();
    Zaplet              getChild(ObjectId zapletId);
    Zaplet              getRoot();
    void            handleResponse(ZapletRequest request,
                            ObjectId userId);
    void            handleEditResponse(ZapletRequest request,
                            ObjectId userId);
    void            handleEditCreate(ZapletRequest request,
                            ObjectId userId);
    PresenterData   getDisplayData(ZapletRequest request);
    PresenterData   getSubmitData(ZapletRequest request);
    void            sendReminder(String reminderMessage);
    void            forward(String forwardMessage, String toList);
    void            close(String closeMessage);
}
```

Using the API defined by Table 1, an addBuildingBlock method is invoked to add a building block to a transportable application. An addChildZaplet method is invoked to create a child transportable application. A getChildren method returns the child transportable applications for a given transportable application. This method returns the transportable applications that are immediate children of a given transportable application. A getZapletData method is invoked to retrieve data relating to a transportable application.

A getParent method returns the parent transportable application of a given transportable application. A getChild method returns the specified child transportable application. A getRoot method returns the root transportable application in the hierarchy.

A handleResponse method is invoked to handle a user response to a transportable application. An editResponse method is invoked to edit an already submitted response, provided the response can be edited. An editDefinition method is invoked to edit the definition of a transportable application. A getDisplayData is invoked to get the presentation data for the transportable application. A getSubmitData is invoked to get necessary data to prompt the user to submit a response to a transportable application.

A sendReminder method is invoked to send a reminder message to the participants of the transportable application. A forward method is used to forward a Zaplet to a set of recipients specified by the 'toList' parameter. A close method is used to close the Zaplet for any further interactions.

1.2.7 Membership

Users of service unit 305 are organized in one or more groups. Each group is represented by a programmatic object in a membership hierarchy. Each group may have one or more child groups or users. Group and user information may be imported from an external directory service, such as an LDAP directory, or may be defined in the system database. Groups may be collections of individuals in a department, project team, or other group with a common goal. Groups provide an archive for the shared knowledge of people who work together. Groups also provide convenient distribution lists for addressing transportable applications.

Membership concepts are programmatically represented by folder objects and group objects. A membership group is a collection of other membership subgroups and users. A folder is a collection of other subfolders and meta-objects. By definition, a group is also a user, and a folder is also a meta-object. Each object in a membership hierarchy comprises a reference to an underlying object or user. For example, when a particular task is saved in two different folders, two references to the same task (one for each folder) are stored in the hierarchy.

Figure 4:
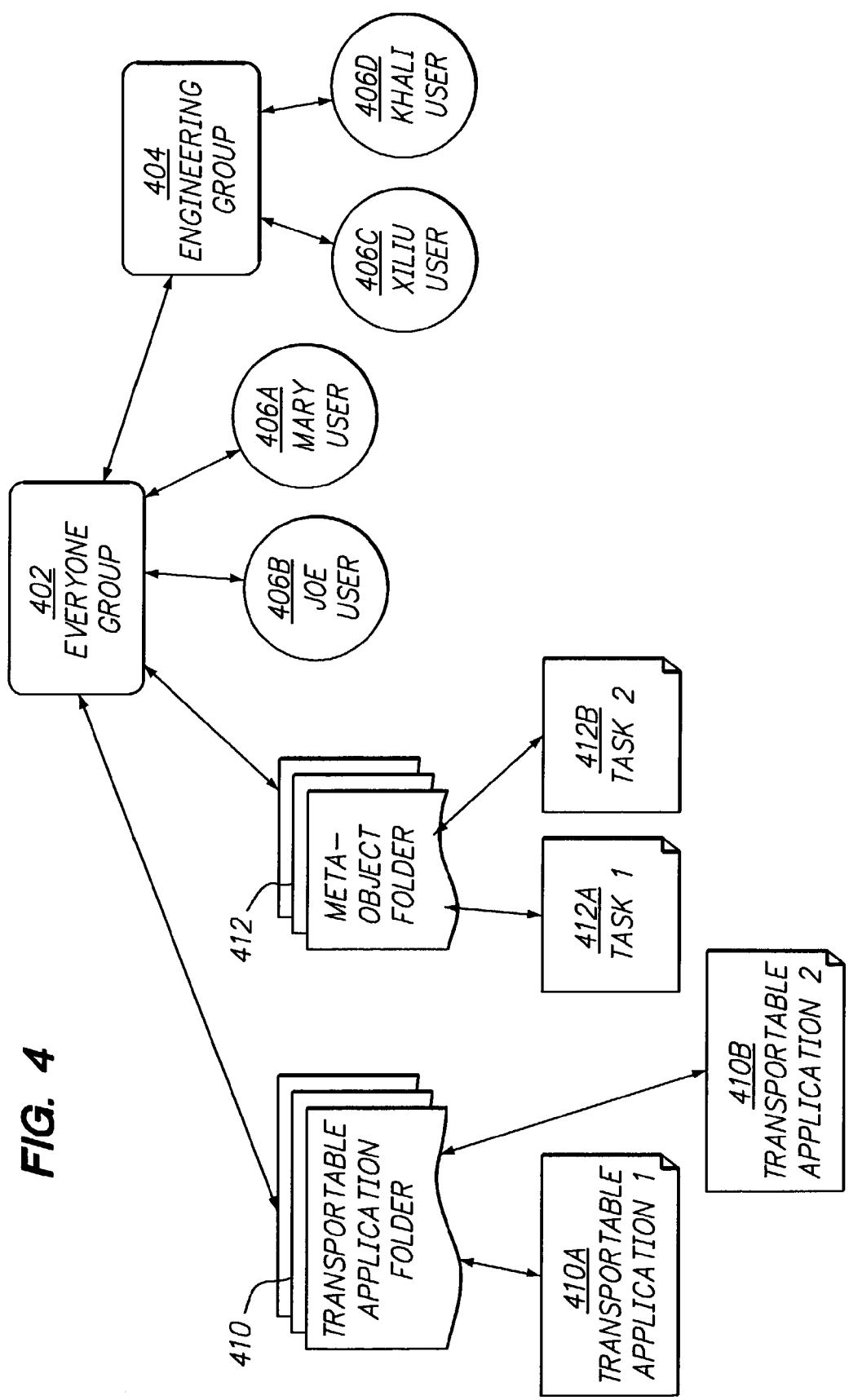
FIG. 4 is a block diagram of an example of a membership hierarchy.

FIG. 4 is a block diagram of an example of a membership hierarchy. An "Everyone" group 402, represented by a group object, contains an Engineering group 404, users 406A, 406B, a transportable application folder 410, and a meta-object folder 412. The transportable application folder 410 contains transportable applications 410A, 410B. The meta-object folder 412 contains tasks 412A, 412B. Engineering group 404 contains users 406C, 406C. The example illustrated in FIG. 4 may be modeled using the NodeObject interface, CollectionNodeObject interface, UserObject interface, FolderObject interface, MetaObject interface to represent one or more authoring tasks or templates, and GroupObject interface.

1.2.8 Building Blocks-Programmatic Aspects

Building blocks are functional units of a transportable application. Each building block encapsulates business logic, data and presentation. A BuildingBlock object is always be contained in an ApplicationContainer object. Server processes provide services to building blocks. An ApplicationContainer invokes various methods on a BuildingBlock object to process various user actions such as creating a transportable application, responding to a transportable application or editing a transportable application and so on. A BuildingBlock can also handle asynchronous events.

Each building block implements the BuildingBlock interface of FIG. 3, which defines methods for storing data for building blocks, storing responses for the building blocks and also for providing the necessary data for presentation. The presenter data that is returned from a building block can be presented in different formats, as described below. In one specific embodiment, the BuildingBlock interface is defined as set forth in Table 2.

TABLE 2

BUILDING BLOCK INTERFACE EXAMPLE

```
public interface BuildingBlock{
    void            handleCreate(ZapletRequest request,
                            BuildingBlockDAO bbDAO);
    void            editCreate(ZapletRequest request,
                            ObjectId userId);
```

TABLE 2-continued

BUILDING BLOCK INTERFACE EXAMPLE

| | |
|---|---|
| void | handleResponse(ZapletRequest request, ObjectId userId); |
| void | editResponse(ZapletRequest request, ObjectId userId); |
| void | handleEvent(EventData eventData); |
| PresenterData | getDisplayData(ZapletRequest request); |
| PresenterData | getEditResponseData(ZapletRequest request); |
| } | |

In this embodiment, a handleCreate method is invoked to handle creation of the building block data in the database 208. An editCreate method is invoked to edit building block data in the database 208. A handleResponse method is invoked to create a user response in the database 208. An editResponse method is invoked to handle editing of an already created user response. A handleEvent method is invoked to handle an event by the building block.

A getDisplayData method is invoked when the building block data needs to be displayed in a transportable application. A getEditResponseData method is invoked when the response data needs to be displayed in a submit dialog box for editing.

In one embodiment, a BuildingBlockMetaData interface specifies methods on a building block meta-data object. Such methods are responsible for providing the necessary information in order to construct an authoring snippet or a response dialog snippet, related to the building block. In one specific embodiment, the BuildingBlockMetaData interface is defined as set forth in Table 3.

TABLE 3

BUILDING BLOCK METADATA INTERFACE EXAMPLE

| | |
|---|---|
| public interface BuildingBlockMetaData{ | |
| Vector | getAuthoringParams(); |
| Vector | getResponseParams(); |
| Vector | getConditions(); |
| Vector | getActions(); |
| } | |

In this embodiment, a getAuthoringParams method returns a vector of authoring parameters, which can be used by a tool to construct an authoring snippet for the building block. Each element of the vector is of BuildingBlockParam type. A getResponseParams method returns a vector of user response parameters, which can be used by a tool to construct a user response dialog box for the building block. Each element of the vector is of BuildingBlockParam type. A getConditions method returns a vector of conditions that a building block can evaluate, which can be used by a tool to define a set of conditions for the building block. Each element of the vector is of ZapletCondition type. A getActions method returns a vector of actions that a building block can perform, which can be used by a tool to specify a set of actions for the building block. Each element of the vector is of ZapletAction type.

When a Building Block is invoked to either to create its data in the database or store user responses or retrieve its data from the database, it uses a Data Access Component (DAC) to access the database. The DAC comprises programmatic objects that enable building blocks to access data in database 208 such that developers of the building blocks do not need to know the specific schema of the database, and such that the building blocks are not affected by any future changes in the schema. Further, the DAC provides, in effect, an API that enables a developer to store building block data in database 208 without knowing the schema.

In one specific embodiment, the DAC comprises data access objects and data objects. Data access objects serve as a channel to write and read data from the database 208. Data access objects encapsulate knowledge about objects and tables in the database 208 that are acted upon. Data access objects provide methods to accomplish data persistence and data retrieval queries. Data access objects can carry out access control checks on the data that is being accessed, in cooperation with the security services described herein, to ensure that a particular user or building block is authorized to retrieve selected data.

Figure 15:
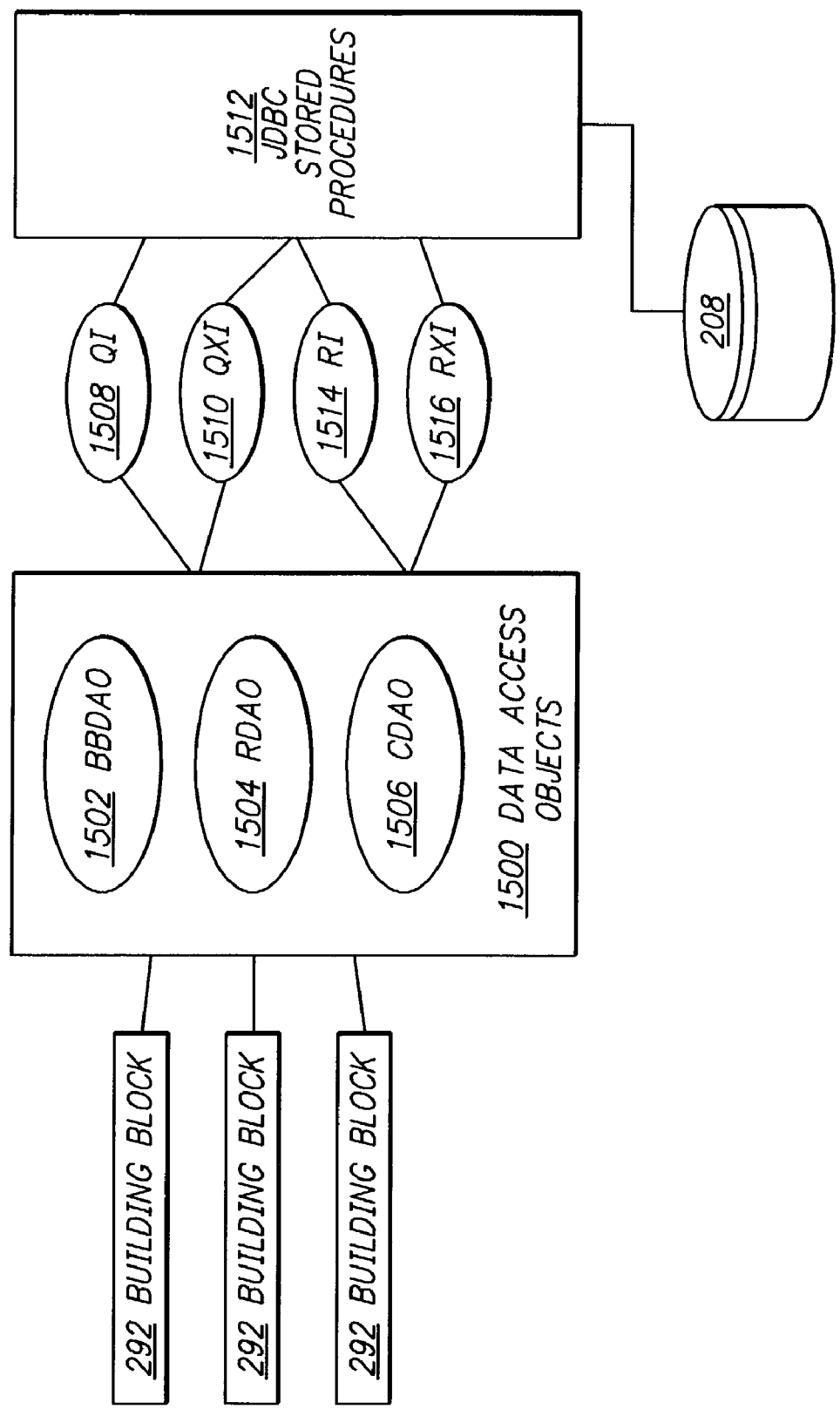
FIG. 15 is a block diagram that illustrates data and control flow among building blocks, data access objects, interface methods and the database.

FIG. 15 is a block diagram that illustrates data and control flow among building blocks, data access objects, interface methods and the database. One or more building blocks 292, 294 communicate with data access objects 1500. Each building block 292, 294 is associated with a corresponding building block data access object 1502 that stores metadata and data used in program logic relating to the building block. Such metadata may include a database identifier, building block identifier, transportable application identifier, etc. The data used in program logic may include scalar values that determine behavior of specific building blocks. For example, for a Poll building block, the data used in program logic may indicate a chart type value that specifies what kind of chart is used for displaying poll results.

Data other than building block data may be stored in database 208. Accordingly, other types of data access objects are provided based on the kind of data that is stored. In one embodiment, data access objects comprise choice data access objects 1506, response data access objects 1508, etc. Each data access object encapsulates information about the underlying database tables by working with interface objects. For example, response data access objects provide a generic public interface that allows building blocks to store any responses from the recipients of a transportable application in the database. An example of such a response is a recipient's response to a poll question.

Each building block data access object provides access to tables of database 208 through interface objects. In one embodiment, the interface objects include a QuestionInsert object 1504, QuestionXMLInsert object 1510, QuestionResult or ResponseInsert object 1514, and QuestionXMLResult or ResponseXMLInsert object 1516. The interface objects communicate with database 208 through one or more stored procedures 1512. In one embodiment, the stored procedures act, in part, to convert user data received from the interface objects to XML format for storage in database 208; metadata that is not received from a user-created building block, or otherwise internally generated, is stored in conventional database columns. A pre-defined method may be used to store any building block-specific programmatic object as a string value in the database. For example, in one embodiment, the method setFieldValue(fieldName, value) is used to store a Java object as an XML string in the database.

A retrieval method is provided to facilitate retrieval of a data object that corresponds to a building block data access object. Data objects are created when data is retrieved from the database 208. Thus, data objects facilitate the flow of results from the database resulting from any query that is executed by a building block or any other component such as a presenter. Each data object is a wrapper around result objects such as the QuestionResult object, and Question- XML result object. Each type of data access object has a corresponding data object to capture results from the database tables. A pre-defined method may be used to retrieve an object that was stored in the database using the corresponding data access object. For example, in one embodiment, the method getFieldValue(fieldName, value) is used to retrieve an object that was stored in the database using the corresponding data access object. Any information that was stored in XML form by a data access object can be retrieved from the database, parsed by an XML parser, and then the query results can be returned on demand. Thus, a data object is a result object that any component in the system can retrieve by providing appropriate input parameters.

Each building block data access object has a corresponding building block data object that maps to the result object QuestionXMLResult. Each data access object provides a reference to a corresponding result object in the database or a cache thereof.

Using this mechanism, building block authors and developers can focus on business logic and program logic that is implemented in a building block rather than on the database schema, because the DAC separates such logic from the database schema by interposing an abstract layer. Accordingly, the system becomes more extensible because creating new building blocks is simplified. Further, dependencies between building blocks and the database are removed. The building blocks are insulated from any major changes that may occur in the database schema.

Graphical user interface elements associated with groups, and processes for joining and using groups from the user perspective, are described herein in the section entitled Personal Portal Presentation.

1.2.9 Directory Integration—Global Object Identifiers

In one embodiment, each transportable application is identified by a global identifier. A transportable application is indirectly transported to each named recipient by sending a message, such as an electronic mail message, to each recipient that contains a reference to the transportable application in the form of a URL that includes the global identifier. When the user opens the message, the URL is invoked, causing the user's browser to retrieve the dynamic content and other elements of the transportable application.

In one approach for implementing the foregoing, the global identifier has the following format: <AppserverURL>/Z?m=<globalId> where "<AppserverURL>" is the URL of an application server, such as "http://www.zaplet.com," and "<globalID>" is the global identifier. In one specific embodiment, the global identifier value has the format DbId_ObjTyp_ObjId, where "DbId" is a value that uniquely identifies a cluster. The DbId value may numeric or may be a string, such as a URL of an application server. When a numeric value is used, then a mapping of numeric values to URLs is stored in a directory. Using a URL requires no such mapping, but increases the length of the global identifier value. Length may be a limiting factor in certain encryption schemes, such as TwoFish. The ObjTyp and ObjId values refer to the type and the local identifier of the object in the cluster. The entire global identifier value is encrypted using a site-specific seed, as described further herein.

In an alternative implementation approach, directory-based access to processing clusters and other objects is used rather than direct reference to clusters as provided in the above approach. In a directory-based approach, objects are referenced using distinguished names that are registered in a directory. The directory may be an X.500 directory, LDAP directory, or similar repository that is associated with database 208. For example, Microsoft Active Directory may be used.

In this approach, each processing cluster is uniquely identified using a distinguished name ("DN"). The DN maps, in a directory, to a URL or other specific identifier of the cluster. There could be additional information in the directory that could be referenced. As defined in the X.500 standard, DNs are elements of a hierarchical naming system in which each DN has <name,value> attributes that are used to traverse a directory hierarchy or tree. For example, the DN "C=US, O=FireDrop, OU=Engineering, HN=alpha" identifies a path in a directory hierarchy to the entry for machine alpha in the Engineering dept at FireDrop which is in the US. That directory entry may contain the URL of an application server that is on this machine. A DN can be transformed into a numeric value using ASN.1 encoding.

Each cluster may be associated with a different enterprise, institution, or other organization. For example, clusters may be located at different competitive parties. Clusters that cooperate with each other need to have a trust relationship, which may be established through a third party security organization. Based on the trust relationship, each party that owns or operates a cluster can set up information for its peers in its own directory that is then used to construct a global identifier value. Since each directory structure is arbitrary and may be determined by the organization, the global identifier for an object also is site dependent. Thus, there may be many valid global identifiers for a single object. However, a benefit of the DN approach is that the DN is an indirect reference to the site information. One site's DN cannot be meaningfully applied to another site, thereby preventing improper access to a cluster from a user associated with a different site. Furthermore, directory level authentication must be successful in order to retrieve site information.

1.3 Presentation of Transportable Applications

1.3.1 E-Mail Client Presentation

In one embodiment, client 102 executes a client application program that facilitates authoring, viewing, interacting with, and managing one or more transportable applications. In this description, such a program is termed a "transportable application client" or, where it is clear from the context, "client." Authoring refers, for example, to creating a transportable application; creating a transportable application based on a template; integrating address information from an address book with a transportable application; converting an existing transportable application to a discussion-type transportable application; creating one or more transportable applications that implement a business process; and similar tasks. Viewing refers, for example, to viewing a transportable application; viewing one or more transportable applications that implement a business process; and viewing transportable applications when the client 102 is disconnected from a network ("off-line viewing"); and similar tasks. Interacting refers, for example, to interacting with a transportable application; interacting with one or more transportable applications that implement a business process; interacting with transportable applications when the client 102 is disconnected from a network; viewing one or more notifications; and similar tasks. Management refers, for example, to moving transportable applications into and out of folders and groups, and similar tasks.

In one approach, the transportable application client interacts with one or more electronic mail client programs ("e-mail clients"). The e-mail clients may comprise Microsoft Outlook 98, Outlook 2000, Outlook Express, Lotus Notes, Eudora, Netscape Messenger, etc. Typically one of the foregoing is installed in client 102 and the transportable application client interacts with it using shared dynamic linked libraries (DLLs), public APIs, or other programmatic communications mechanisms. The transportable application client also interacts with a network browser such as Microsoft Internet Explorer, Netscape Navigator, etc., as well as with the operating system of client 102, which may be Microsoft Windows 95, Windows 98, Windows NT, Windows 2000, etc.

Specific functions of an embodiment of a transportable application client are now described.

In one specific embodiment, a client is provided with an automatic installer that can copy components of the client from an installation media to a client computer system (e.g., client 102), and integrate such components with the operating system, browser and e-mail application. The installation media may be a CD-ROM, file server, Internet download, etc. Alternatively, users may receive an HTML email containing a signed ActiveX control, or equivalent program element, that initiates installation of the client. Installation may involve storing configuration data in a registry of the operating system of client 102.

The client is provided with an automatic start configuration so that the client initiates execution when a client computer, e.g., client 102, starts operation. Thereafter, the client may be stopped and restarted repeatedly by the user. After startup, the client generates an indicator icon that is displayed in an operating system "tray" location. When started, the client initially enters an inactive state. The client activates in response to a log-on process carried out by the user. When the client is activated, the indicator icon changes appearance to indicate that the client is in the active state. To deactivate the client, the user may either log off or stop the client, at which time the indicator icon reverts back to its Started state.

In the log-on process, the client prompts the user for a user identifier and password and then authenticates the identifier and password against the authentication database. The client provides an option to save the password for the user in an encrypted format; userids and passwords are saved as a value pair. Further, the client provides an option to log on automatically when the client is started based on a saved password. Using this option, the last user who logged off is logged on at startup, provided a saved password is available.

When a user receives a notification in responses to receiving a new transportable application, an updated transportable application or changes to the status of a transportable application, the indicator icon changes appearance to indicate that a pending notification exists. Optionally, under control of the client, client 102 may generate a sound or play an audio file to announce the receipt of a notification.

When a user hovers a mouse or similar pointing device over the transportable application indicator icon, the client displays the number of new and updated transportable applications. Selecting the indicator icon causes the client to display the title of each new or updated transportable application and enables the user to select a transportable application for viewing.

Also in one embodiment, the client notifies the user when new or updated software components become available. For example, the client indicates the availability of software updates with a flashing indicator icon. When requested by the user, the installer function of the client downloads and installs the applicable new or updated components.

In another feature, the client enables the viewing of transportable applications off-line by creating a snapshot of transportable application dynamic data in a local cache. When the transportable application is viewed off-line, the client redirects and resolves data references using the local cache. In one configuration, the client maintains a persistent connection to the application server 202 and uses unused bandwidth to download data for the transportable application to the local cache. Only incremental data is downloaded. The download interval, download data size and cache size are configurable.

A user may use the e-mail client executed by client 102 to respond to transportable applications. In this configuration, the client overrides the Reply, Reply to All, and Forward buttons or functions of the e-mail client. In addition, each transportable application may be addressed using the e-mail client. For example, recipients may be selected using a pre-configured search order of various information sources, such as a corporate directory, personal contacts, aliases, and groups. When a transportable application is sent, recipient names are resolved to an address that can be processed by an e-mail server or a similar transport mechanism. The client may provide its own address book and the user may add recipient names to it.

The client can indicate changes in status of a transportable application and updates in the e-mail client. A previously read transportable application may be marked as unread if new responses have been posted. Such notifications should only affect email found in the user's Inbox. If the email has been moved to another folder, these notifications do not occur.

The client communicates with application server 202 to determine if a notification should be sent to the user. The client notifies the user when new or updated templates for transportable applications become available. When requested by the user, the installer downloads installs only the applicable templates.

1.3.2 Personal Portal Presentation

According to one embodiment, transportable applications are accessible through a personal portal. Generally, a personal portal is represented by a graphical user interface window that contains one or more hyperlinks for accessing system functions. The personal portal provides membership services, including defining groups and managing group membership. The personal portal displays organized lists of transportable applications that the user of the portal has received, organized according to group and individual user. Thus, the portal provides an organized entry point through which a user may create, organize and send transportable applications and access tools and services for doing so. The portal provides secure access to transportable applications through user authentication processes.

In one embodiment, the personal portal is defined as and implemented using a container and a set of building blocks. Thus, each personal portal is itself a transportable application like others in the system. In this embodiment a user receives the personal portal through a transport mechanism, such as HTML-enabled e-mail, for example. The user opens the message and receives a view of an initial page ("home page") of the portal by reading the transportable application. In this alternative, selecting links in the home page of the portal causes the system to generate new screen displays and carry out other functions within a browser window that launches automatically.

In this embodiment, the portal comprises a transportable application having two or more Listing building blocks, by default. The first listing building block is an In-Box that lists all transportable applications that have been received by the user who is viewing the portal. The second listing building block comprises a list of links to authoring functions, to assist users in rapidly accessing functions of the application editor and page editor disclosed herein. In an enterprise having a plurality of departments, there is a portal transportable application for each department; each such application comprises a page for each user group in the department. A page for all users is provided. Group moderators may add building blocks to the group pages. Groups may be nested within other groups.

Alternatively, the portal is one or more software applications, represented by a plurality of graphical user interface windows, which are served or operated by a service unit, such as service unit 105. In general, a portal is associated with a business enterprise that owns, operates or hosts system 200. The portal is accessed using a browser executed at a client computer.

In each embodiment, the portal provides access to an Application Builder application and a plurality of templates for creating transportable applications. The portal provides each user with a personal archive of transportable applications that they have sent and received, and provides users with access to groups that provide a repository of shared knowledge regarding transportable applications. In one specific embodiment, the portal home page comprises the following links: Group Directory; My Groups; Personal Messages; Search; Builder; Preferences.

To join a group, a user selects the Group Directory link. A group directory screen appears that lists groups alphabetically by name, shows a description of each group, shows how many messages regarding transportable applications were sent to a group in the past seven days, and shows the group membership status value. If the group is open to everyone, the status value is Join Group. If the group is open by invitation only, the status value is Private. If the current user is a member of a group in the list, the status value is Member. The user then selects either the Name value or the Status value, both of which are hyperlinks, of the group that the user wishes to join.

Figure 9A:
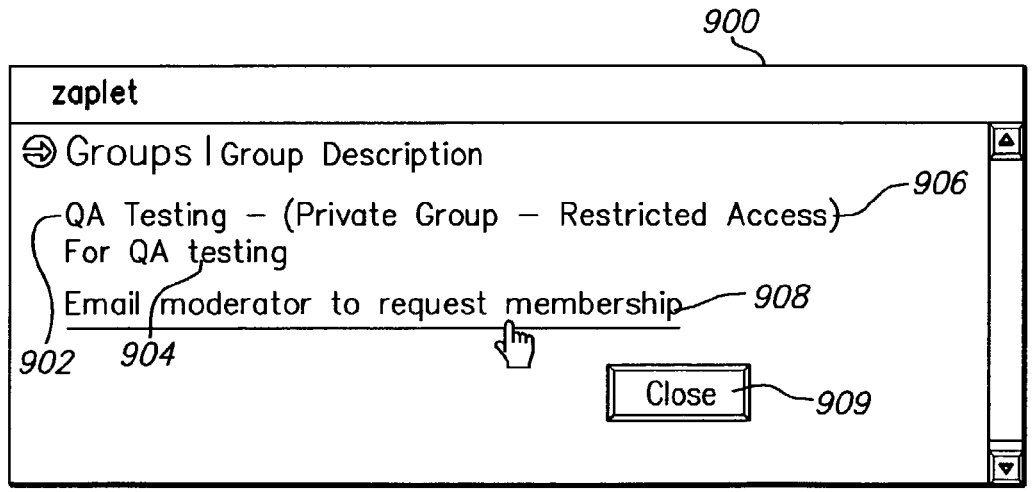
FIG. 9A is a diagram of the Join Group screen that is displayed when the selected group is private.

In response, a Join Group screen is displayed. The form of the Join Group screen varies depending on whether the selected group is open to everyone or private. If the group is open to everyone, then the Join Group screen comprises a Join button and a Cancel button; a user may join the group by selecting the Join button. FIG. 9A is a diagram of the Join Group screen that is displayed when the selected group is private. In this configuration, Join Group screen 900 includes a group name 902, group description 904, a private group label 906, an email link 908, and a Close button 909. To attempt to join a private group, the user may select email link 908. In response, an email message is automatically sent to the moderator or "owner" of the group to request access for the user. Alternatively, the user may select the Close button 909 to close screen 900.

FIG. 9B is a diagram of a My Groups screen that is generated and displayed when a user selects the My Groups link of the portal home page. My Groups screen 910 comprises function links 912, an Application Shortcuts area 914, an Updated Messages area 916, a My Group Activity area 918, and a New Groups area 920. In the function links 912, a Group Directory link 922 displays a list and description of all groups. A Personal Messages link 924 accesses all transportable applications sent to of from the user, including group transportable applications and transportable applications that the user has created for personal use.

The Application Shortcuts area 914 provides rapid access to certain applications. The Updated Messages area 916 provides a list of updated transportable applications for which the user has turned notifications on. The My Group Activity area 918 provides a list of group transportable applications that have been received in the last seven days. The New Groups area 920 provides a list of recently added groups.

The function links 912 further comprise a My Groups link 934 that provides access to detailed functions pertaining to groups of which the user is a member. One or more group links 934A are displayed in a hierarchical tree in association with the My Groups link 934. A user may select one of the group links 934A to carry out specific operations relating to a group. In one specific embodiment, the group operations include: invite a member; membership list; unsubscribe; contract moderator; group description; and view recent group activity.

In the invite member operation, a user can invite another user to join the selected group. An Invite Member screen is displayed. The user enters one or more addresses of users or groups to invite to join the selected group. The user also enters a short introductory message. In response, the system generates and sends a message to each of the named users inviting them to join the selected group, and including the introductory message. If the currently selected group is a private group, the user must send an e-mail to the group moderator to request additional members.

In the membership list operation, a user can view the group membership list. A membership list screen appears, listing members by email address, name and the date on which they joined the group. In the unsubscribe operation, the user can leave or "unsubscribe" from the group. In the contract moderator operation, the user can send an e-mail to the group moderator. In the group description operation, the user can view the description of the group. In the view recent group activity operation, the user can view the ten most recently updated transportable applications for the group.

Figure 9C:
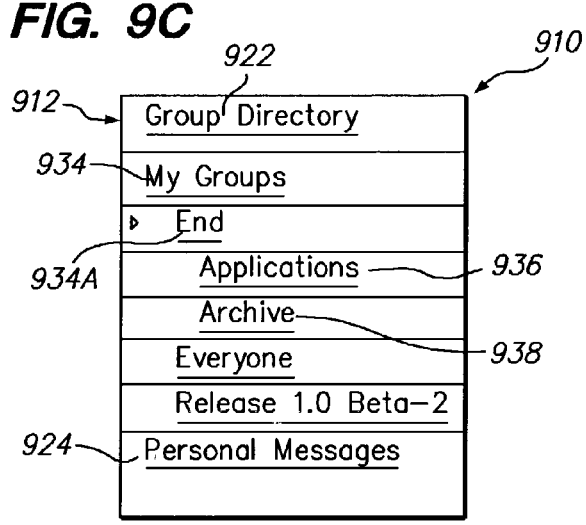
FIG. 9C is a diagram of a portion of the screen display of FIG. 9B.

FIG. 9C is a diagram of a portion of the screen display of FIG. 9B. FIG. 9C illustrates function links 912 when a user has selected one group name link 934A. In response, an Applications link 936 and an Archive link 938 are displayed in a position hierarchically subordinate to the group name link 934A. A member of a group can use any transportable applications created for that group, or create new transportable applications for it. To access the applications, the user selects the Applications link 936. In response, a list of links to applications is displayed in the My Groups screen 910. The user may launch an application by selecting the associated link. To create new transportable applications for the group, the user uses the Application Builder, as described further herein.

The user may also display all transportable applications sent to the group in the group archive by selecting the Archive link 938. In one specific embodiment, the group archive lists all transportable applications sent for the group. The user may filter the list of transportable applications by application type using a drop-down menu. The user may sort the archive list by Author, Subject, application type, date created, or date last modified.

The Personal Messages link 924 provides access to transportable applications that have been sent to the user, and to transportable applications that the user has created for personal use. To access such applications, the user selects the Personal Messages link 924, and then selects an Applications link that is displayed. The Search link 926 provides access to a search engine that can search the full text of all transportable applications by keywords.

The Preferences link 930 is used to change a user's profile of preferences, to thereby tailor the way that the user interacts with groups and transportable applications. Changes to preferences may be made by the user at any time. Through a Preferences dialog, the user may make changes to a user Profile, Address Book, Group Preferences, and a client or Plug-in. To facilitate such changes, the Preferences dialog includes a Profile link, Address Book link, Group Preferences link, and a Plug-in link.

Using the Profile link, the user can change information in the user profile, such as name, password, postal code, time zone, message format, and whether message recipients are automatically added to the Address Book. The message format profile value enables the user to obtain a preferred user experience using the e-mail client. For example, if the user's e-mail client does not accept HTML, the transportable applications received by the user may appear to be "broken." The user can change the format in which transportable applications are delivered to the user. In one specific embodiment, available formats include Plain Text and HTML.

The Address Book is a personalized database of contact persons for sending transportable applications. In one embodiment, selecting the Address Book causes the system to display a list of available address books (Personal, Company, etc.). The user can select one of the available address books and search for contact data within it. The user may add or modify entries or important entries from other programs.

The Group Preferences link may be used to control how incoming transportable applications from groups are delivered. In one embodiment, the user may select a Web Only option, with which transportable applications are delivered to the portal only, or an Email & Web option, which provides delivery of transportable applications both to the portal and the e-mail in-box of the user.

The Plug-in link provides access to a client software element that can execute on a user client, e.g., client 102. By selecting the Plug-in link, the user can install, uninstall, and view the status of the Plug-in. In operation, the Plug-in automatically informs the user when updated transportable applications have been sent, using a distinctive icon that is shown in a designated portion of the graphical user interface. For example, in a Windows system, the distinctive icon is shown in the system tray. Also, in another embodiment, if the client computer is configured to access messages when disconnected from the network, the user can use the client to synchronize transportable applications for offline viewing and replying. Thus Plug-in may be implemented in the form of C++ code that is optimized to the Windows environment. Additionally, in an embodiment, the Plug-in adds new buttons to the toolbar of the user's messaging client. For example, a New Appmail button is provided in an e-mail client so that the user may initiate a process of creating a transportable application from within the e-mail client. The user may also create a new e-mail message and send it in the form of a transportable application by selecting a Send As Appmail button.

In certain embodiments, the Group Directory, My Groups, and Group Archive functions each are implemented as separate transportable applications having containers and listing building blocks.

To facilitate the foregoing operations, portal user roles and group user roles are defined in the security framework that is described herein. In one specific embodiment, a portal Administrator acts as portal editor, has all Coordinator permissions, has Owner control for all groups in the portal, can assign individuals to roles, and can create new roles. A Coordinator can create a group, delete a group, and exercise all User permissions. A User can view the group directory, join a group if it is public, and use the Application Builder and Page Builder that are linked to the portal.

1.3.4 Programmatic Processes for Presentation

Figure 5:
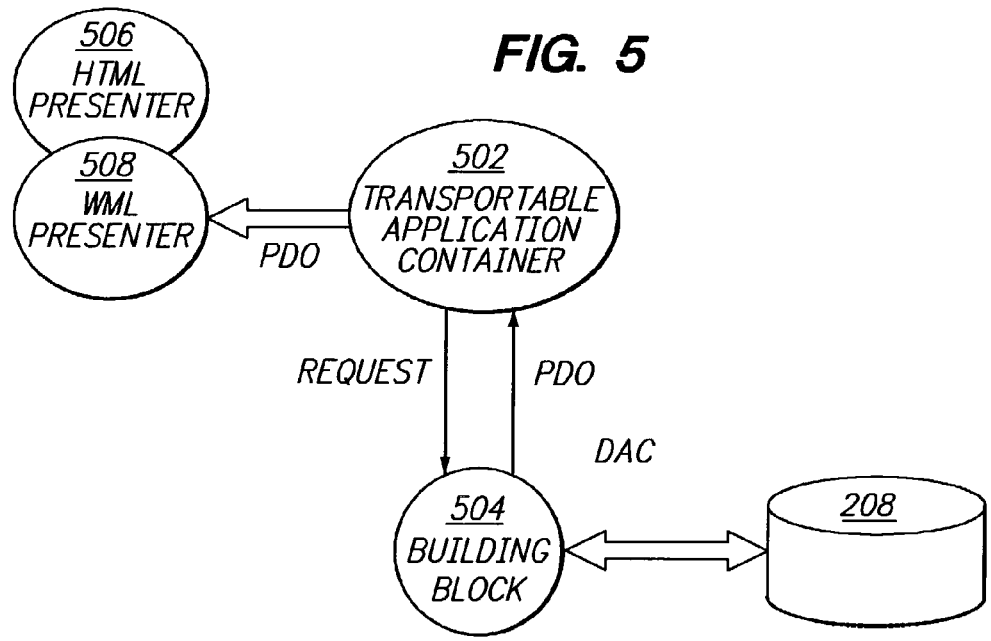
FIG. 5 is a block diagram of objects and data communications paths involved in presentation of content associated with a building block.

FIG. 5 is a block diagram of objects and data communications paths involved in presentation of content associated with a building block. In general, a transportable application container object 502 references and contains a building block 504.

When the building block 504 is invoked by the container object 502 to either to create data in the database 208 or store user responses or retrieve its data from the database, the building block uses Data Access Components (DAC) to access the database. In order to enable presentation of its information, the building block returns a Presenter Data Object (PDO). Each PDO contains all data of a building block that can possibly be displayed on any device in any form, and all associated interaction pathways. A building block presenter object (termed a "presenter" herein) uses the PDO in order to do the actual presentation. For example, HTML presenter 506 can present the data in the PDO in HTML format. Alternatively, a WML presenter 508 can present the data from the PDO in WML format to a wireless device gateway. This mechanism allows presentation of the same PDO in different formats such as HTML, WML, XML, etc.

Presenter data objects as disclosed herein enable reuse of presenters, separate responsibilities of functional elements of the system, enable independent development of building blocks and presenters thereby enhancing modularity and simplifying development, and provide flexibility to handle custom as well as generic presenters. The presenter data objects provide an abstract interface that mediates communications of building blocks and presenters.

Figure 6:
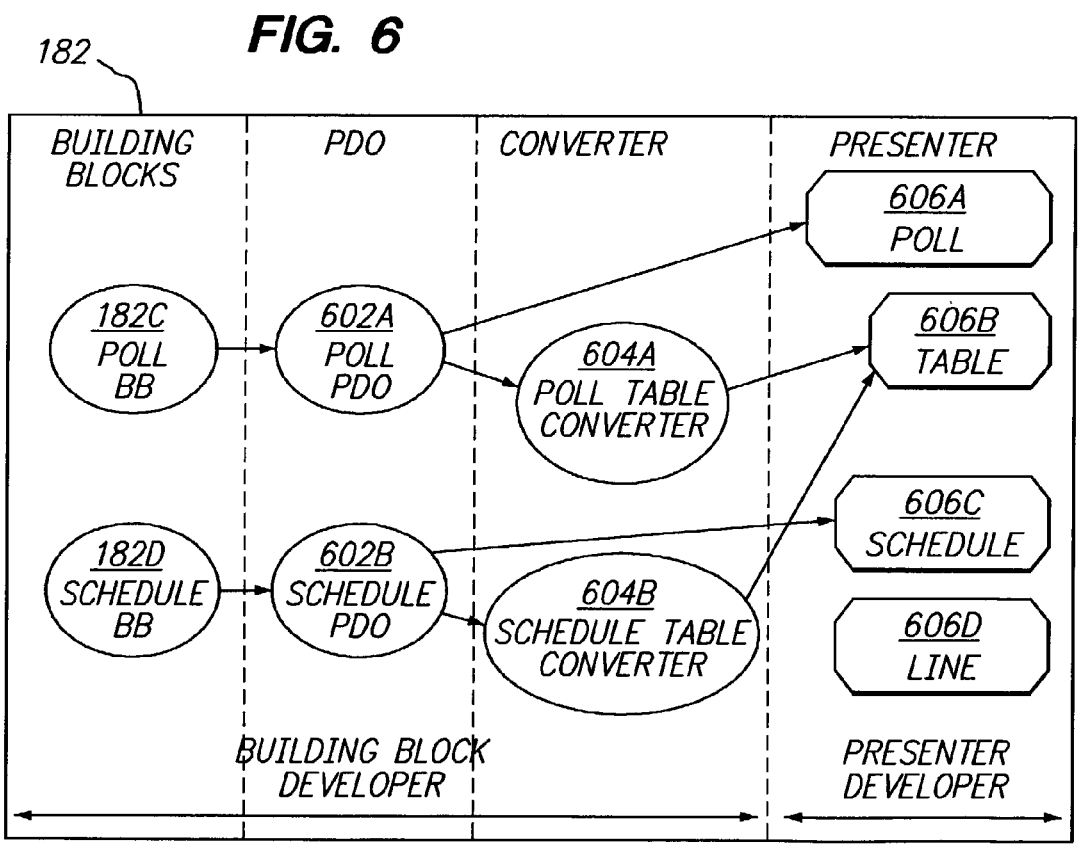
FIG. 6 is a block diagram illustrating interaction of programmatic objects in one embodiment of a presentation model.

FIG. 6 is a block diagram illustrating interaction of programmatic objects in one embodiment of a presentation model. In this embodiment, each Building Block 182C, 182D produces a specific PDO 602A, 602B that contains all the possible data of that Building Block.

Two types of presenters can be used by a Building Block for presentation: Generic Presenters, and Custom Presenters. Generic Presenters work with any PDOs that implement a certain interface that they require. A Custom Presenter has detailed knowledge about the PDO, and can work with only that specific PDO. A PDO that does not implement a certain interface known by a Generic Presenter can still use that presenter by means of a Converter that maps the specific PDO into an interface that is understood by the Generic Presenter. In the embodiment of FIG. 6, generic presenters include a table presenter 606B; that can present a table of data, and line presenter 606D that can present a line graph, etc. Custom presenters include a poll presenter 606A that can present data for a user poll, and a schedule presenter 606C that can present a calendar or schedule.

Each PDO encapsulates data objects that represent the building block data, provides methods to access all the possible building block data, and may implement formatting interfaces like table interface, chart interface etc.

Presenters are responsible for rendering the data, and may use generic rendering utilities. Generic presenters work with a basic PDO that implements a certain interface. A custom presenter may directly work with a specific PDO. Each presenter implements a BuildingBlockPresenter interface.

In one alternative, a building block may pass a PDO to a converter 604A, 604B that converts data of the PDO to a different format that is understood by an interface of the custom presenter. For example, in situations where a specific PDO needs to work with a generic presenter, an object that implements an interface known to the generic presenter is constructed. Such converter objects map a specific PDO to this known interface. Each converter works with a PDO and a corresponding presenter. In one embodiment, a converter implements a ConvertInterface that produces an object that implements the interface known to the generic presenter.

Table 4 provides an example of a code implementation of the objects of FIG. 6.

TABLE 4

CODE FOR PRESENTER ABSTRACT LAYER ELEMENTS

```
public class PollPDO {
    //data
    public int getTotalVotes()
    {
    }
    //get details about each voter.
    public String getVoterEmail( int i)
    {
    }
    public String getvoterName( int i)
    {
    }
    public String getLastChoice( String email )
    {
    }
    // details about the choices.
    public Vector getChoiceLabels()
    {
    }
    // return a vector of Integers that represent choice
totals.
    public Vector getChoiceTotals()
    {
    }
}
public class PollPresenter implements BuildingBlockPresenter
{
    PollPDO pdo = null;
    public PollPresenter( Object pdo )
    {
        this.pdo = (PollPDO)pdo;
    }
    public void PresentLive( Writer out, HttpServletRequest
req )
    {
        // give it to some utility or draw it inline.
        chartUtils.drawPie(out, getChoiceLabels(),
getChoiceTotals() );
    }
    // other methods in BuildingBlockPresenter.
}
interface TableInterface
{
        int getNumRows();
        int getNumColumns();
        String getColumnName(int);
        Class getColumnClass(int);
        Object getValueAt(int, int);
        // possibly more methods
}
public interface ConvertInterface
{
```

TABLE 4-continued

CODE FOR PRESENTER ABSTRACT LAYER ELEMENTS

```
    public Object convert(Object sourcepdo);
}
// presents a table representation of the poll.
public class PollTableConverter implements TableInterface,
ConvertInterface
{
    PollPDO pdo = null;
    String columnNames = {"Voter Name", "Voter Email",
"Choice" };
    public Object convert( Object pdo)
    {
        this.pdo = pdo;
        // do some other housekeeping.
        return this;
    }
    Object getValueAt( int i, int j )
    {
        if ( j == 0 )
        {
            return pdo.getVoterName(i);
        }
        else if ( j == 1 )
        {
            return pdo.getVoterEmail(i);
        }
        else if ( j == 2 )
        {
            return pdo.getVoterChoice(i);
        }
        else
            return null;
    }
    int getNumRows()
    {
        return pdo.getTotalVotes();
    }
    int getNumColumns()
    {
        return 3; // oh no, hard coding
    }
    int getColumnName( int i)
    {
        return columnNames[i];
    }
    Class getColumnClass( int i)
    {
        // everything is a string. Also need to catch
exceptions.
        return Class.forName("java.lang.String");
    }
}
```

Using these structures, when a building block needs to be presented, control logic of application server 202 requests the building block to construct the building block specific PDO. The control logic also contains knowledge about the specific presenter to be used to display the building block e.g. whether to use a custom presenter or a generic presenter. Such information is obtained at the time that a building block is authored.

In case of a custom presenter, control logic of application server 202 instantiates the presenter with the specific PDO obtained from the building block. In the case of a generic presenter, the control logic uses a converter, if necessary, to convert the PDO into a format known to the generic presenter, before constructing the generic presenter. It then passes the presenter to a Java Server Page (JSP) that controls overall presentation of the Zaplet. The JSP uses Building-BlockPresenter interface of the presenter to render the data. Table 5 presents a Java code implementation of the foregoing process.

TABLE 5

JAVA CODE FOR PRESENTATION PROCESS

```
//iterate through different bldg blocks
for ( int i=0; i < numBB; i++ )
{
    Object pollpdo = bb.getPresenterData(request);
    BuildingBlockPresenter pr = null;
    String presenterName = getPresenterName(bb);
    String converterName = getConverterName(bb,
presenterName);
    if ( converterName != null )
    {
        ConvertInterface i =
ConverterFactory.createConverter(converterName);
        Object tablepdo = i.convert(pollpdo);
        pr = PresenterFactory.createPresenter(presenterName,
tablepdo);
    }
    else
        pr = PresenterFactory.createPresenter(presenterName,
pollpdo);
    presenterVector.add(pr);
}
forwardRequestToSomeJSP(presenterVector);
```

A building block may use more than one presenter. For example, displaying results from a poll building block may use a pie chart presenter or a table presenter. To facilitate this possibility, an independently authorable component is provided, comprising a combination of a building block and the set of presenters corresponding to the actions supported by the building block. Thus, a poll building block with a pie chart presenter for display comprises a first independently authorable component, and a poll building block with a bar graph presenter for display comprises a first independently authorable component.

When development of a new building block is complete, it is registered in the system. Each independently authorable component is registered in the system separately. Registration involves providing the system with metadata about the new building block, such as its name, actions it carries out, events that it generates, and types of devices to which it can present data. When a building block is registered, it is displayed to and can be selected by authors of pages and transportable applications when they use the application editor and page editor as described herein.

Figure 16:
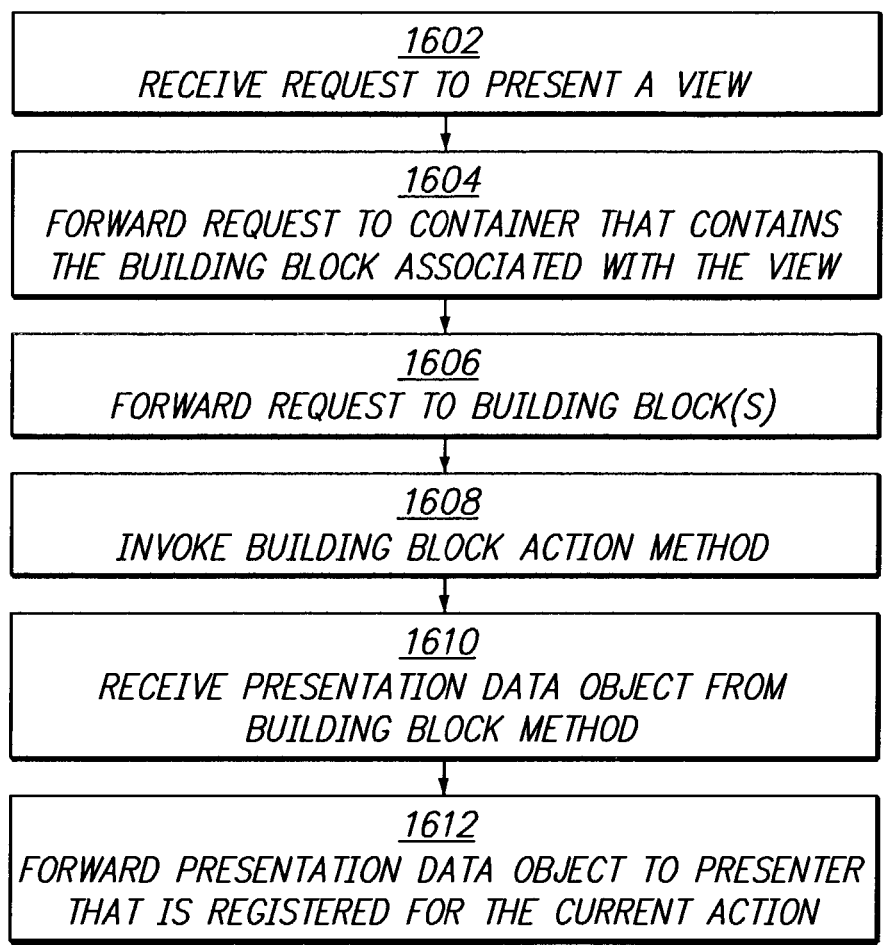
FIG. 16 is a flow diagram illustrating a process of presenting building block information using the foregoing mechanisms.

FIG. 16 is a flow diagram illustrating a process of presenting building block information using the foregoing mechanisms. In block 1602, a request to present a view is received at the application server. The request may comprise an HTTP request or an internal programmatic function call. In block 1604, the request is forwarded to a container that contains the building block associated with the view. In block 1606, the container forwards the request to either an individual building block, or to all the building blocks contained in the container, based on the type of container.

In block 1608, the container invokes an appropriate building block method for the action. In block 1610, a presentation data object is received from the building block method. In block 1610, based on information collected at registration time, the application server forwards the presentation data object to the presenter that was registered for the current action. The system then invokes a presentation method on the presenter.

Actions, in this context, may comprise standard user actions or building block specific actions. Standard user actions are internally known actions that trigger a container to call on all its contained building blocks with a request to participate in such actions. For example, when a transportable application is to be displayed in a browser of client 102, the container requests each of its building blocks for a presentation data object for a "get display data" action. All building blocks that wish to participate in such action return a non-null presentation data object, which are given to the corresponding presenters for rendering.

Building block specific actions, such as a sort action relating to table data in a table building block, originate form the presentation of standard user actions. For example, a sort action originates when a user selects a link in a table building block data that has been presented. The target URL for the action contains enough information for the system to route the request to a specific building block. The building block then responds with a presentation data object that is given to the appropriate presenter.

1.4 Authoring Transportable Applications

Figure 7C:
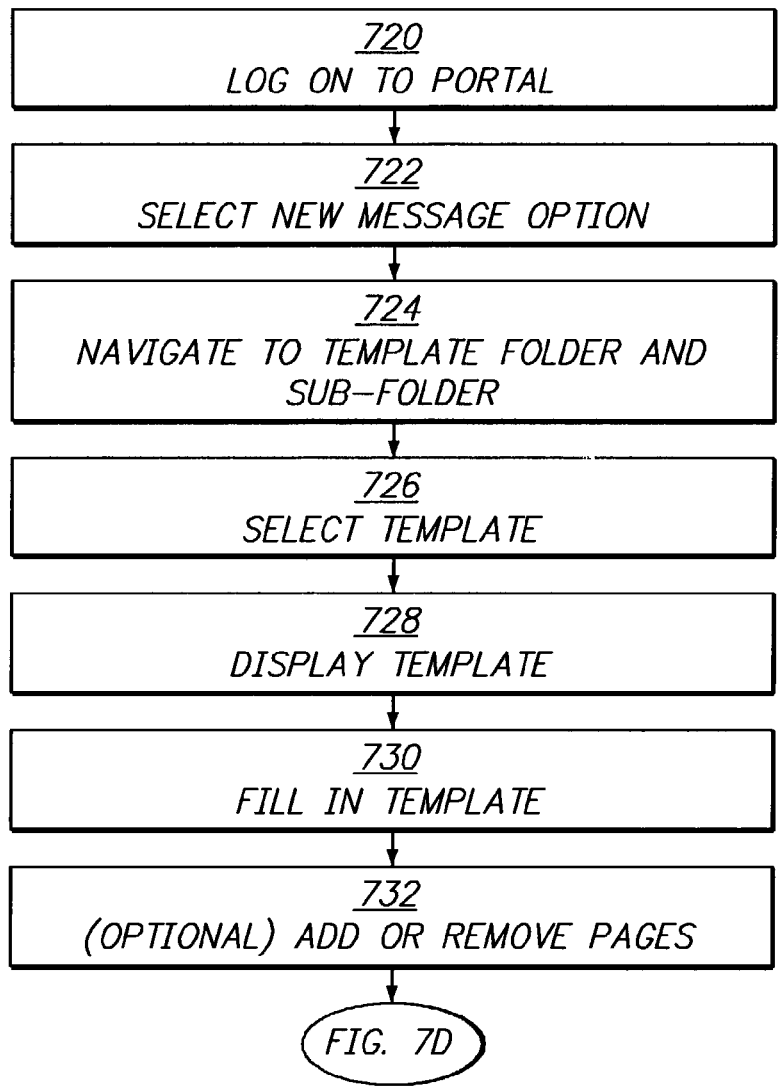
FIG. 7C is a flow diagram illustrating a high-level view of a process of authoring a transportable application.
Figure 7D:
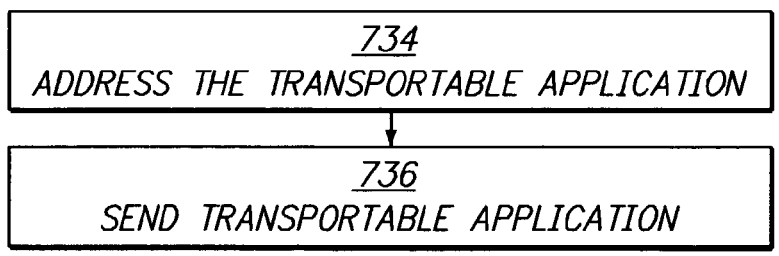
FIG. 7D is a flow diagram of additional steps in the process of FIG. 7C.

FIG. 7C is a flow diagram illustrating a high-level view of a process of authoring a transportable application. FIG. 7D is a flow diagram of additional steps in the process of FIG. 7C.

Optionally, in block 720, a user logs on to a portal, such as a portal of the type described herein in the section entitled "Personal Portal Presentation." The portal home page provides a plurality of menu options in a navigation bar. In block 722, a New Message option is selected from the navigation bar. Alternatively, rather than carrying out the steps of block 720, block 722, a user can select a New Message option from within any existing transportable application. In response, the system displays a list of template folders. In block 724, the user navigates to a template folder or subfolder that contains a desired template. The user then selects a desired template, as in block 726. In one embodiment, an Application Shortcuts list displays frequently-used templates, and a user may select a template directly from the Application Shortcuts list rather than navigating to a folder.

For purposes of illustrating an example, assume that a user selects a Starter Set folder of templates, a Corporate Process sub-folder of templates, and an Escalation Exception Manager template. In response, the template is displayed, as shown by block 728.

Figure 8A:
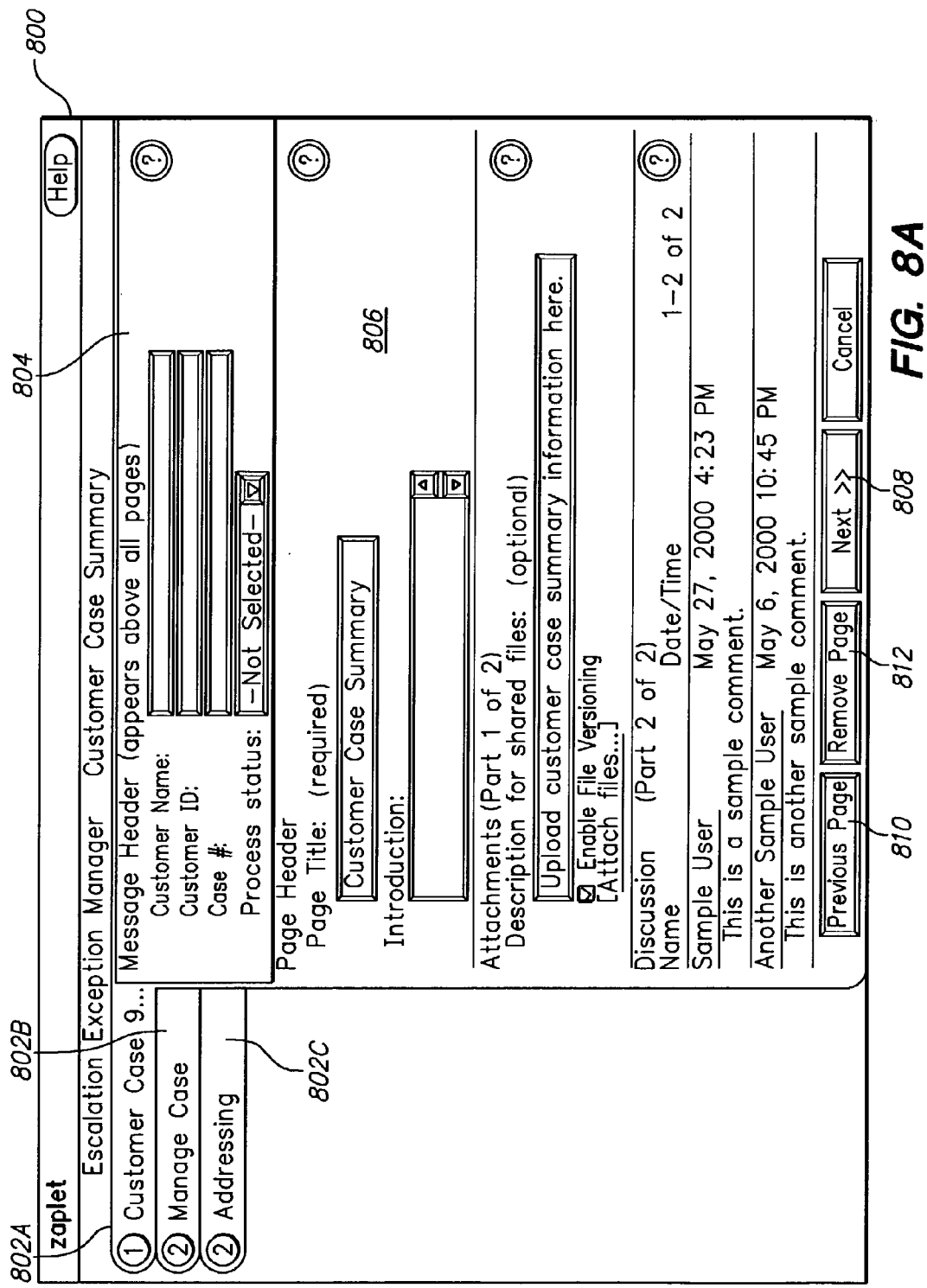
FIG. 8A is a diagram of an example graphical user interface screen display of the Escalation Exception Manager template.

FIG. 8A is a diagram of an example graphical user interface screen display of the Escalation Exception Manager template. In general, screen display 800 comprises a Customer Case Summary page 802A, Manage Case page 802B, and Addressing page 802C. Customer Case Summary page 802A comprises a message header 804, page header 806, attachments area 808, and discussion area 801.

The user enters information in the message header 804. In this example, information is required in none of the fields of the message header, but such information may be required in other templates. The user also enters information in the page header 806, including Page Title and Introduction. The user then enters values for the rest of the fields that are required, attaching files and adding descriptions as needed. Depending on the building blocks in each page, the user may have to upload files of the appropriate type, upload pictures, specify URLs for Web pages, and other tasks.

When all such information is entered, the user selects the Next button 808 to advance in the authoring process. The system displays the next page 802B, 802C and receives further input until the template is completed. The user may select a Preview Page button 810 to receive a view of what the transportable application will look like to recipients.

When the last page of a template is reached, the page displays an Add a New Page button and an Address and Send button. The user may add optional pages to the transportable application by selecting the Add New Page button. The optional steps of removing and adding pages are represented by block 732 of FIG. 7C.

Figure 8B:
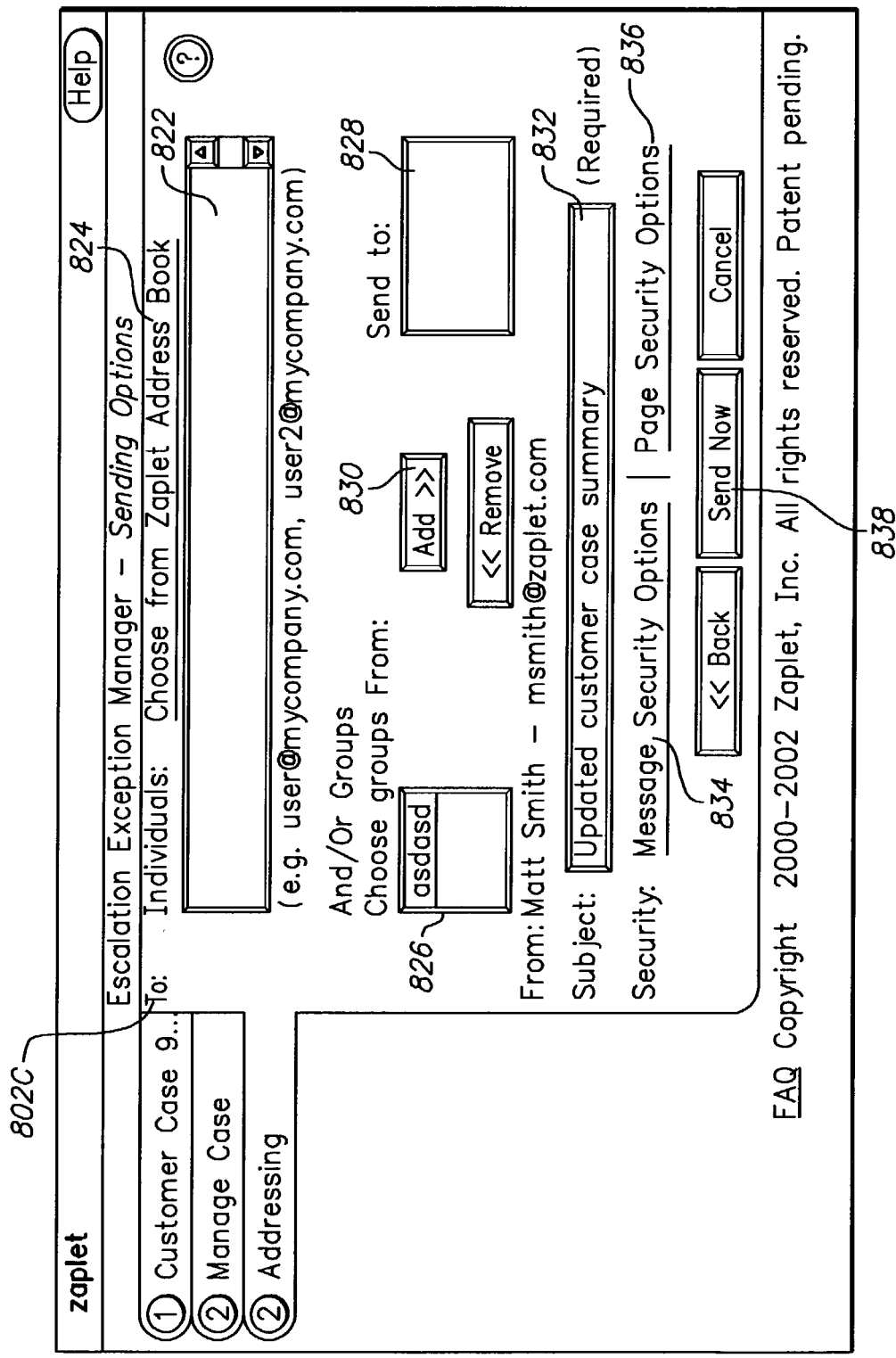
FIG. 8B is a diagram of a screen display of an Addressing page that may be displayed, in one example embodiment.

Referring now to FIG. 7D, in block 734, the transportable application is addressed. The addressing operation may be initiated by selecting the Address and Send button. In response, the system displays Addressing page 802C. FIG. 8B is a diagram of a screen display of an Addressing page that may be displayed, in one example embodiment. In this example, Addressing page 802C comprises an address field 822 that can receive one or more individual e-mail addresses in a comma-separated list. Alternatively, the user may select an address book link 824 and select the recipient e-mail addresses from a stored list of addresses. Additionally or alternatively, the user may select one or more groups of recipients from a list 826 of groups. Selecting a named group in list 826, followed by selecting an Add button 830, causes the system to copy the group name to a Send To list 828 that is used when the transportable application is sent.

Also as part of addressing, the user enters subject text in a Subject field 832.

Figure 8C:
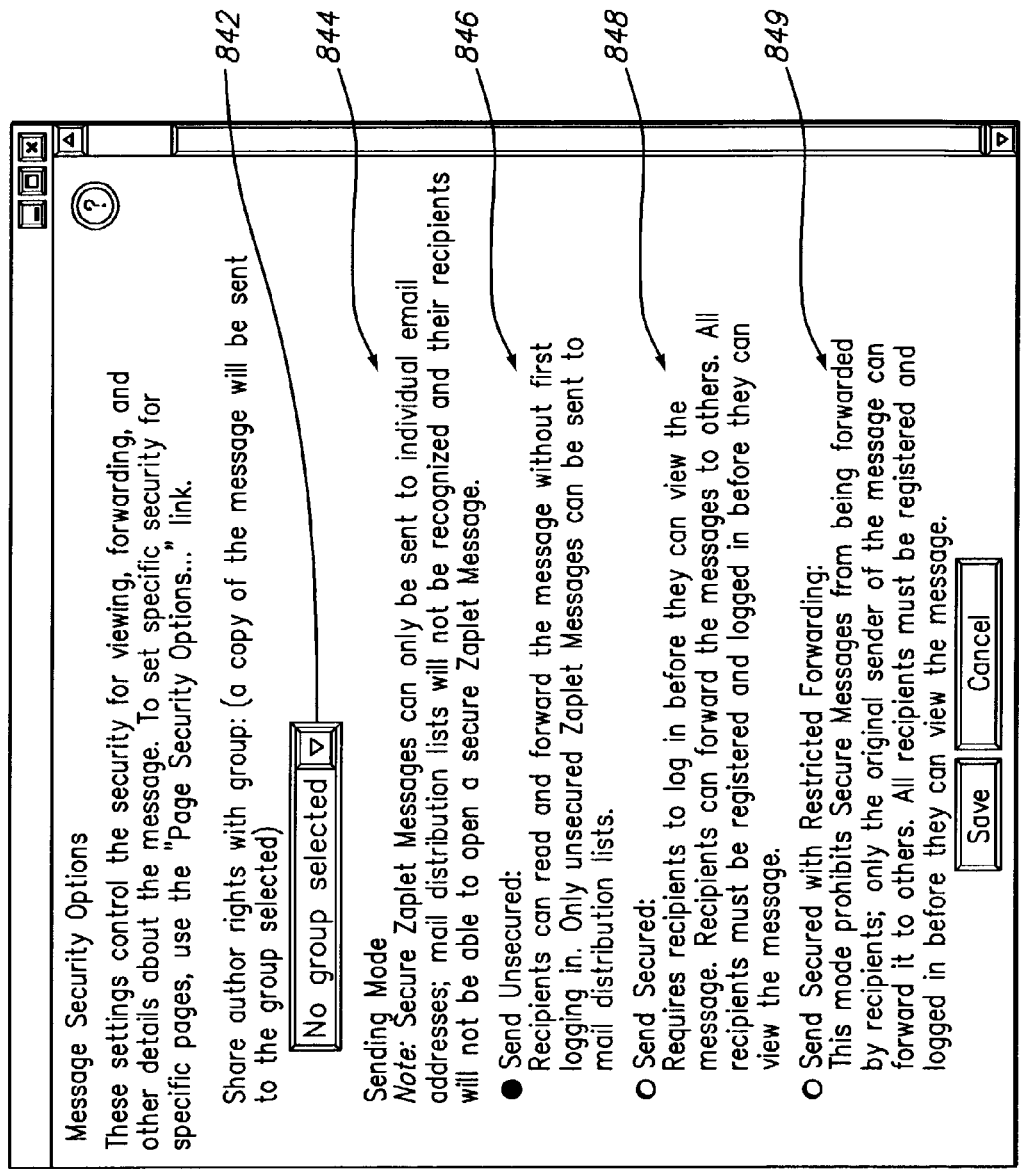
FIG. 8C is a diagram of an example of the Message Security Options window that may be displayed, in one example embodiment.

Optionally, the user may apply access controls or other security controls to the message or its pages by selecting a Message Security Options link 834 and Page Security Options link 836. If the Message Security Options link 834 is selected, then in response, the system displays a Message Security Options window. FIG. 8C is a diagram of an example of the Message Security Options window that may be displayed, in one example embodiment. Message Security Options window 840 comprises a Share Author Rights pull-down 842; by selecting a group from the pull-down menu, the author of the transportable application can share author access rights with a named groups.

In this context, "author rights" refers to a set of privileges for working with transportable application that are reserved to the author of the transportable application. Such author rights may include the ability to send a reminder message, close the transportable application, hide or show pages of the transportable application, or add a page to the transportable application.

To send a reminder message, the author selects a Send A Reminder option from among the message options. The author indicates the recipient choice for the reminder, and enters reminder text. In response, the system will re-send the transportable application to the recipients with new comments at the top.

Closing a transportable application disallows any further additions to the transportable application or to its dynamic content. To close a transportable application, the author selects a Close This Message option from among the message options. The author enters any desired closing message text, such as an explanation of why the transportable application is closed. The transportable application may be re-sent to all recipients with the closing message text at the top, or the closing text may be displayed in the body of the transportable application when existing recipients re-open it.

To hide or show a page, the author selects a Hide/Show Pages option from among the message options. The Hide/Show Pages option enables the author to hide a page that is old or no longer relevant without having to permanently delete it.

The user also may select a sending mode from within a Sending Mode area 844 by selecting one of a plurality of radio buttons 846, 848, 849 that are respectively associated with a Send Unsecured mode, Send Secured mode, and Send Secured with Restricted Forwarding mode. In Send Unsecured mode, no special access controls are applied to the message. Recipients can read and forward the message without first logging into the portal. In Send Secured mode, recipients must log in to the portal before they can view the message. Recipients can forward the message to others. All recipients must be registered in the portal and logged in before they can read the message. In effect, Send Secured requires a recipient to overcome the barrier of user authentication before the user can read the message. In Send Secured with Restricted Forwarding mode, recipients must log-in to the portal to view a message, and only the author can forward the transportable application.

Figure 8D:
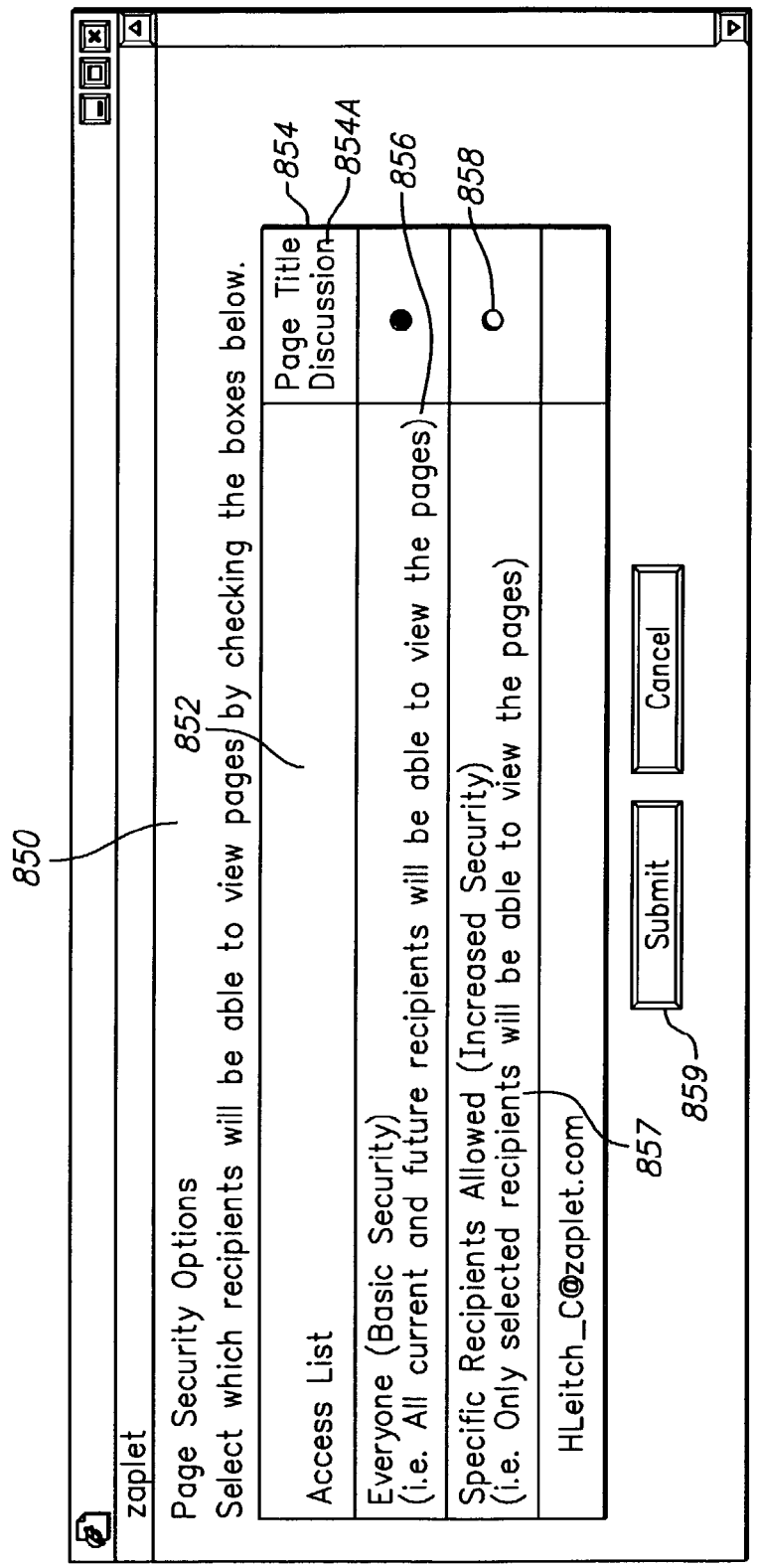
FIG. 8D is a diagram of an example of the Page Security Options window that may be displayed, in one example embodiment.

Referring again to FIG. 8B, if the Page Security Options link 836 is selected, then in response, the system displays a Page Security Options window. FIG. 8D is a diagram of an example of the Page Security Options window that may be displayed, in one example embodiment. Page Security Options window 850 comprises one or more access lists 852 that are displayed in association with radio buttons 856, 858. Each radio button is associated with a particular page of the transportable application, as indicated by a page title header 854. In this case, the page title is Discussion, as indicated by page title 854A. Thus, each named page may have different security options. The access lists 852 may be broad or specific. For example, an Everyone access list 856 provides all current and forwarded recipients with access to the Discussion page. A Specific Recipients list 857 enables only selected users and groups to access the page, if such users or groups are named as part of list 857 and radio button 858 is selected.

Selecting a Submit button 859 sends the selected security options to the server.

Referring again to FIG. 7D, in block 736, the user sends the transportable application by selecting the Send Now button 838.

1.4.1 Application Editor

According to one embodiment, an application editor or application builder is provided for assembling pages into a template for authoring and sending transportable applications. Using the application builder, a user may build as many transportable applications as the user needs, for many different purposes.

Referring again to FIG. 9B, to launch the application builder, a user logs into a portal and receives screen display 910. The user selects the Builder link 928 from among function links 912. In response, the system displays a screen with a link to the Application Builder and the Page Builder (page editor), which is described in the next section. The user selects the Application Builder.

FIG. 9D is a diagram of an Application Builder screen display that is displayed in response to selecting the Application Builder. Screen display 950 comprises a Name field 954 and a Description field 956 in a header area 952. The user enters a description for a new transportable application template. The name appears in the application selection dialog box and helps users select the appropriate application.

The user also enters data in an Introduction Settings area 958, which comprises a plurality of custom field label fields 960 and corresponding Required check boxes 962. The user enters names for any custom fields that authors can fill out when creating a new transportable application based on the template. The corresponding check box 962 is selected if the user wishes to require authors to fill out the field before they can send a new transportable application based on the template.

The Application Builder screen can also receive data specifying the name of a status field in a Name of Status Field 964, and a list of corresponding settings in a Possible Settings field 966. The list comprises one or more possible settings that the status field can assume for specific transportable applications that are constructed based on the template. Example status settings include "New," "Open," "Closed," etc., and may be customized by the author of the template as appropriate for the template.

The user may also add one or more default pages to the template by selecting an Add Page link 968A in Default Pages area 968. Default pages form part of any transportable application that is build and sent based on the application template. Similarly, the user may add one or more optional pages to the template by selecting an Add Page link 969A from an Optional Pages area 969. The optional pages are pages that the author and recipients can choose from when adding a page to the transportable application. In response to selecting one of the Add Page links 968A, 969A, the system displays a page navigation dialog in which the user may navigate to a page folder and select a page to add.

Figure 9E:
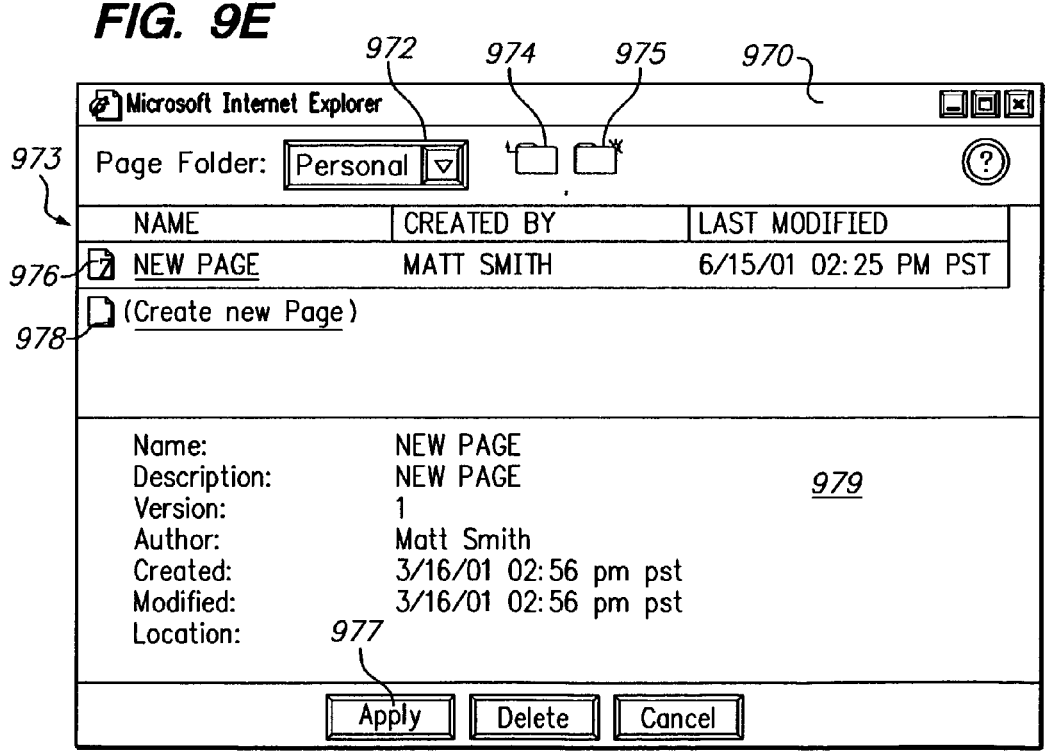
FIG. 9E is a diagram of a page navigation dialog that may be displayed, in one example embodiment.

FIG. 9E is a diagram of a page navigation dialog that may be displayed, in one example embodiment. Dialog 970 comprises a Page Folder pull-down list 972 that may be used to select a folder of pages. In the example of FIG. 9E, the Personal folder is selected. Selecting a navigation button 974 causes the system to display the parent folder of the current folder. When a folder is selected using pull-down list 972, the system displays a list 973 of pages that are in the selected folder. A user may create a new page by selecting a Create New Page link 978. In the example shown, a page named NEW PAGE is selected, and metadata describing the selected page is displayed in a description area 979. Upon navigation to the desired page, the user may add it to the current application template by selecting an Apply link 977.

Selecting a new folder button 975 enables creation of a new folder. In response, the system displays a dialog that prompts the user to enter a name and description for the new folder. The user can create any number of sub-level folders. For example, the user can create a folder named New Pages Folder, open it, and create more folders named Home and Work. The user may move within the folder tree by selecting a folder name to view its contents, then selecting the navigation button 974.

Figure 10A:
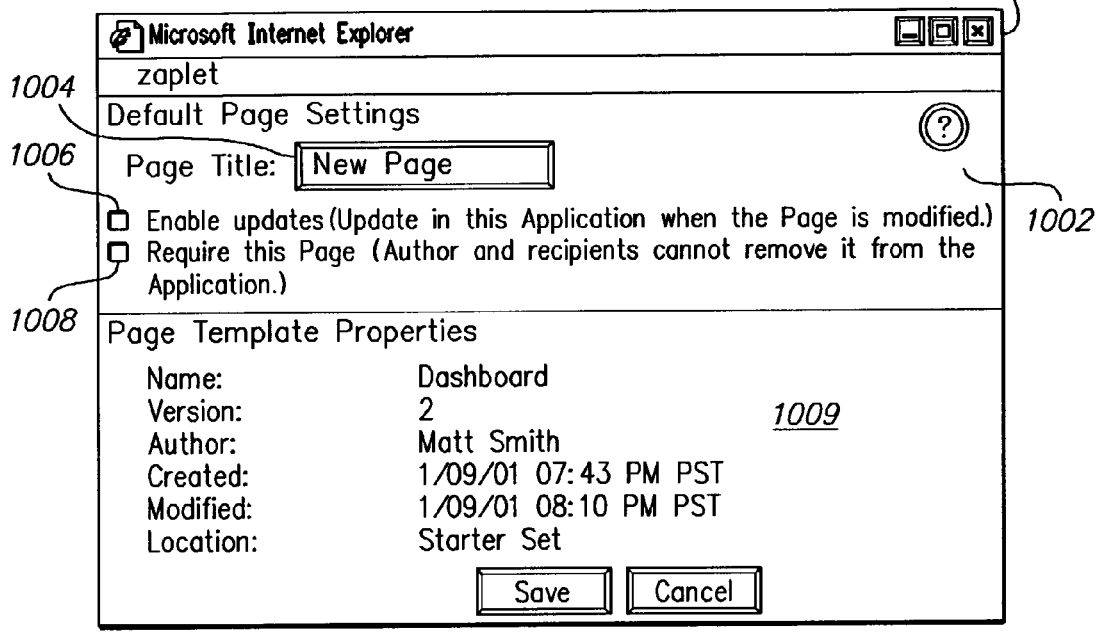
FIG. 10A is a diagram of a Default Page Settings screen that may be used to change properties of a selected default page of a template.

FIG. 10A is a diagram of a Default Page Settings screen that may be used to change properties of a selected default page of a template. In one specific embodiment, a user may use Default Page Settings screen 1000 to change a page name, specify whether an included page is required, and enable updates to a page. Default Page Settings screen 1000 comprises a Page Title field 1004 that can receive a new name for the page. Default Page Settings screen 1000 also comprises an Enable Updates checkbox. When the Enable Updates checkbox is checked, then changes that are made to the page by a page author are made to the template as well, so that any transportable application that is created thereafter also will reflect such changes.

Default Page Settings screen 1000 also comprises a Require This Page checkbox 1008. If it is checked, then the associated page is required in any transportable application that is built based on the associated template, and cannot be deleted.

Pages added to the Optional Pages list are available to authors of transportable applications if such authors wish to add a page. Optional pages appear in the Add Page screen and are not included automatically, but can be added as needed. The user may specify whether authors of transportable applications may add pages to a transportable application that is based on the template from outside the Optional Pages list. In one embodiment, such specification is provided by checking an "Allow authors to add Page from outside this list" checkbox in an Optional Pages screen.

After one or more pages are added, the user may save the application template, and optionally change its name. The user may modify the application template at any time by retrieving it and modifying any of the foregoing properties in the manner described above.

1.4.2 Page Editor (Page Builder)

A page editor may be provided for assembling building blocks into pages that can be added to transportable application templates, and then to transportable applications. In one specific embodiment, a Page Builder allows the user to assemble different building blocks into a page. Which building blocks are added depends on the function that the page author wants the page to serve.

Referring again to FIG. 9B, to launch the application builder, a user logs into a portal and receives screen display 910. The user selects the Builder link 928 from among function links 912. In response, the system displays a screen with a link to the Application Builder and the Page Builder (page editor). The user selects the Page Builder.

Figure 10B:
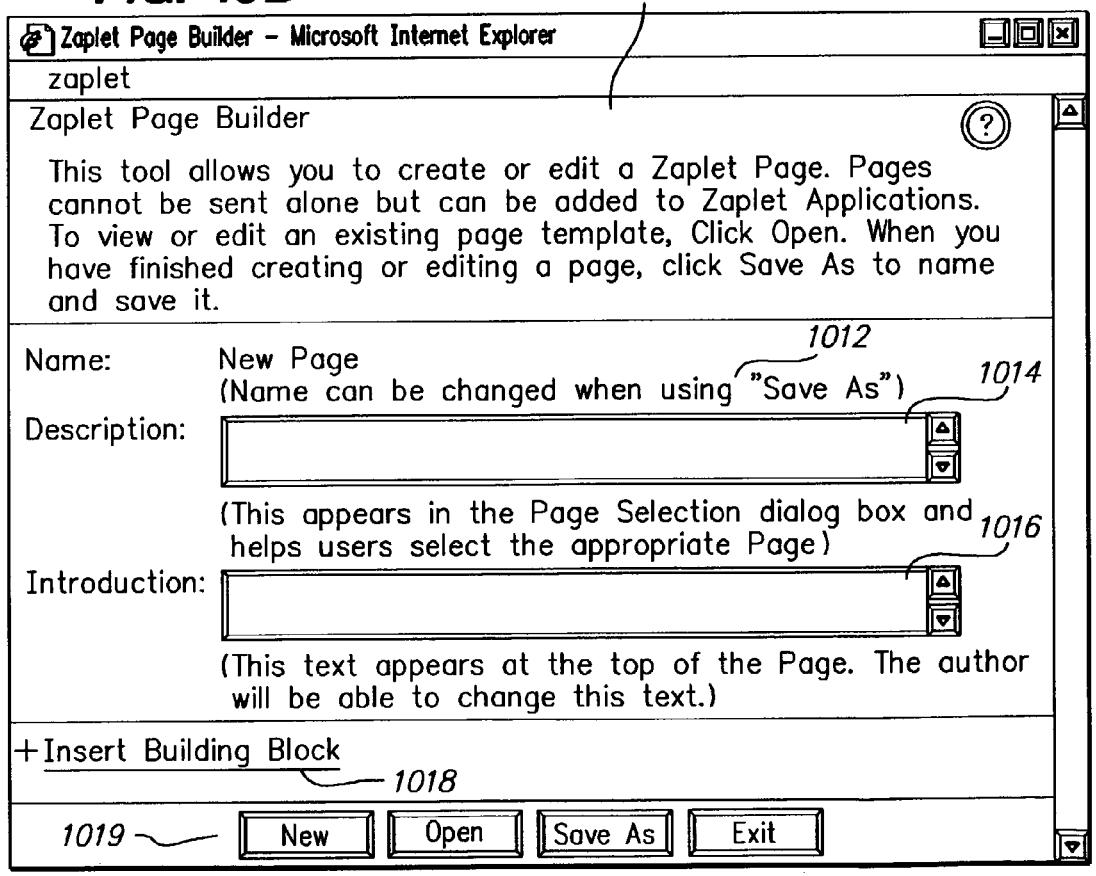
FIG. 10B is a diagram of a Page Builder screen that may be displayed in response to selecting the Page Builder, in one example embodiment.

FIG. 10B is a diagram of a Page Builder screen that may be displayed in response to selecting the Page Builder, in one example embodiment. Page Builder screen 1010 comprises a Name field 1012 that displays a temporary name of the page under development, such as "New Page." To create a new page, the user enters a description of the new page in a Description field 1014 and introduction text in Introduction field 1016. The description value appears in the Page Selection dialog box and helps users select the appropriate page, and the introduction text appears at the top of the page to introduce users to the page. Alternatively, to create a new page, the user may select the Open button from among function buttons 1019, view a page browser showing available pages and folders of pages, select Create A New Page from the page browser, and then enter the description and introduction value.

The user may then add one or more building blocks to the page, or simply save the page in its current form. To save the page, the user selects the Save As button from among function buttons 1019, navigates to a folder in which the user wishes to save the page, enters a name for the page, and selects a Save button. The user may save the page in this manner at any time, and can discard the changes made to the page at any time by selecting the New button from among function buttons 1019.

In one embodiment, launching the Page Builder causes the system to retrieve and display a default page template that comprises two default building blocks. In one specific embodiment, the default building blocks are a discussion building blocks and information fields building block. From the default page, new building blocks may be added, and existing building blocks may moved or deleted.

To add building blocks, the Insert Building Block link 1018 is selected. In response, the system displays a list of building blocks. The list comprises, for each building block, a name value, description value, and graphical representation of the building block. In one specific example embodiment, the list identifies the following available building blocks:

Approval list. Allows a list of participants to respond with approvals for documents, shared files or the content of a message. May be combined with an Inline Document or Image Gallery building block to gather sign-offs on final drafts.

Discussion. Captures the discussion between message participants, eliminating back-and-forth e-mails. May be added to a page with a File Sharing or Interactive Web Page building block to discuss a document's content or Web site.

File Sharing. In addition to distributing files for review, the File Sharing building block enables versioning, to allow participants to automatically share changes with each other. The File Sharing building block may be added to any transportable application page to allow participants to add relevant files at any time.

Information Fields. Enables creating named fields to build forms to display names, dates, locations, etc. May be combined with other building blocks to capture information about the state of a project, names of participants, address information, or outstanding issues.

Inline Document. Participants can review the full content of an HTML document without opening a second application. May be combined with, for example, a Poll, Approval List, or Discussion building block to allow participants to share opinions of the document.

Inline Web Page. Displays a fully interactive Web page within a page of a transportable application, including browser-like navigation controls. May be combined with, for example, a Poll or Ratings building block to capture and share responses among participants without launching a separate browser.

Invitation. Displays the details of an event, including title, description, time, and location. May be combined with a Poll building block to allow participants to respond and add comments.

Image. Displays a graphical image on the page. May be combined with, for example, a Poll, Approval List, Ratings, or Discussion building block, in the same page, to allow participants to submit their opinions of the image.

Image Gallery. Displays a plurality of graphical images, e.g., in "thumbnail" format, within a page. All images may be sent in a transportable application at the same time, or participants may add their own images at any time. May be combined with, for example, an Approval List or Ratings building block to collect opinions on photos or artwork.

Poll. Participants vote for one or more of a plurality of listed options, and the results are displayed in a pie chart, bar chart, etc. May be combined with, for example, an Image Gallery, File Sharing, or Schedule building block to help make business decisions.

Ratings. Respondents share their ratings with each other on one or more questions on a discrete scale, e.g., ratings from 1 to 10. May be used to collect feedback or gauge group members' opinions.

Schedule. Participants specify their availability for one or more proposed dates or times. The Schedule building block can export data to programs that support a calendar data interchange format. May be used, for example, to determine the best time for a meeting or event.

Table. Compile data from multiple individuals into a tabular format; participants can add to or edit the information. The table building block can import or export data, for example, data Files in delimited file formats. May be combined with other building blocks to launch a project, prioritize items, or share contact information.

Listing. Retrieve various types of data from the database and display it in a list format, using HTML or any other desired presentation format.

Further description about building blocks is provided elsewhere herein. To add a building block to a page, the user selects the desired building block by selecting its name from the list or selecting the corresponding graphic image. The list closes, and the selected building block is added to the page, which expands to accommodate the building block. The Insert Building Block link 1018 is re-displayed, and the user may add one or more additional building blocks by selecting the link 1018 again. In one embodiment, the Insert Building Block link 1018 is re-displayed both above and below each added building block, so that the relative order of building blocks in a page may be specified by selecting the link 1018 in the correct ordinal position. Thus, the user may place building blocks above, below, or between other building blocks that have been previously added by selecting the link 1018 at the appropriate position.

The user may also control the visibility of building blocks to users who receive a transportable application that contains them by choosing to hide or show particular building blocks. When a building block is marked as hidden, recipients of a transportable application that contains a page with that building block do not see the building block. Users may similarly add new pages, move, delete, show or hide existing pages. Applying the hide option enables an author to create a complex template that can be used in many different situations, and selectively reveal desired building blocks as appropriate for the particular situation.

FIG. 11A is a diagram of the graphical appearance of an Approval List building block as it appears in a transportable application page under development using the Page Builder. Approval List building block 1100, and all other building blocks, comprises a Move Up link 1102, Move Down link 1104, and Delete link 1106. A user may delete the building block from the page under development by selecting the Delete link 1106. In response, the building block is logically removed from the page, and the page is re-displayed without the building block.

The order in which building blocks appear in the Page Builder is the order in which authors and recipients of transportable applications based on that page will see the building blocks. The user may select links 1102, 1104 to change the relative order of the building block by moving it before or after another building block. In either case, the page is re-displayed with the building block in its new position.

In one embodiment, a Survey Page Builder is provided to enable users to assemble specific building blocks into pages that carry out surveys of recipients. Each survey page comprises one or more building blocks selected from a Choice building block, Free Text Response building block, and Ratings building block. A survey page may be added to any transportable application or template.

Figure 10C:
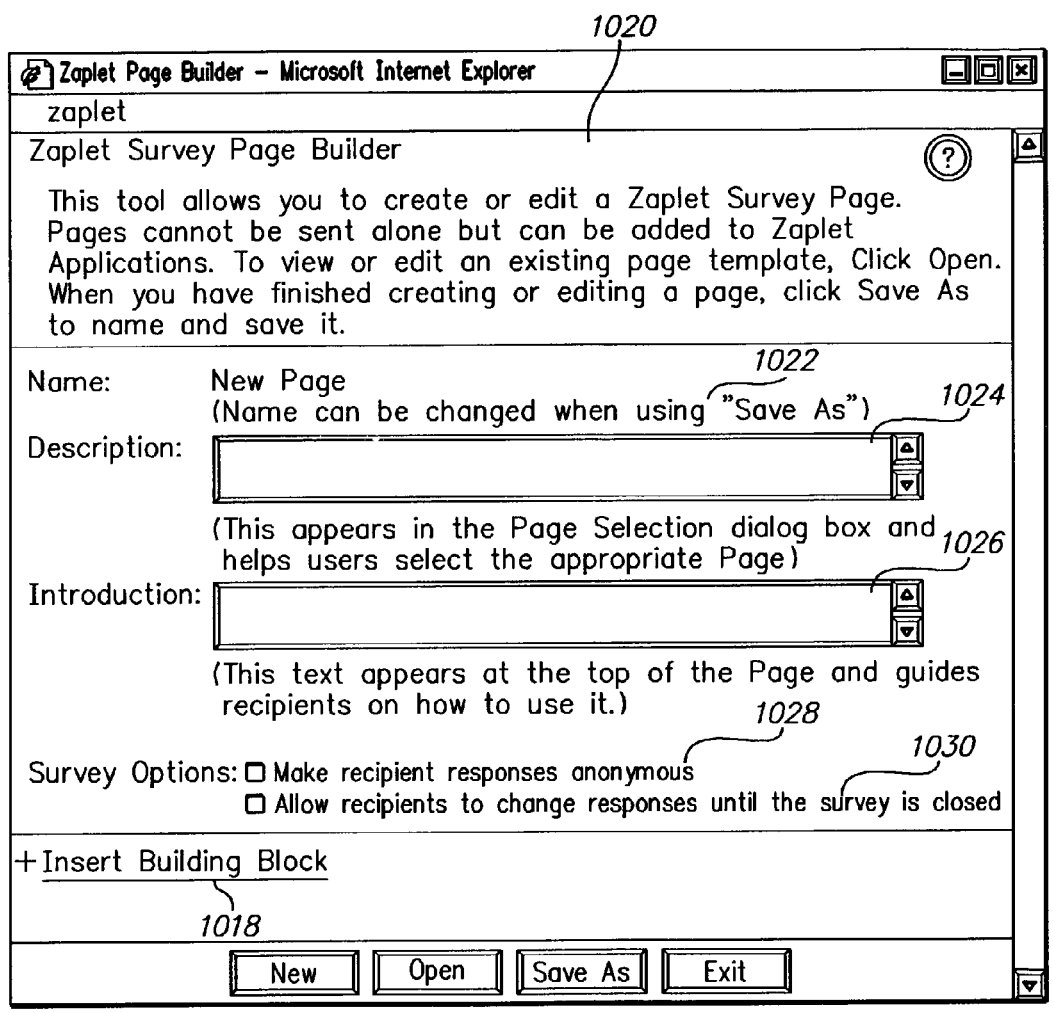
FIG. 10C is a diagram of a Survey Page Builder window that may be displayed, in one example embodiment.

To create a survey page, a user obtains a portal view (FIG. 9B) and selects Builder link 928. The Builder window appears, and the user selects a Survey Page Builder link within it. In response, a Survey Page Builder window opens. FIG. 10C is a diagram of a Survey Page Builder window that may be displayed, in one example embodiment. In this embodiment, the Survey Page Builder window 1020 comprises a Name field 1022 that displays a default value of "New Page," a Description field 1024 that may receive a text description of the page, and an Introduction field 1026 that may receive a text introduction for the page that is displayed to recipients at the top of the page.

Survey Page Builder window 1020 further comprises one or more survey options. In one embodiment, a "Make recipient responses anonymous" link 1028 is provided. When it is selected, responses to the survey are stored in anonymous form. An "Allow recipients to change responses until the survey is closed" link 1030 may be provided. When selected, the system allows recipients of the page to change their responses at any time. When it is not selected, a response of a recipient may not be changed after it is submitted.

The user may add one or more survey building blocks by selecting the Insert Building Block link 1018 at a point in the page where the user wishes to have a building block appear. In response, a list of available building blocks is displayed. In one embodiment, the list comprises:

Choice. Respondents vote for one or more of the listed options; results are displayed, e.g., in a pie chart, bar chart, etc., and are visible only to the author of the transportable application.

Free Text Response. Respondents enter text responses to a question into a single line text box, or a larger comment box. Responses are gathered in a table and are visible only to the author of the transportable application.

Ratings. Respondents provide their ratings on a list of questions or items according to a discrete scale, e.g., 1 to 10. The results are summarized in a graphical format that is visible only to the author of the transportable application.

The user may select one of the building blocks by selecting its name or icon. The user completes the building block with any required information; fields for completion by recipients are left blank. The user may re-order the building blocks or delete one or more building blocks; the page is then saved. The page is added to a template for a transportable application as described herein.

1.4.3 Building Blocks—Examples

A description of specific building blocks is now provided. The building blocks described herein are merely examples, and other building blocks, fewer or more building blocks may be provided to carry out different functions or to configure different transportable applications. For convenience and in order to illustrate clear examples, the building blocks are described in part in terms of graphical appearance, functions and features; however, in an implementation, each building block comprises a plurality of executable computer program modules that are defined by class files and other computer program source statements. Thus, the functions and appearance of each building block herein are determined by and implemented in the form of computer code appropriate to carry out the functions and provide the appearance that are described herein.

Referring again to FIG. 11A, the graphical appearance of an Approval List building block 1100 is shown. The Approval list building block 1100 allows a list of participants to respond with approvals for documents, shared files or the content of a message, and may be combined with an Inline Document or Image Gallery building block to gather sign-offs on final drafts. Approval list building block 1100 comprises an Instructions field 1108 that may receive text instructions that are displayed to recipients of a page that contains the building block 1100. Approval list building block 1100 further comprises a list 1110 of one or more user names 1112 corresponding to recipients of the building block and corresponding response indications 1114. The user names 1112 are dynamically updated according to the recipients of the building block 1100. Approval list building block 1100 further comprises an Include linked comment check box 1116. If checked, the system will display comments from participants in the transportable application. The comments are dynamically updated as they are added.

FIG. 11B is a diagram of an example embodiment of a Discussion building block that may be used to captures a discussion between message participants. Discussion building block 1120 comprises a dynamically updated list 1122 of one or more user names 1124, associated comment text 1126, and a time stamp value 1128 indicating the time when the associated comment was added. When recipients receive a transportable application that contains a Discussion building block 1120, one or more of the recipients may select the building block and add a comment to the topic under discussion. The list 1122 is dynamically updated with the newly added comment so that the next recipient who opens the transportable application will see all previously added comments.

FIG. 11C is a diagram of an example embodiment of a File Sharing building block, according to an example embodiment, which may be used to share an electronic file among a group of recipients for collaborative review or updating. In this embodiment, File Sharing building block 1130 comprises a Description field 1132 in which the author of a template that contains the building block may enter description text. An Enable File Versioning check box 1134 is provided. When it is checked, the system requires each user to check out the associated file before it can be viewed or modified. The file is checked in after modification.

File Sharing building block 1130 also comprises an Attach Files link 1136. The author of the application or template that includes building block 1130 may select link 1136 to specify a file that is shared among recipients of an application that contains the page. In addition, the Attach Files link 1136 may be used by recipients of the transportable application to add files for sharing, discussion or collaboration. Thus, the one or more files that are shared using building block 1130 may be specified by recipients of a transportable application that contains a page that contains the building block 1130, rather than specified by an author of a transportable application that contains the page or a template that contains such a page.

In one embodiment, when a user is interacting with a transportable application having a page that contains File sharing building block 1130, and the user elects to upload a new file for sharing or discussion, the system prompts the user to decide whether versioning should be enabled for the document. A versioning value is stored as a file attribute data value in the database in association with the file. In another embodiment, the Enable File Versioning check box 1134 is displayed in association with every file link for each file that has been uploaded. Thus, a user who is the author of the transportable application or otherwise acting in an owner role may elect to apply versioning at any time.

Figure 11D:
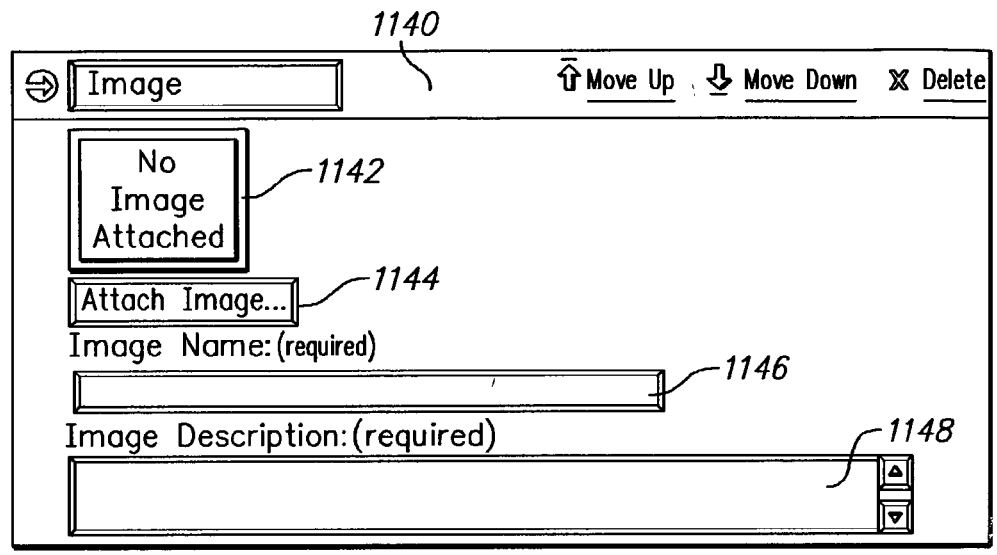
FIG. 11D is a diagram of an Image building block that may be provided, in one example embodiment.

FIG. 11D is a diagram of an Image building block that may be provided, in one example embodiment. An Image building block 1140 may be used to display a graphical image on a page of El transportable application. In one embodiment, Image building block 1140 comprises an image 1142, Attach Image button 1144, Image Name field 1146, and Image Description field 1148. After adding the building block 1140 to the page, the author selects the Attach Image button 114 to attach an image to the building block. In response, the system displays a file browse dialog that enables the author to navigate to a desired image, e.g., in a filesystem or folder of the author's computer, server or network, and select the image. The system uploads the selected image to application server 202 and stores it in database 208 in association with the page under construction.

The user may also add a name value in Image Name field 1146, and a description value in Image Description field 1148.

Figure 11E:
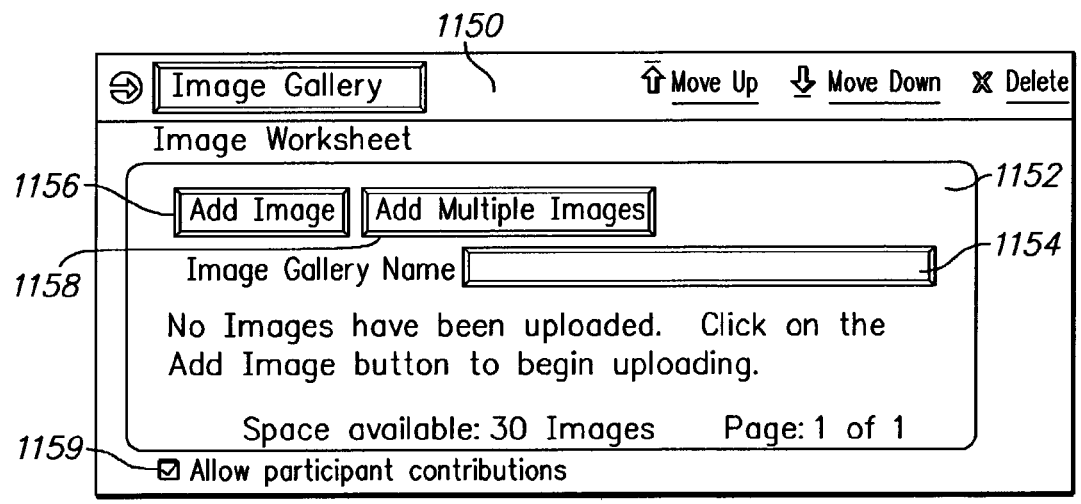
FIG. 11E is a diagram of an Image Gallery building block that may be provided, in one example embodiment.

FIG. 11E is a diagram of an Image Gallery building block that may be provided, in one example embodiment. An Image Gallery building block 1150 may be used to display a plurality of graphical images within a page. In this embodiment, Image Gallery building block 1150 comprises an image worksheet 1152, Name field 1154, Add Image function button 1156, Add Multiple Images button 1158, and checkbox 1159. To add one or more images to the image gallery, the author selects either the Add Image function button 1156 or the Add Multiple Images button 1158. In response, the system displays a file browse dialog that enables the author to navigate to a desired image, e.g., in a filesystem or folder of the author's computer, server or network, and select the image. The system uploads the selected image to application server 202 and stores it in database 208 in association with the page under construction. The user may also add a name value in Name field 1154.

All images may be sent in a transportable application at the same time. Alternatively, if the checkbox 1159 is selected by the author, then participants who receive a transportable application that contains building block 1150 may add their own images at any time. Conversely, if checkbox 1159 is not checked, then participants may not add additional images to the gallery.

The Image building block and Image Gallery building block are supported by appropriate error logic that generates one or more errors if exceptional conditions occur when images are uploaded by the author. Examples of exceptional conditions include: a file is too large; network connection failure; incorrect image format; incorrect image width; etc.

Figure 11F:
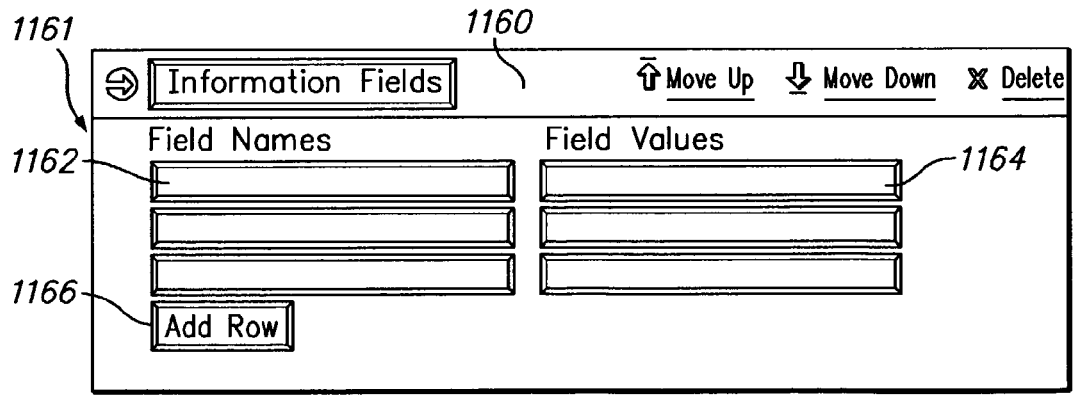
FIG. 11F is a diagram of an Information Fields building block that may be provided, in one example embodiment.

FIG. 11F is a diagram of an Information Fields building block that may be provided, in one example embodiment. In this embodiment, Information Fields building block 1160 comprises a list 1161 of one or more field names 1162 each having an associated field value 1164. The author of a page that contains the building block 1160 provides values for field names 1162; the associated field values are left blank and are added by participants who receive the page. Additional pairs of field names and values may be added to the building block by the author by selecting an Add Row button 1166. Accordingly, an author may create named fields to build forms to display names, dates, locations, etc., and a transportable application can capture information about the state of a project, names of participants, address information, or outstanding issues.

In one embodiment, each field of the Information Fields building block may have an abstract data type associated with it using the data typing mechanisms described herein with respect to the Table building block.

Figure 11G:
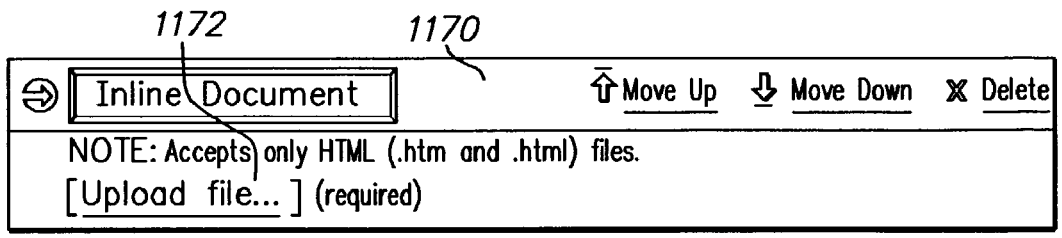
FIG. 11G is a diagram of an Inline Document building block that may be provided, in one example embodiment.

FIG. 11G is a diagram of an Inline Document building block that may be provided, in one example embodiment. In this embodiment, Inline Document building block 1170 comprises an Upload File link 1172. To place a document within a page of a transportable application, to enable participants to review the content of the document without opening a second application, an author of a page that contains building block 1170 selects link 1172. In response, the system displays a file browse dialog that enables the author to navigate to a desired file, e.g., in a filesystem or folder of the author's computer, server or network, and select the file. The system uploads the selected file to application server 202 and stores it in database 208 in association with the page under construction. The name of each file that has been uploaded is displayed in the building block, e.g., in an area above the link 1172.

In one embodiment, building block 1170 accepts one file for upload. In this embodiment, multiple documents may be displayed in a transportable application by adding another page to the application, or by including multiple building blocks 1170 within the same page. Alternatively, multiple files may be included.

Figure 11H:
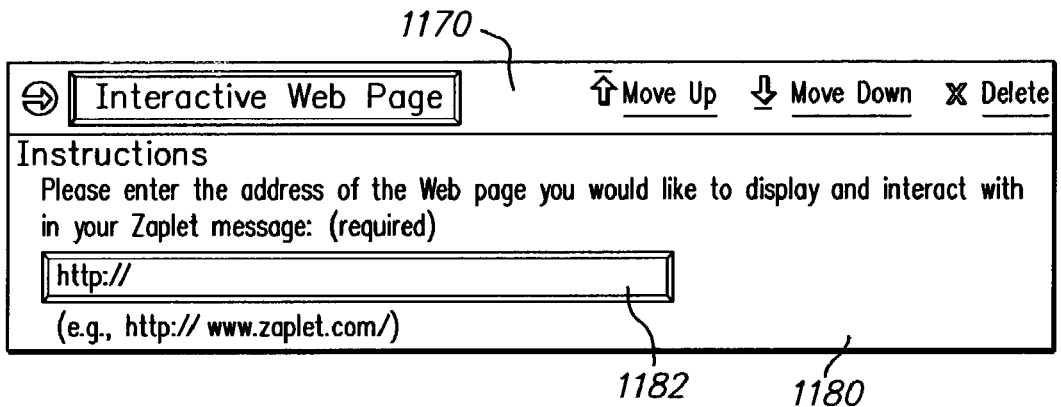
FIG. 11H is a diagram of an Inline Web Page building block that may be provided, in one example embodiment.

FIG. 11H is a diagram of an Inline Web Page building block that may be provided, in one example embodiment. In this embodiment, building block 1180 displays a fully interactive Web page within a page of a transportable application, including browser-like navigation controls. The author selects a location field 1182 and provides a URL or other location identifier of the Web page for display.

In one embodiment, the URL may be changed at any time by recipients of pages that contain the building block. An administrative console function may be provided to enable establishing filters for building blocks.

Figure 12:
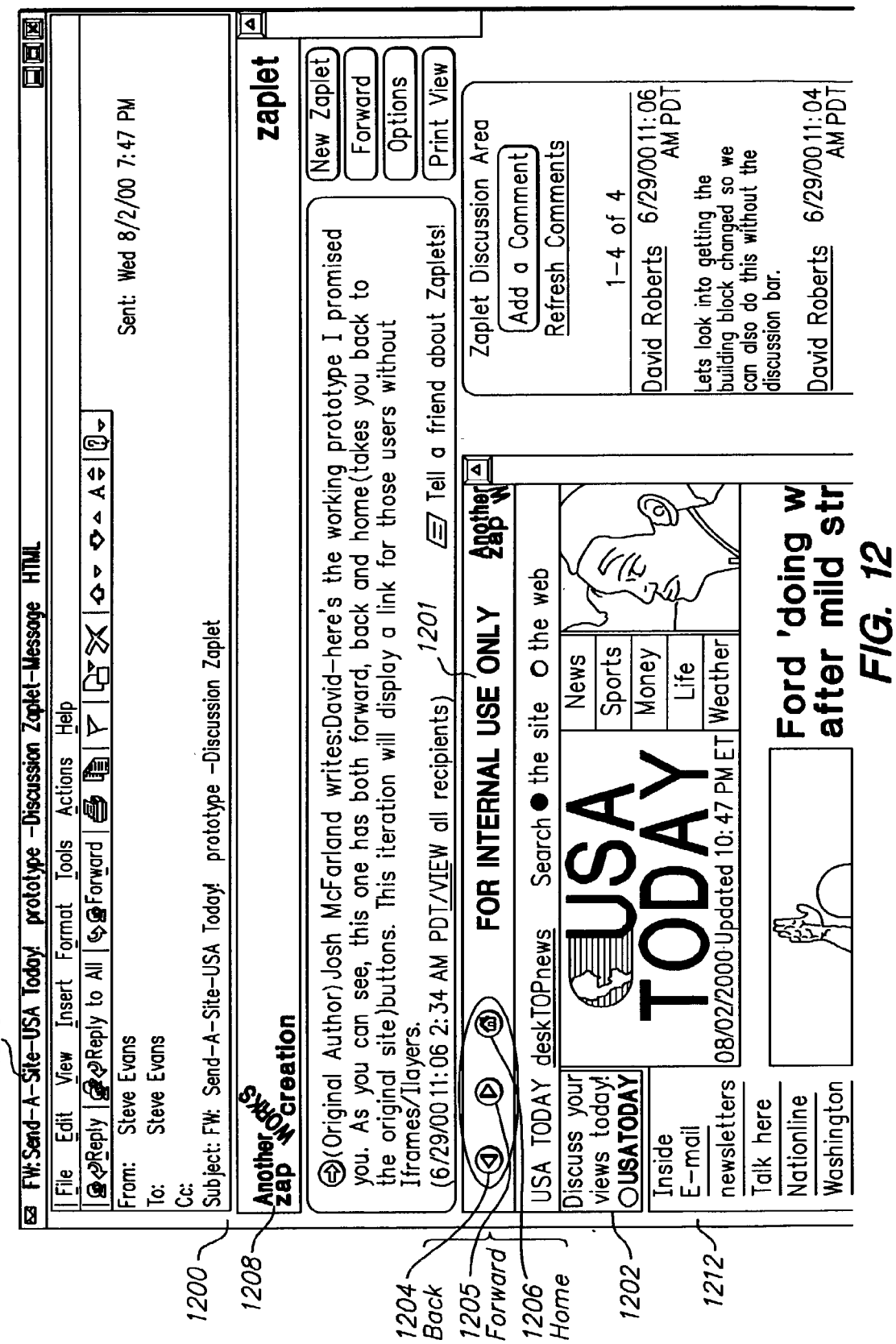
FIG. 12 is a diagram of an example transportable application that contains an inline Web page.

FIG. 12 is a diagram of an example transportable application that contains an inline Web page. In this example embodiment, a transportable application 1200 is shown in a view from a graphical user interface of an e-mail client program 1210. Transportable application 1200 comprises a header 1208 and an inline Web page building block 1212. The building block 1212 includes a navigation header 1201 and a Web page image area 1202 that displays the inline Web page. Navigation header 1201 comprises a Back button 1204, Forward button 1205, and Home button 1206. Navigation header 1201 is displayed automatically by the system when the transportable application 1200 is presented. Thus, the navigation header 1201 is system-generated and does not form part of the Web page in image area 1202. The Web page in image area 1202 is displayed in the same form that it would have if viewed using a browser in conventional manner. Back button 1204, Forward button 1205, and Home button 1206 each comprise links to JavaScript code that carries out the functions of the button. A specific embodiment of such code is described further herein with reference to FIG. 24.

FIG. 13A is a diagram of an Invitation building block that may be provided, in one example embodiment. In this embodiment, Invitation building block 1300 comprises the following data entry fields, which receive text information provided by the author of a page that includes the building block: Event title field 1304, which receives a title of the event for which the invitation is issued; Description field 1306, which receives a brief description of the event; Details field 1308, which receives text providing detailed information about the event; Date field 1310, which receives a value identifying the date of the event; Duration field 1312, which receives a value identifying the time period of the event; Location field 1314, which receives a value specifying where the event will occur; Address field 1316, which receives a value providing an address for the event; and a deadline field 1318, which provides a deadline date for responding to the invitation.

The value in the deadline field 1318 may be used, programmatically, to automatically trigger closing a transportable application or page that includes the Invitation building block 1300.

An author of a page that contains building block 1300 may select a style for the graphical appearance of the building block using a Select Invitation Style link 1302. In response, the system displays a list of one or more predefined styles for invitations. The author selects one of the styles, fills in the foregoing event data, and saves the building block.

Figure 13B:
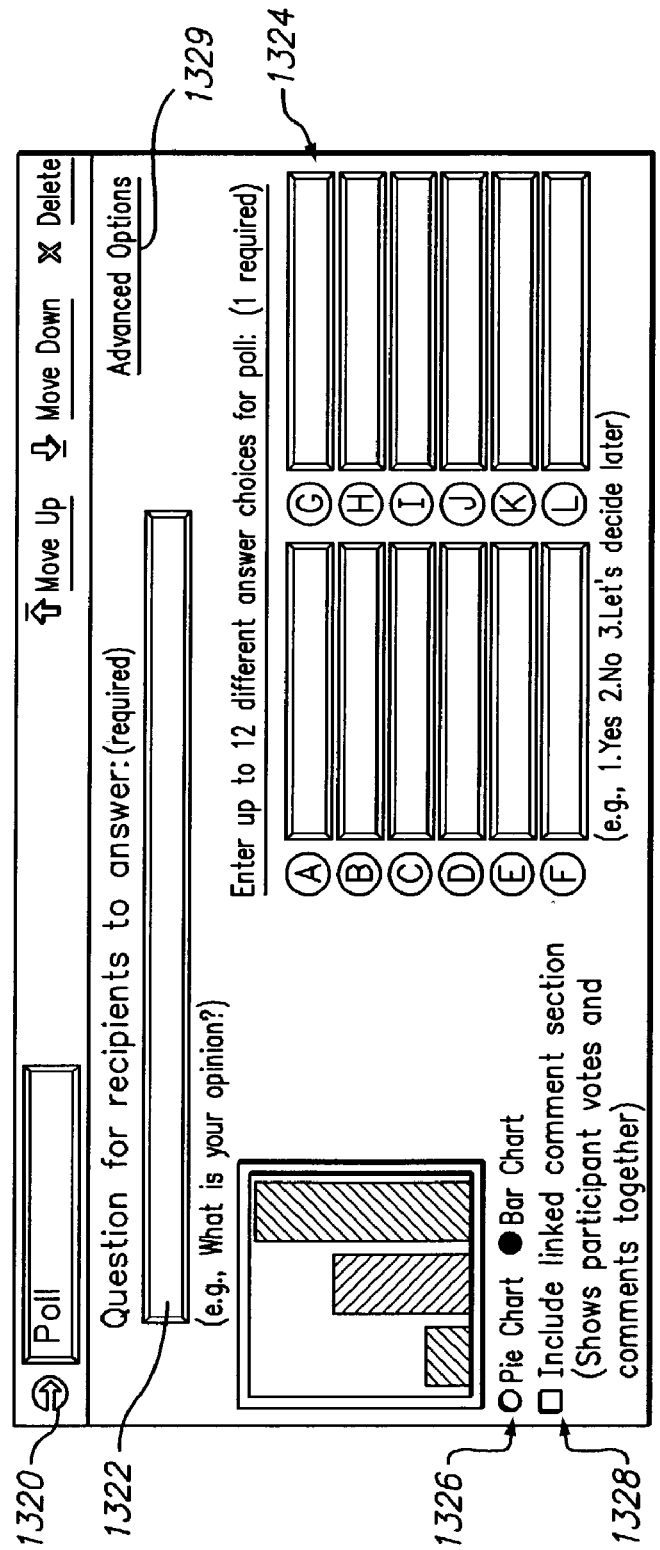
FIG. 13B is a diagram of a Poll building block that may be provided, in one example embodiment.

FIG. 13B is a diagram of a Poll building block that may be provided, in one example embodiment. In this embodiment Poll building block 1320 comprises a Question field 1322 in which the user enters the specific question that recipients are requested to answer when the building block is in use. The author also enters one or more answer choices in answer fields 1324; in responding to the poll question, recipients are required to select one of the answer choices.

As recipients interact with the building block, the author may view a graphic image of the results in graph or chart form. The author may select the specific form of the results by selecting one of a plurality of radio buttons 1326, each of which is associated with a different presentation format such as pie chart, bar chart, etc. The author may enable recipients to attach comments to their responses by selecting Comment check box 1328.

Poll building block 1320 further comprises an Advanced Options link 1329 that enables the author to set other functional behavior of the building block. In response to selecting link 1329, the system displays an Advanced Options window. FIG. 13C is a diagram of an Advanced Options window that may be displayed, in one example embodiment. In this embodiment, the author may use Advanced Options window 1330 to select whether recipients of a poll may vote for one or more of the answer choices 1324 of FIG. 13B, by selecting a value from a pull-down menu 1332. The author may instruct the system to include an additional answer choice of "Other" in the list, and allow recipients to write in an answer, by selecting check box 1334.

In one embodiment, if an "Other" choice is allowed, and recipients write in answers, the written-in answers are automatically added to the choice list. The written-in answers are dynamically updated to the database. Thus, any later recipients who open the same transportable application see the written-in answers as additional poll choices.

One or more Vote Options check boxes 1336 may be provided. In one embodiment, the author may instruct the system to allow recipients and participants in the poll to change a vote by selecting a first check box. The author may instruct the system to allow participants to vote anonymously by selecting a second check box. The author may specify when the poll results are available for viewing by the participants by selecting one of a plurality of radio buttons 1338. In one embodiment, the author may specify that the poll results are available to participants always, after a participant has voted, after the poll closes, or never. In one embodiment, the author may require all ratings to be submitted on an anonymous basis ("forced anonymity"), by selecting an option or check box when the Poll building block is added to an application.

Figure 13D:
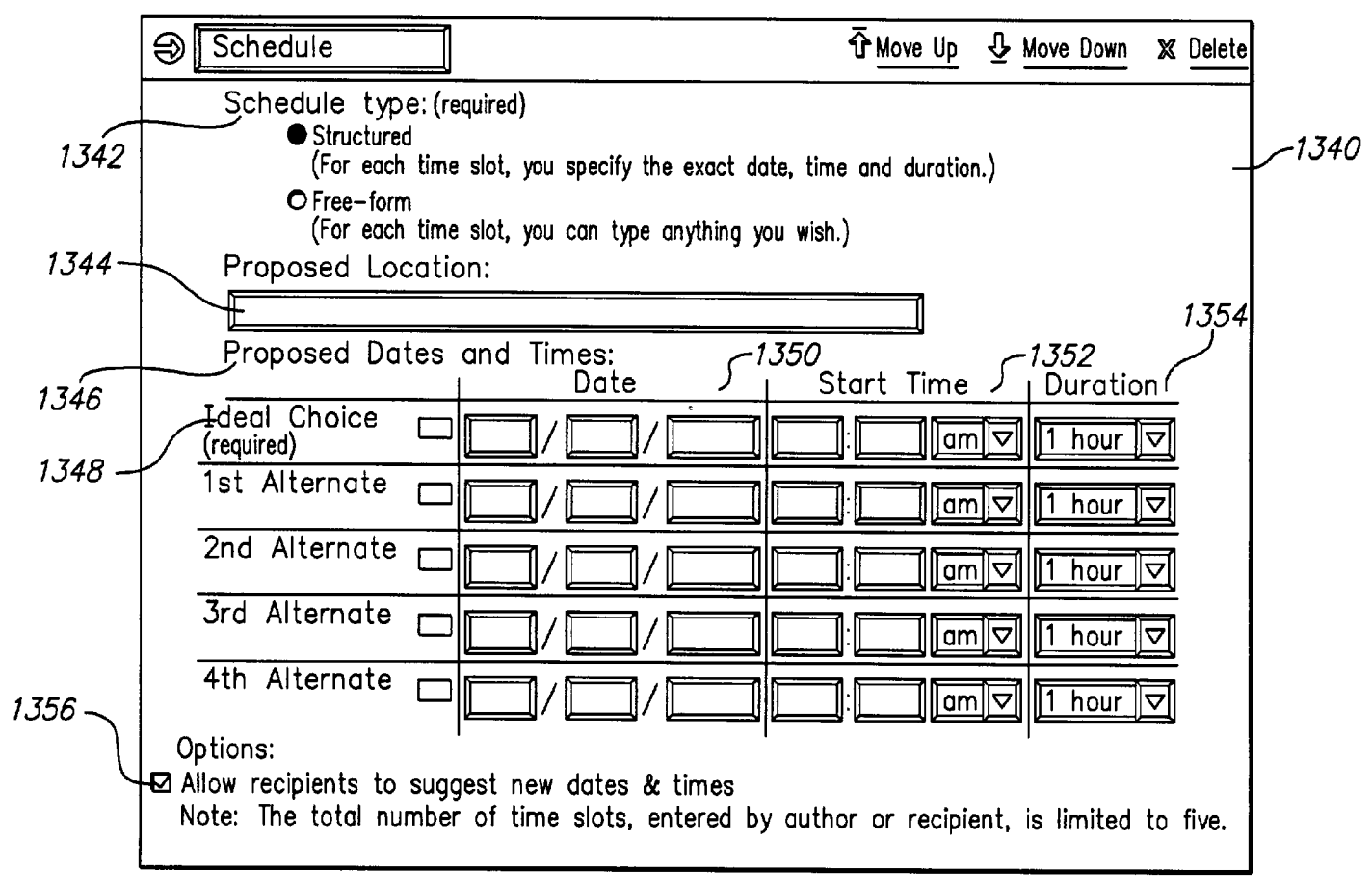

FIG. 13D is a diagram of a Schedule building block that may be provided, in one example embodiment. Participants specify their availability for one or more proposed dates or times in a schedule table. Using Schedule Type radio buttons 1342, the author may specify whether the schedule is structured or free form. In a structured schedule, for each time alternative, the author of a transportable application that includes the Schedule building block 1340 specifies the exact date, time and duration of each time alternative. In a free-form schedule, the author can enter any desired information to describe each alternative.

A Location field 1344 receives a value identifying a proposed location for the scheduled event. A list 1346 of a plurality of time alternatives or choices 1348 is provided. Each choice 1348 has an associated date field 1350, time field 1352, and duration field 1354. Each choice represents a possible best time for a meeting or event, for example. In one embodiment, a maximum of five choices are provided in the building block, as in FIG. 13D, and an option check box 1356 enables the author to specify whether recipients can propose additional choices. If option check box 1356 is not checked, then a recipient of building block 1340 in a transportable application is required to select one of the five choices as best for that individual's schedule.

In one embodiment, the Schedule building block lists at least one schedule response for all recipients of a transportable application that contains the building block. Further, a blank row is displayed in the schedule table for all recipients who have not responded. Thus, even if a recipient has not responded to the transportable application, that recipient is listed in the schedule. This enables all recipients to see who has provided an availability response and who is yet to respond. Programmatically, the Schedule building block may use a getRecipientResult( ) method to retrieve a list of recipients of the transportable application. The list of recipients is compared to a second list of all recipients who are known to have responded to the transportable application. The difference in the lists provides those recipients who should be listed in the schedule table with blank entries.

Figure 13E:
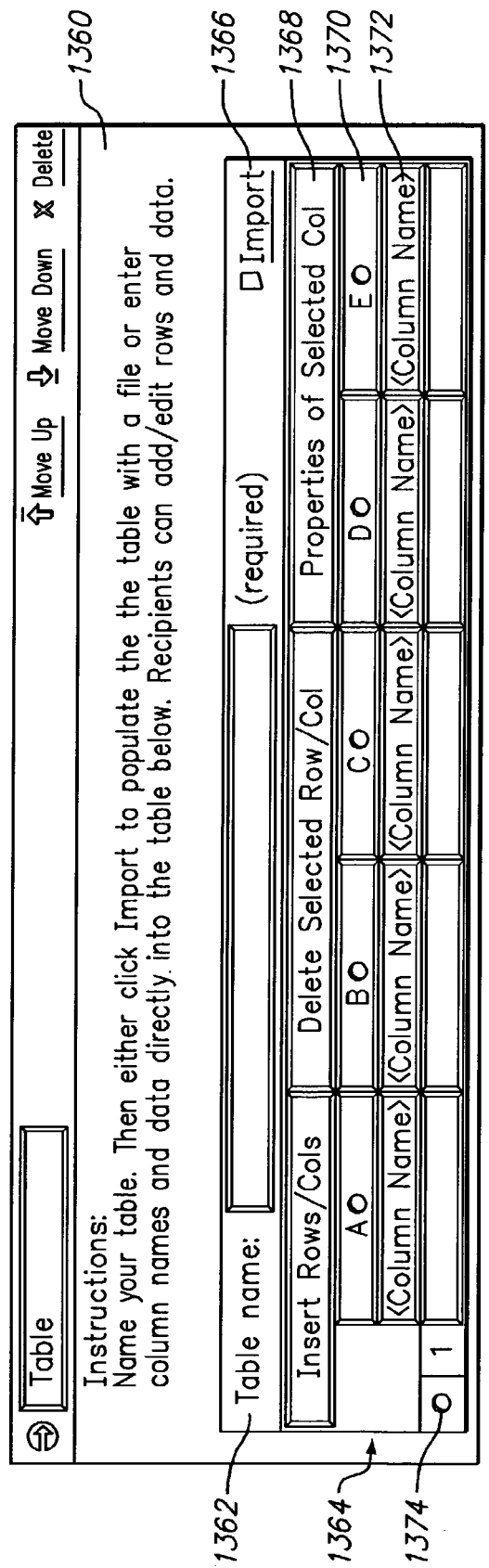
FIG. 13E is a diagram of a Table building block that may be provided, in one example embodiment.

FIG. 13E is a diagram of a Table building block that may be provided, in one example embodiment. A table building block 1360 may be used to compile data from multiple individuals into a tabular format; participants can add to or edit the information. The Table building block can import or export data, for example, data files in delimited file formats. In the embodiment of FIG. 13E, a data table 1364 is defined by a name field 1362, one or more rows 1374 and a plurality of columns 1370. Each column 1370 has an associated column name 1372. Each row and column has an associated radio button which, if selected by the author of the page that contains the building block, makes that row or column appear in the table when the page is displayed in a transportable application.

The author may modify the size and appearance of the table using buttons 1368. In one specific embodiment, buttons 1368 comprise an insert button, delete button, and properties button. A user selects a particular row or column by selecting its associated radio button, and then selects one of the buttons 1368. In response, if the insert button is selected, the system will insert a row or column adjacent to the selected row or column; delete the selected row or column; or enable the user to modify properties of the selected row or column. In one embodiment, such properties include column width, text alignment (left, right, center), cell format, etc. In still another embodiment, the requested changes may be applied to all rows and columns in the table by selecting a separate check box.

In an alternative embodiment, selecting the insert button causes the system to prompt the user to enter a numeric value representing a number of rows or column to insert, thereby enabling inserting multiple rows or columns in a single operation.

In another embodiment, table columns may be formatted according to one of a plurality of abstract data types, e.g., date, numbers, currency, time, etc. The data types may also be enumerated data types, such as a priority type (high, medium, low); an answer type (yes or no), a status type (open, closed, pending, resolved); an approval type (approved, do not approve, undecided); or a custom enumerated type that is user-defined. To apply a data type, the author selects the Properties button from among buttons 1368 and then selects a data type from among a list of available data types. The selected data type is stored in the database as an attribute value for the associated column of the table. If the author adds rows to the table, then columns in the row inherit the data type attribute values. When a recipient adds data to a cell, type checking is carried out to ensure that the value that was entered matches the type of the cell; if a type match occurs, an error is reported.

In addition, data values for table cells may be imported from a data file by selecting an Import link 1366. For example, data values may be imported from a spreadsheet file, delimited file, comma-separated file, tab-separated file, or the equivalent.

Use of enumerated data types enables users to construct Table building blocks that effectively track progress on action items relating to a project. For example, a group of users who are collaborating on a particular project can create a transportable application with a Table building block that identifies tasks, a party responsible for each task, and a status value taken from an enumerated data type. As users complete assigned tasks, they update the Table building block status value as appropriate. Any user who views the transportable application sees the then-current status values for all tasks.

Figure 14A:
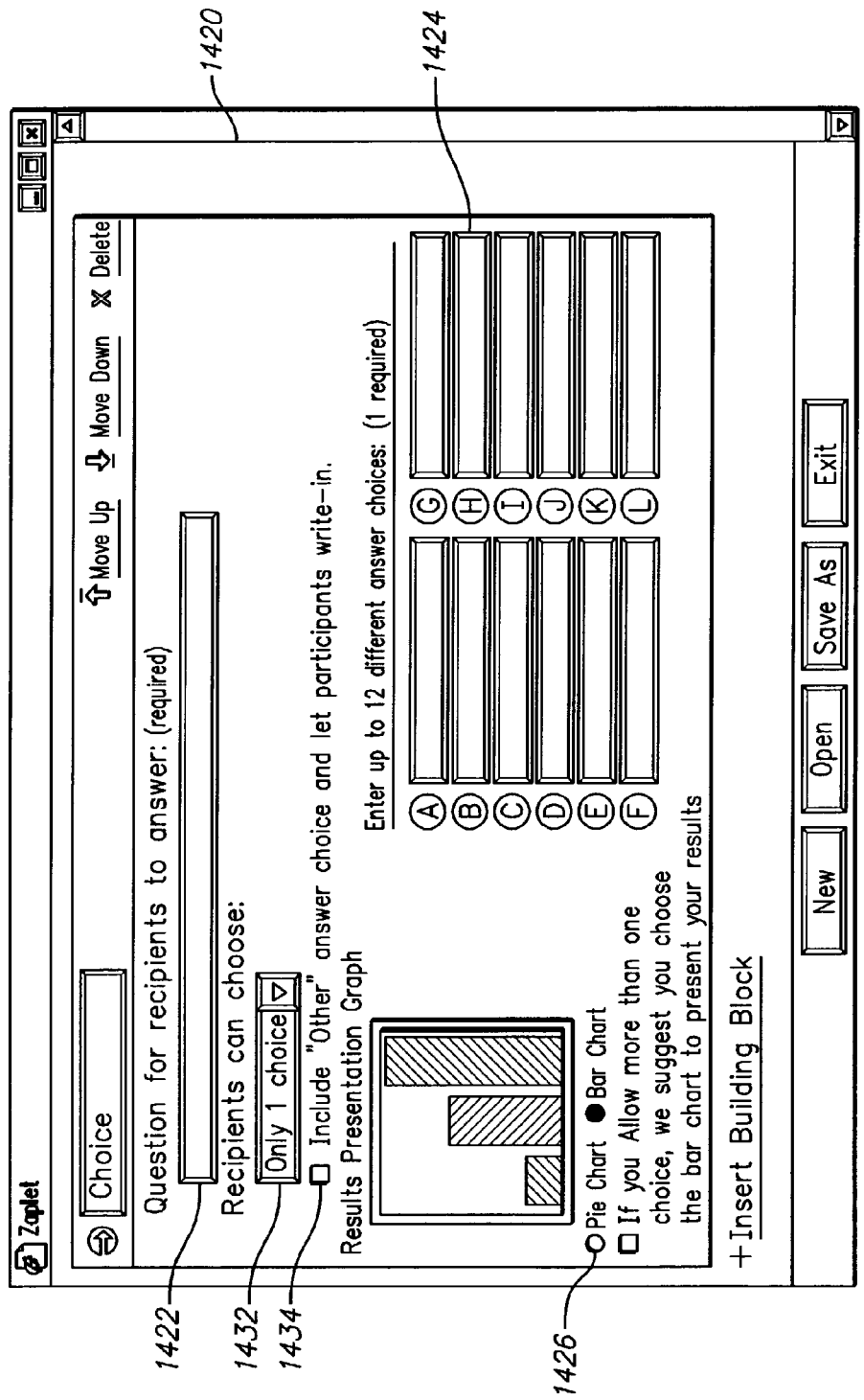
FIG. 14A is a diagram of a Choice building block that may be provided, in one example embodiment.

FIG. 14A is a diagram of a Choice building block that may be provided, in one example embodiment. Using a Choice building block, respondents vote for one or more of the listed options; results are displayed, e.g., in a pie chart, bar chart, etc., and are visible only to the author of the transportable application. In this embodiment Choice building block 1420 comprises a Question field 1422 in which the user enters the specific question that recipients are requested to answer when the building block is in use. The author also enters one or more answer choices in answer fields 1424; in responding to the question, recipients are required to select one of the answer choices provided in the fields.

As recipients interact with the building block, the author may view a graphic image of the choice responses in graph or chart form. The author may select the specific form of the results by selecting one of a plurality of radio buttons 1426, each of which is associated with a different presentation format such as pie chart, bar chart, etc. In one embodiment, the author also may use a pull-down menu 1432 to select whether recipients of a poll may vote for one or more of the answer choices 1424 by selecting a value from a pull-down menu 1432. The author may instruct the system to include an additional answer choice of "Other" in the list, and allow recipients to write in an answer, by selecting check box 1434.

Figure 14B:
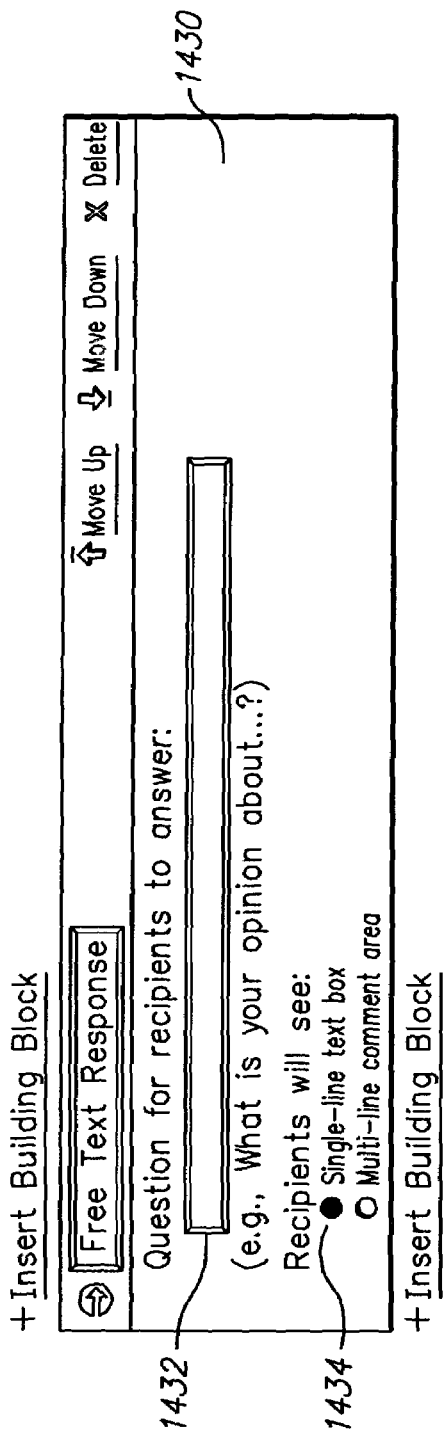
FIG. 14B is a diagram of a Free Text Response building block that may be provided, in one example embodiment.

FIG. 14B is a diagram of a Free Text Response building block that may be provided, in one example embodiment. In this embodiment, respondents enter text responses to a question into a text box or comment field. The author specifies a question for recipients to answer by entering it in question field 1432. Responses are gathered either in a single-line text box or multi-line comment area according to a selection by the author of a corresponding radio button 1434. In an embodiment, a text editor is integrated into question field 1432 so that respondents may use standard text editing keyboard commands and cursor operations as they enter and revise text. In another embodiment, question field 1432 is integrated with a browser DLL, or similar rendering library. In this configuration, respondents may enter HTML tags in the question field, which are stored in association with the building block, and rendered and displayed in HTML format when a response in the question field is displayed to other recipients.

Figure 14C:
FIG. 14C is a diagram of a Ratings building block that may be provided, in one example embodiment.

FIG. 14C is a diagram of a Ratings building block that may be provided, in one example embodiment. In this embodiment, Ratings building block 1440 comprises an Instructions field 1442 in which the author enters text instructions to recipients about how to complete ratings of criteria. The author may define a rating scale by selecting a maximum value 1444. For example, if the author wants criteria rated by participants on a scale from "1" to "5," then the author selects "5" as maximum value 1444. In addition to the numeric rating values, the author may permit a rating of "not applicable" or "N/A" by selecting check box 1446. One or more corresponding rating labels may be provided in rating fields 1448. One or more criteria to receive ratings are provided in item fields 1450. Additional item fields may be added, or item fields may be removed, from among item fields 1450 by selecting an Add Entries link or Remove Entries link 1452.

In one embodiment, the author may require all ratings to be submitted on an anonymous basis ("forced anonymity"), by selecting an option or check box when the Ratings building block is added to an application.

A Listing building block is provided to enable a transportable application to retrieve various types of data from the database and display it in a list format, using HTML or any other desired presentation format.

In one specific embodiment, the Listing building block is implemented as an abstract class that can be subclassed to present any result set of database data that can be described by a programmer or developer. For example, the Listing building block may be used to generate lists of groups, folders, messages, and transportable applications for use in the Group Directory, Group Messages Inbox, Group Application Templates, and Personal Messages Inbox that are displayed through the portal and other mechanisms as described herein.

In this embodiment, the Listing building block implements a Question interface to issue database queries, and a Presenter interface to carry out data presentation. The Listing building block also generates a Create event, Read event, and Close event to the event handling system when it is created, read, or closed, respectively. The Listing building block contains no actual data of its own; rather, all data it displays is metadata about other objects, such as transportable applications, users, groups, or templates. Thus, it need not generate a Response event.

A Group Directory building block may be implemented as a subclass of the Listing building block. The Group Directory building block displays a list of all the Groups available, including group name, description, and status. The Group Directory building block may receive a selection of a group from user input. In response, the Group Directory building block determines whether the user is authorized to access the selected group, and then generates a Status value as output. The Status value may be Join Group, Member, or Private. Join Group means that the user is not a member of the group and the group is not private, i.e., the user may join the group. Member means that the user is already a member of the group. Private means that the user is not a member and group joining is restricted.

A Group Messages Inbox building block also may be implemented as a subclass of the Listing building block. The Group Messages Inbox building block displays a list of all transportable applications sent to a group including author, subject, type, date created, and date last modified. The Group Messages Inbox building block may be used in two different instances to provide a list of current group messages as part of a group home page, and to provide a group archive list.

A Group Applications Templates building block also may be implemented as a subclass of the Listing building block. The Group Applications Templates building block displays a list of selected application templates for a particular group, organized by template name and date created. The selected application templates may all those that are in that group's application directory, for example. There may be an instance of the Group Applications Templates building block for each group.

A User Messages Inbox building block may be may be implemented as a subclass of the Listing building block and generates a list of all transportable applications sent by and received by a user, except that received group messages are not displayed. The list comprises, for each transportable application in the list, a status value, attachment status value, author name, subject, and date last modified. The status value indicates whether the associated transportable application is new or unread, updated or changed, or read. The attachment status value indicates whether the associated transportable application has one or more files attached, or no attachments. The User Messages Inbox building block provides graphical controls to create folders, move transportable applications into folders, or to delete them.

1.4.4 Site Style Editor

According to one embodiment, the Style Editor is configured to enable a portal administrator to create one or more Site-specific Styles. In this context, a "site" is an installation of system 200 at a particular enterprise or organization, such as a corporation. The Site Style Editor displays only those properties of transportable applications and templates that are relevant to creating styles for a particular site. Such properties may include site snippets (including the header and navigation), color scheme, branding and corporate-color images, and fonts to be used throughout the site.

In one approach to implementing the foregoing, a Style Properties table of database 208 includes a column that identifies whether a style property is a general property or a site-specific property. The Style Editor is configured to allow setting a mode, e.g., generic or site-specific, when a user invokes or enters the Editor. When the Style Editor is in a site-specific mode, it shows only properties relevant to that mode.

A Site Style Preview Tool is provided to enable a user, who is creating a Site Style, to preview the appearance of the site so that other users of the system will not be disrupted during development time. Only the Site Style creator can see the site using the Site Style being created. In one embodiment, Site Style development and previewing is carried out on a separate application server to minimize performance issues. Further, in one approach, the preview of the site is displayed in a frameset of a browser, enabling a user to freely browse the site.

When one or more styles have been created, users can select a style at the time that a transportable application is authored. For example, at authoring time, when a transportable application is created or a task is added, a user can either select an existing Style through the Style Picker or create a new Style during authoring and automatically apply that Style to the transport able application that is being authored.

In one approach, a Style Editor is provided having an action bar with a plurality of graphical user interface buttons that trigger different actions and behavior. In one specific embodiment, a Clear button resets Style properties. A Save button saves the Style. If it already exists in the database, it is overwritten without asking the user for a new name. If it does not exist, then the user is prompted to provide a name and description. A Save As button saves the Style after first prompting the user for a name and description. An Open button loads a Style into the Editor from the user's personal collection, or from a Group or Global folder.

A Preview button displays a preview of the current Style. The style is previewed in association with the type of transportable application that the user is in the process of authoring. An Apply and Exit button is also provided. When selected, if the Style has not been saved, then the user is prompted to provide a name and description of the Style, and it is saved. The Style is automatically applied to the then-current transportable application under development, and the Editor is closed. Cancel and Exit buttons may also be provided to enable termination of style editing and exiting the application.

The Style Editor also may be configured to save and load styles to and from groups, global areas, or folders of groups or global areas. This enables groups of users to export styles to such areas for the purpose of sharing them. Use of folders enables users to organize styles. Folders and style references may be created as node objects.

1.5 Communications From Transportable Applications to Users ("Notifications")

1.5.1 Notifications Based on User Responses or Lined Events

In an embodiment, application server 200 includes processes that can selectively deliver notification messages to users based on actions carried out by transportable applications. In general, a notification is a message, sent by electronic mail or any other transport mechanism, to a recipient of a transportable application separate from the application as a result of an action taken by that recipient or by another recipient of the application. For example, assume that a transportable application includes a discussion building block in which a group of participants are discussing a particular topic. If a participant enables notifications for that application, the system sends that participant a notification message each time that another participant updates the application with a new comment.

In one embodiment, each participant or user affirmatively requests notifications in an "opt-in" process. Alternatively, however, notifications may be used to accomplish more complicated business processes or workflows. Further, in one embodiment, notifications are associated with transportable applications as a whole; alternatively, each building block may independently generate a notification based on an action of a participant using that particular building block. In still another alternative, notifications are issued based on rules when conditions specified in the rules are satisfied by user actions.

In this description, participants or users may assume one or more roles. An individual acting in an Owner/Moderator role is a person who initiates or starts a process. The Owner owns the process and is accountable for all its functions. In the corporate context, owners of a process can be product managers, purchase agents, account managers, customer service representatives, etc. An individual also may act as a Participant (also termed a Member or Recipient). Members interact with one or more specific tasks in a process, such as interviewing candidates, bidding on proposals, participating in meetings, etc. The owner of a process can assign specific roles to the participants. Owners may be participants also.

In one embodiment, with respect to groups, an Owner can add or remove members from the group; carry out moderator options; exercise author rights over all group messages; delete group messages; and exercise all Member privileges. A group Member, in contrast, can send or receive group messages; invite others to join public groups; unsubscribe from the group; and create a sub-group.

Notifications, in one approach, are alert messages that are sent to users when a predefined activity has occurred in a process. For example, notifications may be issued as a result of the following activities: Response to a building block by a user; change in process or task status; change in process or task due dates; more than 50% of people have polled; more than 60% of users have confirmed for the meeting; and others. Reminders are prompts sent to users. Examples of reminders include: Inform a user that a due date is fast approaching; inform all users about an important process development; etc. Both notifications and reminders generally are sent outside the context of a transportable application, for example, by a separate e-mail message directed to the recipient. In contrast, notes, as described herein, are text messages that are selectively embedded within a transportable application to draw something to the attention of the recipient when the recipient opens the transportable application.

Notifications may be pull or opt-in notifications, or push notifications. With pull notifications, a user defines (or sets rules) when to receive notifications and reminders. The system automatically sends a notification if the specified definition is satisfied. With push notifications, an owner sends notifications and reminders to users regardless of whether the user has requested for the same. Here the owner overrides the notification preference of the recipient.

In one embodiment, notification processes are configured so that a participant receives notifications on any updates immediately. In this approach, users have the option to opt-in to receive any updates. The user receives a single notification on any updates since the last read. In one specific approach, taking any of the following actions on a process or task triggers delivery of a notification: Adding new tasks; response to building block; closing of tasks; closing of processes; change in process status or due date; change in task status or due date.

In one sub-approach, only the tasks for which a user is in the recipient list trigger notification updates. If a different task changes, for which a user is not in the recipient list, the user is not notified.

In another embodiment, notification processes are configured so that a participant receives notifications on any updates to specific tasks immediately. Users can receive notifications on any updates to a single task or group of tasks. A list of active tasks is provided to the user from which the user can select tasks on which to be notified.

The notification processes also may be configured to send a process-level reminder to all recipients. Specifically, the owner of the process can configure a transportable application to send ad-hoc reminders to everyone in a recipient list whenever an important process event occurs. For example, assume that Michael is interviewing at Alpha Company and an interview process transportable application is currently used for scheduling interviews. A manager at Alpha receives information during the interview process that Michael has a competing offer and needs to decide whether to accept it within the next week. The manager, who is an owner of the transportable application, can immediately notify all the participants that they should schedule interviews for Michael and decide on the candidate. In a related approach, the notification processes are configured to send process-level reminders to selected recipients in the recipient list.

In another embodiment, the system is configured to send a task level reminder to all recipients in a recipient list. The owner of the task can send ad-hoc reminders to everyone in a recipient list whenever an important task event occurs. For example, assume that an offer letter to candidate John Q. Public is under discussion in the "Offer task" of a transportable application. The salary to be offered to the candidate is still under discussion among the managers. However, the Director of Sales needs to provide the sales headcount to the VP of Marketing & Sales next week and as such needs to finalize the offers quickly. She sends a notification to the participants in the "offer task" to come to a consensus quickly on the offer and go further with the hiring. In a related feature, a participant can send a task level reminder to select recipients among the recipients of the transportable application.

Another feature provides scheduled process update notification. A user can schedule to receive process update notifications periodically or on a specified date and time. Periodic update options for the user to select are daily (options within a day), and weekly (options within a week). For example, assume that Bob is the Director of Business Development at Alpha Company and his team is working on new business deals with a lot of startups. Bob would prioritize on his updates based on the importance of the deal. So he schedules some deals for weekly updates while others for daily updates.

In another embodiment, the system is configured to send scheduled process "due date" reminders to all users in a recipient list of a transportable application. In this feature, the owner of a process can schedule specific "due-date" reminders to be sent to everyone either at the process or at the task level. The owner can send the reminder either on a particular date or a specified period before the due date (e.g., two days before, two weeks before, etc). For example, assume that a product management team has defined new features for a particular product release and requires approval from other functional areas (such as Engineering, Sales, Business Development etc.). The features need to be frozen by a certain date so that development on the product can commence. The project lead schedules a "due-date" reminder to be sent to everyone a week before the deadline to ensure that the activities are completed by the due date.

In other features and embodiments, a participant or user can "opt-in" to receive summary of notification changes; "opt-in" to receive selected notifications immediately; send a scheduled task "due date" reminder to everyone in a recipient list; send a scheduled task "due date" reminder to select recipients in a recipient list; and "opt-in" for a scheduled process due date reminder.

In one implementation approach for the foregoing features, the event-based messaging system described herein is configured to enable building blocks and associated notification event handlers to communicate. One or more events may issue as a result of another event. Responses to events are carried out by a notification event handler that is associated with each kind of response event. Response-based notifications are generated by each such handler. Each notification is an event, and the each notification event handler comprises logic that determines which users need to receive notifications and when. In an embodiment, each event handler uses a notification API to generate a list of users to notify, and the event handler then sends the list to an event daemon that dispatches the notifications. As a result, an event-based messaging system facilitates generating rule-based notifications in response to any change in any attribute of a transportable application.

In one implementation of response-based notifications, as outlined above, each user may "opt in" to receive notifications at a task level and at a process level. Hence, each user can subscribe to changes in particular tasks or to any change in the process. Further, each user can associate a notification frequency value with each subscription.

FIG. 7 is a flow diagram of one embodiment of a process of carrying out response-based notifications. In block 702, a response is issued to a building block of a transportable application. For example, a first participant in a group collaboration or other activity enters text, graphics, a button selection or some other value in response to a query provided in a building block.

In block 704, in response, a database query is issued to obtain a list of users who have requested notifications for the current building block. A notification time value is obtained for each user in the list; the notification time value indicates when to notify each individual on the list. In block 706, the list is passed to the parent object of the current building block, which may be another building block or a container object, with a request to carry out notifications.

In block 708, a list of recipients associated with the parent building block or container object is retrieved and compared to the list of users who qualified for notifications at the child building block level. Only those users who qualified for notifications at the child building block level are then considered. For each user who qualified, if that user has a notification time value that indicates a delayed notification is necessary, then no action is taken since the child's notification time overrides any notification time that may be associated with the parent.

In block 710, for each user in the child notification list that qualifies for an immediate notification, then a database query is carried out to determine that the user is active in the system and does not have a notification already pending. This is done to avoid duplicate notifications. If these tests result in a determination that the user is entitled to a notification, then control is passed to block 712.

In block 712, a status value for the user associated with the parent building block or container is changed to Updated, and a current time value is stored in a notification time value in the database.

In block 714, users in the recipient list of the parent block or container who did not qualify for child level notifications are considered. The status value for each such user is changed to Updated, and a current time value is stored in a notification time value in the database. In block 716, the notification message is dispatched to all qualifying users in the parent and child notification lists.

1.5.2 Notifications Based on Rules and Attributes

In a related approach that is integrated with an event management system, each building block can publish attributes about itself to the rest of the system, and publishes event that alert the system when such attributes change. Further, users may create and store rules based on these attributes that cause such users to receive a notification when the rules are satisfied. In addition, users may be notified at a particular time if a rule is satisfied. For example, a user can be notified if a project status reaches "complete", and the user can also be notified if the project status is not "complete" one month after the project began.

In one implementation approach, database 208 comprises a rules table having the following columns: Rule ID; Block ID; User ID; Attribute; Threshold value; Comparator; Time flag indicating whether the rule is time-based; Event ID if the rule is time-based; Action type. In one embodiment, the Rule ID field does not store a unique key value, because the same Rule ID can encompass several rules that are evaluated simultaneously.

Database 208 further comprises an alert log table having the following columns: Block ID; User ID; Note; Read bit. An Alert Waiting bit is provided in a user status table. Each block is associated with a presentAttributes method that returns one or more attributes, types, comparators (if applicable), and description values for each attribute. An interface is accessible from each transportable application with which a user can build the rules and set threshold values and comparators. Each rule may be characterized in terms of Boolean values, number comparisons (equals, less than, greater than), string equals comparisons, etc. Using the interface, a user may edit the rules that have been created, and attach a time value and recurrence period to a rule.

In response to a user creating a rule using the interface, a servlet of application server 202 enters the rule into the database 208, and attaches a rules event to the building block in which the rule was created. The rules event subscribes to attribute changes in the building block. The servlet also deletes any old rules in the database for the same building block.

Thereafter, when an attribute changes in the block, the rules event is invoked. Processing the rules event involves first retrieving all rules for that block from the database 208, evaluating the rules as designed to result in creating and storing a list of rule identifiers that evaluated to TRUE, and generating a rules-passed event that includes the list.

Actions can subscribe to the rules-passed event. Each such action has an associated rule ID value. If a rule matching the associated rule ID value is fulfilled, then the action is executed.

An Alert Notification event object is provided and has a handler process that determines if its rule has passed. If so, the handler sends a notification to the user if needed, and records the notification in a notification log.

In one approach for displaying notifications, when a user opens and reads a transportable application, a flag message is displayed that informs the user that a new notification exists. The flag message may be a hyperlink. The user selects the flag message. In response, the system displays the notification in a pop-up dialog with which the user may scroll through one or more notifications. Each alert then is marked as read.

1.6 Object Communications—Programmatic Methods

In one embodiment, system 200 uses two distinct types of internal communication mechanisms. Non-event driven sharing of data is carried about in Building Block and Container interactions and Container-to-Container communications. Event-driven publish-subscribe exchanges are carried out between disparate objects within the system.

Non-event-driven data sharing is used in cases in which communications require detailed knowledge of the hierarchy of objects or the need to transfer essentially the entire data of such objects. In order to ensure the successful delivery of these communications, a unique identification system is provided for all objects that will communicate within the system. In one embodiment, each object in the system has a unique global identifier, as described further in this document in the section entitled "Directory Integration—Global Object Identifiers." Using global identifiers and associated mapping tables, container objects for contained objects can be determined.

In an alternative embodiment, a global object identifier is associated only with container objects. The relative position of a contained object within the container object is used as a unique identifier of the contained object. As a result, each contained object is accessed only through its immediate Container. For example, a poll Building Block within a task in a Process Container would have the id: <Process Container ID>_<task index>_<poll BB index>, or alternatively, <Task Container ID>_<poll BB index>, if the Process Container was not needed in order to deliver the message. A benefit of this mechanism is that there could be ACLs applied on a particular Container that may affect access to a contained object.

In one embodiment, a data-sharing communication mechanism is used in order to aggregate data from multiple Building Blocks in order to form a composite view. For example, in the case of a Poll Discussion, the Data Access Component for the poll building block and the discussion building block are joined by a composite Building Block in a particular way in order to show both the poll and discussion data together. In order to join such a composite view, the Container collects multiple Data Access Components from the blocks and delivers them to the Composite Building Blocks.

In one specific embodiment, containers or other objects in the platform implement a DataSharingInterface in order to achieve communication. The interface is defined as:

```
public interface DataSharingInterface {
    public DAC getDataAccessComponent(RelativeID target,
UniqueID requester, UserID user);
}
```

The Data Gathering Service Manager implements a DataGatheringInterface in order to extract the DACs of the objects that a component may want to access. This interface is defined as:

```
private interface DataGatheringInterface {
    public Vector gatherDataAccessComponents(UniqueID
requester, UserID user, UniqueID[] fromList);
}
```

In one example embodiment, the Data Gathering Service Manager loops through each element in the fromList, determines the Container, sends the container to a DataSharingInterface and calls the getDataAccessComponent method with the RelativeID of the specified Blocks. The Container implementing the DataSharingInterface gathers the appropriate DAC from the specified Block. This process allows Building Blocks across Containers to share data, and also allows the sharing object to limit the amount of data that should be sent out to the requester.

1.7 Object Communications—Event-Driven Methods (Event Handling System)

In one embodiment, the system described herein provides an event handling service as represented by event processor 112 of FIG. 1B, and event daemons 216 of event service 146 of FIG. 2B. In this embodiment, one or more event daemons 216 are communicatively coupled to event service 146. The event service 146 is communicatively coupled by link 218 to database server 208. The event daemons serve to offload certain separable functions from the application server 202. For example, in an embodiment, event daemons are responsible for mail event queuing and handling, bounced-mail handling, and generating personalized transportable application content, based on a user's e-mail client profile.

Alternatively, a generic event handling system is provided to enable different components of the system to communicate. In one embodiment, an event handling system enables the system to act when a specific event occurs within a transportable application, act when a specific event does not happen, and facilitates authoring rules to carry out the foregoing. Actions may include generating notifications, generating reminders, forwarding a transportable application, other automated actions, delivering a message to subscribers, etc. In one embodiment, actions may comprise anything that can be carried out programmatically. The event handling system may comprise an object framework, message format and implementation classes.

Figure 17A:
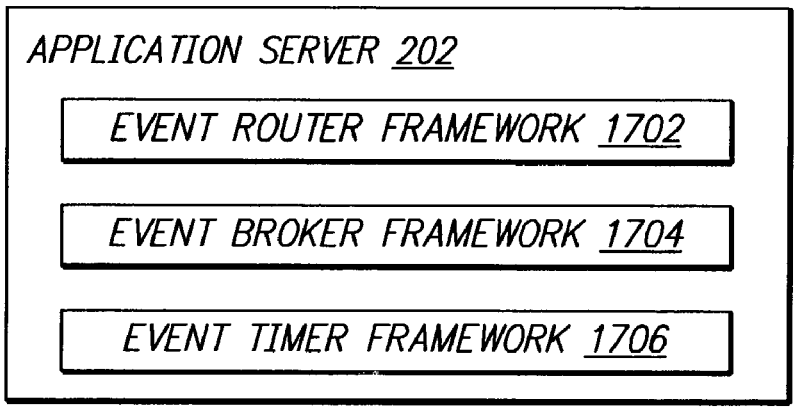
FIG. 17A is a block diagram illustrating elements of an event handling system, in one example embodiment.
Figure 17B:
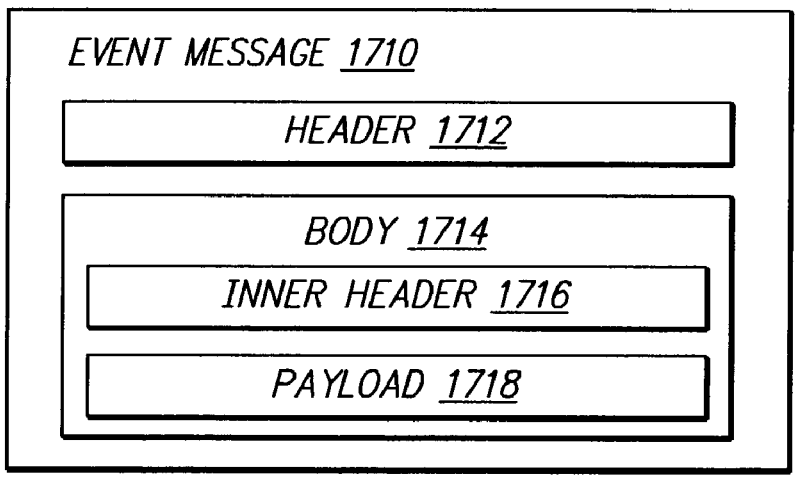
FIG. 17B is a block diagram illustrating elements of an event message.

FIG. 17A is a block diagram illustrating elements of an event handling system, in one example embodiment. FIG. 17B is a block diagram illustrating an event message. Event handling system 1700 is hosted in application server 202 and comprises an event router framework 1702, event broker framework 1704, and event timer framework 1706. Event router framework 1702 performs message routing, selects a transport mechanisms for messages that are sent, and serves as an entry point for other components of the system that need to use events. Examples of transport mechanisms include JMS, HTTP posts, etc. Event broker framework 1704 performs rule evaluation that involves the filtering of event messages and invoking action classes, and can store event messages in a table of database 208. Event timer framework 1706 enables creating event messages at a specified time, for processing time-based rules.

Events are programmatically represented by event messages. In general, event messages contain information about what occurred and the state of objects that relate to the event. Standard events include creating, updating, deleting, and changing the state or status value of a transportable application. For example, an update event for the poll building block may contain the building block identifier, the user name of the person who added a response, the response value, the time and date of the response, the total number of responses, and the total number of recipients. However, each building block may generate any desired events having any desired data or content. Events may be time-based. For example, events are generated or created by invoking particular methods when the prescribed time for an event arrives.

Each building block has a method which, when called by another program element, returns a list of events that it can generate. This enables other program elements to identify and subscribe to events.

In one specific embodiment, each event message comprises a header and a body. The header comprises metadata, and the body comprises information that identifies the container and building block that generated the event, the name of the event, etc. In one specific embodiment, the header comprises a fromDestination value that identifies the originating system; a toDestination value that identifies a destination system for the message; a message type value; a timestamp value that identifies a date and time at which the event occurred; a message action value; and a tracking identifier value. The body encapsulates another header ("inner header") and inner body or payload that contains event-specific data. Events and their data may be defined by an XML schema.

The message type value enables an event message to specify whether it is a system event, application event, etc. Examples of system events including replication events, system administration events, initialization events, etc. Application events may be events generated by transportable applications, connectors, groups, etc. Each event type has a corresponding schema that defines the elements of the inner header and payload for that event type.

Event messages may be persistent. Persistent event messages are stored in an event table in the database 208. Events can be made persistent by programmatically setting a "Persist" flag in the event message header. Alternatively, the event type definition may specify that all event messages of that type are persistent.

In one embodiment, containers generate events that are published to the event handling system. The event handling system applies rules to determine whether received events should result in an action. If the rules are satisfied by the events or other data, then actions result.

Rules may be associated with building blocks or containers. Rules may be saved in association with a template of a transportable application.

Rules may be subject to author control or participant control. In rules with author control, only users who are authors of a transportable application template can modify or deactivate the rules. In rules with participant control, any participant who receives a transportable application that is instantiated from a template having the rule can modify the rule.

Rules may be designated as active or inactive. Active rules are visible within a template of a transportable application and within an active transportable application.

Each rule comprises an association with one event through a coarse-grain filter, a fine-grain filter that has one or more conditions, zero or more constants, one or more actions or handler. Rule constants can comprise a static string or may be defined as reusable expressions.

Rule conditions may be created as coarse-grain filters or fine-grain filters. Coarse-grain filters determine whether a particular event message maps to or is associated with a pertinent set of rules for the event. Thus, coarse-grain filters carry out filtering only on a header portion of an event message. Coarse-grain filters support, for example, static strings or wildcards for filtering events based on header elements. An example of a coarse-grain filter is, "EventType=createResponseVoteRequest". This filter would pass only event messages that result from an end user issuing a vote in a poll building block. The coarse-grain filter "SenderID=1222" would pass only event messages created as a result of actions by a specific user (user "1222").

A fine-grain filter is a filter that contains conditions used to decide whether an associated action should be fired or not for a particular rule; the action is invoked only if all conditions in the filter are satisfied. Conditions in a fine-grain filter may be applied against any data in a message or against dynamically retrieved data. Fine-grain filters generally are defined by a custom class that implements an interface, or specific programmatic expressions that invoke methods. In one embodiment, fine-grained filters are defined as Xpath statements according to the format specified in the document "xpath.html" that is available at this writing in the "TR" folder of the "www.w3.org" directory and domain on the Internet. An example of an Xpath statement is "/message/body/poll/currentCotnt/text( )>5," which states that the value of the variable "currentCount" of the text( ) method of the poll building block shall be greater than "5".

Actions are implemented as handler classes that can invoke any programmatic method or routine. In general, the handler classes are implemented within a building block that generates the events that include the actions associated with the handler classes. In one embodiment, during rule editing, a rule author may select one of a plurality of standard actions that are provided by a graphical rule editor. Alternatively, custom actions can be created by preparing appropriate program code that is uploaded to application server 202 and registered with the event handling system. Examples of standard actions include: system action for notification; system action for closing a transportable application; system action for unclosing a transportable application; system action for updating a status field of a transportable application; system action for creating a new page or transportable application based on a saved template; system action to change a role for a particular user for a particular page; system action to rename a page; system action to show a page; system action to hide a page; system action to open a page; system action to close a page.

Rules may be defined in XML format and attached to a building block, a page, or to a template for a transportable application. In one embodiment, rules may be created using a graphical Rules Editor, which is accessible from the transportable application editor described herein, when building blocks, pages, or templates for transportable applications are authored. The Rules Editor is also accessible from within a transportable application that has been opened. Rule editing involves selecting a condition template from a scope of available condition templates, providing values for variables in the condition template, and selecting result actions. Rule editing may be carried out at any time during the lifecycle of a transportable application template or instance.

Rules may be evaluated or "fire" one or more times.

In one specific embodiment, to carry out event-driven messaging, containers for transportable applications or groups implement an EventHandler interface 340 of FIG. 3. In one embodiment, the EventHandler interface is defined as:

```
public interface EventListener {
    public void handleEvent(Message msg);
}
```

For containers of transportable applications in order to react to create, respond, and edit events, and for GroupContainers to add, modify and delete members, and for FolderContainers to add, modify or delete files, the following event handling process is carried out. First, the appropriate event is passed to an EventManager that forwards the event to a particular ActionManager for the specific type of event, for example, a ResponseActionManager. The ActionManager then calls a handleEvent method on the appropriate EventListener. In these cases it is clear which object is intended to act on this event. Accordingly, to require each container to subscribe to its create, respond, and edit events is superfluous and therefore point-to-point messaging may be used as an alternative. In point-to-point messaging, the ResponseActionManager calls the handleResponseEvent, making the Container design easier.

For general event handling when Building Blocks are generating information useful for other Building Blocks, a publish-subscribe model is used, in which objects subscribe to certain events from the EventManager. Subscribers implement the EventListener interface and handle the appropriate event.

Details of an embodiment of an event processing system are now provided. In one embodiment, an event processing system comprises tables in a database that are configured according to the database design and schema described herein, and programmatic objects that implement functions of the API described herein.

In general, in one approach, an Event Message may be published on many occasions, which identify the type of the message. Every Message object has a specific message type value ("MsgType") associated with it. The specific message type will trigger the proper action, associated with the message type. In one specific approach, message type values are omitted, and each message provides attributes as name/value pairs that are accessible in a global memory space.

In one embodiment, a database schema that supports message processing comprises an attribute table and message table. The attribute table may have the following structure:

| Field Name | Field Description | Required | Key | Type |
|---|---|---|---|---|
| MSGID | Id of the Message | Yes | Yes | NUMBER(19) |
| ATTRNAME | Name of the Attribute | Yes | Yes | VARCHAR(64) |
| ATTRVALUE | Value of the Attribute | | | VARCHAR(1024) |
| ATTRTYPE | Type of the Attribute | Yes | | VARCHAR(16) |

The MSGID and ATTRNAME fields are included in the primary key. The ATTRTYPE field is used to store information about internal type of the attribute on the app server side. This information is used to transfer the value of the attribute to the required type.

The message table may have the following structure:

| Field Name | Field Description | Required | Key | Type |
|---|---|---|---|---|
| MSGID | Id of the Message | Yes | Yes | NUMBER(19) |
| MSGTYPE | Type of the Message | Yes | | VARCHAR(64) |
| OBJID | Id of the Object | Yes | | NUMBER(19) |
| OBJTYPE | Type of the Object | Yes | | NUMBER(3) |
| SENDERID | Id of the sender, who posted the message | | | NUMBER(19) |
| SENDERTYPE | Type of the Sender, which posted the message (user, group, etc.) | | | NUMBER(3) |
| MSGTIME | Time when message was created | Yes | | DATE |
| STATUS | Status of the Message | Yes | | NUMBER(3) |
| EXPTIME | Expiration time of this message | Yes | | DATE |

The MSGID field is the primary key. An index is created on the combined OBJID and OBJTYPE fields. The STATUS field represents an internal parameter and is hidden from the API. The STATUS field stores the result of database transaction and processing of the event.

An example class structure that implements an appropriate API is set forth in APPENDIX 1.

FIG. 17C is a flow diagram of a process of evaluating and acting on an event message. In block 1720, a transportable application type message is created. In general, block 1720 is carried out by a container object.

In block 1722, the event handling system determines how to route the event message. For example, in block 1724, the event handling system determines whether the event is synchronous or asynchronous. If the event is synchronous, then it is sent to a message broker 1734 that is defined by the event broker framework 1704.

Message broker 1734 determines whether the event is persistent, as shown by block 1736. If so, then control passes to block 1738 in which the event is stored in the database or otherwise made persistent. Thereafter, and if the event is determined as not persistent at block 1736, control is passed to block 1740, in which one or more coarse-grain filters are located. The filters are selected based on the message type, and applied to the event message.

If the event message matches one of the coarse-grain filters, then in block 1742, one or more rules with fine-grain filters are retrieved. Rule constants are extracted from the rules in block 1746. In block 1748, the fine-grain filters are applied to the event message. If a match occurs, then in block 1744, the associated action is performed.

Referring again to block 1724, if the event message is asynchronous, then control passes to block 1726 in which the event message is dispatched using a transport mechanism. The event message is sent over a durable or non-durable topic, as appropriate, as shown by block 1728, 1730, 1732. Thereafter, the event message is processed at the message broker, as shown by block 1734, in the manner described above. Concurrently, a notification message is received at block 1750, and in response a notification is sent to the end user, at block 1752.

1.8 Object Communications—External Systems 1.8.1 Enterprise Application Integration Using Connectors According to one embodiment, mechanisms for enterprise application integration, using connectors, are provided to enable the system to connect to existing ("legacy") applications of an enterprise that uses the system. The mechanism for connectivity may use a synchronous or an asynchronous approach. In a synchronous approach the client makes a request and waits for a response before it proceeds. Synchronous approaches can use HTTP, HTTPS, RMI, CORBA. Asynchronous approaches do not have this limitation and typically use asynchronous messaging implementations.

FIG. 18A is a block diagram of a first enterprise application integration approach that uses an asynchronous approach.

Application server 202 and other servers 1802 that comprise the transportable application system as described herein are communicatively coupled using JMS 214 to an adapter 1804. The adapter 1804 is communicatively coupled to an existing asynchronous Enterprise Application Integration (EAI) bus 1806. Commercially available examples of EAI bus 1806 are produced by Vitria, TIBCO, IBM, WebMethods/Active, etc. The bus 1806 is communicatively coupled through one or more connectors 1808A, 1808B, 1808C to corresponding legacy applications in the form of an enterprise application 1810, Web server 1812, mainframe 1814, etc. In this example, adapter 1804, EAI bus 1806, and connectors 1808A, 1808B, 1808C are compatible and generally are provided by one of the foregoing vendors.

FIG. 18B is a block diagram of the system of FIG. 18A wherein a custom connector is used. The custom connector 1818 is substituted for JMS 214 and adapter 1804. In this configuration, an asynchronous solution is provided and use of JMS is not required. As a result, a particular JMS implementation is not required. The custom connector 1818 may be created and implemented, for example, using a software development kit (SDK) from the party that supplies the EAI bus 1806.

Figure 18C:
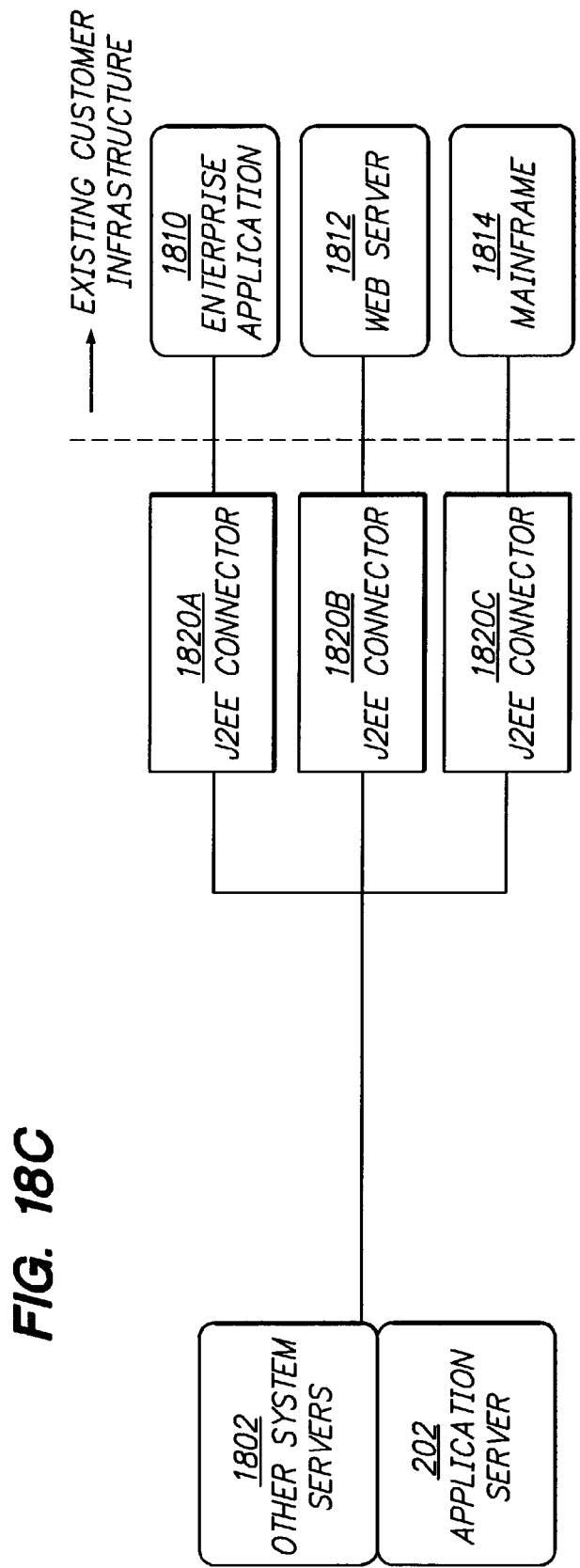
FIG. 18C is a block diagram of an application-server centric integration approach for providing a synchronous integration solution.

FIG. 18C is a block diagram of an application-server centric integration approach for providing a synchronous integration solution. In this approach, servers 202, 1802 are communicatively coupled through one or more Java 2 Enterprise Edition (J2EE) connectors 1820A, 1820B, 1820C to corresponding applications 1810, 1812, 1814. J2EE connectors, as defined by Sun Microsystems, provide a standard architecture for connecting Java 2 systems and applications to legacy information systems. Application 1810 may be Siebel, SAP, PeopleSoft, etc., or any other external application.

Alternatively, in FIG. 18C a Java Connector Architecture (JCA) construct may be used as connectors 1820A, 1820B, 1820C. There may be multiple instances of a connector for each external application.

Figure 18D:
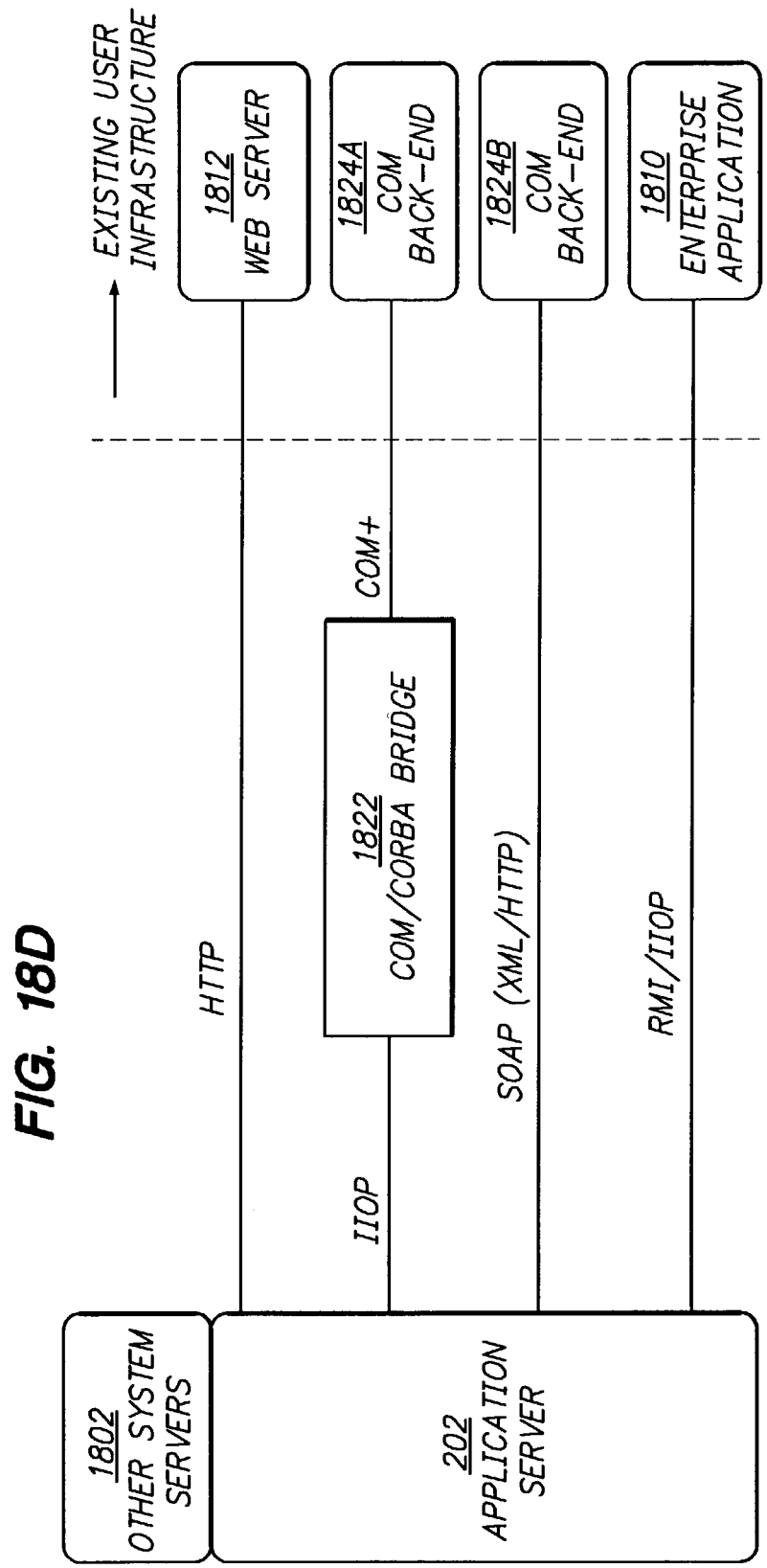
FIG. 18D is a block diagram of an enterprise application integration approach that provides synchronous integration through one or more synchronous protocols.

FIG. 18D is a block diagram of an enterprise application integration approach that provides synchronous integration through one or more synchronous protocols. The servers 202, 1802 are communicatively coupled to the legacy systems through the synchronous protocols. Examples of such synchronous protocols include HTTP, RMI, CORBA, SOAP, etc. In the case of CORBA, a bridge 1822 may be used to convert CORBA messages and objects to Common Object Model (COM) format.

Figure 18E:
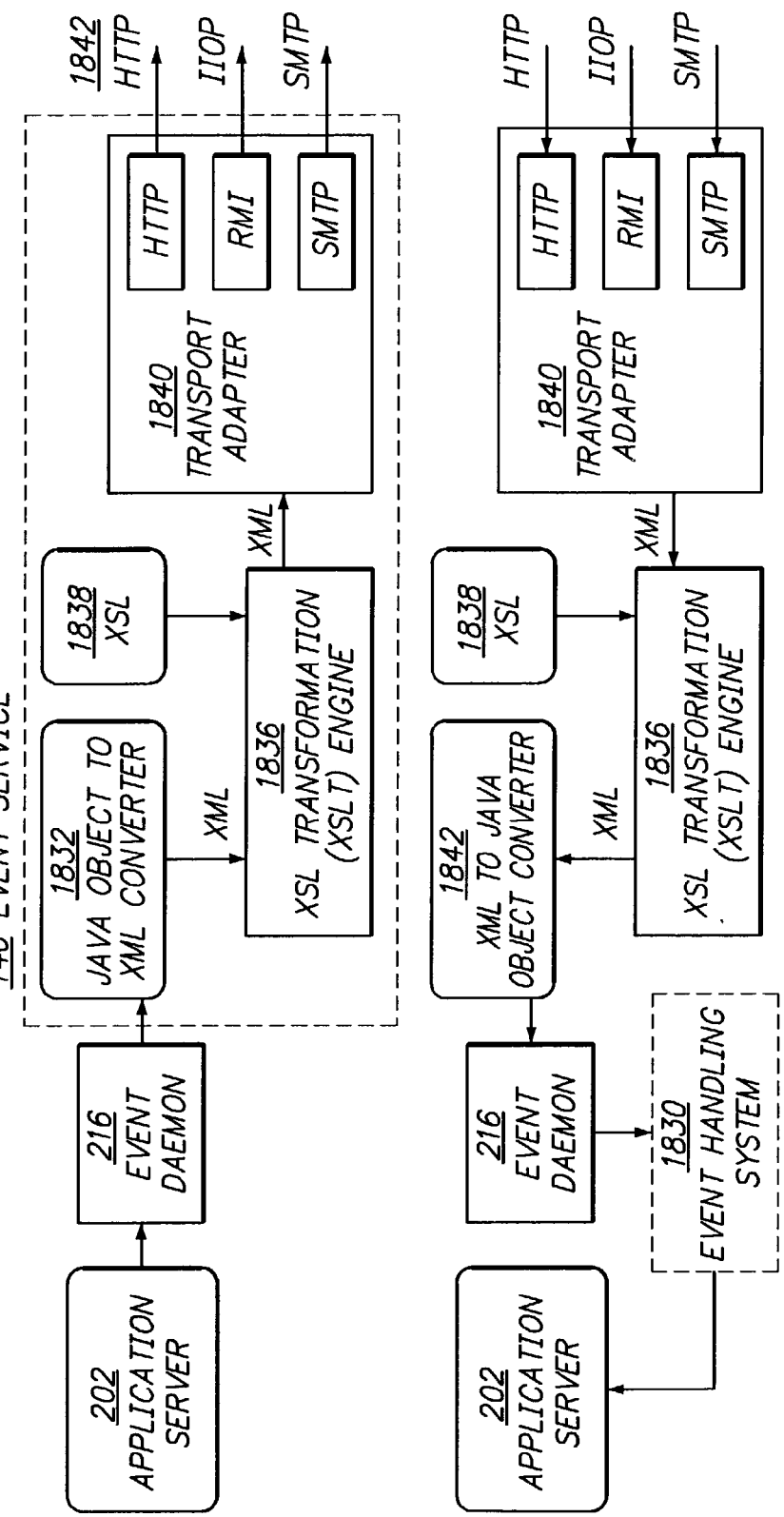
FIG. 18E is a block diagram of an enterprise application integration approach that uses event-based communication.

FIG. 18E is a block diagram of an enterprise application integration approach that uses event-based communication. Application server communicates through event daemon 216 to event service 146. Within or in association with event service 146, incoming event messages are passed to a Java object to XML converter 1832, yielding an XML representation of the information in the daemons. The SML information is transformed using engine 1836, with input from an XSL stylesheet 1838, to yield transportable XML information. The transportable XML information is passed to transport adapter 1840, which outputs the XML information using one or more synchronous protocols 1842. The synchronous protocols communicate with the legacy systems as in FIG. 18D.

In operation, in one specific embodiment, as illustrated in the top half of FIG. 18E, the application server 202 uses JMS point-to-point mode to generate events and communicate them to event daemon 216. When the event daemon 216 processes an event, event service 146 instantiates a Java object and uses converter 1832 to transform the Java object into an XML string. It then uses this XML, transformation engine 1836, and an XSL stylesheet 1838 associated with the Java object to output the expected XML schema for a receiving partner system. The method of transport for the XML can be HTTP, IIOP, or SMTP.

Referring now to the bottom half of FIG. 18E, the reverse occurs when an XML message arrives from a partner system. For example assume that the transport mechanism is HTTP. A servlet is invoked and uses transformation engine 1836 and the corresponding XSL 1838 for that XML message to convert it to an XML representation that is expected by application server 202. An XML to Java object converter 1842 is then used to instantiate a corresponding Java object for the event daemon 216. The object is encapsulated as an event message. An event handler for that object is then invoked from event handling system 1830 when the event daemon processes the event. Each XML message must have its own object representation, XSL, and event handler.

This arrangement has the advantage that XML messaging is becoming the method of choice for inter-operability between business-to-business systems that exchange data. Application-server vendors are coming out with their own XML-based messaging systems for such exchanges, e.g., WebLogic's Collaborate.

In the approaches of FIG. 18B, FIG. 18C, the disclosed connectors generally act as gateways for external applications to create, retrieve, update and delete application business objects of the system through an object interface mechanism. The connectors also receive notifications for changes to such objects through the event management system and notification system, or by polling. The connectors also enable application server 202 and other components of the system to retrieve and update data from external applications. In one specific embodiment, the connectors enable objects associated with building blocks to retrieve and update objects that are hosted in external applications or systems.

FIG. 18F is a block diagram of providing another embodiment of an enterprise application integration approach. One or more enterprise applications 1810A, 1810B, 1810C are communicatively coupled to JMS queues 214 either directly, as in the case of application 1810A, or indirectly through an EAI bus 1806, as in the case of applications 1810B, 1810C. The direct connected application 1810A has an adaptor 1840B that can queue objects to the JMS queues 214, for receipt by a corresponding proxy adaptor 1840A of a connector framework 1854. EAI bus 1806 has a similar corresponding adapter 1841B and proxy adaptor 1841A.

Adaptor 1841B and proxy adaptor 1841A may be configured to operate with any desired EAI bus 1806 or similar product, e.g., webMethods, Vitria, SeeBeyond, etc.

Connector framework 1854 communicates through an API 1852 to connector building blocks 1850, which may be included in a transportable application to give that application the ability to communicate with enterprise applications. The API 1852 may provide create, read, update and delete functions for business objects and transportable application objects. Such operations are subjected to access controls as described herein. In one embodiment, notifications and event rules can be set on connector building blocks 1850 to enable taking actions or creating other transportable applications when the connector building blocks change or generate events. A generic connector building block provides an XSL translation function equivalent to XSL transformation engine 1836 of FIG. 18E, and can display connector data. One or more Extensible Style Documents (XSDs) describe the business objects of the enterprise applications in a manner equivalent to XSL 1838.

Thus, the integration framework as described herein provides both direct integration and integration through an existing EAI bus. As a result, adapters can be constructed without platform changes. Both outbound and inbound operations are supported. The framework provides the ability to programmatically create transportable applications and add pages from enterprise systems. Business objects are described in XSD's rather than in source code. Adapter configuration information is described in XML. Asynchronous messages, through the JMS queues, are used for communication with enterprise applications or an EAI bus.

A building block can synchronously query an enterprise application adapter for all business objects matching given criteria. The building block can synchronously request data for a business object from the external system if the data is not found in the cache. Further, an enterprise application can request the system to create a transportable application using external data. The enterprise application can send a notification that a business object has changed, causing the system to update the cache.

An advantage of using this approach is that the building blocks in general will not need to store such objects persistently since the building blocks may retrieve a copy of the external data, at any time, through the connectors, with less impact on performance than if persistent storage is used.

Connectors as disclosed herein may conform to any appropriate communication mechanism for external business objects. For example, the protocols proposed by BizTalk.org, RoseltaNet, EBXML, etc., may be used.

In one specific implementation, connectors are implemented in one or more programmatic classes that conform to the following API description:

Connector class. Building blocks can retrieve any external business object as an instance of a connector business object class. The connector business object class provides methods to produce an XML representation of the object, modify the object, etc. Building blocks can use XSL stylesheets to present the business objects through generic HTML presenters or use custom presenters. The business objects may be implemented as cached data access objects.

Subscribe method. Registers a subscription for a business object for later use. Receives, as parameters, a name of a business object, and one or more name/value pairs that identify an instance of the business object. Returns a key to identify the subscribed object; the key, which may be persistently stored, is passed to all other methods of the connector class.

GetBizObject method. Retrieves a business object. Receives, as parameters, a name of a business object and a key value. Returns the requested instance of the object.

unSubscribe method. Drops a subscription to a business object. Receives a name of the business object and the key value.

A Connector Business Object class provides a base class for all business objects, and defines a getXMLString method, setXMLField method, update method, and registerNotification method. The getXMLString method returns an XML string method of a named business object. The setXMLField method sets the XML field in a business object based on a field name and a value for the field. The update method stores all changes made to the business object through the setXMLField method.

The registerNotification method registers a rule with the event handling system. It receives, as parameters, an array of fine-grain filters that comprise Xpath expressions, and an action to invoke when the filters are satisfied. The rule registered with the event handling system is created using the specified list of fine-grain filters and the type of event message that is generated by the connector system when the business object changes.

1.9 Security Processes; Access Control

In one embodiment, a security framework is provided having a plurality of security services and interface definitions. The security framework enables an end user to configure and define security features to use when authenticating users and authorizing them to access data. Thus, in this context, security and access control refer both to authenticating users for access to the system as a whole, as well as verifying that a particular authenticated user is authorized to retrieve or modify specific data in the database.

The security framework also enables one user to develop transportable applications with another party and have some of the data to be shared amongst the users associated with that party. The security framework comprises a plurality of interfaces, each of which providing a contractual set of features and responsibilities to the consumers of the interface.

In one embodiment, the security framework is implemented using access control service 136 and security service 120. Access control processes applicable to the embodiments described herein are described in co-pending application Ser. No. 09/861,008, filed May 17, 2001, the entire contents of which are hereby incorporated by reference as if fully disclosed herein.

A GateKeeper interface provides a data consumer with the ability to retrieve and configure information that defines relationships among security domains. This interface provides information about the hosting domain and other domains that have a trusted relationship with this domain. Also, specific users can be managed through this interface so that only specific individuals within an organization have access to data within a hosting organization.

A PortalGate interface provides a consumer with the ability to authenticate a user using a username and password, SSL, PKI, etc. Further, the interface provides the consumer with the ability to query whether a user is still valid, for example, by checking to see if a user is still valid and has not been revoked. The interface also enables another program element to query whether a user has access to a specific data object or object instance.

An Access Control (AssetGuardian) management interface defines one or more contracts between a consumer and an entitlements database. An entitlements database stores information about users and what they have access to. In one embodiment, the entitlements database is maintained separate from database 208 of FIG. 2A, to improve security of the entitlements database.

A Security Provider interface provides components to control end-to-end security. In one embodiment, a PKI enabler interface and an authorization interface each has an implementation that can be defined by configuration where each implementation represents a way to access a PKI or an authorization scheme. Each of these implementations can be loaded simultaneously so that one or more schemes can be used at the same time.

Programmatic classes within the security framework are configured to provide security against intrusion. For example, the classes are typed as final to prevent a hacker from providing implementations to an abstract class or extend and override a non-final class with dangerous or risky code. Therefore, the security framework has its own interfaces and extends other trusted interfaces in packages that are trusted, e.g., the java.security package available from Sun Microsystems.

The data that the framework manages is composed of hierarchies of assets. Assets are defined as objects that exist in a department or an enterprise that need to be protected. For example, assets include transportable applications, pages, building blocks, and objects that encapsulate field data values for any of the foregoing. Each asset in a hierarchy can have permission assigned to it on behalf of a user. The mechanism by which an asset has a user and permission composed for it is termed a security label. Since each asset in a hierarchy can have its own label and levels of access can be applied across a hierarchy, the labels are termed multilevel. Therefore, the security framework is a multi-level security label system.

Contracts within the Security Framework may be defined using the Interface Definition Language (IDL). IDL enables a framework to expose its interfaces and contract data as well as error handling capabilities. In one embodiment, types of IDL syntax that are used in the framework include IDL Exceptions, Structs, and Interfaces. IDL Exceptions are defined so that generated Java source, or any other language that has an IDL binding, will have error handling capabilities defined at the package level. IDL structures are compiled into Java objects, which are typed as final. The security framework composes the contract objects in its model package. The framework model package defines the objects that are used in communications or invocation of interfaces' methods. IDL Interfaces contain the methods that can be invoked as well as the error-handling signature, which completely defines the contract of the interface.

One important benefit to using IDL is that most application and transaction servers use IDL as a way to initially introduce interfaces and implementations into the container. Another benefit is that the IDL to Java conversion process produces client and server side stubs and skeletons so that an end to end implementation is more easily created.

The Gatekeeper interface contract states that of the security configuration for a given security domain, which is determined at the organizational level, all parameters that allow security integration across multiple domains can be retrieved. The interface, for example, supports the retrieval of the CrossDomainList, which is a list of X.500 distinguished names ("DNs") representing external organizations that have a trusted relationship with this domain. Additionally, CrossDomainDN is a list interface list of all the users (by the DN) who have trusted access to this domain. If this list is null then normal authentication mechanisms are used to determine if a user has access to this domain. If it is not then the intention of this managed list is to provide the users who can access this domain. When the user DN is determined then it can be cross-referenced to the list. If the user DN is not present then the user's authentication must fail whether they can authenticate properly or not. A commercial example of an authentication system that may be used is WebLogic.

An important contract of this interface is the management of the domain and whether it is a secure domain or not. The getMode( ) method informs the consumer of the method if the domain represented by the interface is secure or not. In fact the value returned is not a Boolean but a string, which contains definite values of "Secure", "Not Secure", and options text for any granularity in between. In this way a security administrator can define as many security levels as they require.

The PortalGate Interface provides the system with a trusted path. When a user authenticates to the security framework, by one of a variety of mechanisms, a session is established specifically for that user. Because IDL has been used to define the contract of the interface the session trusted path can be managed in an ORB, Application server, or transaction server container. Invoking a method in this interface checks operation that are attempted after the user authenticates.

In one embodiment, four types of authentication mechanisms are provided. PKI verification provides the framework with the ability to participate in a single sign on arrangement with a PKI environment. To invoke such verification, an object or method passes the name of the user, a digitally signed version of their name, and the symbol PKI_VERIFICATION as parameter values. SSL-only verification is like weak verification, discussed below, in that the user name and password are passed as parameters. It simply informs the framework that an SSL connection is being used to send information to and from the interface. Certificate-based SSL verification is like PKI verification in that the name of the user is passed in one parameter and their SSL certificate is passed in another parameter. The certificate is then validated with the CA of the SSL certificate (either Verisign, Cylink, or Entrust). Weak verification passes a name and password as parameters and provides relatively low security.

Each data parameter is provided as a mutable type, e.g., a byte array, so that the data within it can be deleted once it is used. A checkVerification( ) method returns true if the user is still authenticated and has not been revoked from the environment. A first checkGuard( ) method checks to see if the user has access to a specific asset (either at the type level or the instance level) given a specific permission. A second checkGuard( ) is the same as the first except that the variable parameter allows the framework to accept extra data to further scrutinize the access check. For example, an application component may want to verify that a user not only has read permission to sales data but that they only have access to the Northeast sales region and not any other. In this case the application component can pass a value that is effectively a SQL where clause or an XML document which describes the SQL where clause. A getName( ) method returns the authenticated users DN. This can be used for further checking or for personalization purposes.

For purposes of facilitating use of the AssetGuardian interface, all assets within the framework are contained within an organizational hierarchy. The framework composes and manages organization objects as X.500 organization objects. Within the organizational definitions there are users, roles, permissions, security labels, and security preferences. The entire framework also has an audit trail, which is not bound, at an organizational level.

Based upon organizational hierarchy roles, permissions, resultant security labels, preferences, and assets exist at nodes within the tree. Assets themselves are hierarchical structures in that they can represent complex types (such as containers, databases, database tables, etc.). Each asset can have its own security label and each label can be assigned a level. The security framework provides a LabelComparator interface and implementation that provides for the interpretation of the level of a security label as it is a applied to one or more assets.

The security provider interface allows the framework to dynamically load an implementation that supports a Public Key Infrastructure vendor. PKI vendors support encryption, decryption, digital signature, and signature verification. They also provide key management, certificate issuance and management, as well as user authentication for single sign on.

The interface supports S/MIME and non-S/MIME security operations as well as the management of security recipients. Recipients in a security context are those persons who have a public X.509 encryption certificate and can have data of any sort encrypted specifically for them, Operational the interface and its implementation manage a stack of recipients, which is pushed before an operation occurs. When recipients are defined they can have data encrypted for them. In the case of a signing operation the user who has a connection to the PKI and managed through the connect method in this interface has their private signing certificate used.

To apply access controls to transportable applications, in one specific embodiment, the following processes are used. A transportable application is created as otherwise described in this document. The transportable application is defined as an asset having an asset identifier that is obtained by calling a method of the java.security package. One or more access control definitions (or "labels") are created by the author using the "makeAccessControlLabelModel( )" method of the java.security package. Each access control definition identifies read, write, and update permissions. Each recipient has his or her own access control definition that defines one or more limited permissions. Thus, the intersection of the transportable application access control definition and the recipient access control definition indicates whether a particular recipient can access an application.

At the time a recipient attempts to open or read a transportable application that is secured, the recipient is first prompted to log in to the system. The access control labels are checked to identify the recipient's individualized permissions. In one embodiment, a checkAsset method of the Asset Guardian interface is used. Access is denied when permission is not allowed.

Access controls specifically applicable to database access are now described. In general, in one embodiment, access to database 208 is restricted and is based on the role-based permissions provided by the security framework for different object types. A Java class encapsulates information needed to carry out an access control request or verification, including session identifier, user name, action type, and object type. This information is used when calling an authentication API of the security framework.

Further, classes and methods responsible for access to containers and folders, database queries or row selections, inserts, updates, and deletions are configured to carry out access control verification on the objects that are the subject of such operations, before carrying out such operations. Carrying out access control verification refers to calling a method of the security framework that can determine whether a particular user is authorized to access a particular named object or asset. Each such class and method is provided with methods that can check for access authorization and generate exceptions if access is denied.

In conjunction with access control each asset can have encryption and digital signature attributes applied so that transactions based against the asset can be encrypted and or digitally signed. For example, when a user is interacting with a transportable application, each time that a client 120 generates a network request that includes data for a field of a building block, the client can digitally sign the request. Upon receiving the request, application server 202 can verify the signature before the request is processed. In one embodiment, each HTTP request that is generated by a client and that includes field data relating to a transportable application, page or building block is digitally signed. Each HTTP request that is received at an application server 202 is checked to determine if the request contains a digital signature. If so, the digital signature is extracted from the request and verified. If verification is successful, the request is redirected to a service routine, i.e., processed normally by the application server. In one alternative, information collected in the extraction process may be logged or stored in an audit trail.

Extracting digital signatures from an HTTP request stream may be implemented using software systems that are commercially available from PrivateWire. Verifying digital signatures that have been extracted may be implemented using software systems that are commercially available from Entrust, Inc.

Access controls may be modified as a result of events that are processed using the event handling system described herein. For example, an action associated with an event may be to modify an access control of a transportable application to become either broader or stricter in some way, or to enable a new recipient to have access to the transportable application.

In one embodiment, instance-scoped role-based access control is provided for transportable application. Such control is "instance-scoped" because access controls are determined and can be defined uniquely for each user for each instance of a transportable application. Such a mechanism provides much more detailed access control, as compared to class-scoped access control using J2EE mechanisms, which provides only method-level checking per user per transportable application class. In one embodiment, when a transportable application is authored, or after the transportable application becomes active, an author can add, modify or delete users from access controls specified for the transportable application and pages within the transportable application.

Access to JSPs and servlets in the system is controlled through membership of users in roles. Roles may be "page-scoped," that is, defined at the page level within transportable application. Thus, access to instances of assets such as building blocks and associated rule descriptors are determined based on the role that a user is assigned to for the page instance on which the building block and rule descriptor instances are created.

In another embodiment, directory auto-registration is provided. When the system has been configured with knowledge of the existence and location of a directory server, a user may log in to the system using a user name, password or other credentials that are stored in the directory server. After locating such credentials in the directory server at the time of the user's first login, the system automatically registers those credentials in database 208. Thereafter, the user can log in to the system without reference to the directory server. In another feature, bulk user registration may be carried out by an administrator, by loading a formatted file that contains the user information. Self-registration is also facilitated.

1.9.1 Cluster-Specific Encryption and Request Routing

In one embodiment, all message identifiers that are sent from the system to a client are encrypted. In another embodiment, the encryption process associates each message identifier with a processor cluster or database cluster that is responsible for processing the message. Using such a process, a message identifier in a URL that is meant for one cluster cannot be processed by another cluster. This is beneficial in the event that a malicious user redirects the URL toward another cluster, e.g., by changing the URL to point to the new cluster and keeping the same arguments, and the URL and the message it carries are decrypted at the destination. In one encryption approach, a database identifier or cluster identifier is embedded in the message in order to provide more security.

In one past approach, the format for a message ID is <prefix>_<encrypted message id>, where "prefix" is a number that determines the seed for the TwoFish encryption algorithm. In one sub-approach, the seed value may be hard-coded in program source code for the functions that carry out the encryption process. A disadvantage of this approach is that such code is installed on all client installations, so that all clients use the same seed, or each new client installation will need a new software release. Moreover, a message destined for one client could be redirected to another client's cluster, and because the system decrypts all messages that are received by the cluster a security vulnerability exists. In this context, a "client installation" refers to a particular instance of system 200 that is licensed to or used by an enterprise, organization or similar entity.

Therefore, in another approach, different seeds are used for encryption for different client installations, and each incoming message is checked to see if it is meant for the cluster. If not, it is discarded. Each client is assigned a database ID, which is unique. A global identifier replaces the message ID.

Further, in an improved approach, each client uses a different seed that is determined by the database ID of the cluster and is derived from a base seed by addition of the database ID to the base seed. Since the seed consists of 16 bytes, a long time interval must elapse before any two clients can get the same seed.

The prefix in the message contains the database ID. The database ID is also present in the encrypted message ID in encrypted form. Thus, if a malicious user attempts to change the database ID to another cluster in the hope that it would be a valid URL, it is most unlikely that the decrypted message will resolve to a valid global identifier. Even if it does, the database ID component is highly unlikely to match the prefix, and therefore the system would discard the message if the two do not match.

In this approach, all incoming messages pass through a sanity check mechanism wherein the system initially compares the prefix of the message with the database ID of the originating client installation. If they do not match the message is discarded. If they match, the message identifier is decrypted. The message identifier is a global identifier, and since the global identifier contains the database identifier, the database identifier is compared to the prefix and if they do not match, the message is discarded.

In another feature of this approach, to accommodate changes in the encryption algorithm or methodology itself, a version value is associated with each specific encryption methodology. Each client may use its own encryption algorithm, and the encryption version value is part of the prefix. In one embodiment, the format for the new prefix is EV:DBId, where "EV" designates the encryption version and "DBID" is the database identifier value. The prefix may be transformed, e.g., by bit shifting, so that the component values EV and DBID are not easily visible.

1.9.2 Sharing Transportable Application Data Among Multiple Sites

In one embodiment, the system described herein is a distributed system in which multiple particular installations of the system can share transportable applications and associated data. For example, different companies could each set up the system and collaborate by sharing transportable applications and associated data.

In general, transportable application data is replicated at each of the participating sites or installations, enabling the user to receive a consolidated view of interaction with all sites. A user logs in to a portal home page and receives a view of all transportable applications directed to that user, from any originating system. Each transportable application is authored and updated only at one site. All portal operations are performed on the home site of the user. Portal operations include viewing group lists, group archives, and folder; and performing administrative functions such as assigning transportable applications to folders. Operations other than portal operations are performed on the home site of the respective object. Users can author transportable applications at any site.

Trust relationships are established among sites that participate in replication, using elements of the security framework described herein. Each user is designated to have a home site and all users are denoted as local or remote for a particular site. Data for a particular user is always replicated at the home site, enabling the user to obtain a consolidated, global view of all activity at the home site at all times. Accordingly, a user may log in once to a home site and need not log in multiple times to different sites or clusters.

In operation, a user logs in to the system. The user is transparently redirected to an application server 202 at a site that has home information about the user. At the home site, the user is presented with a personalized portal view appropriate for the user. The Personal Messages page and Group Archive pages present a list of all transportable applications involving the user, including those that are remotely located.

When a link of a particular transportable application is selected, the user is re-directed to the appropriate site, and information from that site is displayed in a new window. Authentication to the new site is carried out by passing a digital certificate with the user's security credentials to the new site, using the security framework, so that multiple logins are not required. If the selected transportable application is remotely located, the user can view and respond to it. The remote site recognizes that the user is a remote user and configures links for buttons in the user interface to reference the user home site. For example, the New Message link identifies a URL in the home site rather than the remote site.

A user may also author a new transportable application based on a template that is owned by a remotely located group. When such a template is selected, a new window is opened from the remote site and the user is re-directed to the remote home location of the group that owns the template. The new transportable application is authored at the remote site, i.e., its data is stored at a database of the remote site.

All folders of the user and all administrative tasks relating to the folders are carried out at the user's home site server.

Redirection, for the foregoing processes, is achieved by determining a URL of the remote site to which redirection is occurring. Accordingly, all sites that are cooperating as described above provide access to one another through a private TCP port in their firewalls, or through a security mechanism of the security framework.

The replicated data includes certain metadata about all transportable applications and groups that relate to the user. For example, for transportable applications that involve a user and are remotely stored, a local or home site receives metadata including subject, status, author name, updated timestamps, timestamp for the last time the user read the transportable application, message attributes, etc., Such information is retrieved from rows in a transportable application table of a database of the remote site. Metadata about groups is also replicated, including group hierarchy and membership data, group folders and content data, etc.

In one embodiment, objects that are replicated across sites, or across clusters of servers at a collocated location that implement different sites, implement a Replicatable interface. A replication manager receives a Replicatable interface as an argument and transports it to one or more sites that need the object. The Replicatable interface includes an export data method, apply data method, and methods to retrieve header information for messages to be sent. The export data method outputs an array of replication data objects, each corresponding to a single destination site. Each replication data object serves as a container for the transport of objects across sites and encapsulates state and type information.

The export data method is used at the home or master site of a replication event to export a version of the state of an object for reconstruction on a remote site. The apply data method is used by an empty Replicatable object to import a state from the input object. This allows a Replicatable object to be reconstructed on a remote site of a replication transaction with the state tailored to that remote site. A replication status object may be used to provide acknowledgment of replication messages. Replication is carried out as data is updated. Sites communicate using XML messages that are sent over HTTPS.

1.10 System Administration Processes

System administration processes may include a reporting function that presents information that analyzes interaction of recipients with transportable applications. Such statistical data may be retrieved by or available to a server administrator, authors of transportable applications, etc.

1.11 Using Transportable Applications in Business Processes and Workflow

In an embodiment, one or more transportable applications may be used to carry out complex business processes and workflows. In one specific embodiment, a process template designer mechanism enables a business process expert to create and publish templates of a process framework. A template for a process framework can include a general process description, process-specific fields (e.g., process status), templates of component tasks for transportable applications, a Process Style comprising an association of fonts, colors, images, layout, text that are applied to all building blocks and tasks of transportable applications that make up the process; required, preordered starter-tasks, and process-specific properties (e.g., notifications, access controls). The process template serves as a guide for an author's later design of a specific instance of a process. On-the-fly editing of templates and authoring of a process transportable application can also be initiated from within the template designer mechanism.

In one approach for implementation of the foregoing, a process designer uses a Process Composer software tool to create a process template. Thereafter, the process template may be retrieved and used during the authoring process to construct a process transportable application and send it out to a list of recipients.

The process composer enables a user to identify, select, and include tasks in a template for a process that has one or more transportable applications. Some such tasks may be designated as starter tasks. A starter task is included when an author begins to compose a process transportable application. A starter task may or may not be deemed required by the process template creator. A template also may include one or more "addable" tasks. An addable task is one that can be added to the process transportable application after it has been sent to recipients.

In one embodiment, a process template comprises a Java class that stores information about a process. The process template class determines the types of tasks that can be entered after a transportable application is sent, and also provides appropriate process creation information at the time that an author creates a transportable application based on the template.

The template class stores information identifying the types of tasks that are allowed and which tasks are starter tasks. For starter tasks, the template class stores whether or not each task is a required task. Additionally, some meta information about the overall process is stored, e.g., a process name, process description, and process style. In one specific embodiment, a process template class has the following member variables and corresponding accessor methods:

```
private String name;
private ObjectID authorID;
private String description;
private Vector styleIDs;
private boolean updateStyle;
private ObjectID templateID;
    private Vector introFields;    // vector of IntroField objects
    private Vector requiredTasks; // vector of ProcessTask objects
    private Vector allowedTasks;   // vector of ProcessTask objects
```

The process template class may also have the following methods:

```
public void ProcessTemplate()
public void store (DBTrans transaction)
public void remove (DBTrans transaction)
public static void remove (DBTrans transaction, ObjectID templateID)
public static ProcessTemplate getTemplate(ObjectID templateID)
```

The ProcessTemplate class may have an empty constructor such that a Process Servlet that creates the ProcessTemplate class is responsible to set the fields appropriately. For example, the servlet parses the HTTP Request and sets the values on the ProcessTemplate object.

The store( ) method takes in a transaction value, which can be null, and writes the object to the database. The method calls another method in a helper class to transform the member variables into XML format. The remove( ) method deletes the ProcessTemplate from the database. The transaction value can be null, in which case it constructs its own transaction and executes it. The static method removes the given template from the database. The getTemplate( ) method retrieves the ProcessTemplate with the given template identifier and passes it back to the calling method. It uses a helper class to construct the ProcessTemplate object from the XML information in the database.

An IntroField class represents, at an abstract level, any additional introduction field information the author wishes to provide, and the default value for this field and what kind of graphical user interface widget is used to display the field, e.g., drop-down, radio button, text area. It has the following member variables:

```
private String name;
private String defaultValue;
private String inputType;   //html type of input e.g. text,
```

```
textarea, etc.; use constants
private Vector sizeInfo;    // vector of sizes we want for
the html components like width
private String options = ""; //additional options
private Vector choices;  // String Vector of choices for
drop down
private int position;    //position on authoring page
```

A ProcessTask class represents a task from the process point of view and includes a task ID value and information about the task, e.g., whether it is a starter task or an allowed task. The ProcessTask object contains the following member variables and appropriate accessor methods:

```
private ObjectID taskID;
private int position;
private String name; //
private boolean isStarter = false;
private boolean isRequired = false;
```

A ProcessXMLUtils helper class aids in the writing and retrieval of the process XML to and from the database. It will implement an interface so that it can be passed into the XML parser to provide the appropriate call back routines. Further, the helper class includes the methods getXmlString and ProcessTemplate:

```
public static String getXmlString (ProcessTemplate)
public static ProcessTemplate getProcessTemplate (String
    xmlString)
```

The getXmlString method receives a ProcessTemplate object and returns an XML representation of it, including all its member variables. The ProcessTemplate method receives a string of XML text and returns a ProcessTemplate object.

In one specific embodiment, each process template is stored in database 208 in a Process Template table that contains the following columns:

| Name | Null? | Type |
|---|---|---|
| TemplateID | Not Null | Number(19) |
| AuthorID | Not Null | Number(19) |
| Position | Not Null | Number(3) |
| XML | Not Null | VARCHAR2(1024) |
| DateCreated | Not Null | Date |
| DateModified | Not Null | Date |

Database 208 also comprises a table that associates styles and tasks with the template so that the system can update them if any changes occur in the task template or the style. This table can be used by any object that requires a parent to child relationship, and needs to update an object that is using it. In one specific embodiment, the style association table comprises the following columns:

| Name | Null? | Type |
|---|---|---|
| ParentID | Not Null | Number(19) |
| ParentType | Not Null | Number(4) |
| ChildID | Not Null | Number(19) |
| ChildType | Not Null | Number(4) |
| Update | Not Null | Char(1) |

Creating a Process Template involves selecting one or more tasks that can be used, certain attribute values for the tasks, and related process information that applies to all processes, such as the name and description of the process. In one specific embodiment, a servlet ("ProcessTemplate-Servlet") is used to save a process template to database 208. The Process Template Servlet has action parameters such as save, open, add, etc. Each action type will have a corresponding method to perform the appropriate action. A form submitted to the servlet includes parameter values that can be used to construct a process template object. In general, the servlet extracts parameters from the HTTP request that submits the form to the servlet, and constructs a process template object from them that can be written to the database 208.

The servlet then forwards a template creation request to a process template designer server page. In an embodiment, a Java Server Page (JSP) is used. The process template designer JSP iterates over the parameters from the form and displays them correctly on the page. The JSP also implements the submissions to the ProcessTemplateServlet to move up, move down, delete, insert tasks, and carry out any other defined operations.

The introductory fields may include various types of inputs and ordering. The XML syntax can be extended to incorporate other information, e.g. specifying a maximum number of choices for checkboxes.

Process templates may include rules that control, for example, issuance of notifications in responses to changes to tasks in the process. In one approach, the rules are represented as a vector of objects that are stored in association with the ProcessTemplate object. Additionally, task level rules can be added to a task using the process composer, which stores the task-level rules as a vector of objects stored in association with a ProcessTask object.

2.0 Multiple-Part Electronic Messages

In general, in one aspect, the present invention is directed to multiple-part electronic messages. Each multiple-part electronic message comprises a plurality of parts that are associated as part of a single message. In one embodiment, a multiple-part electronic message is distributed, viewed and updated as part of a group collaboration application system. In this embodiment, one or more multiple-part electronic messages may be configured to implement business processes such as information review, planning, forecasting, etc. In another embodiment, multiple-part electronic messages are transported as part of a client-server electronic communication system. For example, the multiple-part messages may be created using an e-mail client and communicated using an e-mail transport server or related infrastructure. Thus, embodiments do not require proprietary equipment or special modifications for transport within an existing or "legacy" communication system.

Embodiments are not limited to e-mail as a communication media. The multiple-part messages may be communicated using other data communication mechanisms such as HTTP. Embodiments also are not limited to display at conventional e-mail clients. Multiple-part messages may be displayed using a personal digital assistant, wireless communication device, Internet appliance, etc.

Figure 21A:
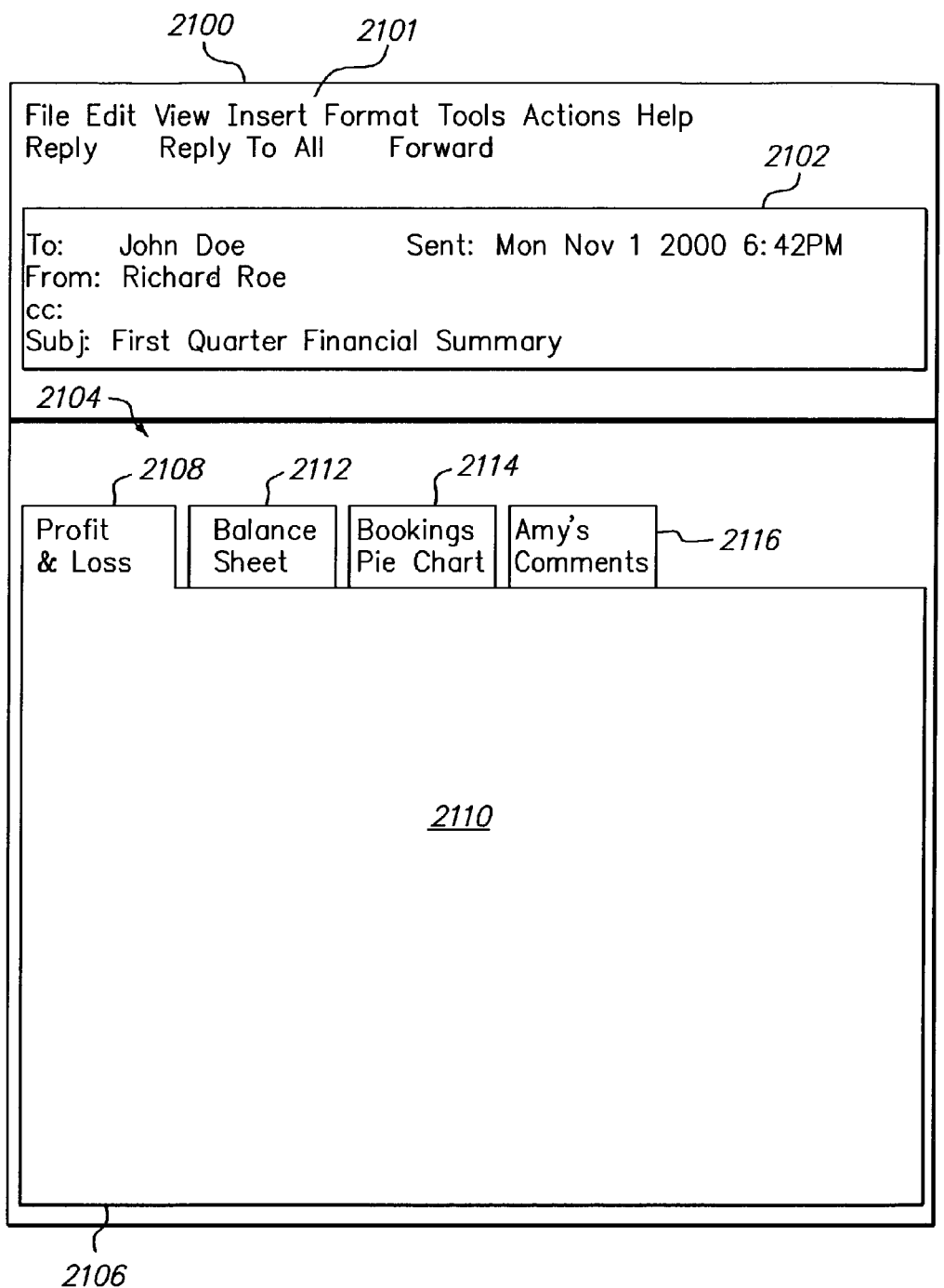
FIG. 21A is a diagram of a first embodiment of a graphical user interface display of a multiple-page electronic message.

FIG. 21A is a diagram of a first embodiment of a graphical user interface display of a multiple-page electronic message.

According to this embodiment, a user interface display window 2100 is generated by an e-mail processing application. The user interface display window 2100 includes a toolbar 2101, a message header display pane 2102, and a message body display pane 2104. Toolbar 2101 displays one or more buttons, links or other user interface widgets for selecting commands, options or tools of the e-mail processing application. Conventional commands such as File, Edit, View, Insert, Format, Tools, Actions, and Help may be provided for carrying out operations with respect to a message that is displayed in window 2100.

Toolbar 2101 also may include one or more buttons, links, or other user interface widgets for taking messaging actions with respect to the displayed message. For example, Toolbar 2101 may provide Reply, Reply To All, and Forward options. Selecting the Reply option instructs the e-mail processing application to generate a new message in reply to the currently displayed message, directed only to the sender of the message. Selecting the Reply To All option instructs the e-mail processing application to generate a new message in reply to the currently displayed message, directed to the sender of the message and all recipients of the message. Selecting the Forward option instructs the e-mail processing application to generate a new message that is directed to a new recipient and that includes a copy of the currently displayed message. In other embodiments described herein, new messages are not generated, and reply content or forwarded content is consolidated in the original message.

The message header display pane 2102 displays message header information. For example, the message header display pane 2102 may display the name of the sender of the message, the names of recipients, the subject of the message, the date that the message was sent, etc.

Message body display pane 2104 comprises one or more message pages 2106, 2112, 2114, 2116, etc. In FIG. 21A, for purposes of illustrating a simple example, four message pages 2106, 2112, 2114, 2116 are shown. However, in other embodiments, a message may comprise any number of message pages and message body display pane 2104 may include any number of message pages.

Each message page comprises a page navigation region and a page body. For example, a first message page 2106 comprises a page navigation region 2108 and a page body 2110.

In one embodiment, each page navigation region is graphically displayed such that the page navigation region is a contiguous part and integral with its associated page body. Further, each page navigation region is graphically displayed such that every page navigation region is selectable, using a graphical cursor that is movable using pointing device such as a mouse, whenever any particular page body is displayed.

For example, in the embodiment of FIG. 21A, message pages 2106, 2112, 2114, 2116 are displayed as simulated overlays wherein the first message page 2106 appears to be on top of a stack of message pages. Although message page 2106 is the top message page, the page navigation regions of all other message pages 2106, 2112, 2114, 2116 are visible adjacent to message page 2106 and are selectable at any time during which message page 2106 is displayed.

When a particular page navigation region is selected, the message page associated with the selected page navigation region becomes fully visible. For example, if the Bookings Pie Chart message page 2114 is selected, it becomes fully visible and appears to be the top page in a stack of pages. The message body 2110 of message page 2106 becomes hidden, although its page navigation region 2108 remains visible. Processing operations to carry out such functions may be executed by a server that is communicatively coupled with a client that is displaying the message window 2100, according to processes that are described further herein.

Each page navigation region may carry a label that identifies the contents of the message page that is associated with the page navigation region. For example, in FIG. 21A, the message displayed in window 2100 generally relates to a First Quarter Financial Summary. A first message page 2106 presents Profit & Loss information, as indicated by a "Profit & Loss" label in the page navigation region 2108 of the first message page. A second message page is labeled "Balance Sheet," and other message pages may have any other desired labels. Such labels may comprise text, numeric values, graphic images, icons, hyperlinks, or any other indicator element or other information.

The page navigation regions may be color-coded, for example, according to a topical key, an order of priority, and industry-standard color arrangement, etc.

For purposes of illustrating an example, in FIG. 21A, the page navigation regions are shown as arranged along a top edge of a message page. However, the page navigation regions may be arranged along a bottom edge, left edge, right edge, or other side edge.

If a message has a plurality of message pages, and message display window 2100 has insufficient space to display all the message navigation regions associated with the message pages in a row, then the message body pane 2104 may comprise an indicator that additional message pages and navigation regions are available for display and selection. For example, message body pane 2104 can display an arrow, dot, or other icon adjacent to the right-most message navigation region. Selection of the arrow, dot, or other icon causes a server or other element to generate message body pane 2104 such that one or more of the other message navigation regions are displayed, and such that previously visible message navigation regions scroll or slide to the side, up or down to make room for the newly displayed message navigation regions.

Using this configuration, an e-mail message is displayed in a structured fashion. Its content may be organized so that one set of related information is collected in a particular page, and another set of related information is collected in another page. Specific information is accessible simply by selecting a navigation region that corresponds to the specific information. Extensive scrolling or searching for such specific information becomes unnecessary.

Figure 21B:
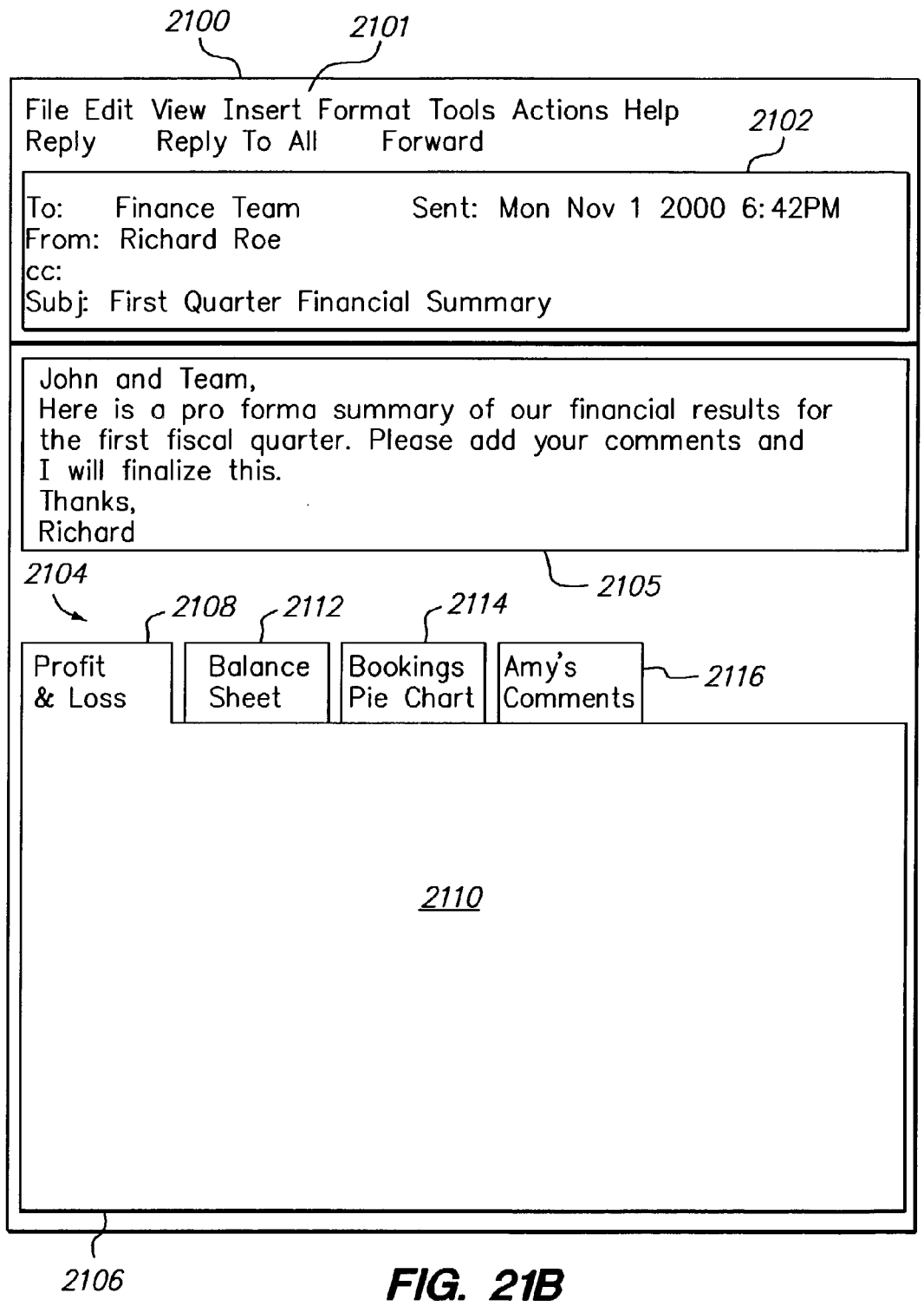
FIG. 21B is a diagram of a second embodiment of a graphical user interface display of a multiple-page electronic message.

FIG. 21B is a diagram of a second embodiment of a graphical user interface display of a multiple-page electronic message.

In the embodiment of FIG. 21B, message window 2100 further includes a static content pane 2105 that may display text notes, graphic images, banner advertisements, or any other desired static content. In one embodiment, data for static content pane 2105 is obtained from the static content region of electronic media that associated with a group collaboration application.

Figure 22A:
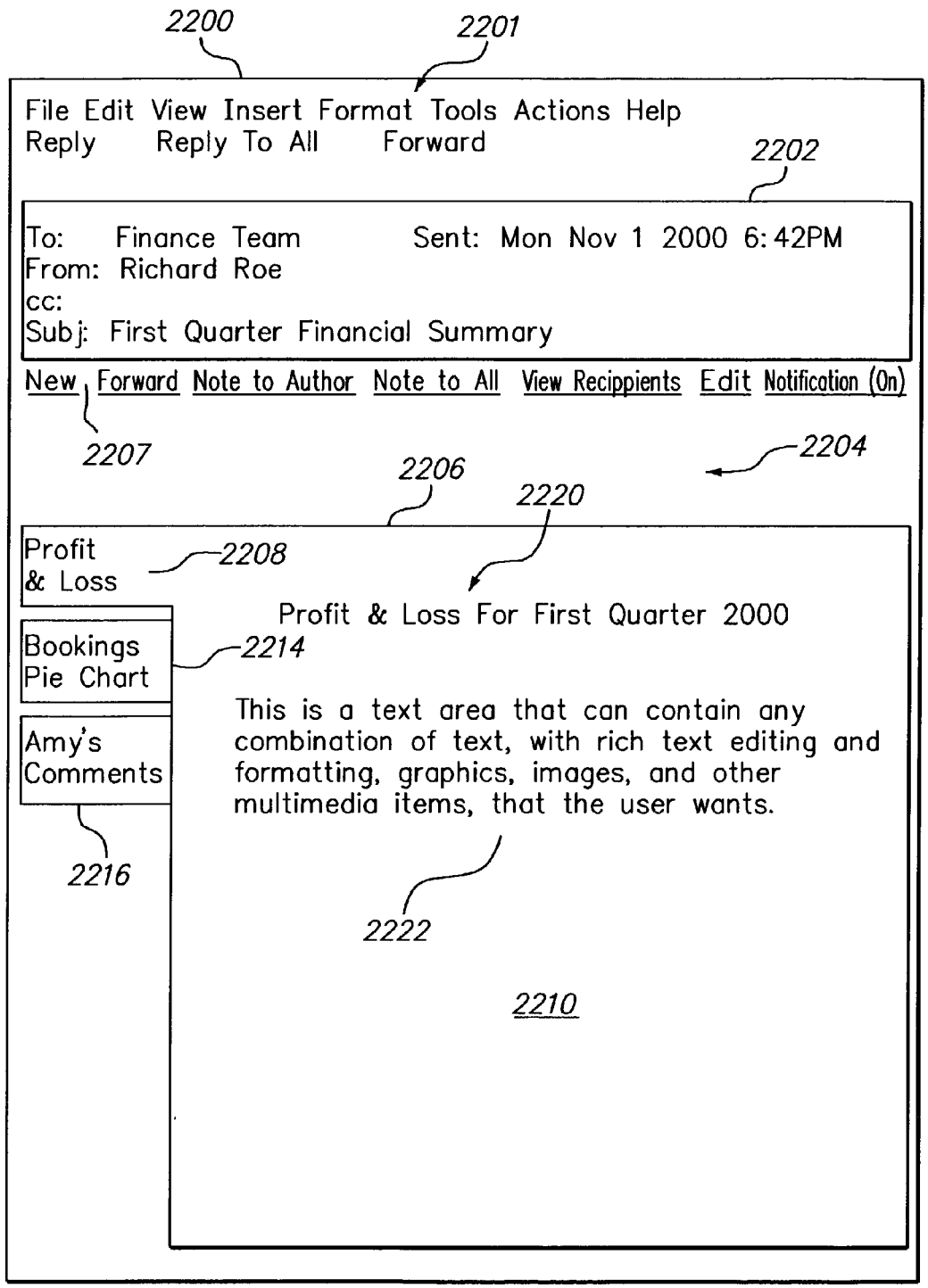
FIG. 22A is a diagram of a third embodiment of a graphical user interface display of a multiple-page electronic message.

FIG. 22A is a diagram of a third embodiment of a graphical user interface display of a multiple-page electronic message.

A message display window 2200 is provided in the embodiment of FIG. 22A. As in FIG. 21A and FIG. 21B, message display window 2200 may include a toolbar 2201, a message header pane 2202, and a message body display pane 2204.

Optionally, in certain embodiments the message display window 2200 also comprises a message toolbar 2207 that provides command options for generating and working with messages that are displayed in the message body display pane 2204. For example, in one specific embodiment, message toolbar 2207 provides New, Forward, Note to Author, Note to All, View Recipients, Edit, and Notifications command options.

Message toolbar 2207 may be implemented separate from toolbar 2201 in embodiments that interoperate with unmodified e-mail processing applications. For example, in an embodiment that interoperates with Microsoft Outlook as an e-mail processing application, the toolbar 2201 is generated by Microsoft Outlook and controls its functions, whereas message toolbar 2207 is generated as part of a displayed message by a separate server. This arrangement enables use of the electronic media, group collaboration applications, and multi-page electronic messages disclosed herein without modification of the e-mail processing application. Alternatively, the electronic media, group collaboration applications, and multi-page electronic messages may be integral to the e-mail processing application, and the functions of toolbars 2201, 2207 may be combined in a single toolbar.

Operation of functions of toolbar 2207 are described further herein in connection with a description of a server structure that may be used to implement the processes described herein.

Selecting the New function from message toolbar 2207 is a request to generate a new message that may contain one or more message pages. Selecting the Forward function is a request to forward the currently displayed message, including all message pages, to a new recipient. Selecting the Note to Author function is a request to create a static note that is visible only to the author of the currently displayed message when that author displays or re-displays the message. An example of such a note is action request 2284 of FIG. 22C.

Message window 2200 of FIG. 22A further includes one or more message pages 2206, 2214, 2216. Each message page has an associated message navigation region and a message page body. For example, message page 2206 includes a navigation region 2208 and a page body 2210. In the embodiment of FIG. 22A, each navigation region extends laterally from its associated page body, such as to the left of the page body. Alternatively, the navigation regions may extend to the right of the message body. Each navigation region is arranged so that it is continuously visible whenever a particular page body is displayed.

The page body may contain any desired text or graphics, or a combination thereof. In the example of FIG. 22A, page body 2210 includes a page title 2220 and a text block 2222. Additionally or alternatively, there may be other text, graphics, icons, images, hyperlinks to other resources, etc.

Page body 2210 may also comprise one or more dynamic content regions that display dynamic content and are supported by one or more active application elements that are executed by a supporting server. In one specific embodiment, page body 2210 comprises one or more application building blocks that have been selected from an application starter set or library. Each building block comprises a pre-defined, self-contained module of executable program instructions that can be linked together with other building blocks to form a complete executable application.

Typically, each building block performs a discrete function, such as group discussion; polling; interactive Web pages; file sharing; inline document viewing; table generation; rating generation; surveys; approval lists; schedules; images; image galleries; invitations; information fields; connections to external systems and applications; and others. When a page containing a building block is selected using its navigation region, a supporting server re-displays an image corresponding to the application with graphical elements relating to the selected building block. Such graphical elements may include headers, text, graphic images, radio buttons or other user input widgets, as appropriate for the function to which the building block relates.

Figure 22B:
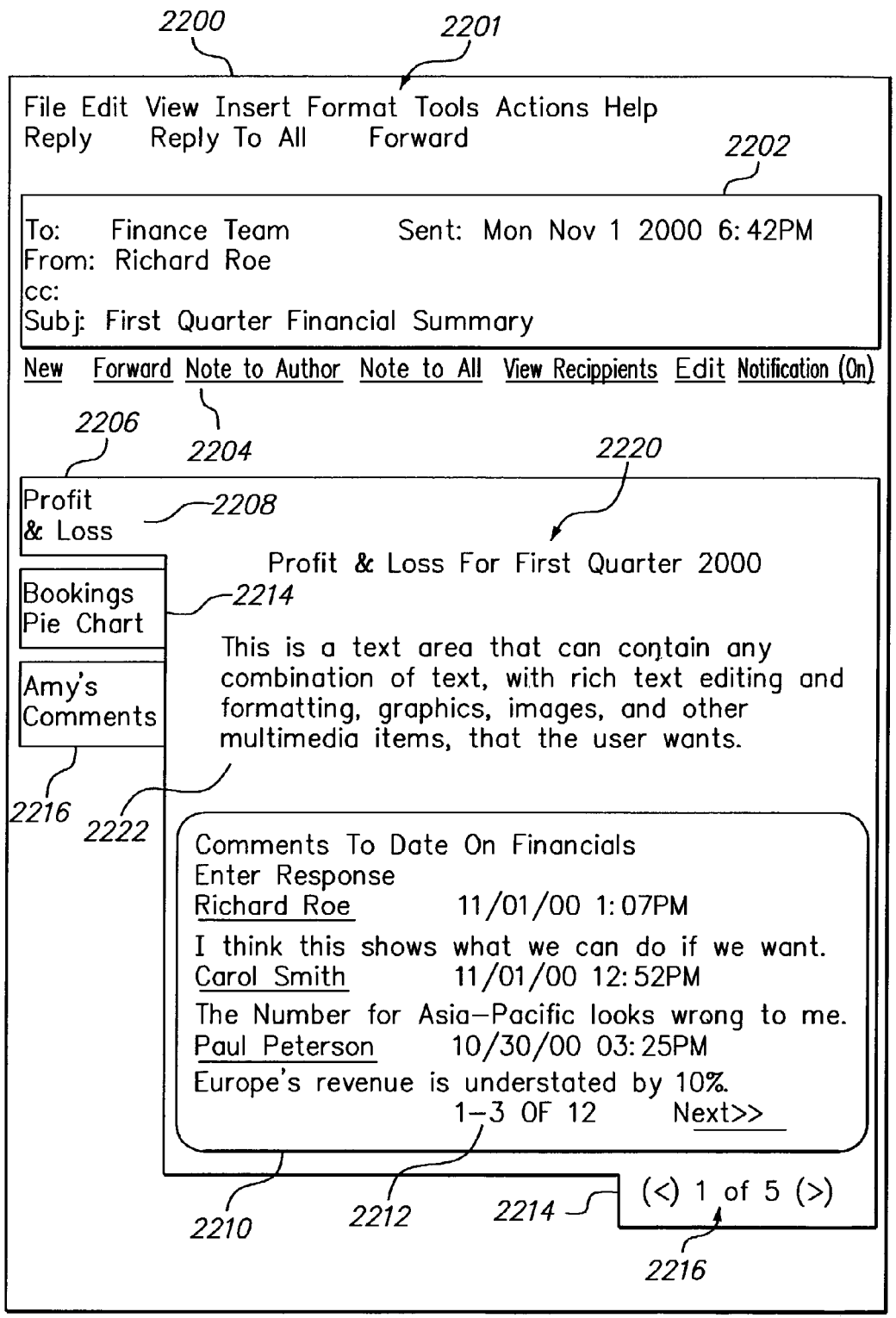
FIG. 22B is a diagram of a fourth embodiment of a graphical user interface display of a multiple-page electronic message.

FIG. 22B is a diagram of a fourth embodiment of a graphical user interface display of a multiple-page electronic message that includes a dynamic content region.

As in FIG. 22A, the embodiment of FIG. 22B includes a message display window 2200, toolbar 2201, a message header pane 2202, a message body display pane 2204, a message toolbar 2207 that provides command options, and one or more message pages 2206, 2214, 2216 each having an associated message navigation region and a message page body. Message display window 2200 also comprises a dynamic content region 2210 that contains dynamic information.

In the example of FIG. 22B, the dynamic content region 2210 is based on a comment building block that facilitates gathering comments from a plurality of members of the group. As members of the group receive the message shown in message display window 2200, each member may select dynamic content region 2210 and enter one or more comments. The entered comments are stored in a database of a supporting server. Whenever any other group member or other recipient receives the message, opens it, and views message page 2206, the server obtains a then-current copy of the dynamic content, such as all comments entered to date, and displays it as part of dynamic content region 2210.

Dynamic content region 2210 operates as a discrete window within message page 2210. If the content associated with the dynamic content region 2210 overflows the dynamic content region 2210 when it is displayed, a user may select a navigation tool 2212 to view additional content.

Likewise, if not all the content associated with a particular message page will fit in the message page when it is displayed, the message page may include an indication that other content can be obtained. For example, in FIG. 22B, message page 2206 has a downwardly extending navigation region 2214 that displays a navigation tool 2216. By selecting appropriate icons within the navigation tool 2216, a user can instruct a supporting server to retrieve and display different parts or additional parts of a message page.

In one embodiment, if a message has a plurality of message pages, additional page navigation regions are displayed generally in a column arranged on the left edge or right edge of the message display pane. In embodiments in which the elements in the message display window are rendered based on source code in HTML, the message display window has potentially infinite length. In these embodiments, the message display window may include any number of page navigation regions. If not all the message navigation regions are viewable in on a screen display, the user can scroll the screen display to view further page navigation regions.

Alternatively, to remove the need for scrolling, there may be a pre-defined maximum number of pages that appear in a message display window at any one time.

Figure 22C:
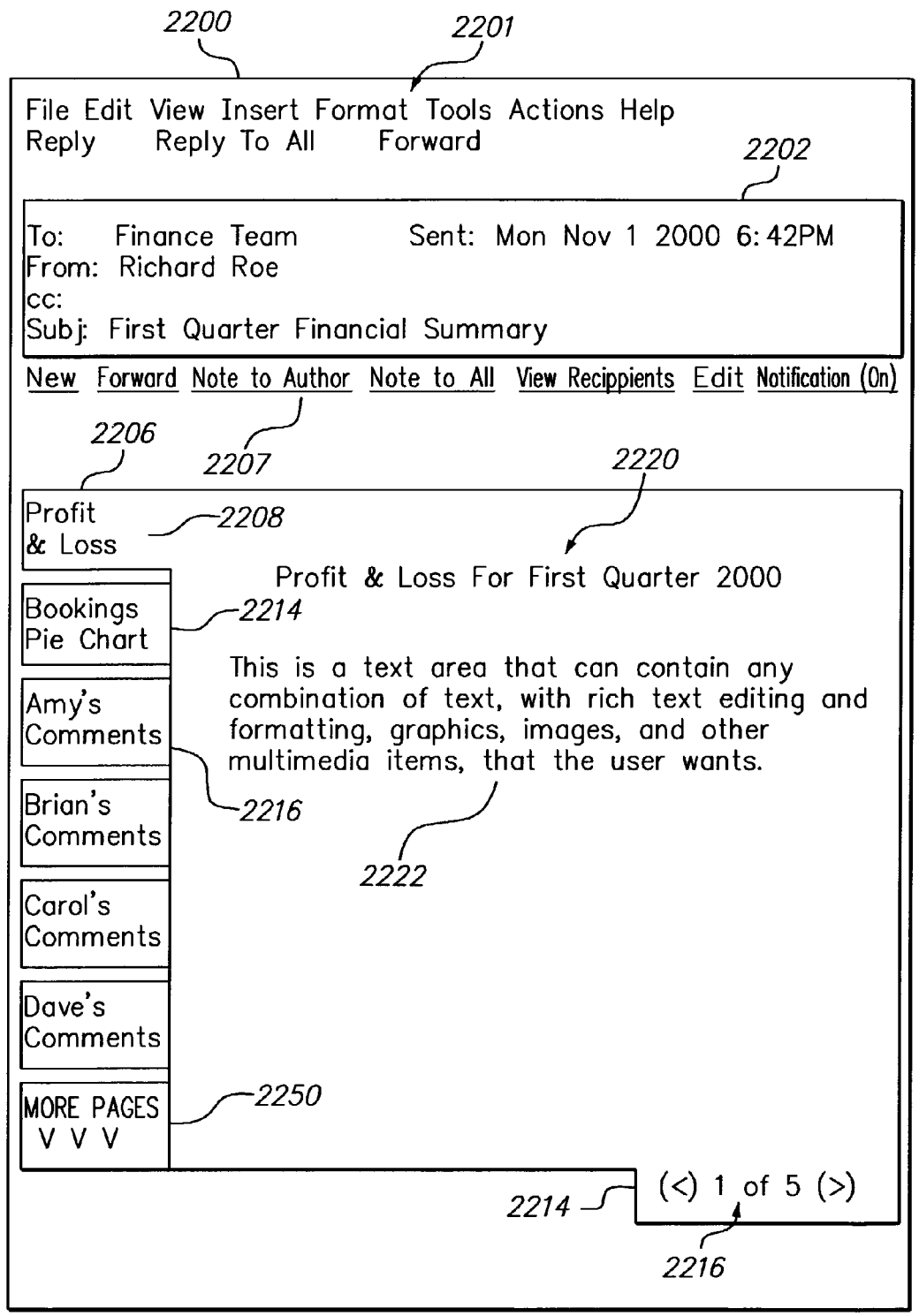
FIG. 22C is a diagram of a further embodiment of a graphical user interface display of a multiple-page electronic message that includes an indicator of additional pages.

FIG. 22C is a diagram of a further embodiment of a graphical user interface display of a multiple-page electronic message that includes an indicator of additional pages.

As in FIG. 22A, the embodiment of FIG. 22B includes a message display window 2200, toolbar 2201, a message header pane 2202, a message body display pane 2204, a message toolbar 2207 that provides command options, and one or more message pages 2206, 2214, 2216 each having an associated message navigation region and a message page body. Message display window 2200 also comprises a "more pages" navigation region 2250, which is present when a message has a plurality of message pages, and message display window 2100 has insufficient space to display all the message navigation regions associated with the message pages in a row.

Selection of the "more pages" navigation region 2250 causes the server or other element to re-generate message body pane 2104 such that one or more of the other message navigation regions are displayed, and such that previously visible message navigation regions scroll or slide to the side, up or down to make room for the newly displayed message navigation regions. Such re-generation may result in removing the "more pages" navigation region 2250 from the display.

The "more pages" navigation region 2250 may comprise an indicator that additional message pages and navigation regions are available for display and selection. For example, the region can display an arrow, dot, or other icon adjacent to the right-most message navigation region.

Figure 22D:
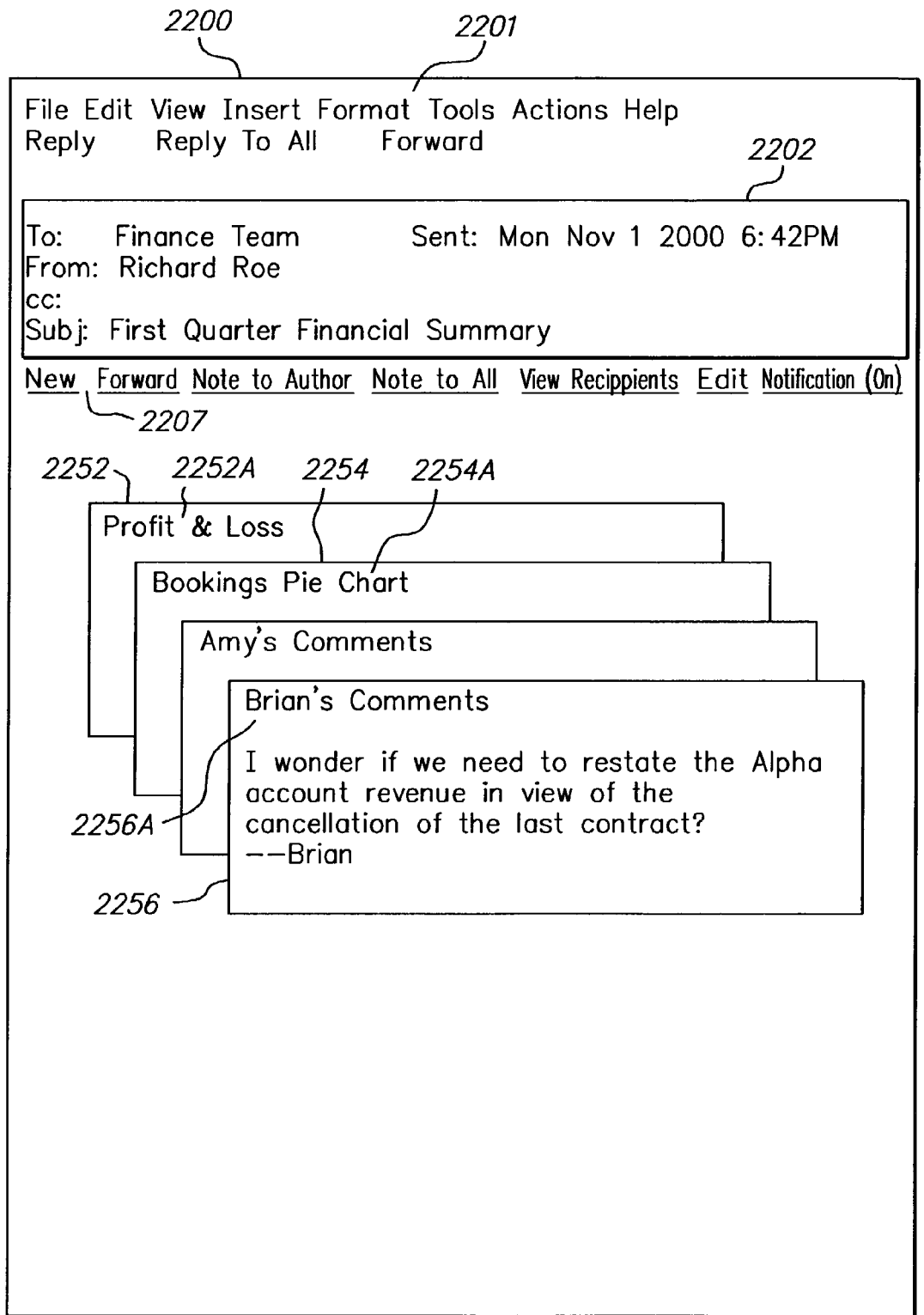
FIG. 22D is a diagram of a further embodiment of a graphical user interface display of a multiple-page electronic message.

FIG. 22D is a diagram of a further embodiment of a graphical user interface display of a multiple-page electronic message.

The embodiment of FIG. 22D includes a message display window 2200, toolbar 2201, a message header pane 2202, a message body display pane 2204, and message toolbar 2207 that provides command options. One or more message pages 2252, 2254, 2256 are provided, each having an associated message navigation region 2252A, 2254A, 2256A, and a message page body 2252B, 2254B, 2256B. Each of the message pages 2252, 2254, 2256 is displayed in an overlay manner such that one of the message pages, e.g., message page 2252, appears to be the topmost message page, and such that other message pages 2254, 2256, etc., appear to be stacked beneath the topmost message page.

In this arrangement, each message navigation region 2252A, 2254A, 2256A is continuously visible and may be selected at any time. When a message navigation region is selected, the corresponding message page is internally designated as the topmost message page, and the message body display pane 2204 is re-generated such that the new topmost message page appears on top and its contents are visible.

In FIG. 22D, for purposes of illustrating a simple example, four (4) message pages are shown. However, embodiments may comprise any number of message pages.

3.0 Linking and Aggregating Messages

According to one embodiment, the system and processes described herein facilitate linking and aggregating messages, such as transportable applications.

Figure 20:
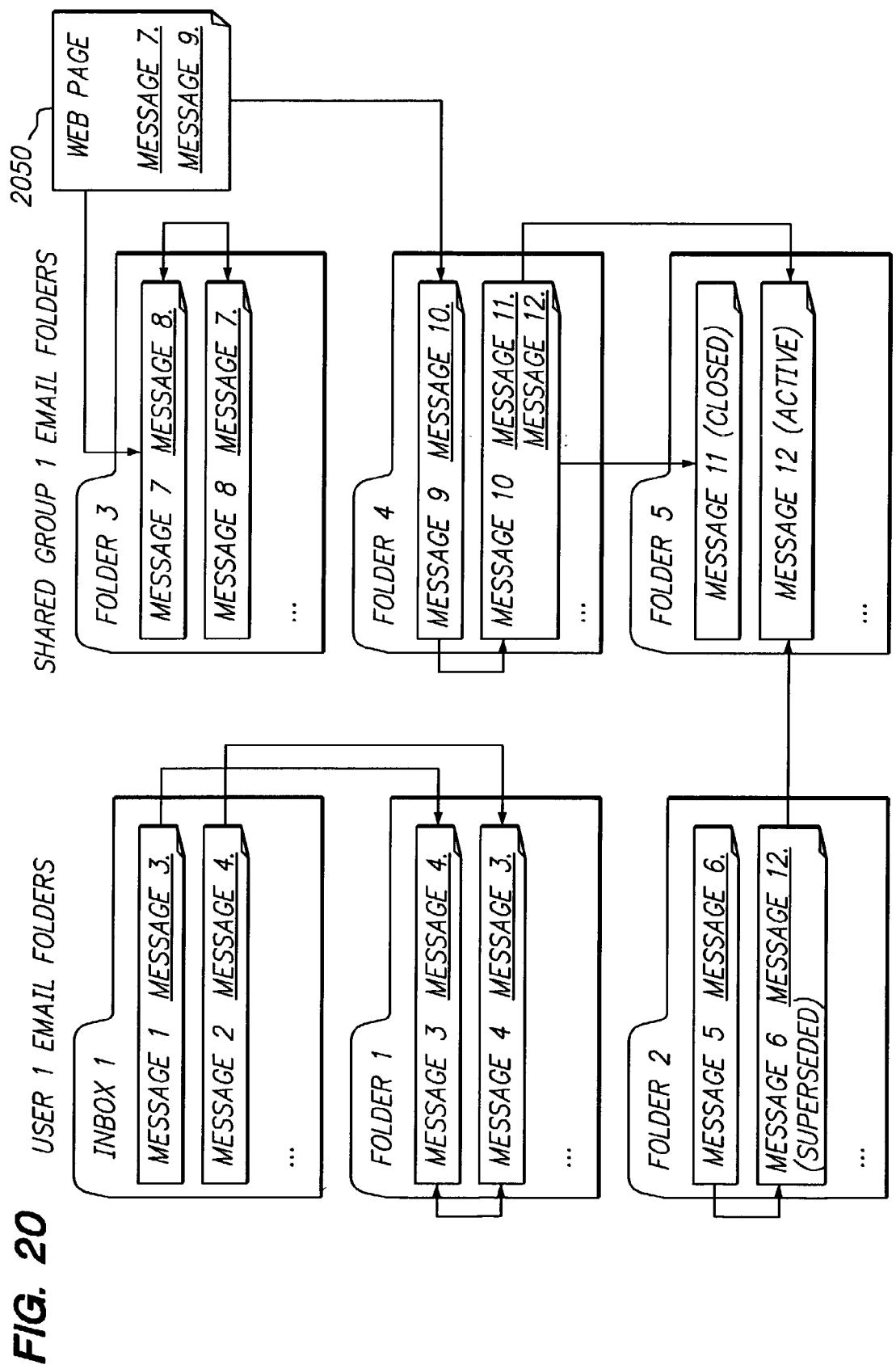
FIG. 20 is a block diagram illustrating a plurality of messages that are linked across different folders.

FIG. 20 is a block diagram illustrating a plurality of messages that are linked across different folders. In one embodiment, a persistent URL may be used to identify the messages. In FIG. 20, non-underlined message labels identify messages (e.g. "Message 1"), and underlined message labels identify hyperlinks to other messages. Such links may be used to hyperlink messages in the same folder. For example, message 1 of Inbox 1 is linked to message 3 of Folder 1. Links may also associate messages in different folders, such as message 10 of Folder 4 that is linked to message 12 of Folder 5. Links may associate messages in an "in-box" to messages in a folder, as in the case of message 1 and message 3. Links may associate messages in a folder and messages in an application, as in the case of message 7 of Folder 3, which is referenced in Web Page 2050. One message may contain links to multiple messages. For example, message 10 of Folder 4 has links to message 11 and message 12.

The interconnection between messages enables serialized and parallel decision making within a messaging system. Further, since the URL is not dependent upon the position within the messaging system, such as within a folder or on a web page, the position of the message may be changed without destroying the link between messages. For example, message 9 may be moved from Folder 4 to Folder 5 and still maintain a link from Web page 2050.

When two or more messages are linked in the foregoing manner, they form a message web. In one embodiment, message webs are networks of messages that are related by a topic or activity. Such networks aggregate knowledge that is generated within a context of the activity. For example, message webs linked over a network can provide information that does not require significant webmaster interaction or detailed internal system knowledge. Moreover, a current status of content or other attributes may be captured within the message web. This allows the health or age of the content to be communicated to a system administrator or other interested individual. Accordingly, the most current or active information can be highlighted. The content of messages within a message web may be involved in the same context and may include content modification, process interaction, choice making, and activity launching among a group or participants.

The links may be configured to be unidirectional or bi-directional. For a unidirectional link up, there is not a corresponding link at the destination back to the source location of the unidirectional link. In a bi-directional link up, there may be a corresponding link at the destination back to the source location of link creation.

Figure 23A:
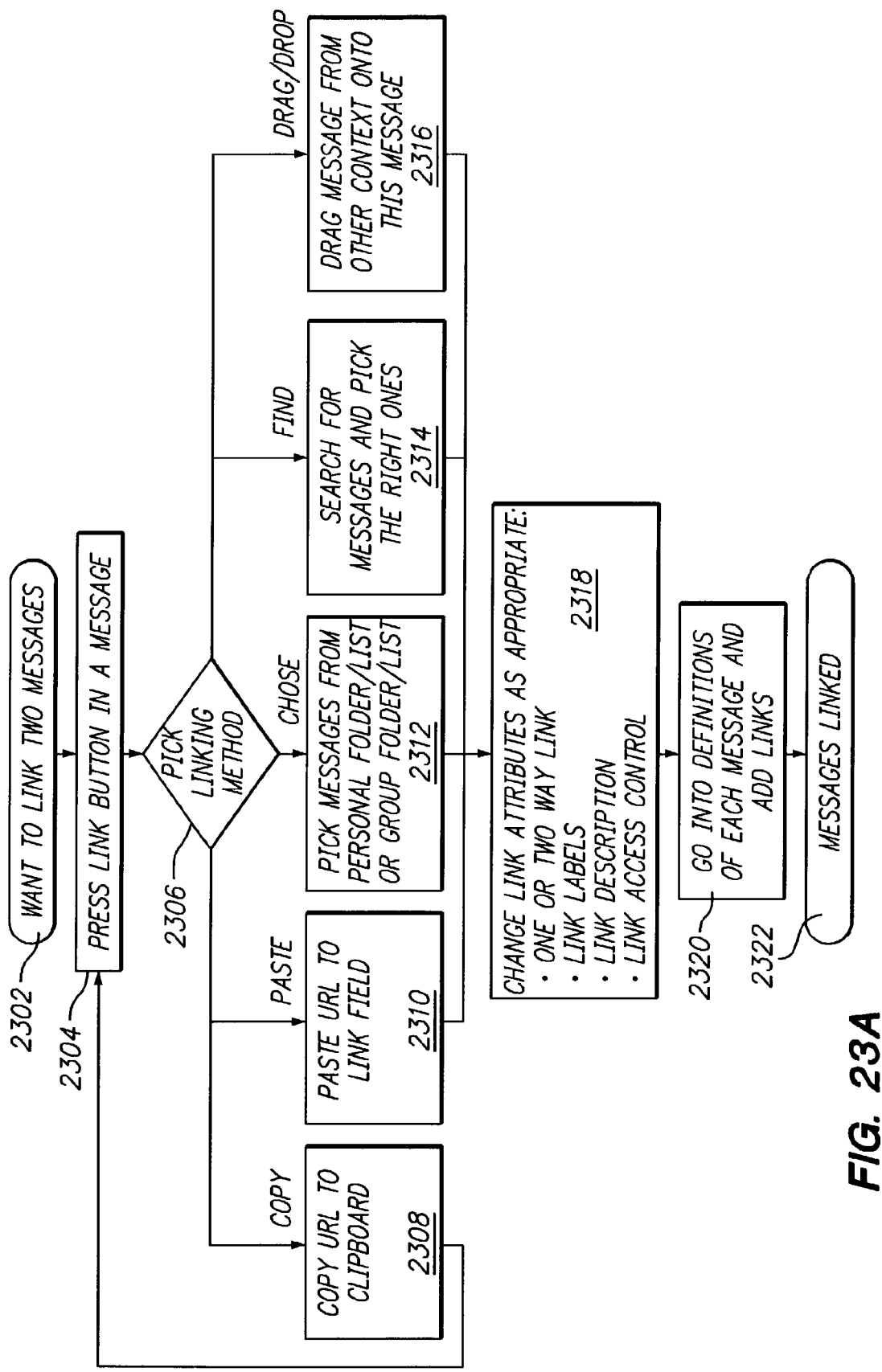
FIG. 23A is a flowchart of a process for linking messages, according to one embodiment.

FIG. 23A is a flowchart of a process for linking messages, according to one embodiment. In general, message links may be constructed manually by using user actions to link to a message. Further, a URL of a message or message web can be presented to an end user, suitable for copying and linking. Message authors or recipients can link messages. Ad hoc tasks may be served by letting a user connect steps within the task. Ad hoc knowledge organization may be served by letting a user connect related messages to each other. Message linking provides a streamlined mechanism for copying a message's URL to the clipboard and avoids obscure multiple step processes to locate a message's URL.

In block 2302, the process of FIG. 23A begins when a recipient, author or other user of a transportable application wishes to link one transportable application to another. In block 2304 the user selects a Link function button within the message. The Link button may be displayed, for example, as part of command buttons 282 of FIG. 2C. In response, in block 2306 the user is prompted to select a linking method. The prompt of block 2306 may be a dialog box or wizard. Block 2306 also may involve adding a List building block to the transportable application, wherein items in the list of the building block comprise references to linked messages. Thus, the List building block serves as a mechanism for maintaining links to other messages.

In one method., the user may copy the URL of another message to the clipboard provided by the operating system, in block 2308. Control returns to block 2304, and the user then pastes the copied URL to a link field that is provided in the prompt of block 2306, as shown by block 2310. Alternatively, the user may select one or more messages from a personal folder or list, or from a group folder or list, as shown by block 2312. In another alternative, the user may search for messages and select the right ones, as indicated by block 2314; this may involve opening another window that has a personal folder or list of messages. In another alternative, the user may drag a message from another context into the current message or into the dialog box or wizard, as in block 2316.

After selecting a linking method and a linked method, in block 2318, the user is prompted to change one or more link attributes, as appropriate. Such attributes may include cross-linking, link labels, link description, access control, etc.

In block 2320, definitions of messages are modified to add links. In one embodiment, block 2320 involves updating the List building block of the transportable application to add a reference to the linked message. As a result, the selected messages become linked, at block 2322. A user who opens the transportable application can view the List building block and link to another message by selecting a message that is in the list.

Figure 23B:
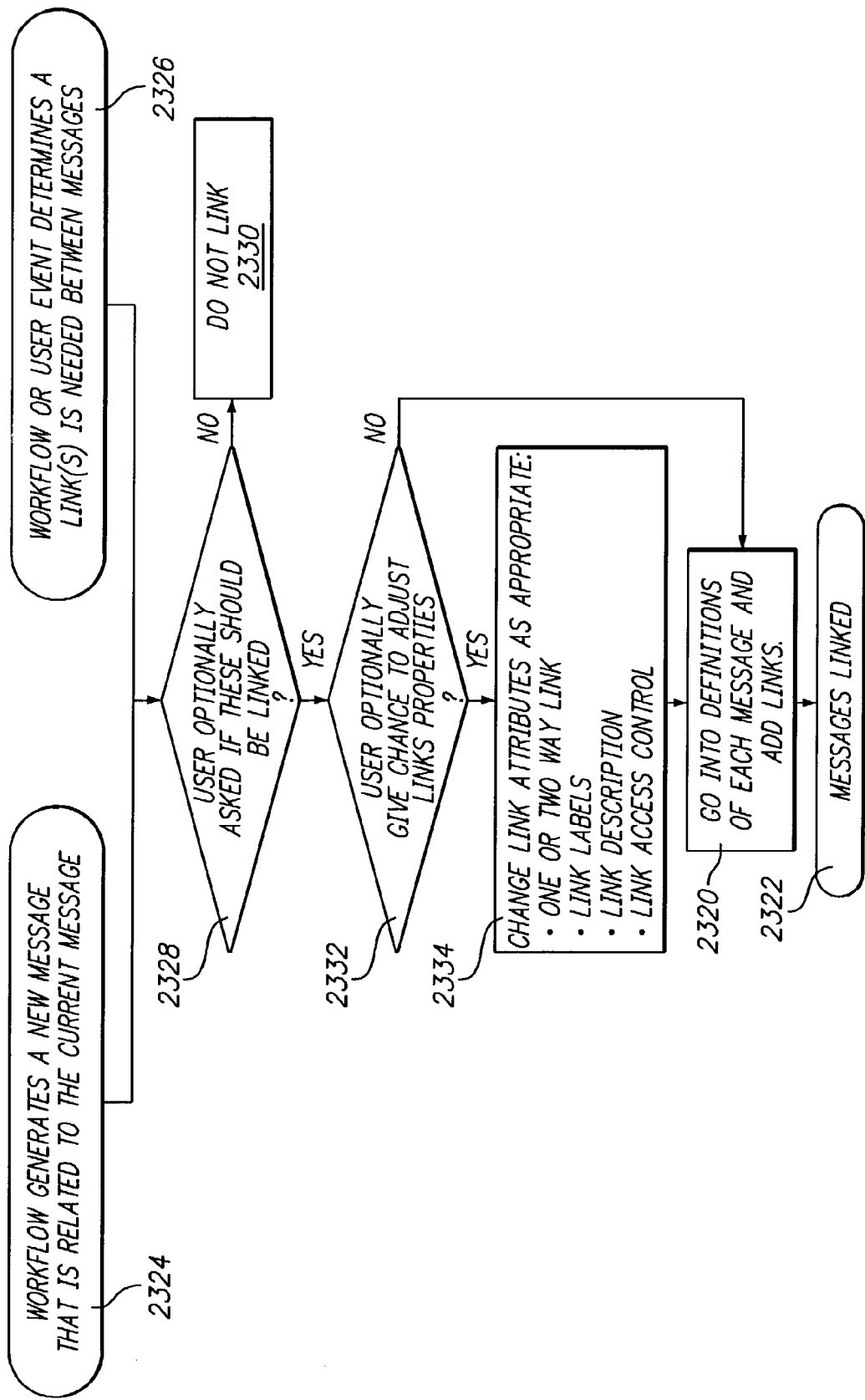
FIG. 23B is a flowchart of a process of automatically linking messages in another embodiment.

FIG. 23B is a flowchart of a process of automatically linking messages in another embodiment. Linking of messages may occur automatically or indirectly as a result of actions by a user within a task or as a result of workflow execution, e.g., as a part of creating or performing a next step of the task. Such links way be constructed automatically or indirectly by the application server 202. Thus, error rate can be reduced by automatically linking messages together, where steps or messages are related.

In block 2324, a workflow process generates a new message that is related to the current message. For example, block 2324 may comprise a first transportable application generating another transportable application in response to an event that is generated by user interaction with a page or building block. Alternatively, in block 2326, a workflow or user event determines that a link is needed among two or more messages.

In block 2328, optionally, the user may be prompted to indicate whether the messages should be linked. The prompt may take the form of requesting confirmation of a proposed link of messages. If the user indicates that the messages should not be linked, then in block 2330, no link is created. Alternatively, if the link is confirmed, then in block 2332 and block 2334 the user is optionally prompted to modify one or more link attributes, as in block 2318 of FIG. 23A. Control then passes to block 2320 and block 2322, as in FIG. 23A.

Messages may be linked based on the message's content or context. For example, a name, electronic mail address, a group, or company name, may be used to recognize and match a message with another message on an associated page or in an associated folder, In another example, a message that is named similarly to another message with the same or similar recipient list may be tied together to form a Message Web.

Figure 23C:
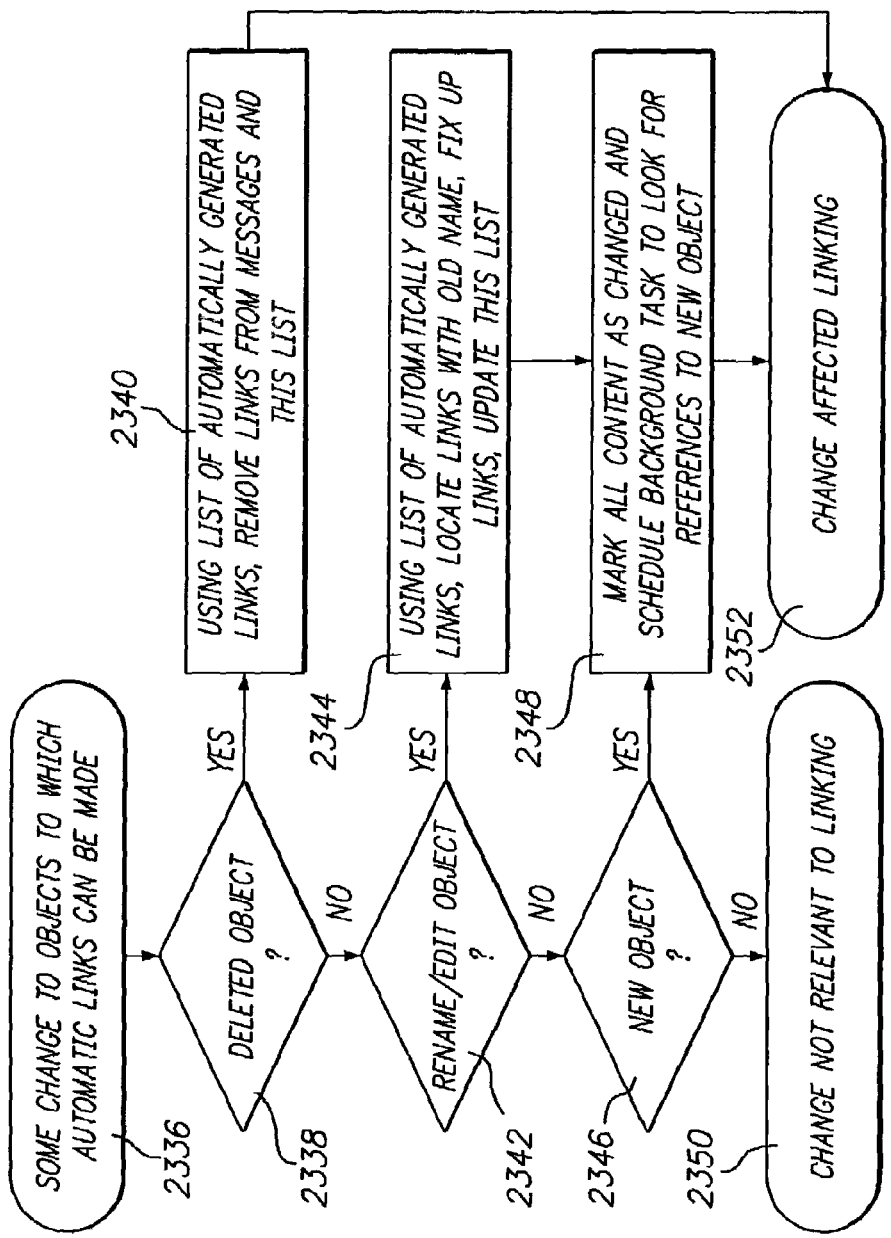
FIG. 23C is a flow diagram of a process of automatically creating message links in response to a change in an object.

FIG. 23C is a flow diagram of a process of automatically creating message links in response to a change in an object. Such automatic linking may relieve an author of adding common links by hand.

In block 2336, a change occurs to one or more objects to which automatic links can be made. For example, a building block or page of a transportable application is deleted, modified, renamed, or created. In block 2338, block 2342, and block 2346, branch points are carried out in accordance with the kind of change that occurred. In block 2338, if the object is deleted, then in block 2340, links are removed from messages and from the list of links in the message. For example, the list building block of the message is updated to delete links. In block 2342, if the object is edited or renamed, then the list of automatically generated links is reviewed. For each link that is identified in the list, the link is followed to the linked message. Any link in the list of linked messages that contains the old name is updated with the new name, as shown by block 2344. If a new object is created, as in block 2346, then in block 2348, its content is marked as changed. A background task or process is scheduled and dispatched to look for references to the new object.

As a result, affected links are changed, as shown by block 2352. If all the tests of block 2338, block 2342, and block 2346 are negative, then any change that has occurred is not relevant to linking, so no action is taken, as shown in block 2350.

Figure 23D:
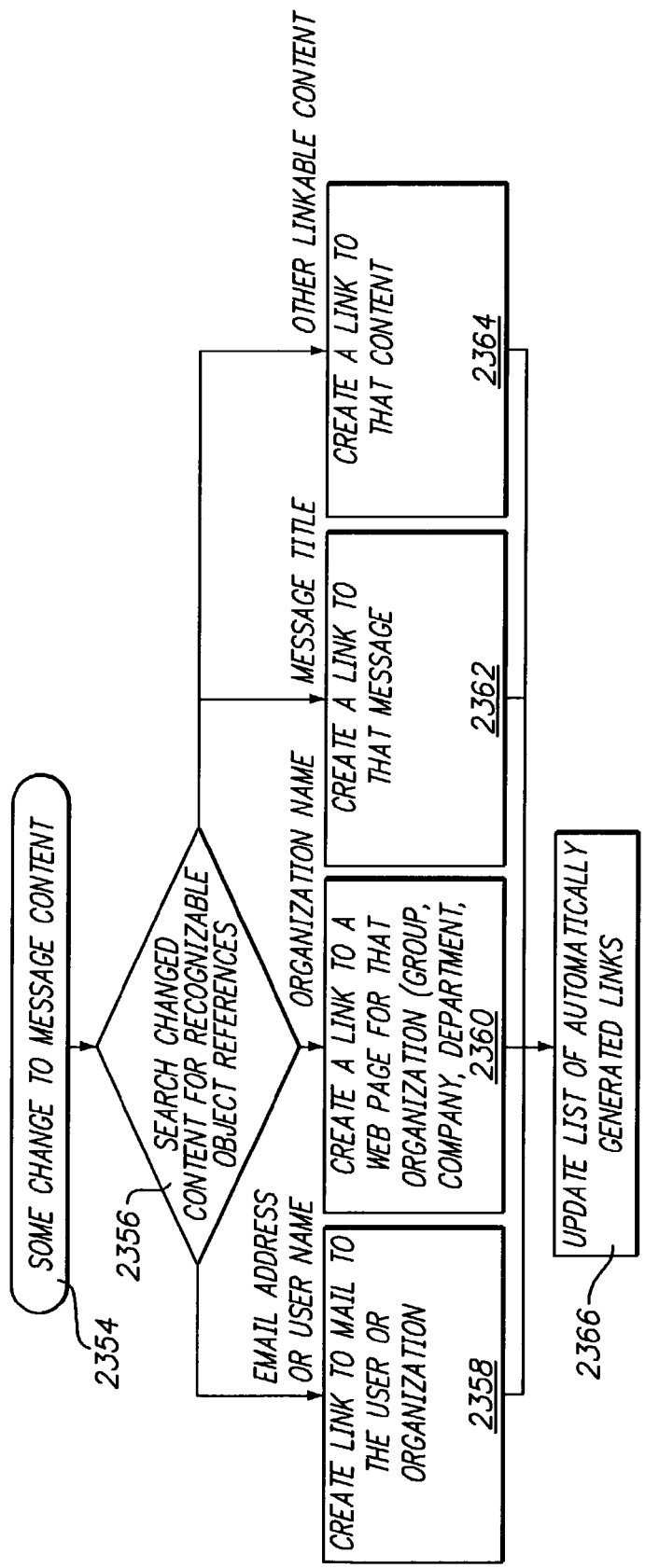
FIG. 23D is a flow diagram of a process of updating message links in response to changes in message content.

FIG. 23D is a flow diagram of a process of updating message links in response to changes in message content. In block 2354, a change to one or more items of message content is detected. For example, a recipient of a transportable application updates the application with new dynamic content, and in response, a building block of the application generates an update event. In block 2356, the changed content is search to identify one or more recognizable object references that could be the subject of a link to another message. For example, the changed content is searched to identify an e-mail address or user name, organization name, message title, etc.

In block 2358, if an e-mail address or user name is identified, a link is created to instantiate an e-mail to the user. For example, an HTML "mailto:" link may be created in the List building block that references the user. In block 2360, if an organization name is identified, a link to a Web page for that organization is created, e.g., in the List building block. In block 2362, if a message title of another message or transportable application that is known in the system is identified, then a link to that message is created, e.g., in the list building block. In block 2364, if other linkable content is identified, then an appropriate link to that content is created in the list. An example of other linkable content may be a digital song, an image, etc. In block 2366, the list of links is updated with any link that has been created in the preceding steps.

Figure 23E:
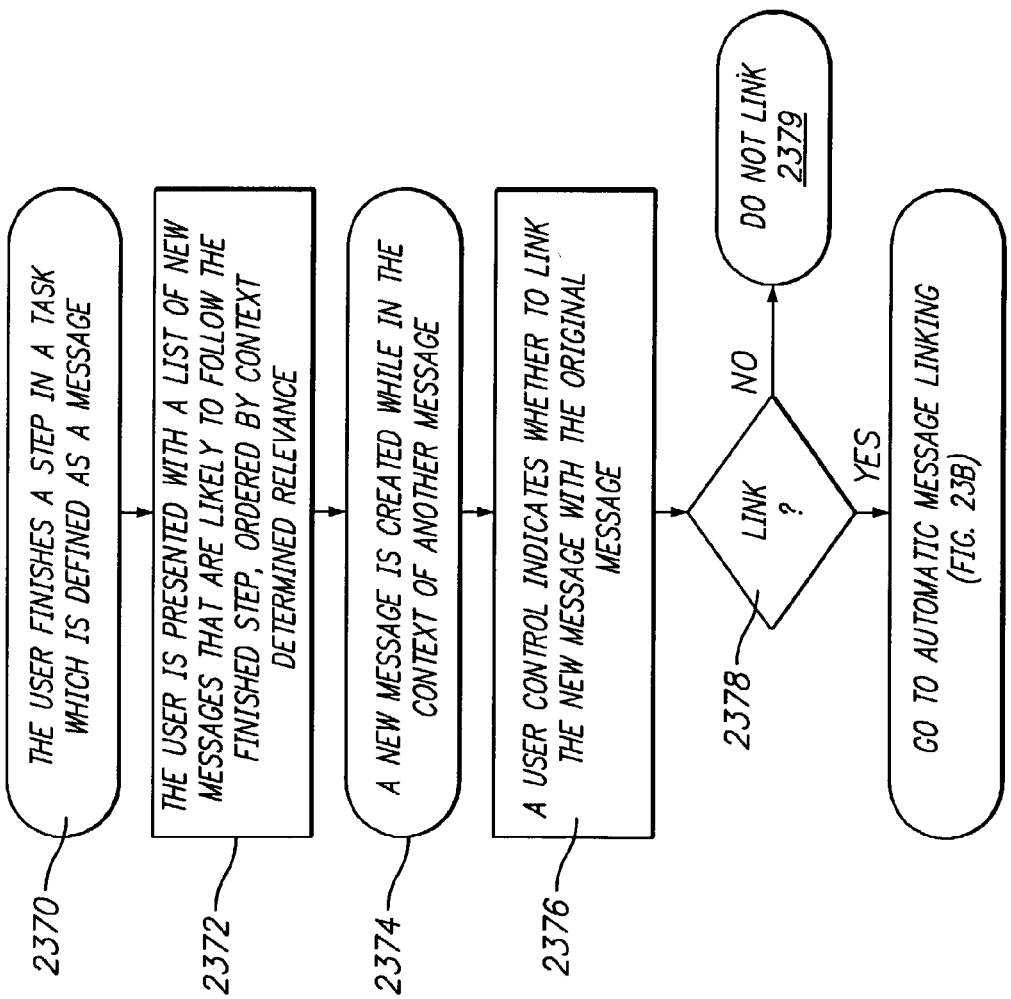
FIG. 23E is a flow diagram of a process of suggested message linking.

FIG. 23E is a flow diagram of a process of suggested message linking. In one embodiment, message links may be suggested, and either accepted or denied by a user, especially when adding a step to an ad hoc task. This combines the advantages of manual and automatic message linking in order to enhance ad hoc task/data linking. Lists of suggested links may be built into the logic built into a message web, or are provided in a message tab (as in the aggregated content under a tabbed presentation), or are provided in a message template, or are provided in a message web template. Templates can be used to allow new instances of message tabs, messages, or message webs to be selected by a end user. End users may create templates by using running instances of message tabs, messages, or message webs and saving their structure and optionally their content. Templates may be categorized and shared with others. In one embodiment, the process of FIG. 23E is useful to allow a user to optionally add a link to complete, enhance, continue, or add to a current task. For example, a user may schedule an event in one task and once a time is agreed upon for the event, may continue the task by enabling users in a group to purchase tickets to the event.

In block 2370, a user finishes a step in a task that is defined as a message. For example, a user completes providing input to a building block of a transportable application. In response, in block 2372, the input is analyzed and the user is presented with a list of other messages that are likely to following the completed step, ordered by context-determined relevance. For example, if the user has completed rating a job applicant in a poll building block of a human resources transportable application, the system determines that a salary offer application is likely to follow next. Therefore, the user is presented with the salary offer application in the list. Alternatively, a new message is created by the user, or automatically, while the user is in the context of another message.

In either case, in block 2376, the user indicates whether to link the new message with the original message, as by selecting a user interface button. If the user requests linking, as tested in block 2378, then automatic message linking is carried out, as described herein in connection with FIG. 23B. If no linking is requested, then none is carried out, as shown by block 2379.

When a user traverses a hyperlink from within e-mail messages to a URL or Web document, according to one embodiment, the Web page or other HTML content is displayed within the e-mail client window, as in FIG. 12. The content may comprise on-page navigations controls (Home, Back, Forward), since browser controls are not provided in conventional e-mail clients.

Figure 24:
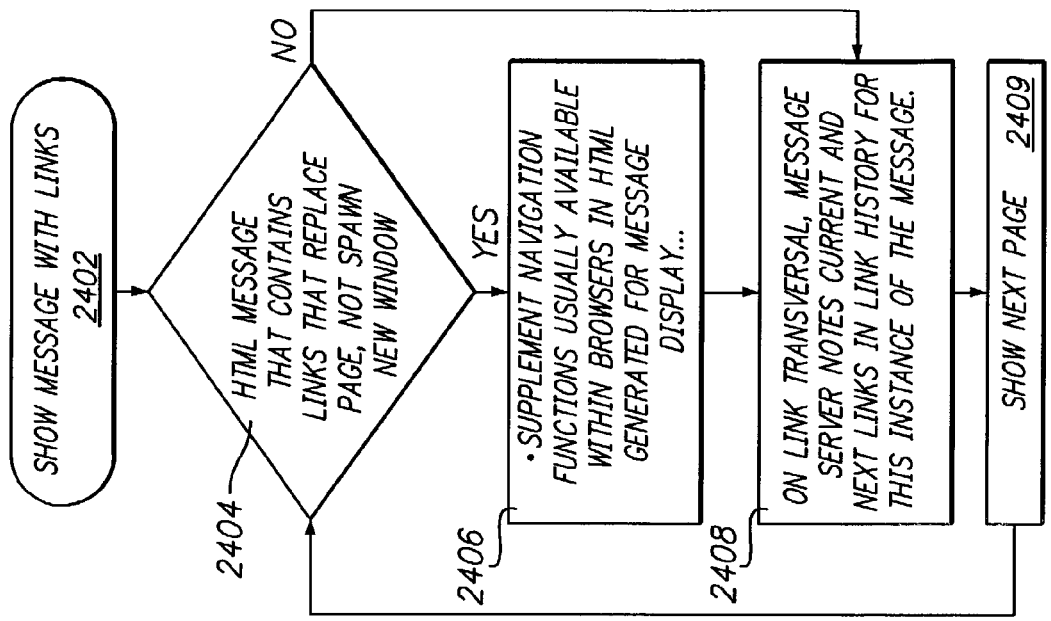
FIG. 24 is a flow diagram of a process of displaying HTML content in an e-mail client with browser navigation features.

FIG. 24 is a flow diagram of a process of displaying HTML content in an e-mail client with browser navigation features. In block 2402, the system is requested to display a transportable application that contains a link to HTML content. In block 2404, the system determines whether, in displaying the HTML content, it should spawn a browser window and display the content therein, or display the content within the e-mail client window. If the test of block 2404 is true, then in block 2406, the HTML message display is supplemented with navigation functions that are normally available in a browser.

In one implementation, block 2406 involves displaying a Home button, which causes the original page of the dynamic portion of the message to be shown, a Back button, and a Forward button. FIG. 12 illustrates examples of such buttons. The Home button is implemented as a self-referencing URL to the dynamic content portion of the transportable application. The Back and Forward buttons are implemented as JavaScript elements such that when each button is selected, JavaScript is invoked to carry out the functions. The JavaScript elements link back to application server 202 to determine what URL to load, based on a link traversal history that is maintained by that server. As shown in block 2408, when a link is traversed, application server 202 is updated with the current and next links in a link history that is associated with the current transportable application. In block 2409, a next page of the transportable application is displayed. Control flows back to block 2404 to render that page in the same manner.

In this configuration, browser controls may be used to navigate links within the messaging system. Thus, a user can easily navigate between a current message and another message, and then return to the current message. This navigation may occur within the same window.

Figure 25A:
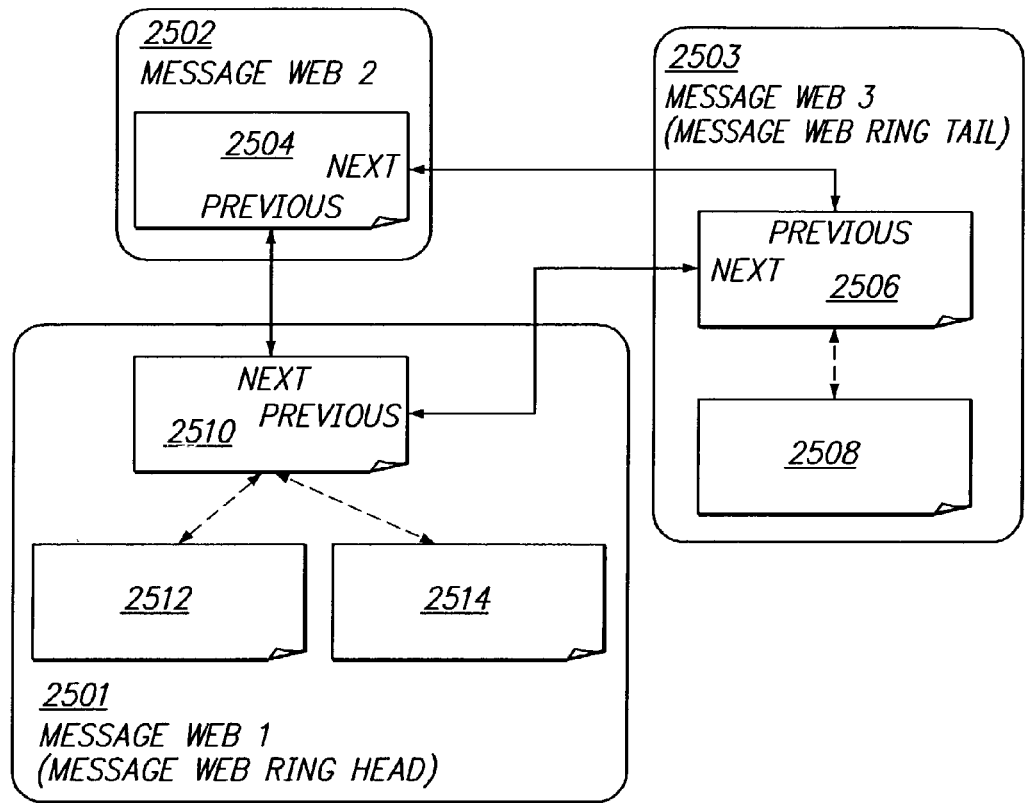
FIG. 25A is a block diagram of a linked collection of related message webs, referred to herein as a message web ring.

FIG. 25A is a block diagram of a linked collection of related message webs, referred to herein as a message web ring. Such rings may provide a complete list of related message webs. A user may navigate through the ring searching for desired information. Message web rings may also provide a higher level of aggregation to organize a project's tasks. In the example of FIG. 25A, a first message web 2501 comprises messages 2510, 2512, 2514. Message 2510 is the home message of message web 2501, which acts as the head of a message web ring that includes a second message web 2502 and a third message web 2503. The second and third message webs 2502,2503 each include respective message web home messages 2504, 2506. Each message web home message 2510, 2504, 2506 has a Next link that identifies the next message web in the ring, and a Previous link that identifies the previous message web in the ring. The links among home messages 2510, 2504, 2506 form a ring in which message web 2501 is the head and message web 2503 is the tail.

In this configuration, linked messages may be navigated between multiple applications. For example, a user may navigate within an application between messages or navigate between applications and then access multiple messages within another application. This allows aggregation of messages to be performed within a single application or folder and also amongst other folders.

Figure 25B:
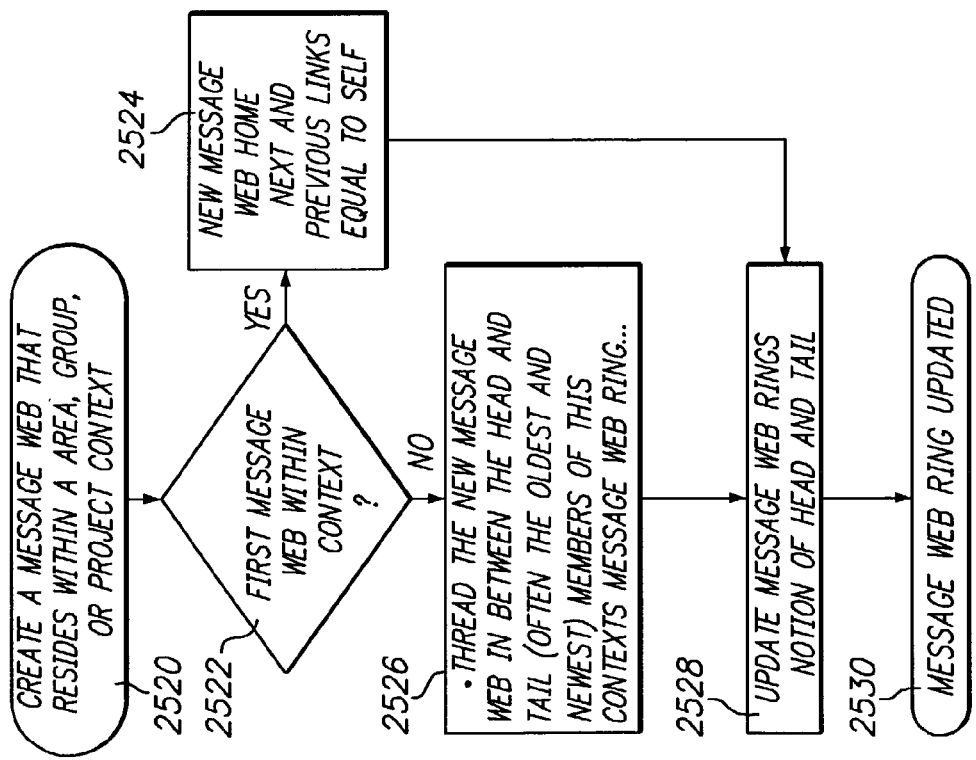
FIG. 25B is a flow diagram of a process of creating a message web ring.

FIG. 25B is a flow diagram of a process of creating a message web ring. In block 2520, a message web is created that resides within an area, group, or project context that may have other message webs. In block 2522, a test is carried out to determine whether the current message web is the first message web within the current context. If so, then in block 2524, the Next and Previous links of the current message web are set to be equal and to refer to the current message web.

If not, then the current message web is threaded integrated into a ring structure with other message webs, in a position between the head and tail of the ring, in block 2526. In particular, in one embodiment, the Previous link of the current message web is set to the value of the Previous link of the home message of the tail message of the ring. The Next link of the home message of the tail message web of the ring is set to point to the home message of the current message web. The Next link of the home message of the current message web is set to the home message of the head message of the ring. The Previous link of that message is set to point to the new message web. As a result, as shown by block 2528, the message web ring's head and tail are updated to include the new message web, and the ring is therefore updated, as indicated by block 2530.

Figure 26A:
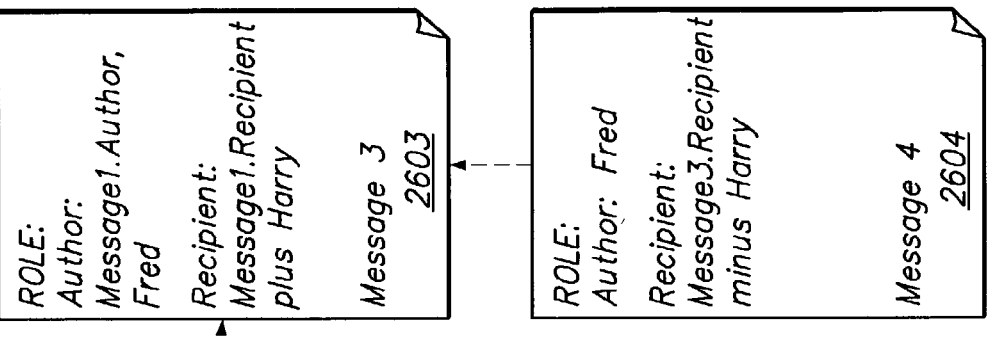
FIG. 26A is a block diagram illustrating messages in a message web having shared address lists.
Figure 26A:
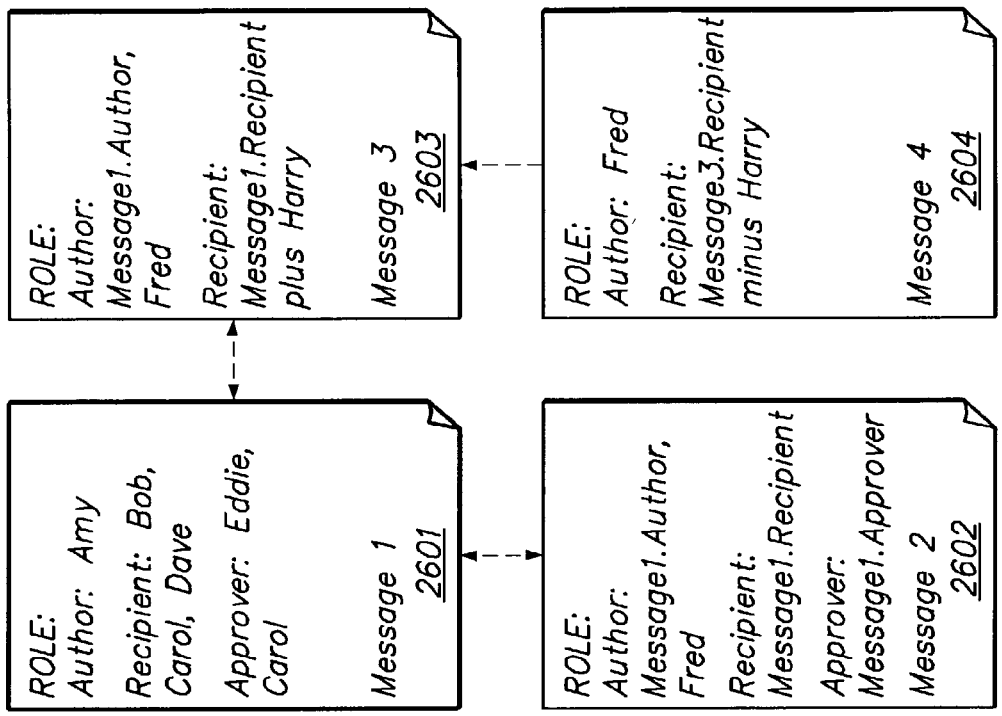

FIG. 26A is a block diagram illustrating messages in a message web having shared address lists. In one embodiment, a message web may share a list of addresses among its member messages. Individual messages may have their unique addressees extended or restricted in comparison to a shared list of addresses. Shared lists may be reused, which can avoid initially generating an address list for each step in a task. Further, a user can be easily added to an existing task by adding the user to a shared address list and forwarding a message to the user within the message web. Access to the remainder of the message web is then achieved by way of links and navigation tools as described herein. Subsequent steps that are added will then include the added user.

In particular, a list of recipients of the message may be changed between linked messages, such that a first set of recipients can be defined in one message and another set of recipients can be defined in another message. For example, in FIG. 26A, in a first message 2601 the recipients are Bob, Carol, and Dave. However, in message 2603, which is linked to message 2601, the recipients are defined as everyone in message 2601 plus Harry. Thus, a recipient list may be shared between messages. Additionally, messages may be configured to define business logic, other roles having the same sharing relationship between messages. The link between message 2604 and message 2603 demonstrates one form of "side-bar" or private conversation that could occur within a message web in which the link between messages is unidirectional.

Figure 26B:
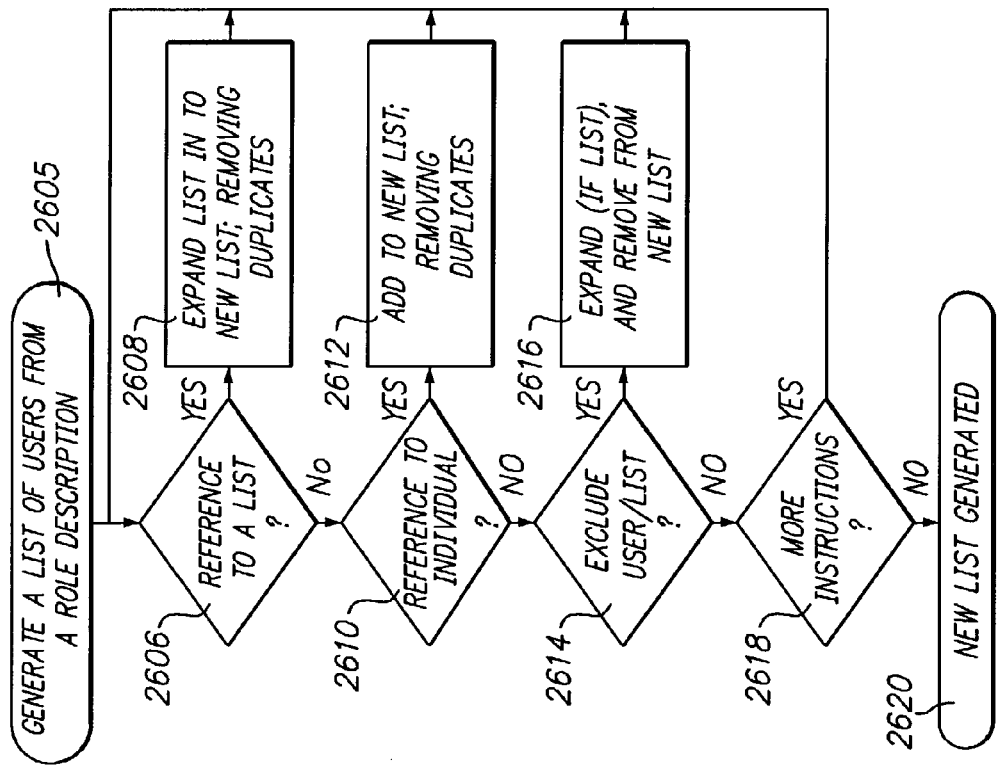
FIG. 26B is a flow diagram of a process of generating a list of recipients of a transportable application.

FIG. 26B is a flow diagram of a process of generating a list of recipients of a transportable application. In block 2605, a list of users is generated from a role description. For example, an initial set of recipients of a transportable message, such as message 2601, may be generated based on a role that comprises a set of user names. Assume that the author of the message 2601 addresses the message to "Project X Group" and that group name is associated with a set of users {Bob, Carol, Dave}. As a result, the recipient list of message 2601 is Bob, Carol Dave.

In block 2606, the system determines if the list generated in block 2605 contains a reference to another list. If so, in block 2608 the current recipient list is expanded to include all recipients who are named in the referenced list, and duplicates are removed. In block 2610, the system determines if the recipient list generated in block 2605 contains a reference to an individual. If so, then the individual is added to the current recipient list, and duplicates are removed. In block 2614, the system determines if the recipient list generated in block 2605 includes instructions to exclude a user or list. If so, then in block 2616, the referenced list is expanded, and its members are removed from the list generated in block 2605. If the list generated in block 2605 has more instructions, then they are processed in similar manner. As a result, a new recipient list is generated, as indicated in block 2620.

Figure 27C:
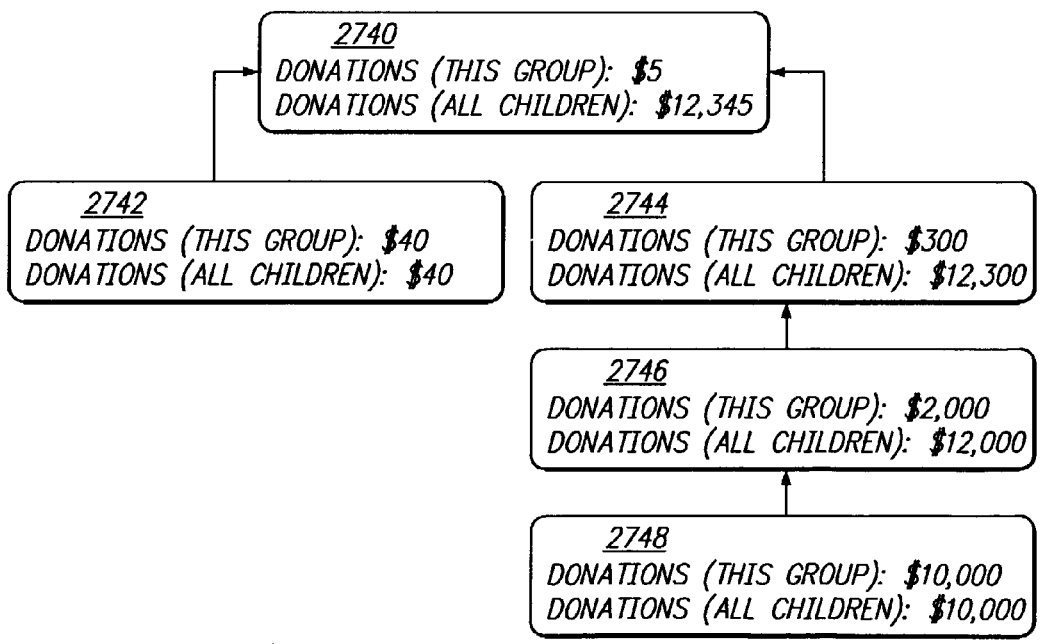
FIG. 27C illustrates one application of the processes of FIG. 27A, FIG. 27B in which a linked collection of related messages are used to aggregate data from a child message up to a parent message.
Figure 27A:
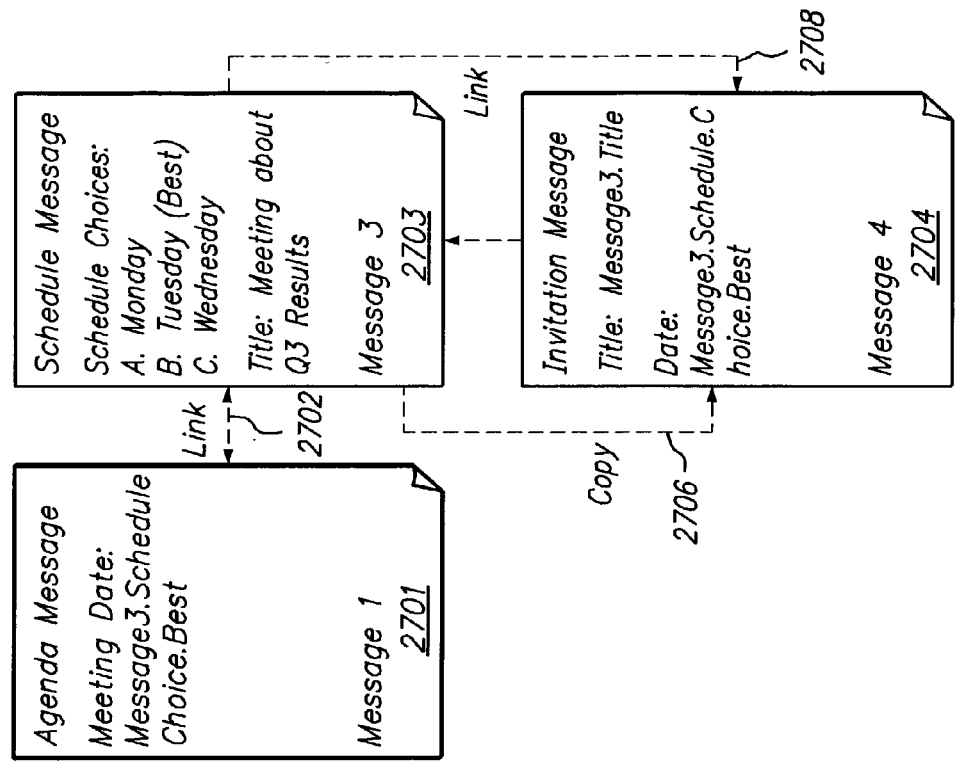
FIG. 27A is a block diagram illustrating that the content of messages that are linked can be changed, with automatic propagation of changed content to linked messages.

FIG. 27A is a block diagram illustrating that the content of messages that are linked can be changed, with automatic propagation of changed content to linked messages. This allows content to be targeted to certain groups and separated from other groups. Changes to content may flow back, forth, and among linked message members. The linking provides connections that workflow processes can use to identify targets and sources of data that are needed within independent messages. Links used for sharing data and role information may be made unavailable to the end user.

In the example of FIG. 27A, a first message 2701 is linked by link 2702 to message 2703. The Meeting Date value of message 2701 is linked to a field "Schedule.Choice.Best" of message 2703, so that changes to that field are propagated to first message 2701. Message 2703 is also linked to message 2704 and sends the same field value to it. Thus, changes in message 2703 flow along links 2702, 2708 to other messages in a message web.

FIG. 27B is a flow diagram of a process of updating data among linked messages in a message web.

In block 2726, the system determines that a field of a transportable application has been updated. For example, user input results in a change to a data entry field of a building block. In block 2728, the system determines whether any other system objects, such as data objects, fields, or building blocks have subscribed to the field that has changed. If so, then the subscribers are marked as needing to be refreshed, in block 2730. For every subscriber needing to be refreshed, block 2732, control is passed to block 2724 to mark the subscriber field as no longer needing to be refreshed. The field is then interpreted starting at block 2710. When all subscriber fields have been refreshed, control passes to block 2734 in which the process of FIG. 27B is complete.

In block 2710, a field definition and value within a message are interpreted to identify a link or other reference to other messages. In block 2712, the system determines whether the field definition comprises a link to data in another field. If so, then in block 2714, the system verifies that the linked field is updated, and fetches data from the linked field. Block 2714 may involve dynamically retrieving field data from database 208. In block 2716, the system tests whether the field definition contains an instruction to embed data from another field. If so, then the embedded field is identified and tested to determine if it is updated, as in block 2718. Data from the embedded field is fetched, and the field definition property is cleared since the data is then embedded.

In block 2720, the system tests whether all data in the field definition has been resolved to static form. If not, then control is transferred to block 2712 to resolve any remaining references. If so, then in block 2722, any business rules in the field definition are applied to compute the final field value.

Accordingly, data from one field of a message that is linked in a message web may propagate to fields of other linked messages, automatically and in response to user input or other actions that cause changes to data objects.

FIG. 27C illustrates one application of the processes of FIG. 27A, FIG. 27B in which a linked collection of related messages are used to aggregate data from a child message up to a parent message. The result may be displayed in any message of the tree to show activity in the lineage of a tree. Messages 2742, 2744, 2746, 2748 participate in a tree rooted at message 2740, which receives data values from all child messages and aggregates them. Message 2740 is used to collect donations from a group of recipients. Similar donation collection messages may be created from any donation collection message and sent to a different set of recipients. Each message shows the donations committed to by its recipients, as well as the donations committed to by all its descendants. Arrows show the flow of data up through the message hierarchy. Message 2740 is linked to and subscribes to donation fields of child messages 2742, 2744, 2746, 2748. Each such message may also be a message web.

Figure 28A:
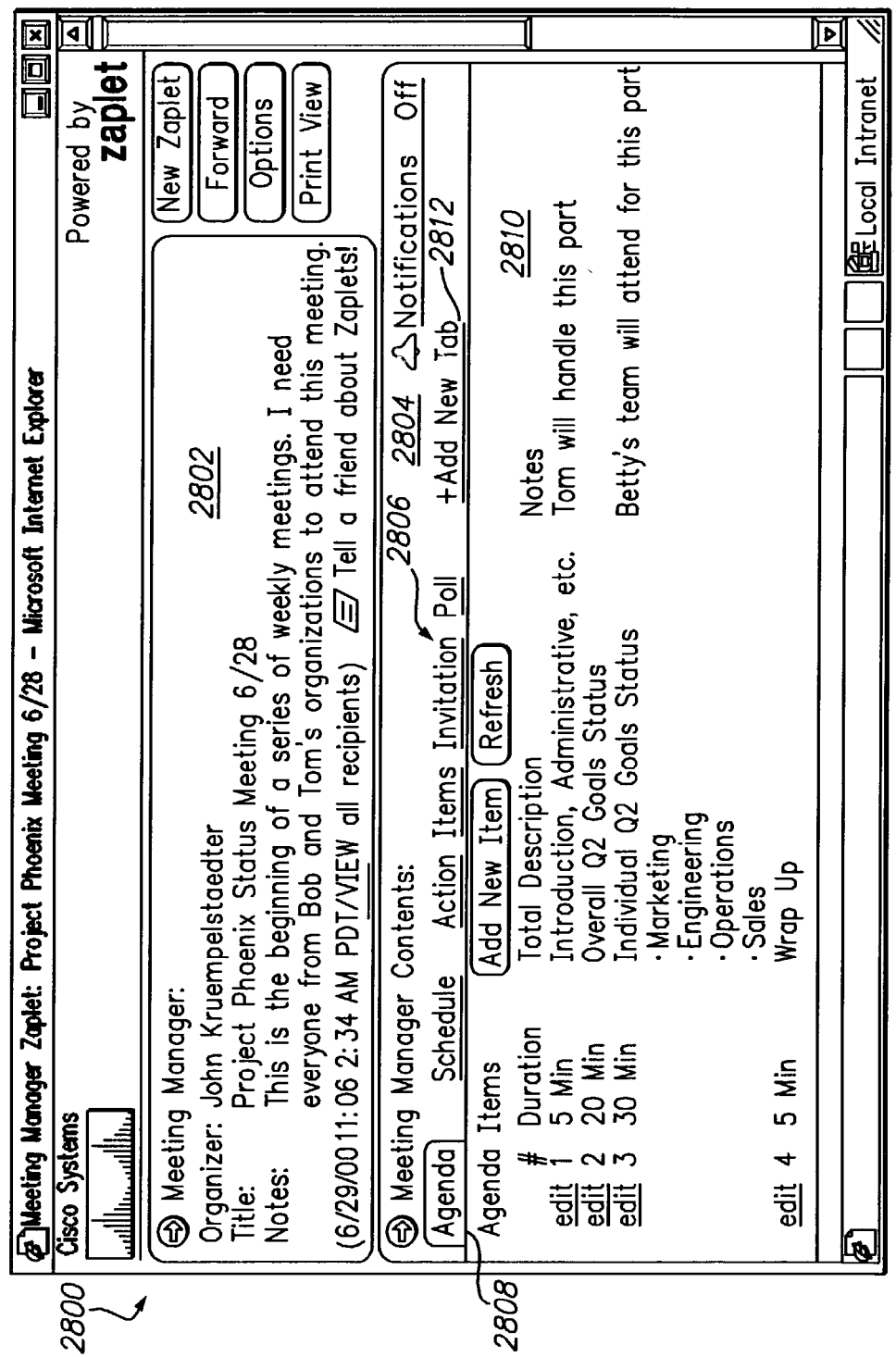
FIG. 28A is a diagram of a graphical user interface display in which a transportable application includes a plurality of tabs that switch between the content of message web members.

FIG. 28A is a diagram of a graphical user interface display in which a transportable application includes a plurality of tabs that switch between the content of message web members. Transportable application 2800 comprises a header area 2802 and a message web header 2804 having a plurality of tabs 2806. In the example of FIG. 18A, the tabs 2806 include an agenda tab link 2808, action items link, invitation link, poll link, etc. Agenda link 2808 accesses an agenda that is presented within the context of transportable application 2800, e.g., in a display pane 2810. By clicking on one of the tabs, the action items for that message content may be viewed or changed without leaving the context of the enclosing message. There may be different access control capabilities for the content under each tab. Participants may link other message webs to header 2804 by selecting an Add New Tab Link 2812. In response, the system prompts the user to identify a message web to link, as in FIG. 23A.

Thus, message web members that share a common address list may be aggregated into a single message for purposes of presentation. Messages that are added, modified, and deleted as parts of the message web are reflected in the aggregated presentation. Some tasks are better navigated by direct access to steps instead of linear progression from one step to the next. By aggregating message web members within a single presentation, available members can be easily seen and accessed directly. Aggregated message web presentations may also provide a per role control panel for a task such that messages with diverse recipient or access control lists can be presented in an aggregated manner.

Figure 28B:
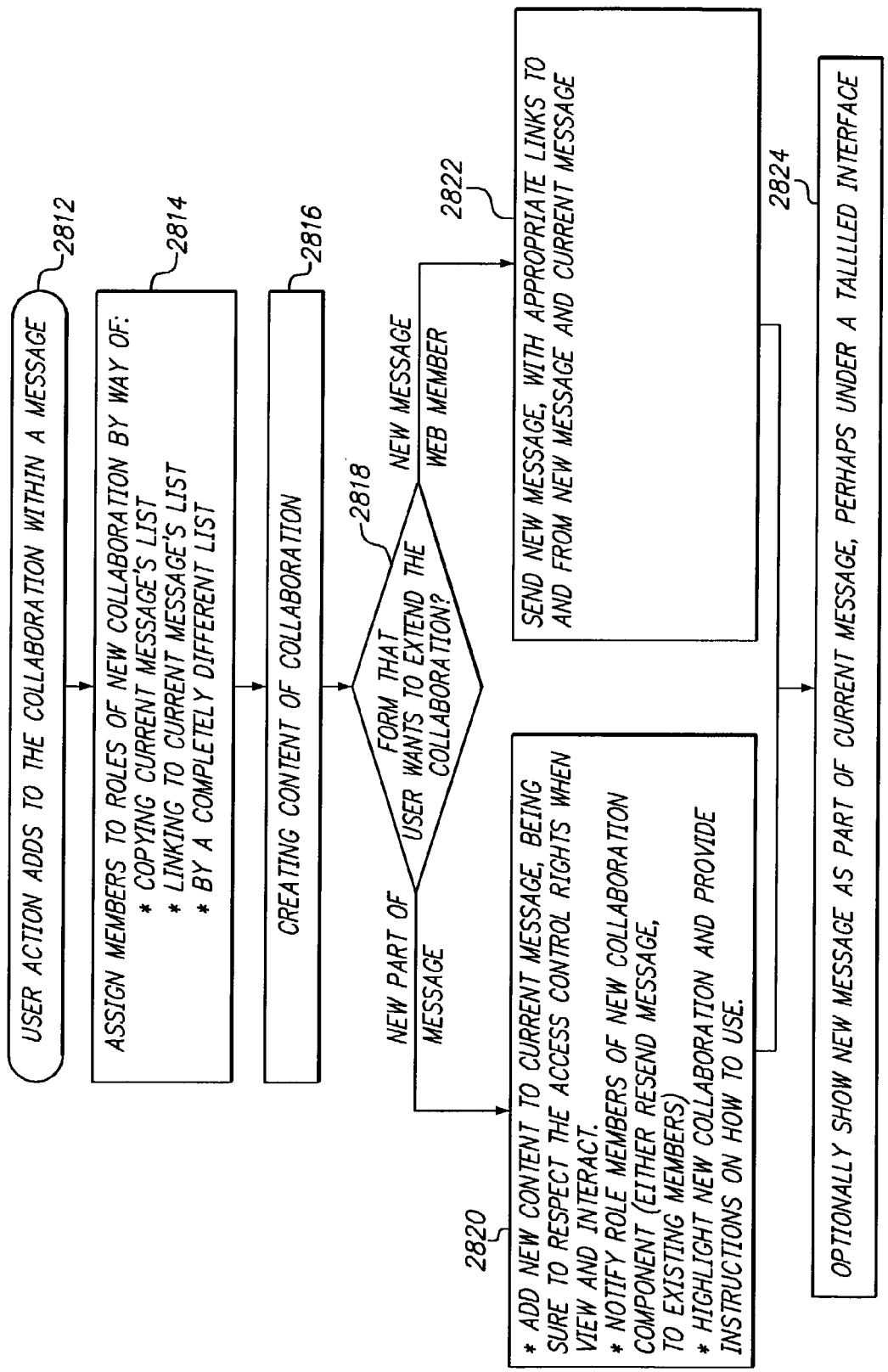
FIG. 28B is a flow diagram of a process of adding tabs to a transportable application of the type shown in FIG. 28A.

FIG. 28B is a flow diagram of a process of adding tabs to a transportable application of the type shown in FIG. 28A. In block 2812, a user action adds to a collaboration activity within a message. For example, assume that a recipient selects Add New Tab link 2812 of FIG. 28A. In response, members are assigned to the new collaboration, in block 2814. For example, the recipient list of the current transportable application may be added to a message recipient list for the new collaboration. In block 2816, content for the new collaboration is created. In one embodiment, the content is created by prompting the user to select whether to extend the collaboration as a new part of an existing message, or as a new message web member, as indicated by block 2818.

If a new message web member is requested, then in block 2822, a new message is sent to the recipient list, and appropriate links are created to insert the new message into the message web. If a new part of the same message is selected, then in block 2820, the new content is added to the current message. Recipients of the current message notified appropriately, and the new content is highlighted when such recipients read the message. In either alternative, as shown by block 2824, the new message may be associated with a new tab in the current message.

Figure 28C:
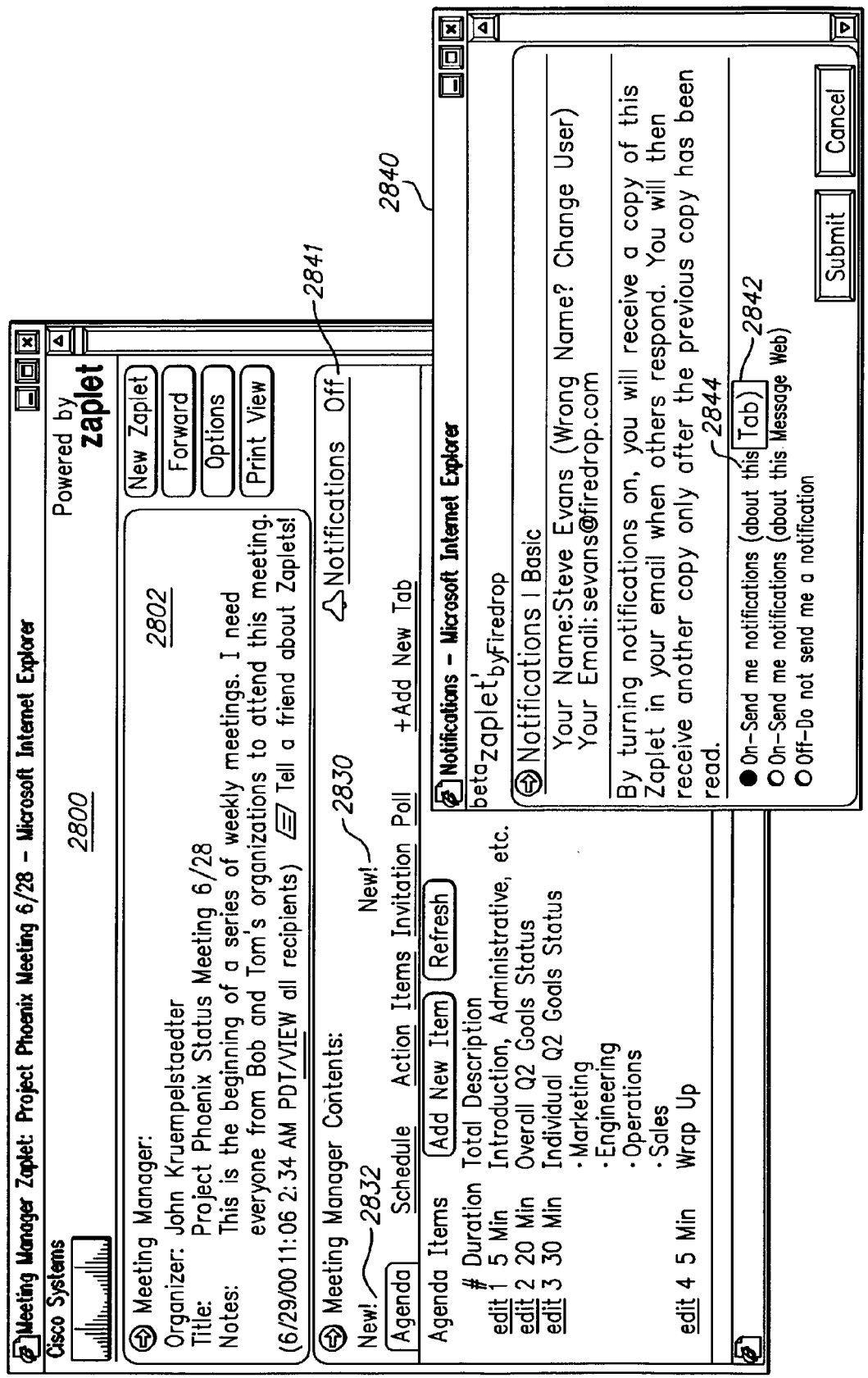
FIG. 28C illustrates a notification message of a message web.

FIG. 28C illustrates a notification message of a message web. Message 2800 of FIG. 28A is shown with New icons 2830, 2832 indicating areas that are new since the time the user last looked at this message. The user may set conditions for such notifications by selecting a Notifications link 2841. In response, the system displays a dialog box 2840 having notification activation links 2842, 2844. The user may turn on notifications relating to a particular message tab with notification activation link 2844 and may turn on notifications about an entire message web with link 2842. When such notifications are set, the icons 2830, 2832 are displayed when content of the page or message web changes.

Thus, a single notification message serves to alert a user about changes or additions spanning multiple messages within a message web. Individual changes or additions across messages are highlighted within the notification message. The notification message can be the message web home, any message web member, a digest of changes within a message web, or a list of message webs.

For example, assume a user working on a multiple step task wants to be kept informed about changes within that task. By signing up for message web notifications, a user cuts down on the number of notifications he receives by aggregating indications of what has changed into a single notification message. The user does not get multiple notifications corresponding to every change within the message web. No further notification is sent until a user has looked at the changes indicated by a previous notification.

Message webs that are delivered to recipients may be received in an e-mail client and identified by a special subject designation. For example, a special message that represents a message web may be displayed within the same containers, lists, or folder as a regular email message. An icon representing the message could be different, and menu functions available for the special message might be different from those available for a regular message. The message subject line may include a topical subject, appended with, "-Message Web," or a similar designation. Message Webs may take the place of individual messages within message folders. These may be individual messages, but a special message may be referred to as the "Message Web Home". Message Webs may exist within the same folders as messages.

Figure 29:
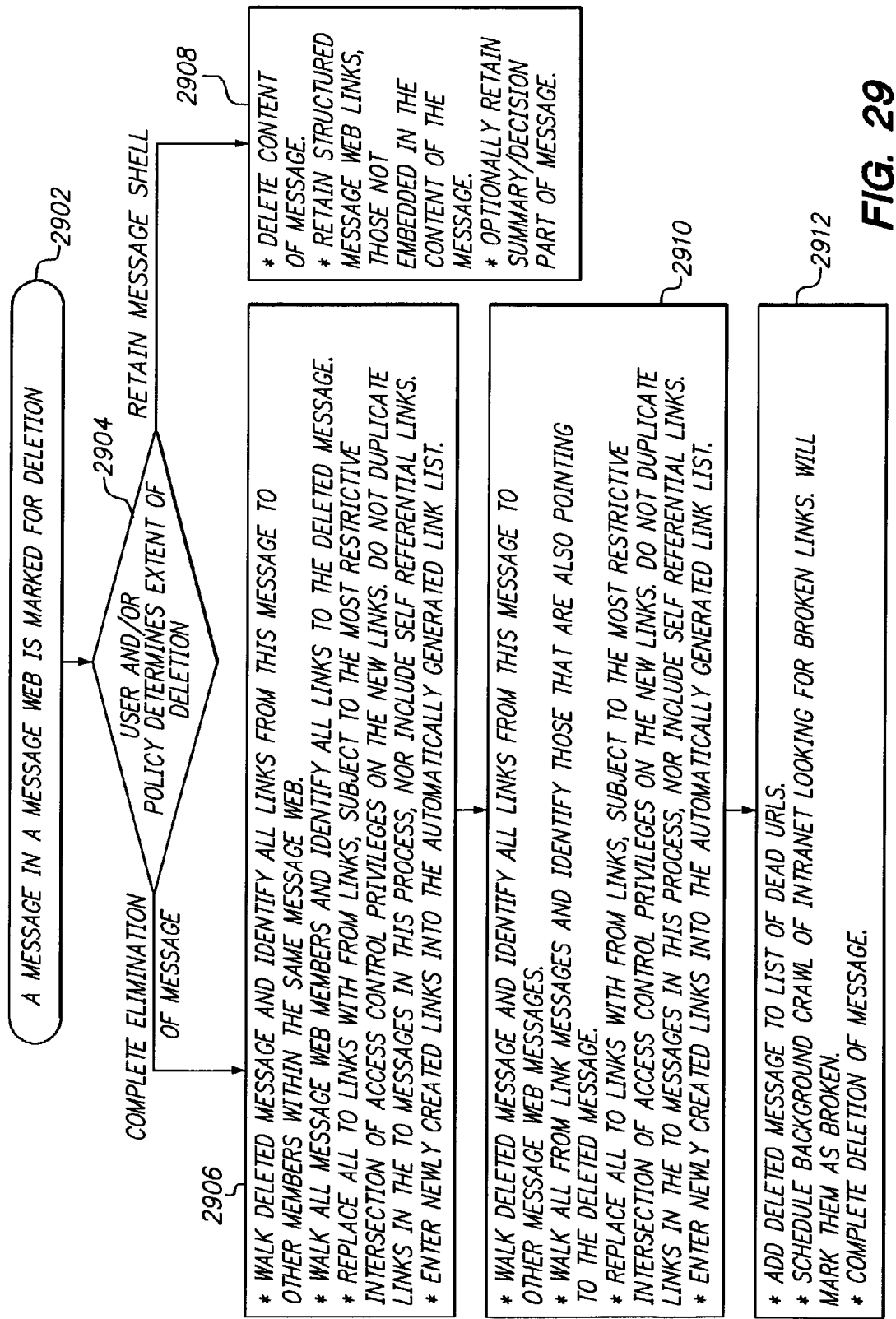
FIG. 29 illustrates a method for tracing deleted messages using links.

FIG. 29 illustrates a method for tracing deleted messages using links. In one embodiment, a message deleted from within a message web does not destroy the integrity of the message web; instead, message links are automatically repaired. Automatically generated message placeholders may also be used in the place of deleted messages in order to maintain the integrity of a message web. These placeholders can act as patch panels, giving user options of where to link to, especially when the self-repair process cannot definitively decide what the correct links are out of a broader set. Additionally, links to a deleted message may be removed or disabled from their source.

Within the Internet, broken links are an extremely common problem. By knowing that message webs form a unit, a manager can either rethread the ends of links pointing to deleted messages or utilize a placeholder message shell through which existing links can traverse. The shell has little or no content other than the links from it that the previous message contained. The shell can also offer suggestions, when the shell manager is not sure of what links are important. Links that are automatically deleted when a message is deleted result in fewer broken links.

In block 2902, a message in a message web is marked for deletion. In block 2904, the system determines what kind of deletion to carry out. In an embodiment, deletion may involve complete elimination of the deleted message, or retaining a message shell as a placeholder. If a placeholder is retained, then in block 2908, the content of the message is deleted, and the existing message web links are retained. Optionally, a summary or decision portion of the message may be retained.

If the message is completely eliminated, then in block 2906, all links from the deleted message to other members within the same message web are identified. Each message web member is visited and all links to the deleted message are identified. The links are replaced with links to the next message in the message web, subject to access control privileges and elimination of self-referencing links. The updated links are entered in an automatically maintained link list. In block 2910, links to other message webs are similarly updated. In block 2912, the deleted message is added to a list of deleted messages or "dead URLs." Optionally, a crawl of the Internet may be scheduled to search for external links to the deleted message, since such links become "broken" upon deletion of the message. As a result, the message is deleted.

Figure 30:
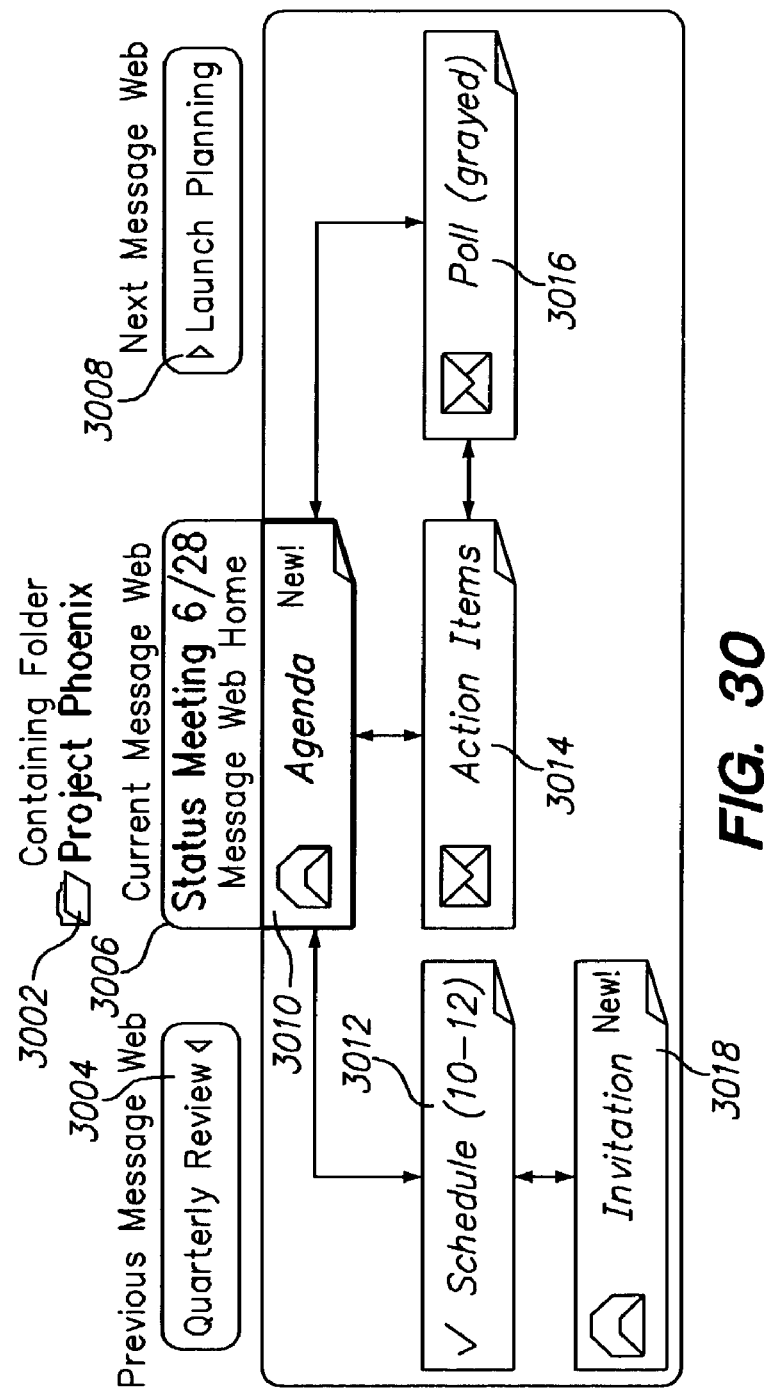
FIG. 30 illustrates a message web map that may be used in a graphical user interface of a messaging system that supports linked messages, in one example embodiment.

FIG. 30 illustrates a message web map that may be used in a graphical user interface of a messaging system that supports linked messages, in one example embodiment. The user interface graphically depicts messages as connected to each other. Applications containing multiple messages may also be linked together. In the example of FIG. 30, a visualization of an entire message web available to a user is provided. With such a message web map, a user can locate a message, jump directly to another message (even if not directly linked), see what messages have new content (relative to the user), and note the status of each message/step in a task or sub-task. Similarly, a map of other applications and folders may be represented.

For example, FIG. 30 depicts a folder 3002 for a particular project that contains a first message web 3006 dealing with an upcoming status meeting. The message web 3006 comprises a home message 3010 and child messages 3012, 3014, 3016, 3018. Each such message may be a transportable application as described herein. FIG. 30 also depicts a previous message web 3004 and next message web 3008 in a web ring. Thus, a user may receive a graphical view of complex message relationships and related message webs.

Figure 31A:
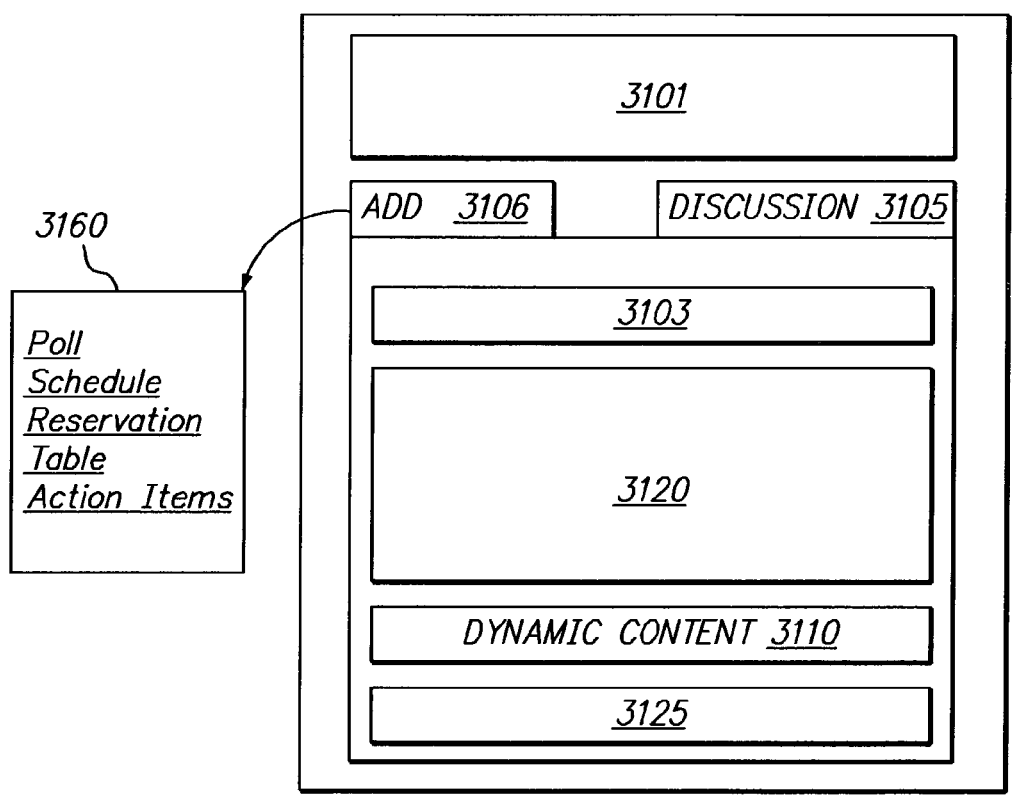
FIG. 31A, FIG. 31B, and FIG. 31C are diagrams of graphical user interface displays that illustrate an example of a recruiting process using a message web.
Figure 31B:
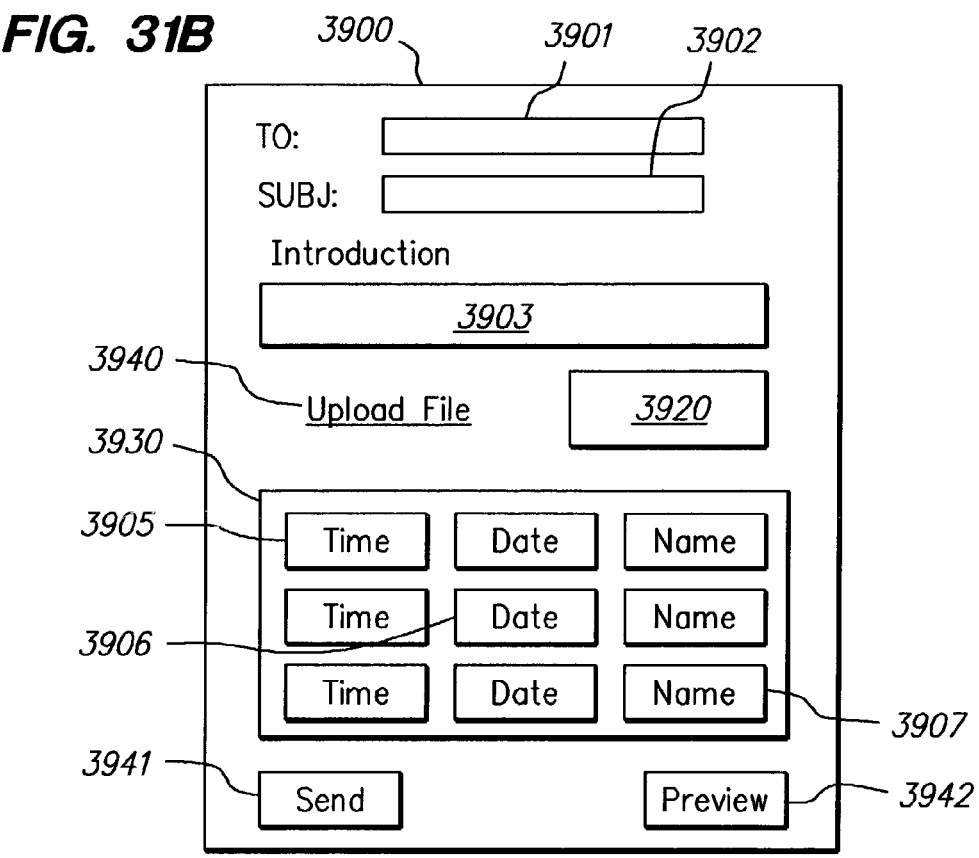
Figure 31C:
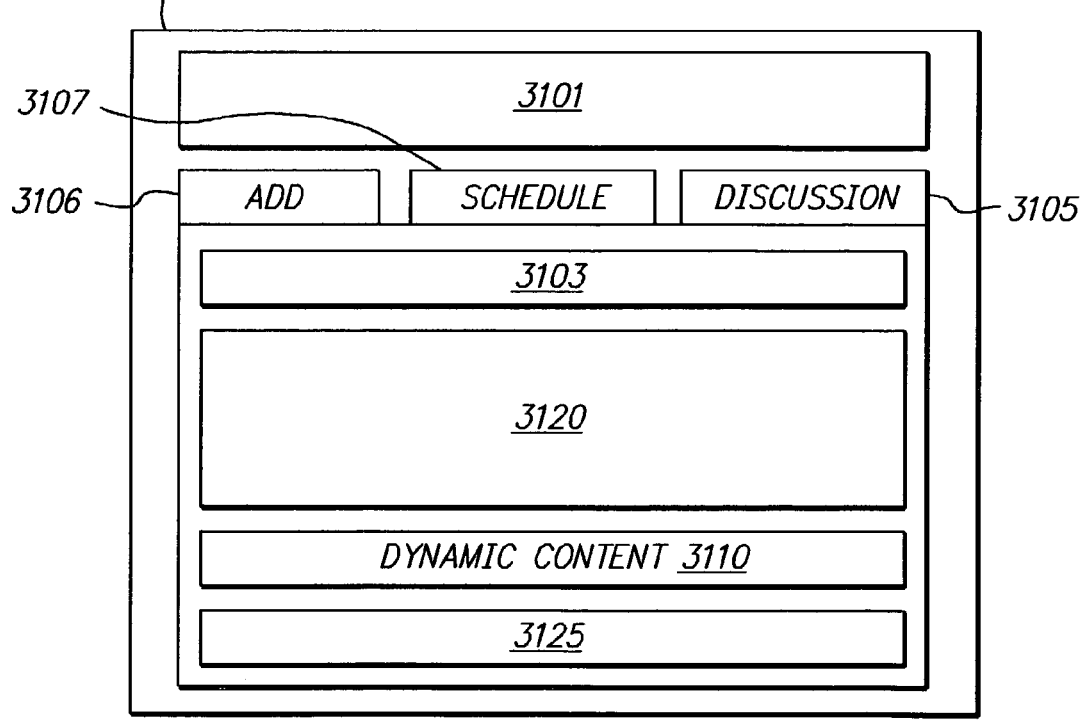

FIG. 31A, FIG. 31B, and FIG. 31C are diagrams of graphical user interface displays that illustrate an example of a recruiting process using a message web.

Assume that a user logs into the system and enters a name and password via, for example, a Web page. Once the password and user name are verified by application server 220, an electronic form or application editor is provided to the user. The user may author a transportable application providing recruiting functions based on a template. The user may specify one or more addresses, such as electronic mail addresses, for the participants of the message web in a field of the form. The user may also specify the subject of the Message Web in a field. The form may also include a link that allows a user to upload content into a static content region. Static content, for example, a candidate's resume may be uploaded from a file residing on the user's computer. The form may also include buttons that allow the user to send the contents of the form to application server 220 and to first preview the content before it is sent to the server.

Once the user submits the form to the server, in response, the server sends a transportable application 3100 (FIG. 23D) with the content specified in the form. In one embodiment, transportable application 3100 may include one or more static content regions and dynamic content regions 3101, 3103, 3120, 3110, 3125, which include and capture content from regions of the electronic form. The regions may display headers, introductory text, substantive content, graphics, etc.

The transportable application 3100 also includes tabs 3105, 3106 that are associated with separate pages of the application. Tab 3105 specifies that transportable application 3100 includes a "Discussion". In this example, participants in the discussion can add comments into an interface region 3125. The tab 3106 allows one or more of the participants to link the current "Discussion" to, for example, a "Schedule" which can be used to set-up times to interview the candidate. A window 3160 may pop-up that allows a participant to choose "Schedule." Once the participant clicks on Schedule, the request is sent to the server.

In response, the server generates a new electronic form for providing a schedule. FIG. 31B illustrates an example electronic form 3900 that includes a region 3930 with fields 3905, 3906, and 3907 for specifying the Time, Date, and Name of the participants. The form 3900 may also include fields 3901 and 3902 and a dynamic content region 3903. The form 3900 may also include Send and Preview buttons 3941, 3942 that function in a manner similar to the buttons described above. Further, the form 3900 may include a link 3940 that enables a user to submit the content of the form to the server. When a participant presses the button 3940, the content of the form 3900 is sent to the server.

The transportable application 3100 is then be updated to reflect the content of the form 3900. FIG. 31C is a diagram of a screen display in which the transportable application reflects such updates. A tab 3107 is added to the transportable application 3100 to indicate that a "Schedule" has been initiated to interview the candidate. A participant may reply to the Schedule using the interface region and may also view the most current content in the dynamic region. The participants may use the tabs to navigate between the Discussion and Schedule. Each time a participant navigates between the tabs, the participant dynamically receives the most current content from the server.

A participant may add other transportable applications, pages or building blocks to the transportable application. In this way, multiple types of applications can be combined using the same message without the need for multiple instances of messages or tedious navigation through multiple message folders. Additionally, tabs similar may be added to the transportable application that allow multiple transportable applications, pages, or building blocks to be available, but marked as no longer active or useful to one or more of the participants ("grayed out").

4.0 Hardware Overview

The approaches described herein may be implemented in hardware or software, or a combination thereof. In one embodiment, the approaches are implemented in computer programs executing one or more programmable computers. The programmable computers may be either general-purpose computers or special-purpose, embedded systems. In either case, program code is applied to data entered with or received from an input device to perform the functions described and to generate output information. The output information is applied to one or more output devices.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk, magnetic diskette, or memory chip) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

Figure 19:
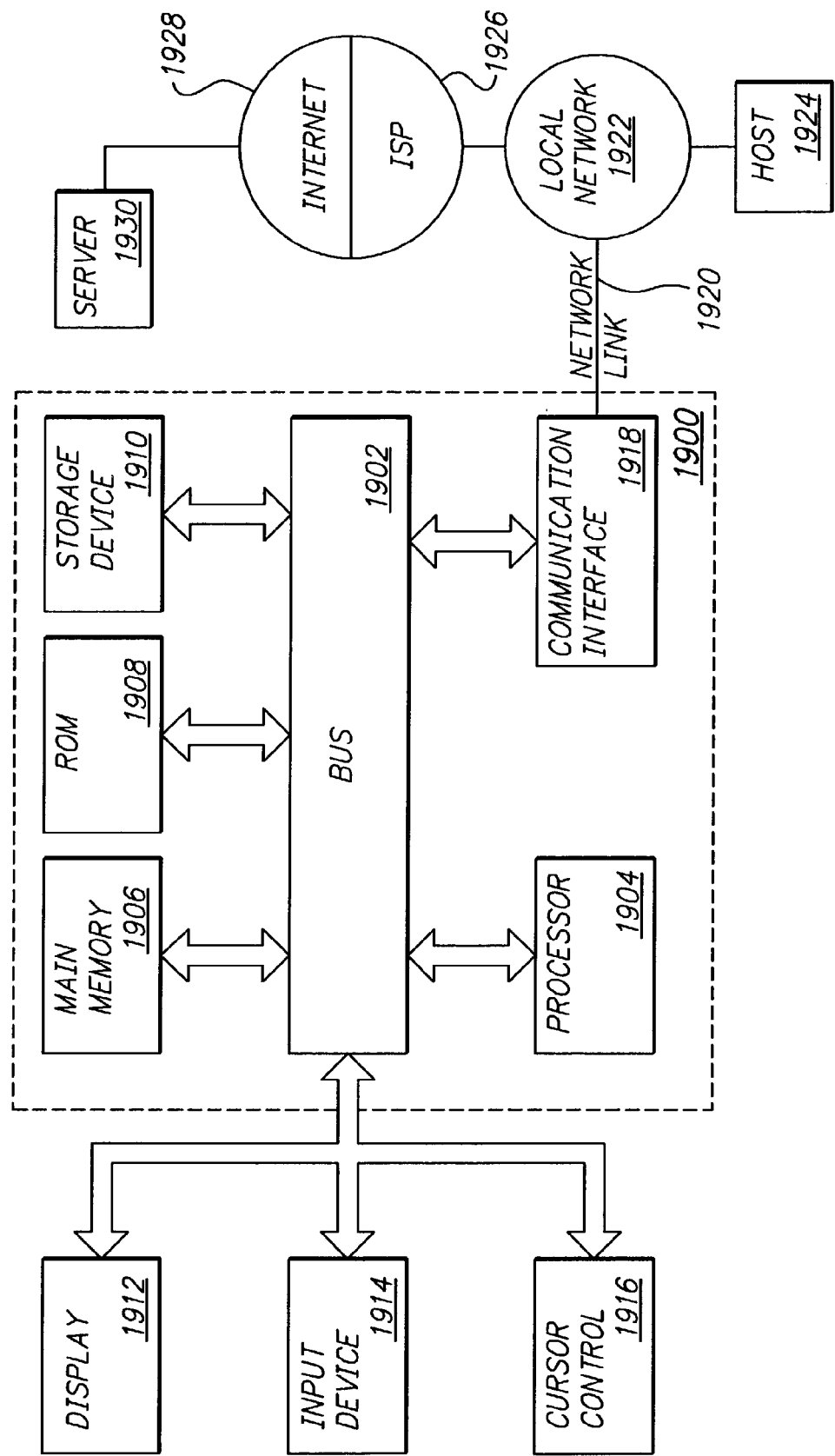
FIG. 19 is a block diagram that illustrates a computer system with which an embodiment may be implemented.

FIG. 19 is a block diagram that illustrates a computer system 1900 upon which an embodiment of the invention may be implemented. Computer system 1900 includes a bus 1902 or other communication mechanism for communicating information, and a processor 1904 coupled with bus 1902 for processing information. Computer system 1900 also includes a main memory 1906, such as a random access memory ("RAM") or other dynamic storage device, coupled to bus 1902 for storing information and instructions to be executed by processor 1904. Main memory 1906 also may be used for storing temporary variables or other intermediate information during execution of instructions to be executed by processor 1904. Computer system 1900 further includes a read only memory ("ROM") 1908 or other static storage device coupled to bus 1902 for storing static information and instructions for processor 1904. A storage device 1910, such as a magnetic disk or optical disk, is provided and coupled to bus 1902 for storing information and instructions.

Computer system, 1900 may be coupled via bus 1902 to a display 1912, such as a cathode ray tube ("CRT"), for displaying information to a computer user. An input device 1914, including alphanumeric and other keys, is coupled to bus 1902 for communicating information and command selections to processor 1904. Another type of user input device is cursor control 1916, such as a mouse, a trackball, touch screen, keypad of a cellular telephone or PDA, or cursor direction keys for communicating direction information and command selections to processor 1904 and for controlling cursor movement on display 1912. This input device typically has two degrees of freedom in two axes, a first axis (e.g., x) and a second axis (e.g., y), that allows the device to specify positions in a plane.

The invention is related to the use of computer system 1900 for collaborative communications, multiple-part messages, and linking and aggregating messages. According to one embodiment of the invention, collaborative communications, multiple-part messages, and linking and aggregating messages is provided by computer system 1900 in response to processor 1904 executing one or more sequences of one or more instructions contained in main memory 1906. Such instructions may be read into main memory 1906 from another computer-readable medium, such as storage device 1910. Execution of the sequences of instructions contained in main memory 1906 causes processor 1904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1904 for execution. Such a medium may take many forms, including but not limited to, non-volatile media, volatile media, and transmission media. Non-volatile media includes, for example, optical or magnetic disks, such as storage device 1910. Volatile media includes dynamic memory, such as main memory 1906. Transmission media includes coaxial cables, copper wire and fiber optics, including the wires that comprise bus 1902. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1904 for execution. For example, the instructions may initially be carried on a magnetic disk of a remote computer. The remote computer can load the instructions into its dynamic memory and send the instructions over a telephone line using a modem. A modem local to computer system 1900 can receive the data on the telephone line and use an infrared transmitter to convert the data to an infrared signal. An infrared detector can receive the data carried in the infrared signal and appropriate circuitry can place the data on bus 1902. Bus 1902 carries the data to main memory 1906, from which processor 1904 retrieves and executes the instructions. The instructions received by main memory 1906 may optionally be stored on storage device 1910 either before or after execution by processor 1904.

Computer system 1900 also includes a communication interface 1918 coupled to bus 1902. Communication interface 1918 provides a two-way data communication coupling to a network link 1920 that is connected to a local network 1922. For example, communication interface 1918 may be an integrated services digital network ("ISDN") card or a modem to provide a data communication connection to a corresponding type of telephone line. As another example, communication interface 1918 may be a local area network ("LAN") card to provide a data communication connection to a compatible LAN. Wireless links may also be implemented. In any such implementation, communication interface 1918 sends and receives electrical, electromagnetic or optical signals that carry digital data streams representing various types of information.

Network link 1920 typically provides data communication through one or more networks to other data devices. For example, network link 1920 may provide a connection through local network 1922 to a host computer 1924 or to data equipment operated by an Internet Service Provider ("ISP") 1926. ISP 1926 in turn provides data communication services through the worldwide packet data communication network now commonly referred to as the "Internet" 1928. Local network 1922 and Internet 1928 both use electrical, electromagnetic or optical signals that carry digital data streams. The signals through the various networks and the signals on network link 1920 and through communication interface 1918, which carry the digital data to and from computer system 1900, are exemplary forms of carrier waves transporting the information.

Computer system 1900 can send messages and receive data, including program code, through the network(s), network link 1920 and communication interface 1918. In the Internet example, a server 1930 might transmit a requested code for an application program through Internet 1928, ISP 1926, local network 1922 and communication interface 1918. In accordance with the invention, one such downloaded application provides for collaborative communications, multiple-part messages, and linking and aggregating messages as described herein.

The received code may be executed by processor 1904 as it is received, and/or stored in storage device 1910, or other non-volatile storage for later execution. In this manner, computer system 1900 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX 1

CLASS STRUCTURE AND API FOR EVENT HANDLING

```
1   Class Message
2   java.lang.Object
3      |
4      + - -com.zaplet.message.Message
5   ----------------------------------------------------------------------------------------------
6   public class Message
7   extends java.lang.Object
8   Class for implementing Messaging API - responsible for message content
9   Contains all data, related to the event message along with get/set methods, providing
10  access to this data The most proper way of using the Message class functionality would
11  be to instantiate the class and then add proper attributes, i.e name / value pairs for this
12  class:
13  ==============================
14
15            Message msg = new Message (msgType, objID, objType,
16  senderID, senderType, expTime);
17
18            // adding name/value pairs here
19            msg.addAttr (AttrName, Object);
20
21  ==============================
22
23  Since:
24       Java v1.1.8
25  Version:
26       1.0
27  Author:
28       Vlad Silverman
29  See Also:
30       com.zaplet.db.SelectAttributesByMsgId
31  ----------------------------------------------------------------------------------------------
    Message (java.lang.String msgType, com.zaplet.data.ObjectID objID,
    java.lang.String objType, com.zaplet.data.ObjectID senderID,
    java.lang.String senderType, java.util.Date expTime)
        Constructor Used to initialize a Message
32
                              void  addAttr (java.lang.String name,
                                    java.lang.Object value)
                                    addAttr() - adds atributes for the current message
              java.util.Hashtable  getAttr ()
                                    getAttr() - gets the m__attr class variable
                   java.util.Date  getExpTime ()
                                    getExpTime() - gets the m__expTime class variable
         com.zaplet.data.ObjectID  getMsgID ()
                                    getMsgID() - gets the m__msgID class variable
                 java.lang.String  getMsgType ()
                                    getMsgType() - gets the m__msgType class variable
         com.zaplet.data.ObjectID  getObjID ()
                                    getObjID() - gets the m__objID class variable
                 java.lang.String  getObjType ()
                                    getObjType() - gets the m__objType class variable
         com.zaplet.data.ObjectID  getSenderID ()
                                    getSenderID() - gets the m__senderID class variable
                 java.lang.String  getSenderType ()
                                    getSenderType() - gets the m__senderType class variable
                              int  getStatus ()
                                    getStatus() - gets the m__status class variable
                          boolean  isPersistent ()
                                    isPersistent() - gets the m__persistent class variable
                      static void  main (java.lang.String [] args)
                                    main() - main method provides functionality for unit testing of
                                    Message class
                             void  setAttr (java.util.Hashtable attr)
                                    setAttr() - sets the m__attr class variable
                             void  setExpTime (java.util.Date expTime)
                                    setExpTime() - sets the m__expTime class variable
                             void  setMsgID (com.zaplet.data.ObjectID msgID)
                                    setMsgID() - sets the m__msgID class variable
                             void  setMsgType (java.lang.String msgType)
                                    setMsgType() - sets the m__msgType class variable
                             void  setObjID (com.zaplet.data.ObjectID objID)
                                    setObjID() - sets the m__objID class variable
                             void  setObjType (java.lang.String objType)
                                    setObjType() - sets the m__objType class variable
                             void  setPersistent (boolean persistent)
                                    setPersistent() - sets the m__persistent class variable
                             void  setSenderID (com.zaplet.data.ObjectID senderID)
```

APPENDIX 1-continued

CLASS STRUCTURE AND API FOR EVENT HANDLING

```
                    setSenderID() - sets the m_senderID class varible
                void setSenderType (java.lang.String senderType)
                    setSenderType() - sets the m_senderType class variable
                void setStatus (int status)
                    setStatus() - sets the m_status class variable
33
    clone, equals, finalize, getClass, hashcode, notify, notifyAll, toString,
    wait, wait, wait
34
35  1.1.1 Message
36  public Message (java.lang.String msgType,
37             com.zaplet.data.ObjectID objID,
38             java.lang.String objType,
39             com.zaplet.data.ObjectID senderID,
40             java.lang.String senderType,
41             java.util.Date expTime)
42         Constructor Used to initialize a Message
43         Parameters:
44         msgType - - String value of the Message type
45         objID - - int value of the object Id
46         objType - - String value of the object type
47         This value should be part of names, defined in ObjectType class
48         senderID - - value of the sender Id
49         senderType - - String value of the sender type
50         This value should be part of names, defined in ObjectType class
51         expTime - - expiration time for the current message
52  1.1.2 setMsgID
53  public void setMsgID (com.zaplet.data.ObjectID msgID)
54         setMsgID() - sets the m_msgID class variable
55         Parameters:
56         msgID - - the value to be set
57  ----------------------------------------------------------------------
58  1.1.3 getMsgID
59  public com.zaplet.data.ObjectID getMsgID ()
60         getMsgID() - gets the m_msgID class variable
61         Returns:
62         msgID - the value of the class variable
63  ----------------------------------------------------------------------
64  1.1.4 setMsgType
65  public void setMsgType (java.lang.String msgType)
66         setMsgType() - sets the m_msgType class variable
67         Parameters:
68         msgType - - the value to be set
69  ----------------------------------------------------------------------
70  1.1.5 getMsgType
71  public java.lang.String getMsgType ()
72         getMsgType() - gets the m_msgType class variable
73         Returns:
74         msgType - the value of the class variable
75  ----------------------------------------------------------------------
76  1.1.6 setObjID
77  public void setObjID (com.zaplet.data.ObjectID objID)
78         setObjID() - sets the m_objID class variable
79         Parameters:
80         objID - - the value to be set
81  ----------------------------------------------------------------------
82  1.1.7 getObjID
83  public com.zaplet.data.ObjectID getObjID ()
84         getObjID() - gets the m_objID class variable
85         Returns:
86         objID - the value of the class variable
87  ----------------------------------------------------------------------
88  1.1.8 setObjType
89  public void setObjType (java.lang.String objType)
90         setObjType() - sets the m_objType class variable
91         Parameters:
92         obj Type - - the value to be set
93  ----------------------------------------------------------------------
94  1.1.9 getObjType
95  public java.lang.String getObjType ()
96         getObjType() - gets the m_objType class variable
97         Returns:
98         objType - the value of the class variable
99  ----------------------------------------------------------------------
100 1.1.10 setSenderID
101 public void setSenderID (com.zaplet.data.ObjectID senderID)
102        setSenderID() - sets the m_senderID class variable
```

APPENDIX 1-continued

CLASS STRUCTURE AND API FOR EVENT HANDLING

```
103        Parameters:
104        objID - - the value to be set
105    ----------------------------------------------------------------------------------------
106    1.1.11 getSenderID
107    public com.zaplet.data.ObjectID getSenderID ()
108        getSenderID() - gets the m_senderID class variable
109        Returns:
110        senderID - the value of the class variable
111    ----------------------------------------------------------------------------------------
112    1.1.12 setSenderType
113    public void setSenderType (java.lang.String senderType)
114        setSenderType() - sets the m_senderType class variable
115        Parameters:
116        senderType - - the value to be set
117    ----------------------------------------------------------------------------------------
118    1.1.13 getSenderType
119    public java.lang.String getSenderType ()
120        getSenderType() - gets the m_senderType class variable
121        Returns:
122        senderType - the value of the class variable
123    ----------------------------------------------------------------------------------------
124    1.1.14 setStatus
125    public void setStatus (int status)
126        setStatus() - sets the m_status class variable
127        Parameters:
128        status - - the value to be set
129    ----------------------------------------------------------------------------------------
130    1.1.15 getStatus
131    public int getStatus ()
132        getStatus() - gets the m_status class variable
133        Returns:
134        status - the value of the class variable
135    ----------------------------------------------------------------------------------------
136    1.1.16 setExpTime
137    public void setExpTime (java.util.Date expTime)
138        setExpTime() - sets the m_expTime class variable
139        Parameters:
140        expTime - - the value to be set
141    ----------------------------------------------------------------------------------------
142    1.1.17 getExpTime
143    public java.util.Date getExpTime ()
144        getExpTime() - gets the m_expTime class variable
145        Returns:
146        expTime - the value of the class variable
147    ----------------------------------------------------------------------------------------
148    1.1.18 isPersistent
149    public boolean isPersistent ()
150        isPersistent() - gets the m_persistent class variable
151        Returns:
152        m_persistent - the value of the class variable
153    ----------------------------------------------------------------------------------------
154    1.1.19 setPersistent
155    public void setPersistent (boolean persistent)
156        setPersistent() - sets the m_persistent class variable
157        Parameters:
158        m_persistent - - the value to be set
159    ----------------------------------------------------------------------------------------
160    1.1.20 setAttr
161    public void setAttr (java.util.Hashtable attr)
162        setAttr() - sets the m_attr class variable
163        Parameters:
164        attr - - the value to be set
165    ----------------------------------------------------------------------------------------
166    1.1.21 getAttr
167    public java.util.Hashtable getAttr ()
168        getAttr() - gets the m_attr class variable
169        Returns:
170        attr - the value of the class variable
171    ----------------------------------------------------------------------------------------
172    1.1.22 addAttr
173    public void addAttr (java.lang.String name,
174                        java.lang.Object value)
175        throws MessageException
176        addAttr() - adds atributes for the current message
177        Parameters:
178        name - the name of the attribute to be added to the name/value list
179        value - the value of the attribute to be added to the name/value list
```

APPENDIX 1-continued

CLASS STRUCTURE AND API FOR EVENT HANDLING

```
180        Throws:
181           MessageException - - in case of null parameters
182  ----------------------------------------------------------------------------------------------------
183  1.1.23 main
184  public static void main (java.lang.String [] args)
185        main() - main method provides functionality for unit testing of Message class
186
187                         1.2  Class MessageService
188  java.lang.Object
189    |
190    + - -com.zaplet.message.MessageService
191  ----------------------------------------------------------------------------------------------------
192  public class MessageService
193  extends Object
194  Class for implementing Messaging API - responsible for services on Message data
195  Publishes/stores info about any object in the db
196  This class provides also transformation between internal objects used by the Zaplet
197  platform and standard data types, used by JDBC layer
198  Possible ways of using the MessageService are outlined below:
199  ==============================
200              Message msg = new Message (msgType, objID, objType,
201  senderID, senderType, expTime);
202
203              try {
204
205                  // adding name/value pairs here
206                  msg.addAttribute (AttrName1, Object1);
207                  msg.addAttribute (AttrName2, Object2);
208                  . . . .
209
210        // Now there are several choices:
211        //
212        // 1. we can just store the message and
213        //       all its attributes in the database
214                  MessageService, publish (msg);
215                  . . . .
216                  OR
217
218        // 2. we can publish the message in the Db and
219        // fire the action, associated with the message
220        //       The action should be implemented in the handle ()
221        //       method of the class, specified by 'msgType'
222                  MessageService.publishAndFire (msg);
223                  . . . .
224                  OR
225
226        // 3. we can just fire the action, specified by msgType
227        //       without storing the message in the database
228        msg.setPersistent (false);
229                  MessageService.publisbAndFire (msg);
230
231              }
232              catch (MessageException me) {
233                  // process MessageException here
234              }
235  ==============================
236
237  Since:
238        Java v1.1.8
239  Version:
240        1.0
241  Author:
242        Vlad Silverman
243  See Also:
244        com.zaplet.db.SelectAttributesByMsgId
245  ----------------------------------------------------------------------------------------------------
     Static String      SEQUENCEQUERY
246
     MessageService ()
247
                     protected getHandler (String msgType)
              static MessageHandler getHandler() - get the name of the class, which should handle the current
                        message
                        The name of the class is related to the type of the message
              protected static int getUniqueId (String query)
                           Get unique primary key id for an object, specified in the query
                        parameter.
```

APPENDIX 1-continued

CLASS STRUCTURE AND API FOR EVENT HANDLING

```
                    private static int insertAttributes (DbTrans trans, Message msg)
                                insertAttributes(msg) - inserts all attributes (name/value pairs) of a
                                message in the database
                    private static int insertMessage (DbTrans trans, Message msg)
                                insertMessage(msg) - inserts a message in the database
                    static void main (String [] args)
                                main() - main method provides functionality for unit testing of
                                MessageService class
                    static void publish (Message msg)
                                publish() - stores a new Message
                                this method will verify first m_Persistent flag of the Message object and store
                                the Message in the Db only if this flag is true
                    static void publishAndFire (Message msg)
                                publishAndFire() - activates the handle() method of the specific handler.
                                Handler is associated with the type of the current message.
248
    , clone, equals, finalize, getClass, hashCode, notify, notifyAll,
    registerNatives, toString, wait, wait, wait
249
250 1.2.24 SEQUENCEQUERY
251 public static final String SEQUENCEQUERY
252 1.2.25 MessageService
253 public MessageService ()
254 1.2.26 publish
255 public static void publish (Message msg)
256                    throws MessageException
257       publish() - stores a new Message
258       this method will verify first m_Persistent flag of the Message object and store the Message in the
259       Db only if this flag is true
260       Parameters:
261       msg - - a Message object
262       Throws:
263       MessageExceotion - - in case of one of db transactions failed
264 ----------------------------------------------------------------------------------------------------------
265 1.2.27 insertMessage
266 private static int insertMessage (DbTrans trans,
267                                   Message msg)
268       insertMessage(msg) - inserts a message in the database
269       Parameters:
270       trans - - database transaction
271       msg - - a Message object
272       Returns:
273       inserted number of rows
274 ----------------------------------------------------------------------------------------------------------
275 1.2.28 insertAttributes
276 private static int insertAttributes (DbTrans trans,
277                                      Message msg)
278       insertAttribute(msg) - inserts all attributes (name/value pairs) of a message in the database
279       Parameters:
280       trans - - database transaction
281       msg - - a Message object
282       Returns:
283       inserted number of rows
284 ----------------------------------------------------------------------------------------------------------
285 1.2.29 publishAndFire
286 public static void publishAndFire (Message msg)
287                    throws MessageException
288       publishAndFire() - activates the handle() method of the specific handler.
289       Handler is associated with the type of the current message. Before calling the handler this method
290       will store the Message object in the database
291       Parameters:
292       msg - - the Message object
293       Throws:
294       MessageException - - in case the event message can't be fired. Possible reason for this - the handle
295       can't be found
296 ----------------------------------------------------------------------------------------------------------
297 1.2.30 getHandler
298 protected static MessageHandler getHandler (String msgType)
299                    throws MessageException
300       getHandler() - get the name of the class, which should handle the current message
301       The name of the class is related to the type of the message
302       Parameters:
303       msgType - - the type of the message
304       Returns:
305       MessageHandler - returns an object which implements MessageHandler interface
306       Throws:
307       MessageException - - in case the handler can't be found
```

APPENDIX 1-continued

CLASS STRUCTURE AND API FOR EVENT HANDLING

```
308  ----------------------------------------------------------------------------------------------------
309  1.2.31 getUniqueId
310  protected static int getUniqueId (String query)
311                      throws MessageException
312       Get unique primary key id for an object specified in the query parameter. Use the database
313       sequencer
314       Parameters:
315       query - - a SQL query string ot get next id
316       Returns:
317       int - the next id number
318       Throws:
319       MessageException - - in case of DB communication failure
320  ----------------------------------------------------------------------------------------------------
321  1.2.32 main
322  public static void main (String [] args)
323                      throws Exception
324       main() - main method provides functionality for unit testing of MessageService class
325       This procedure instantiates a new message and sets message type of the current
326       message to the HandlerTest class located in com.zaplet.message package Three
327       attributes of different types are added to the current message After fire() method
328       will be called on the current message the handle() method of the HandlerTest class
329       will be executed This method is implemented just for testing purposes It will print
330       out the names, values and types of all attributes, associated with the current
331       message
332
333                      1.3 Class SystemHandler
334  java.lang.Object
335    |
336    + - -com.zaplet.message.SystemHandler
337  ----------------------------------------------------------------------------------------------------
338  public class SystemHandler
339  extends java.lang.Object
340  implements MessageHandler
341  Class for implementing Messaging API Contains handle method
342  Since:
343       Java v1.1.8
344  Version:
345       1.0
346  See Also:
347       Message
348  ----------------------------------------------------------------------------------------------------
     SystemHandler ()
            Constructor Used to initialize a SystemHandler
349
         void handle (Message msg)
             handle() gets the list of all observers of the current message, i.e gets the list of all messages,
             associated in the current message for every associated message acivates the fire method, which in turn:
             stores associated message if it is persistent activates the handle of the associated message
350
     clone, equals, finalize, getclass, hashCode, notify, notifyAll, toString,
     wait, wait, wait
351
352  1.3.33 SystemHandler
353  public SystemHandler ()
354       Constructor Used to initialize a SystemHandler
355  1.3.34 handle
356  public void handle (Message msg)
357       handle() gets the list of all observers of the current message, i.e gets the list of all messages,
358       associated in the current message for every associated message acivates the fire method, which in
359       turn: stores associated message if it is persistent activates the handle of the associated message
360       Specified by:
361       handle in interface MessageHandler
362       Parameters:
363       msg - Message object
364
365
366                      1.4 Interface MessageHandler
367  All Known Implementing Classes:
368       SystemHandler
369  ----------------------------------------------------------------------------------------------------
370  public interface MessageHandler
371  Iterface for Messaging API Contains methods to be implemented by every specific
372  Handler class
373  Since:
374       Java v1.1.8
375  Version:
376       1.0
```

APPENDIX 1-continued

CLASS STRUCTURE AND API FOR EVENT HANDLING

```
377  See Also:
378       com.zaplet.db.SelectAttributesByMsgId
379
          void handle (Message msg)
               handle method
380
381  1.4.35 handle
382  public void handle (Message msg)
383       handle method
384       Parameters:
385       msg - - a Message object
```

What is claimed is:

1. A method for processing a request to display an electronic message, the method comprising the computer-implemented steps of:

generating first message data, wherein the first message data defines at least a first message portion and one or more selection regions for selectively displaying one or more other message portions of a multiple-part electronic message having a plurality of message portions, wherein only one message portion among the first message portion and the other message portions is visible at a time when the first message data is displayed at a client;

providing the first message data to the client;

receiving from the client a request for a second portion of the electronic message selected from among the other message portions;

generating second message data which, when processed at a user interface of the client, causes the client to display the second portion of the electronic message and to hide the first message portion; and providing the second message data to the client;

wherein the step of generating first message data comprises the steps of generating first message data that defines at least a first message page, one or more selection regions for one or more other message pages of a multiple-page electronic message having a plurality of message pages, and a plurality of sub-pages of the first message page, further comprising the steps of;

receiving a selection of a sub-page of the first message page;

generating third message data that defines the selected sub-page of the first message page and which, when processed at the user interface, causes the user interface to display the selected sub-page of the electronic message;

providing the third message data to the client.

2. A method as recited in claim 1, wherein generating first message data further comprises the steps of generating first message data that defines a plurality of message portions each having a corresponding selection region and that defines a message user interface region that comprises all corresponding selection regions and the first message portion.

3. A method as recited in claim 1, wherein the first message data includes user interface definition data which, when processed at the user interface, causes the user interface to display the first portion of the electronic message in a first panel.

4. A method as recited in claim 3, wherein the user interface definition data includes data which, when processed at the user interface, causes the user interface to display a first identifier of the first portion of the electronic message in the first panel.

5. A method as recited in claim 4, wherein the first identifier indicates content of the first portion of the electronic message.

6. A method as recited in claim 3, wherein generating the first message data and generating the second message data further comprises the steps of generating second user interface definition data which, when processed at the user interface, causes the user interface to display a plurality of continuously visible selection regions, each associated with a different portion of the multiple-part message and the first portion of the electronic message.

7. A method as recited in claim 6, wherein the second user interface definition data comprises data which, when processed at the user interface, causes one or more other identifiers to be displayed in association with the continuously visible selection regions to identify corresponding portions of the electronic message.

8. A method as recited in claim 1, wherein the first message data comprises selection region definition data which, when processed at the user interface of the client, causes the client to display a plurality of selection regions that extend outwardly laterally from the first portion of the electronic message.

9. A method as recited in claim 1, wherein the first message data comprises selection region definition data which, when processed at the user interface of the client, causes the client to display a plurality of selection regions that extend outwardly upwardly from the first portion of the electronic message.

10. A method as recited in claim 1 wherein the second message data comprises selection region definition data which, when processed at the user interface of the client, causes the client to display a plurality of selection regions that extend outwardly downwardly from the first portion of the electronic message.

11. A method as recited in claim 1, wherein the first message data defines an electronic mail message having a plurality of message pages.

12. A method as recited in claim 1, wherein the first message data comprises selection region definition data which, when processed at the user interface of the client, causes the client to display a toolbar of functions for manipulating the multiple-part electronic message within a user interface panel that contains the first message portion.

13. A method as recited in claim 1, wherein the first message data further comprises one or more executable application building blocks, and further comprising the steps of:
- executing the one or more application building blocks to result in creating and storing one or more then-current dynamic data values as part of the first message portion;
- providing the one or more dynamic data values to the client as part of the first message portion.

14. A method as recited in claim 1, further comprising the steps of:
- retrieving one or more then-current dynamic data values from a database;
- rendering the dynamic data values as part of the first message portion;
- providing the one or more dynamic data values to the client as part of the first message portion.

15. A data processing apparatus comprising:
- a memory device configured to store electronic message data;
- a processor communicatively coupled to the memory device; and
- one or more sequences of instructions in the memory device which, when executed by the processor, cause the processor to carry out the steps of:
  - generating first message data, wherein the first message data defines at least a first message portion and one or more selection regions for selectively displaying one or more other message portions of a multiple-part electronic message having a plurality of message portions, wherein only one message portion among the first message portion and the other message portions is visible at a time when the first message data is displayed at a client;
  - providing the first message data to a client;
  - receiving from the client a request for a second portion of the electronic message selected from among the other message portions;
  - generating second message data which, when processed at a user interface of the client, causes the client to display the second portion of the electronic message and to hide the first message portion;
  - providing the second message data to the client;
  - wherein the step of generating first message data comprises the steps of generating first message data that defines at least a first message page, one or more selection regions for one or more other message pages of a multiple-page electronic message having a plurality of message pages, and a plurality of sub-pages of the first message page,
  - further comprising the steps of:
  - receiving a selection of a sub-page of the first message page;
  - generating third message data that defines the selected sub-page of the first message page and which, when processed at the user interface, causes the user interface to display the selected sub-page of the electronic message;
  - providing the third message data to the client.

16. An apparatus for processing a request to display an electronic message, comprising:
- means for generating first message data, wherein the first message data defines at least a first message portion and one or more selection regions for selectively displaying one or more other message portions of a multiple-part electronic message having a plurality of message portions, wherein only one message portion among the first message portion and the other message portions is visible at a time when the first message data is displayed at a client;
- means for providing the first message data to a client;
- means for receiving from the client a request for a second portion of the electronic message selected from among the other message portions;
- means for generating second message data which, when processed at a user interface of the client, causes the client to display the second portion of the electronic message and to hide the first message portion;
- means for providing the second message data to the client;
- wherein the means for generating first message data comprises means for generating first message data that defines at least a first message page, one or more selection regions for one or more other message pages of a multiple-page electronic message having a plurality of message pages, and a plurality of sub-pages of the first message page,
- further comprising:
- means for receiving a selection of a sub-page of the first message page;
- means for generating third message data that defines the selected sub-page of the first message page and which, when processed at the user interface, causes the user interface to display the selected sub-page of the electronic message;
- means for providing the third message data to the client.

17. A computer-readable medium comprising one or more sequences of instructions for processing a request to display an electronic message, which instructions, when executed by one or more processors, cause the one or more processors to carry out the steps of:
- generating first message data, wherein the first message data defines at least a first message portion and one or more selection regions for selectively displaying one or more other message portions of a multiple-part electronic message having a plurality of message portions, wherein only one message portion among the first message portion and the other message portions is visible at a time when the first message data is displayed at a client;
- providing the first message data to a client;
- receiving from the client a request for a second portion of the electronic message selected from among the other message portions;
- generating second message data which, when processed at a user interface of the client, causes the client to display the second portion of the electronic message and to hide the first message portion;
- providing the second message data to the client;
- wherein the step of generating first message data comprises the steps of generating first message data that defines at least a first message page, one or more selection regions for one or more other message pages of a multiple-page electronic message having a plurality of message pages, and a plurality of sub-pages of the first message page,
- further comprising the steps of:
- receiving a selection of a sub-page of the first message page;
- generating third message data that defines the selected sub-page of the first message page and which, when processed at the user interface, causes the user interface to display the selected sub-page of the electronic message;
- providing the third message data to the client.

* * * * *